United States Patent
Sculley et al.

(10) Patent No.: US 10,459,611 B1
(45) Date of Patent: Oct. 29, 2019

(54) SMART WORKSTATION METHOD AND SYSTEM

(71) Applicant: Steelcase Inc., Grand Rapids, MI (US)

(72) Inventors: Darrin Sculley, Byron Center, MI (US); Bo Anderson, Grand Rapids, MI (US); Rachel Anne Neiman, Grand Rapids, MI (US); Brandon Buckingham, Middleville, MI (US)

(73) Assignee: Steelcase Inc., Grand Rapids, MI (US)

( * ) Notice: Subject to any disclaimer, the term of this patent is extended or adjusted under 35 U.S.C. 154(b) by 0 days.

(21) Appl. No.: 15/898,175

(22) Filed: Feb. 15, 2018

Related U.S. Application Data

(63) Continuation of application No. 15/173,212, filed on Jun. 3, 2016, now Pat. No. 9,921,726.

(51) Int. Cl.
*G06F 3/00* (2006.01)
*G06F 3/0484* (2013.01)
*H04W 76/11* (2018.01)
*A47C 7/00* (2006.01)
*A47B 83/00* (2006.01)
(Continued)

(52) U.S. Cl.
CPC .......... *G06F 3/0484* (2013.01); *A47B 83/001* (2013.01); *A47C 7/00* (2013.01); *G06F 16/2457* (2019.01); *H04B 1/3827* (2013.01); *H04L 9/3231* (2013.01); *H04W 4/30* (2018.02); *H04W 76/11* (2018.02)

(58) Field of Classification Search
CPC ............. G06F 3/0484; G06F 17/30867; G06F 17/30029; A47B 83/001
See application file for complete search history.

(56) References Cited

U.S. PATENT DOCUMENTS

| 3,953,770 A | 4/1976 | Hayashi |
| 4,163,929 A | 8/1979 | Janu et al. |

(Continued)

FOREIGN PATENT DOCUMENTS

| AU | 2011203137 A1 | 7/2011 |
| AU | 2013203919 A1 | 5/2013 |

(Continued)

OTHER PUBLICATIONS

Anthro Corporation, Can Anthro "Walk the Talk"?: Employees Embark on a 30-Day Sit-Stand Challenge, Press Release Oct. 11, 2010, www.anthro.com/press-releases/2010/employees-embark-on-a-30-day-sit-stand-challenge, Copyright 2016, 4 pages.

(Continued)

*Primary Examiner* — Curtis B Odom
(74) *Attorney, Agent, or Firm* — Quarles & Brady LLP

(57) ABSTRACT

A method and system for anonymously associating a workstation user's station control preferences with a workstation, the method comprising the steps of correlating anonymous user IDs with user preference sets in a database, obtaining input from a user at a workstation, comparing the user input to the anonymous user IDs to distinguish one distinguished user from other users without determining the identity of the user, accessing the user preference set associated with the distinguished user and controlling workstation affordances per the accessed user preferences while the user is located within a present zone proximate the workstation.

41 Claims, 78 Drawing Sheets

(51) Int. Cl.
*H04W 4/30* (2018.01)
*H04B 1/3827* (2015.01)
*H04L 9/32* (2006.01)
*G06F 16/2457* (2019.01)

(56) References Cited

U.S. PATENT DOCUMENTS

| | | |
|---|---|---|
| 4,440,096 A | 4/1984 | Rice et al. |
| 4,571,682 A | 2/1986 | Silverman et al. |
| 4,751,399 A | 6/1988 | Koehring |
| 4,779,865 A | 10/1988 | Lieberman et al. |
| 4,821,118 A | 4/1989 | Lavaliere |
| 4,828,257 A | 5/1989 | Dyer et al. |
| 4,849,733 A | 7/1989 | Conigliaro et al. |
| 4,894,600 A | 1/1990 | Kearney |
| 5,019,950 A | 5/1991 | Johnson |
| 5,022,384 A | 6/1991 | Freels et al. |
| 5,050,077 A | 9/1991 | Vincent |
| 5,086,385 A | 2/1992 | Launey |
| 5,097,672 A | 3/1992 | Takenaka |
| 5,140,977 A | 8/1992 | Raffel |
| 5,224,429 A | 7/1993 | Borgman et al. |
| 5,259,326 A | 11/1993 | Borgman et al. |
| 5,293,097 A | 3/1994 | Elwell |
| 5,305,238 A | 4/1994 | Starr, III et al. |
| 5,308,296 A | 5/1994 | Eckstein |
| 5,323,695 A | 6/1994 | Borgman et al. |
| 5,335,188 A | 8/1994 | Brisson |
| 5,371,693 A | 12/1994 | Nakazoe |
| 5,406,176 A | 4/1995 | Sugden |
| 5,412,297 A | 5/1995 | Clark et al. |
| 5,435,799 A | 7/1995 | Lundin |
| 5,455,487 A | 10/1995 | Mix |
| 5,456,648 A | 10/1995 | Edinburg et al. |
| 5,476,221 A | 12/1995 | Seymour |
| 5,485,376 A | 1/1996 | Oike et al. |
| 5,489,827 A | 2/1996 | Xia |
| 5,583,831 A | 12/1996 | Churchill et al. |
| 5,612,869 A | 3/1997 | Letzt et al. |
| 5,666,426 A | 9/1997 | Helms |
| 5,717,856 A | 2/1998 | Carleton et al. |
| 5,765,910 A | 6/1998 | Larkin et al. |
| 5,853,005 A | 12/1998 | Scanlon |
| 5,870,647 A | 2/1999 | Nada et al. |
| 5,890,997 A | 4/1999 | Roth |
| 5,898,579 A | 4/1999 | Boys |
| 5,915,091 A | 6/1999 | Ludwig |
| 5,944,633 A | 8/1999 | Wittrock |
| 6,013,008 A | 1/2000 | Fukushima |
| 6,014,572 A | 1/2000 | Takahashi |
| 6,030,351 A | 2/2000 | Schmidt et al. |
| 6,032,108 A | 2/2000 | Sciple et al. |
| 6,038,542 A | 3/2000 | Ruckdashel |
| 6,075,755 A | 6/2000 | Zarchan |
| 6,100,663 A | 8/2000 | Boys |
| 6,135,951 A | 10/2000 | Richardson et al. |
| 6,140,921 A | 10/2000 | Baron |
| 6,142,910 A | 11/2000 | Heuvelman |
| 6,144,942 A | 11/2000 | Ruckdashel |
| 6,161,095 A | 12/2000 | Brown |
| 6,177,905 B1 | 1/2001 | Welch |
| 6,266,612 B1 | 7/2001 | Dussell |
| 6,266,691 B1 | 7/2001 | Watanabe |
| 6,286,441 B1 | 9/2001 | Burdi et al. |
| 6,288,716 B1 | 9/2001 | Humpleman |
| 6,296,408 B1 | 10/2001 | Larkin et al. |
| 6,297,621 B1 | 10/2001 | Hui |
| 6,304,068 B1 | 10/2001 | Hui |
| 6,312,363 B1 | 11/2001 | Watterson et al. |
| 6,342,906 B1 | 1/2002 | Kumar |
| 6,360,101 B1 | 3/2002 | Irvin |
| 6,360,675 B1 | 3/2002 | Jones |
| 6,361,173 B1 | 3/2002 | Vlahos |
| 6,424,623 B1 | 7/2002 | Borgstahl |
| 6,434,158 B1 | 8/2002 | Harris |
| 6,434,159 B1 | 8/2002 | Woodward |
| 6,447,424 B1 | 9/2002 | Ashby et al. |
| 6,458,060 B1 | 10/2002 | Watterson et al. |
| 6,466,234 B1 | 10/2002 | Pyle |
| 6,487,180 B1 | 11/2002 | Borgstahl |
| 6,501,364 B1 | 12/2002 | Hui |
| 6,527,674 B1 | 3/2003 | Clem |
| 6,532,218 B1 | 3/2003 | Shaffer |
| 6,546,419 B1 | 4/2003 | Humpleman |
| 6,548,967 B1 | 4/2003 | Dowling |
| 6,587,782 B1 | 7/2003 | Nocek |
| 6,595,144 B1 | 7/2003 | Doyle |
| 6,622,116 B2 | 9/2003 | Skinner et al. |
| 6,669,286 B2 | 12/2003 | Iusim |
| 6,691,029 B2 | 2/2004 | Hughes |
| 6,702,719 B1 | 3/2004 | Brown et al. |
| 6,716,139 B1 | 4/2004 | Hosseinzadeh-Dolkhani et al. |
| 6,724,159 B2 | 4/2004 | Gutta |
| 6,746,371 B1 | 6/2004 | Brown et al. |
| 6,749,537 B1 | 6/2004 | Hickman |
| 6,760,412 B1 | 7/2004 | Loucks |
| 6,760,749 B1 | 7/2004 | Dunlap |
| 6,790,178 B1 | 9/2004 | Mault et al. |
| 6,793,607 B2 | 9/2004 | Neil |
| 6,803,744 B1 | 10/2004 | Sabo |
| 6,839,417 B2 | 1/2005 | Weisman |
| 6,850,837 B2 | 2/2005 | Paulauskas |
| 6,888,438 B2 | 5/2005 | Hui |
| 6,906,495 B2 | 6/2005 | Cheng |
| 6,964,370 B1 | 11/2005 | Hagale et al. |
| 6,977,476 B2 | 12/2005 | Koch |
| 6,987,221 B2 | 1/2006 | Platt |
| 7,000,660 B2 | 2/2006 | Chen |
| 7,003,728 B2 | 2/2006 | Berque |
| 7,027,995 B2 | 4/2006 | Kaufman |
| 7,030,735 B2 | 4/2006 | Chen |
| 7,042,196 B2 | 5/2006 | Ka Lai |
| 7,043,532 B1 | 5/2006 | Humpleman |
| 7,063,644 B2 | 6/2006 | Albert et al. |
| 7,070,539 B2 | 7/2006 | Brown et al. |
| 7,084,758 B1 | 8/2006 | Cole |
| 7,124,164 B1 | 10/2006 | Chemtob |
| 7,128,693 B2 | 10/2006 | Brown et al. |
| 7,139,976 B2 | 11/2006 | Kausik |
| 7,141,026 B2 | 11/2006 | Aminian et al. |
| 7,149,776 B1 | 12/2006 | Roy |
| 7,161,490 B2 | 1/2007 | Huiban |
| 7,163,263 B1 | 1/2007 | Kurrasch |
| 7,172,530 B1 | 2/2007 | Hercules |
| 7,180,503 B2 | 2/2007 | Burr |
| 7,212,414 B2 | 5/2007 | Baarman |
| 7,221,937 B2 | 5/2007 | Lau |
| 7,239,110 B2 | 7/2007 | Cheng |
| 7,248,017 B2 | 7/2007 | Cheng |
| 7,266,383 B2 | 9/2007 | Anderson |
| 7,268,682 B2 | 9/2007 | Bialecki, Jr. |
| 7,293,243 B1 | 11/2007 | Ben-Shachar et al. |
| 7,301,463 B1 | 11/2007 | Paterno |
| 7,327,442 B1 | 2/2008 | Fear et al. |
| 7,340,769 B2 | 3/2008 | Baugher |
| 7,370,269 B1 | 5/2008 | Prabhu |
| 7,393,053 B2 | 7/2008 | Kurrasch |
| 7,394,405 B2 | 7/2008 | Godden |
| 7,421,069 B2 | 9/2008 | Vernon |
| 7,439,956 B1 | 10/2008 | Albouyeh et al. |
| 7,474,058 B2 | 1/2009 | Baarman |
| 7,475,078 B2 | 1/2009 | Kiilerich |
| 7,495,414 B2 | 2/2009 | Hui |
| 7,499,462 B2 | 3/2009 | MacMullan |
| 7,510,508 B2 | 3/2009 | Santomassimo et al. |
| 7,518,267 B2 | 4/2009 | Baarman |
| 7,519,664 B2 | 4/2009 | Karaki |
| 7,522,878 B2 | 4/2009 | Baarman |
| 7,523,905 B2 | 4/2009 | Timm et al. |
| 7,525,283 B2 | 4/2009 | Cheng |
| 7,526,525 B2 | 4/2009 | Hagale |
| 7,538,284 B2 | 5/2009 | Nielsen et al. |
| 7,554,316 B2 | 6/2009 | Stevens |
| 7,554,437 B2 | 6/2009 | Axelsen |

(56) References Cited

U.S. PATENT DOCUMENTS

| | | | |
|---|---|---|---|
| 7,576,514 B2 | 8/2009 | Hui |
| 7,577,522 B2 | 8/2009 | Rosenberg |
| 7,590,941 B2 | 9/2009 | Wee |
| 7,594,873 B2 | 9/2009 | Terao et al. |
| 7,605,496 B2 | 10/2009 | Stevens |
| 7,612,528 B2 | 11/2009 | Baarman |
| 7,614,001 B2 | 11/2009 | Abbott et al. |
| 7,615,936 B2 | 11/2009 | Baarman |
| 7,619,366 B2 | 11/2009 | Diederiks |
| 7,622,891 B2 | 11/2009 | Cheng |
| 7,628,737 B2 | 12/2009 | Kowallis et al. |
| 7,634,533 B2 | 12/2009 | Rudolph |
| 7,635,324 B2 | 12/2009 | Balis |
| 7,637,847 B1 | 12/2009 | Hickman |
| 7,639,110 B2 | 12/2009 | Baarman |
| 7,639,514 B2 | 12/2009 | Baarman |
| 7,639,994 B2 | 12/2009 | Greene |
| 7,640,866 B1 | 1/2010 | Schermerhorn |
| 7,643,312 B2 | 1/2010 | Vanderelli |
| 7,649,454 B2 | 1/2010 | Singh |
| 7,652,230 B2 | 1/2010 | Baier |
| 7,661,292 B2 | 2/2010 | Buitmann et al. |
| 7,664,870 B2 | 2/2010 | Baek |
| 7,689,655 B2 | 3/2010 | Hewitt |
| 7,693,935 B2 | 4/2010 | Weber |
| 7,707,249 B2 | 4/2010 | Spataro |
| 7,714,537 B2 | 5/2010 | Cheng |
| 7,715,831 B2 | 5/2010 | Wakefield |
| 7,717,827 B2 | 5/2010 | Kurunmaki et al. |
| 7,722,503 B1 | 5/2010 | Smith et al. |
| 7,734,690 B2 | 6/2010 | Moromisato |
| 7,735,918 B2 | 6/2010 | Beck |
| 7,741,734 B2 | 6/2010 | Joannopoulos |
| 7,810,025 B2 | 10/2010 | Blair |
| 7,825,543 B2 | 11/2010 | Karalis |
| 7,844,306 B2 | 11/2010 | Shearer |
| 7,847,675 B1 | 12/2010 | Thyen |
| 7,849,135 B2 | 12/2010 | Agrawal |
| 7,857,731 B2 | 12/2010 | Hickman et al. |
| 7,863,861 B2 | 1/2011 | Cheng |
| 7,868,482 B2 | 1/2011 | Greene |
| 7,868,587 B2 | 1/2011 | Stevens |
| 7,869,941 B2 | 1/2011 | Coughlin |
| 7,881,233 B2 | 2/2011 | Bieselin |
| 7,884,808 B2 | 2/2011 | Joo |
| 7,885,925 B1 | 2/2011 | Strong |
| 7,892,148 B1 | 2/2011 | Stauffer et al. |
| 7,893,953 B2 | 2/2011 | Krestakos |
| 7,896,436 B2 | 3/2011 | Kurrasch |
| 7,898,105 B2 | 3/2011 | Greene |
| 7,904,209 B2 | 3/2011 | Podgorny |
| 7,909,737 B2 | 3/2011 | Ellis et al. |
| 7,914,468 B2 | 3/2011 | Shalon et al. |
| 7,915,858 B2 | 3/2011 | Liu |
| D636,333 S | 4/2011 | Kulikowski |
| 7,925,308 B2 | 4/2011 | Greene |
| 7,925,525 B2 | 4/2011 | Chin |
| 7,931,563 B2 | 4/2011 | Shaw et al. |
| 7,932,618 B2 | 4/2011 | Baarman |
| 7,941,133 B2 | 5/2011 | Aaron |
| 7,941,753 B2 | 5/2011 | Meisels |
| 7,948,448 B2 | 5/2011 | Hutchinson et al. |
| 7,952,324 B2 | 5/2011 | Cheng |
| 7,953,369 B2 | 5/2011 | Baarman |
| 7,955,219 B2 | 6/2011 | Birrell et al. |
| 7,965,859 B2 | 6/2011 | Marks |
| 7,973,635 B2 | 7/2011 | Baarman |
| 7,973,657 B2 | 7/2011 | Ayed |
| 7,989,986 B2 | 8/2011 | Baarman |
| 7,999,669 B2 | 8/2011 | Singh |
| 8,001,472 B2 | 8/2011 | Gilley et al. |
| 8,004,235 B2 | 8/2011 | Baarman |
| 8,021,164 B2 | 9/2011 | Epstein |
| 8,022,576 B2 | 9/2011 | Joannopoulos |
| 8,024,202 B2 | 9/2011 | Carroll et al. |
| 8,024,661 B2 | 9/2011 | Bibliowicz |
| 8,026,908 B2 | 9/2011 | Ku |
| 8,028,020 B2 | 9/2011 | Huck |
| 8,032,705 B2 | 10/2011 | Klitsner |
| 8,035,255 B2 | 10/2011 | Kurs |
| 8,035,340 B2 | 10/2011 | Stevens |
| 8,039,995 B2 | 10/2011 | Stevens |
| 8,040,103 B2 | 10/2011 | Hui |
| 8,041,586 B2 | 10/2011 | Jethani |
| 8,047,914 B2 | 11/2011 | Morrow |
| 8,047,966 B2 | 11/2011 | Dorogusker et al. |
| 8,049,301 B2 | 11/2011 | Hui |
| 8,051,782 B2 | 11/2011 | Nethken et al. |
| 8,052,580 B2 | 11/2011 | Saalasti et al. |
| 8,054,854 B2 | 11/2011 | Poslinski |
| 8,055,310 B2 | 11/2011 | Beart |
| 8,055,644 B2 | 11/2011 | Crowley |
| 8,057,069 B2 | 11/2011 | Mangiardi |
| 8,061,864 B2 | 11/2011 | Metcalf |
| 8,069,100 B2 | 11/2011 | Taylor |
| 8,069,465 B1 | 11/2011 | Bartholomay |
| 8,073,614 B2 | 12/2011 | Coughlin |
| 8,076,800 B2 | 12/2011 | Joannopoulos |
| 8,076,801 B2 | 12/2011 | Karalis |
| 8,081,083 B2 | 12/2011 | Hinterlong |
| 8,084,889 B2 | 12/2011 | Joannopoulos |
| 8,091,029 B1 | 1/2012 | Gay |
| 8,092,346 B2 | 1/2012 | Shea |
| 8,093,758 B2 | 1/2012 | Hussmann |
| 8,097,983 B2 | 1/2012 | Karalis |
| 8,097,984 B2 | 1/2012 | Baarman |
| 8,102,235 B2 | 1/2012 | Hui |
| 8,105,209 B2 | 1/2012 | Lannon et al. |
| 8,106,539 B2 | 1/2012 | Schatz |
| 8,109,858 B2 | 2/2012 | Redmann |
| 8,112,100 B2 | 2/2012 | Frank |
| 8,115,448 B2 | 2/2012 | John |
| 8,116,681 B2 | 2/2012 | Baarman |
| 8,116,683 B2 | 2/2012 | Baarman |
| 8,117,262 B2 | 2/2012 | Kumar |
| 8,120,311 B2 | 2/2012 | Baarman |
| 8,126,974 B2 | 2/2012 | Lyle |
| 8,127,155 B2 | 2/2012 | Baarman |
| 8,129,864 B2 | 3/2012 | Baarman |
| 8,138,875 B2 | 3/2012 | Baarman |
| 8,140,701 B2 | 3/2012 | Rajan |
| 8,141,143 B2 | 3/2012 | Lee |
| 8,149,104 B2 | 4/2012 | Crum |
| 8,150,449 B2 | 4/2012 | Onozawa |
| 8,159,090 B2 | 4/2012 | Greene |
| 8,159,335 B2 | 4/2012 | Cox, Jr. |
| 8,164,222 B2 | 4/2012 | Baarman |
| 8,167,776 B2 | 5/2012 | Lannon et al. |
| 8,170,946 B2 | 5/2012 | Blair |
| 8,174,152 B2 | 5/2012 | Baumann |
| 8,180,663 B2 | 5/2012 | Tischhauser |
| 8,188,856 B2 | 5/2012 | Singh |
| 8,200,520 B2 | 6/2012 | Chen |
| 8,204,272 B2 | 6/2012 | Marks |
| 8,204,935 B2 | 6/2012 | Vernon |
| 8,206,325 B1 | 6/2012 | Najafi et al. |
| 8,209,618 B2 | 6/2012 | Garofalo |
| 8,214,061 B2 | 7/2012 | Westrick, Jr. |
| 8,219,115 B1 | 7/2012 | Nelissen |
| 8,222,827 B2 | 7/2012 | Kuennen |
| 8,223,508 B2 | 7/2012 | Baarman |
| 8,228,025 B2 | 7/2012 | Ho |
| 8,228,026 B2 | 7/2012 | Johnson |
| 8,234,189 B2 | 7/2012 | Taylor |
| 8,238,125 B2 | 8/2012 | Fells |
| 8,239,890 B2 | 8/2012 | Kooman |
| 8,257,228 B2 | 9/2012 | Quatrochi et al. |
| 8,259,428 B2 | 9/2012 | Mollema |
| 8,262,244 B2 | 9/2012 | Metcalf |
| 8,266,535 B2 | 9/2012 | Brown |
| 8,269,456 B2 | 9/2012 | Hui |
| 8,270,320 B2 | 9/2012 | Boyer |
| 8,280,453 B2 | 10/2012 | Beart |
| 8,280,948 B1 | 10/2012 | Chen |

(56) References Cited

U.S. PATENT DOCUMENTS

| | | |
|---|---|---|
| 8,290,479 B2 | 10/2012 | Aaron |
| 8,296,669 B2 | 10/2012 | Madonna |
| 8,299,753 B2 | 10/2012 | Hui |
| 8,300,784 B2 | 10/2012 | Choi |
| 8,301,077 B2 | 10/2012 | Xue |
| 8,301,079 B2 | 10/2012 | Baarman |
| 8,301,080 B2 | 10/2012 | Baarman |
| 8,304,935 B2 | 11/2012 | Karalis |
| 8,315,561 B2 | 11/2012 | Baarman |
| 8,315,621 B2 | 11/2012 | Lau |
| 8,315,650 B2 | 11/2012 | Lau |
| 8,324,759 B2 | 12/2012 | Karalis |
| 8,327,410 B2 | 12/2012 | Andersen |
| 8,338,990 B2 | 12/2012 | Baarman |
| 8,339,274 B2 | 12/2012 | Van De Sluis |
| 8,341,532 B2 | 12/2012 | Ryan |
| 8,346,166 B2 | 1/2013 | Baarman |
| 8,346,167 B2 | 1/2013 | Baarman |
| 8,350,971 B2 | 1/2013 | Malone |
| 8,351,856 B2 | 1/2013 | Baarman |
| 8,352,296 B2 | 1/2013 | Taneja |
| 8,354,821 B2 | 1/2013 | Cheng |
| 8,361,000 B2 | 1/2013 | Gaspard |
| 8,362,651 B2 | 1/2013 | Hamam |
| 8,364,400 B2 | 1/2013 | Coughlin |
| 8,370,516 B2 | 2/2013 | Salesky |
| 8,373,310 B2 | 2/2013 | Baarman |
| 8,373,386 B2 | 2/2013 | Baarman |
| 8,375,103 B2 | 2/2013 | Lin |
| 8,380,255 B2 | 2/2013 | Shearer |
| 8,380,786 B2 | 2/2013 | Hoffert |
| 8,381,603 B2 | 2/2013 | Peng et al. |
| 8,385,894 B2 | 2/2013 | Takehara |
| 8,390,669 B2 | 3/2013 | Catchpole |
| 8,395,282 B2 | 3/2013 | Joannopoulos |
| 8,395,283 B2 | 3/2013 | Joannopoulos |
| 8,400,017 B2 | 3/2013 | Kurs |
| 8,400,018 B2 | 3/2013 | Joannopoulos |
| 8,400,019 B2 | 3/2013 | Joannopoulos |
| 8,400,020 B2 | 3/2013 | Joannopoulos |
| 8,400,021 B2 | 3/2013 | Joannopoulos |
| 8,400,022 B2 | 3/2013 | Joannopoulos |
| 8,400,023 B2 | 3/2013 | Joannopoulos |
| 8,400,024 B2 | 3/2013 | Joannopoulos |
| 8,407,289 B2 | 3/2013 | Chen |
| 8,410,636 B2 | 4/2013 | Kurs |
| 8,415,897 B2 | 4/2013 | Choong |
| 8,421,407 B2 | 4/2013 | Johnson |
| 8,423,288 B2 | 4/2013 | Stahl |
| 8,432,062 B2 | 4/2013 | Greene |
| 8,432,356 B2 | 4/2013 | Chase |
| 8,438,333 B2 | 5/2013 | Edwards, III |
| 8,441,154 B2 | 5/2013 | Karalis |
| 8,441,354 B2 | 5/2013 | Padmanabhan |
| 8,443,035 B2 | 5/2013 | Chen |
| 8,446,046 B2 | 5/2013 | Fells |
| 8,446,450 B2 | 5/2013 | Mauchly |
| 8,450,877 B2 | 5/2013 | Baarman |
| 8,456,509 B2 | 6/2013 | Khot |
| 8,457,888 B2 | 6/2013 | Ranford |
| 8,461,719 B2 | 6/2013 | Kesler |
| 8,461,720 B2 | 6/2013 | Kurs |
| 8,461,721 B2 | 6/2013 | Karalis |
| 8,461,722 B2 | 6/2013 | Kurs |
| 8,461,817 B2 | 6/2013 | Martin |
| 8,462,921 B2 | 6/2013 | Parker |
| 8,466,583 B2 | 6/2013 | Karalis |
| 8,471,410 B2 | 6/2013 | Karalis |
| 8,473,571 B2 | 6/2013 | Penner |
| 8,476,788 B2 | 7/2013 | Karalis |
| 8,482,158 B2 | 7/2013 | Kurs |
| 8,482,160 B2 | 7/2013 | Johnson |
| 8,484,494 B2 | 7/2013 | Siegel |
| 8,487,480 B1 | 7/2013 | Kesler |
| 8,489,329 B2 | 7/2013 | Coughlin |
| 8,494,143 B2 | 7/2013 | DeJana |
| 8,497,601 B2 | 7/2013 | Hall |
| 8,499,119 B2 | 7/2013 | Balraj |
| 8,504,663 B2 | 8/2013 | Lowery |
| 8,508,077 B2 | 8/2013 | Stevens |
| 8,510,255 B2 | 8/2013 | Fadell |
| 8,519,668 B2 | 8/2013 | Hui |
| 8,522,695 B2 | 9/2013 | Ellegaard |
| 8,527,549 B2 | 9/2013 | Cidon |
| 8,527,610 B2 | 9/2013 | Koike |
| 8,528,014 B2 | 9/2013 | Reynolds |
| 8,531,153 B2 | 9/2013 | Baarman |
| 8,531,294 B2 | 9/2013 | Slavin |
| 8,533,268 B1 | 9/2013 | Vernon |
| 8,538,330 B2 | 9/2013 | Baarman |
| 8,540,641 B2 | 9/2013 | Kroll et al. |
| D692,010 S | 10/2013 | Verghese |
| 8,550,820 B2 | 10/2013 | Soltanoff |
| 8,552,592 B2 | 10/2013 | Schatz |
| 8,554,476 B2 | 10/2013 | Coughlin |
| 8,554,477 B2 | 10/2013 | Coughlin |
| 8,558,411 B2 | 10/2013 | Baarman |
| 8,558,693 B2 | 10/2013 | Martin |
| 8,560,024 B2 | 10/2013 | Beart |
| 8,560,128 B2 | 10/2013 | Ruff |
| 8,560,232 B2 | 10/2013 | Coughlin |
| 8,560,336 B2 | 10/2013 | Schwarzberg et al. |
| 8,567,048 B2 | 10/2013 | Singh |
| 8,569,914 B2 | 10/2013 | Karalis |
| 8,587,153 B2 | 11/2013 | Schatz |
| 8,587,154 B2 | 11/2013 | Fells |
| 8,587,155 B2 | 11/2013 | Giler |
| 8,593,105 B2 | 11/2013 | Baarman |
| 8,593,286 B2 | 11/2013 | Razoumov et al. |
| 8,594,291 B2 | 11/2013 | Bieselin |
| 8,595,023 B2 | 11/2013 | Kirchhoff et al. |
| 8,598,721 B2 | 12/2013 | Baarman |
| 8,598,743 B2 | 12/2013 | Hall |
| 8,600,670 B2 | 12/2013 | Kim |
| 8,604,714 B2 | 12/2013 | Mohan |
| 8,610,400 B2 | 12/2013 | Stevens |
| 8,610,530 B2 | 12/2013 | Singh |
| 8,618,696 B2 | 12/2013 | Kurs |
| 8,618,749 B2 | 12/2013 | Kuennen |
| 8,618,770 B2 | 12/2013 | Baarman |
| 8,620,484 B2 | 12/2013 | Baarman |
| 8,620,617 B2 | 12/2013 | Yuen et al. |
| 8,620,841 B1 | 12/2013 | Filson |
| 8,621,245 B2 | 12/2013 | Shearer |
| D697,477 S | 1/2014 | Jonas, III |
| 8,622,314 B2 | 1/2014 | Fisher |
| 8,629,578 B2 | 1/2014 | Kurs |
| 8,629,755 B2 | 1/2014 | Hashim-Waris |
| 8,630,741 B1 | 1/2014 | Matsuoka |
| 8,631,126 B2 | 1/2014 | Veiseh |
| 8,638,062 B2 | 1/2014 | Baarman |
| 8,643,326 B2 | 2/2014 | Campanella |
| 8,650,600 B2 | 2/2014 | Ogle |
| 8,653,927 B2 | 2/2014 | Singh |
| 8,659,417 B1 | 2/2014 | Trundle |
| 8,660,790 B2 | 2/2014 | Stahl |
| 8,665,310 B2 | 3/2014 | Verthein |
| 8,666,051 B2 | 3/2014 | Gilzean |
| 8,667,401 B1 | 3/2014 | Lozben |
| 8,667,452 B2 | 3/2014 | Verghese |
| 8,668,045 B2 | 3/2014 | Cohen |
| 8,669,676 B2 | 3/2014 | Karalis |
| 8,669,844 B2 | 3/2014 | Walker |
| 8,680,960 B2 | 3/2014 | Singh |
| 8,683,345 B2 | 3/2014 | Lee |
| 8,686,598 B2 | 4/2014 | Schatz |
| 8,686,647 B2 | 4/2014 | Ono |
| 8,687,452 B2 | 4/2014 | Kishibe |
| 8,688,100 B2 | 4/2014 | Aaron |
| 8,688,467 B2 | 4/2014 | Harrison et al. |
| 8,690,362 B2 | 4/2014 | Wendt |
| 8,690,578 B1 | 4/2014 | Nusbaum et al. |
| 8,690,735 B2 | 4/2014 | Watterson et al. |
| 8,692,410 B2 | 4/2014 | Schatz |

(56) References Cited

U.S. PATENT DOCUMENTS

| | | |
|---|---|---|
| 8,692,412 B2 | 4/2014 | Fiorello |
| 8,692,639 B2 | 4/2014 | Baarman |
| 8,692,641 B2 | 4/2014 | Singh |
| 8,692,642 B2 | 4/2014 | Singh |
| 8,694,026 B2 | 4/2014 | Forstall |
| 8,694,165 B2 | 4/2014 | Smith |
| 8,694,597 B1 | 4/2014 | Raj |
| 8,698,590 B2 | 4/2014 | Singh |
| 8,698,591 B2 | 4/2014 | Singh |
| 8,700,060 B2 | 4/2014 | Huang |
| 8,700,690 B2 | 4/2014 | Raghav et al. |
| 8,707,546 B2 | 4/2014 | Singh |
| 8,710,948 B2 | 4/2014 | Singh |
| 8,712,858 B2 | 4/2014 | Blair |
| 8,713,112 B2 | 4/2014 | Hewitt |
| D705,745 S | 5/2014 | Kurs et al. |
| 8,716,903 B2 | 5/2014 | Kurs |
| 8,717,400 B2 | 5/2014 | Ranganath |
| 8,719,070 B2 | 5/2014 | Jabbour |
| 8,723,366 B2 | 5/2014 | Fiorello |
| 8,729,737 B2 | 5/2014 | Schatz |
| 8,731,116 B2 | 5/2014 | Norconk |
| 8,742,625 B2 | 6/2014 | Baarman |
| 8,743,171 B2 | 6/2014 | Hiller |
| 8,743,198 B2 | 6/2014 | Padmanabh |
| 8,756,348 B2 | 6/2014 | Beel |
| 8,760,007 B2 | 6/2014 | Joannopoulos |
| 8,760,008 B2 | 6/2014 | Joannopoulos |
| 8,760,265 B2 | 6/2014 | Krueger |
| 8,766,484 B2 | 7/2014 | Baarman |
| 8,766,485 B2 | 7/2014 | Joannopoulos |
| 8,766,487 B2 | 7/2014 | Dibben |
| 8,767,032 B2 | 7/2014 | Rodman |
| 8,768,309 B2 | 7/2014 | Robbins |
| 8,771,222 B2 | 7/2014 | Kanderian, Jr. et al. |
| 8,772,971 B2 | 7/2014 | Joannopoulos |
| 8,772,972 B2 | 7/2014 | Joannopoulos |
| 8,772,973 B2 | 7/2014 | Kurs |
| 8,782,527 B2 | 7/2014 | Karlson |
| 8,788,448 B2 | 7/2014 | Fadell |
| 8,797,159 B2 | 8/2014 | Kirkpatrick |
| 8,810,379 B2 | 8/2014 | Murphy |
| 8,812,028 B2 | 8/2014 | Yariv |
| 8,812,096 B2 | 8/2014 | Flaherty et al. |
| 8,813,196 B2 | 8/2014 | Weller |
| 8,814,754 B2 | 8/2014 | Weast et al. |
| 8,818,782 B2 | 8/2014 | Thukral et al. |
| 8,819,136 B1 | 8/2014 | Vernon |
| 8,819,138 B2 | 8/2014 | Houston |
| 8,821,350 B2 | 9/2014 | Maertz |
| 8,825,482 B2 | 9/2014 | Hernandez-Abrego et al. |
| 8,825,597 B1 | 9/2014 | Houston |
| 8,836,500 B2 | 9/2014 | Houvener et al. |
| 8,838,681 B2 | 9/2014 | Motes |
| 8,842,153 B2 | 9/2014 | Ranganath |
| 8,843,816 B2 | 9/2014 | Stull |
| 8,847,988 B2 | 9/2014 | Geisner et al. |
| 8,849,914 B2 | 9/2014 | Bove |
| 8,856,256 B1 | 10/2014 | Srinivasan |
| 8,866,619 B2 | 10/2014 | Knibbe |
| 8,872,432 B2 | 10/2014 | Kercso |
| 8,875,195 B2 | 10/2014 | Ogle |
| 8,878,439 B2 | 11/2014 | Noguchi |
| 8,887,069 B2 | 11/2014 | Tipirneni |
| 8,896,656 B2 | 11/2014 | Epstein |
| 8,898,231 B2 | 11/2014 | Crawford |
| 8,904,293 B2 | 12/2014 | Bastide |
| 8,909,702 B2 | 12/2014 | Golovchinsky |
| 8,947,215 B2 | 2/2015 | Mandel et al. |
| 8,965,541 B2 | 2/2015 | Martinez et al. |
| 8,984,685 B2 | 3/2015 | Robertson et al. |
| 8,997,588 B2 | 4/2015 | Taylor |
| 9,049,923 B1 | 6/2015 | Delagey et al. |
| 9,084,475 B2 | 7/2015 | Hjelm |
| 9,098,502 B1 | 8/2015 | Horling et al. |
| 9,119,568 B2 | 9/2015 | Yin et al. |
| 9,167,894 B2 | 10/2015 | DesRoches et al. |
| 9,176,214 B2 | 11/2015 | Berrett et al. |
| 9,236,817 B2 | 1/2016 | Strothmann et al. |
| 9,339,106 B2 | 5/2016 | Epstein et al. |
| 9,380,682 B2 | 6/2016 | Mead |
| 9,465,524 B2 | 10/2016 | Epstein |
| 9,486,070 B2 | 11/2016 | Labrosse et al. |
| 9,642,219 B2 | 5/2017 | Mead |
| 9,716,861 B1 | 7/2017 | Poel |
| 9,766,079 B1 | 9/2017 | Poel |
| 9,852,388 B1 | 12/2017 | Swieter |
| 9,907,396 B1 | 3/2018 | Labrosse et al. |
| 9,921,726 B1* | 3/2018 | Sculley ............ H04B 1/3827 |
| 9,955,318 B1 | 4/2018 | Scheper |
| 10,021,530 B2 | 7/2018 | Sigal et al. |
| 10,057,963 B2 | 8/2018 | Mead et al. |
| 10,161,752 B1 | 12/2018 | Poel et al. |
| 10,225,707 B1 | 3/2019 | Scheper et al. |
| 2001/0013307 A1 | 8/2001 | Stone |
| 2001/0028308 A1 | 10/2001 | De La Huerga |
| 2001/0051885 A1 | 12/2001 | Nardulli |
| 2002/0015097 A1 | 2/2002 | Martens |
| 2002/0055419 A1 | 5/2002 | Hinnebusch |
| 2002/0130834 A1 | 9/2002 | Madarasz |
| 2002/0145512 A1 | 10/2002 | Sleichter, III et al. |
| 2003/0097284 A1 | 5/2003 | Shinozaki |
| 2003/0103075 A1 | 6/2003 | Rosselot |
| 2003/0218537 A1 | 11/2003 | Hoch |
| 2004/0001095 A1 | 1/2004 | Marques |
| 2004/0010328 A1 | 1/2004 | Carson et al. |
| 2004/0014014 A1 | 1/2004 | Hess |
| 2004/0051813 A1 | 3/2004 | Marmaropoulos |
| 2004/0141605 A1 | 7/2004 | Chen |
| 2004/0153504 A1 | 8/2004 | Hutchinson |
| 2004/0210933 A1 | 10/2004 | Dresti |
| 2004/0215694 A1 | 10/2004 | Podolsky |
| 2004/0229729 A1 | 11/2004 | Albert et al. |
| 2004/0239161 A1 | 12/2004 | Lee |
| 2004/0261013 A1 | 12/2004 | Wynn et al. |
| 2005/0018826 A1 | 1/2005 | Benco |
| 2005/0027581 A1 | 2/2005 | Kjesbu |
| 2005/0058970 A1 | 3/2005 | Perlman et al. |
| 2005/0071213 A1 | 3/2005 | Kumhyr |
| 2005/0113649 A1 | 5/2005 | Bergantino |
| 2005/0160368 A1 | 7/2005 | Liu et al. |
| 2005/0165626 A1 | 7/2005 | Karpf |
| 2005/0172311 A1 | 8/2005 | Hjelt et al. |
| 2005/0182653 A1 | 8/2005 | Urban et al. |
| 2005/0202934 A1 | 9/2005 | Olrik et al. |
| 2005/0209051 A1 | 9/2005 | Santomassimo et al. |
| 2005/0218739 A1 | 10/2005 | Maddin |
| 2005/0235329 A1 | 10/2005 | Karaoguz |
| 2005/0273372 A1 | 12/2005 | Bowne |
| 2005/0273493 A1 | 12/2005 | Buford |
| 2006/0009215 A1 | 1/2006 | Bogod |
| 2006/0015376 A1 | 1/2006 | Sattler |
| 2006/0021363 A1 | 2/2006 | Mizukoshi |
| 2006/0026502 A1 | 2/2006 | Dutta |
| 2006/0045107 A1 | 3/2006 | Kucenas |
| 2006/0063980 A1 | 3/2006 | Hwang et al. |
| 2006/0080007 A1 | 4/2006 | Gerard et al. |
| 2006/0080432 A1 | 4/2006 | Spataro |
| 2006/0168618 A1 | 7/2006 | Choi |
| 2006/0205564 A1 | 9/2006 | Peterson |
| 2006/0218027 A1 | 9/2006 | Carrion |
| 2006/0241520 A1 | 10/2006 | Robertson |
| 2006/0250524 A1 | 11/2006 | Roche |
| 2006/0266791 A1 | 11/2006 | Koch et al. |
| 2007/0094065 A1 | 4/2007 | Wu |
| 2007/0118415 A1 | 5/2007 | Chen |
| 2007/0135264 A1 | 6/2007 | Rosenberg |
| 2007/0136095 A1 | 6/2007 | Weinstein |
| 2007/0162315 A1 | 7/2007 | Hodges |
| 2007/0179355 A1 | 8/2007 | Rosen |
| 2007/0197239 A1 | 8/2007 | Sane |
| 2007/0198744 A1 | 8/2007 | Wensley |
| 2007/0200396 A1 | 8/2007 | Baumann et al. |
| 2007/0219059 A1 | 9/2007 | Schwartz et al. |

(56) References Cited

U.S. PATENT DOCUMENTS

| | | |
|---|---|---|
| 2007/0226034 A1 | 9/2007 | Khan |
| 2007/0265138 A1 | 11/2007 | Ashby |
| 2007/0282661 A1 | 12/2007 | Franco |
| 2007/0288291 A1 | 12/2007 | Earle |
| 2008/0028323 A1 | 1/2008 | Rosen |
| 2008/0030317 A1 | 2/2008 | Bryant |
| 2008/0045384 A1 | 2/2008 | Matsubara et al. |
| 2008/0051256 A1 | 2/2008 | Ashby et al. |
| 2008/0077620 A1 | 3/2008 | Gilley et al. |
| 2008/0091503 A1 | 4/2008 | Schirmer |
| 2008/0098525 A1 | 5/2008 | Doleschal et al. |
| 2008/0122635 A1 | 5/2008 | Fujikawa |
| 2008/0132383 A1 | 6/2008 | Einav et al. |
| 2008/0162198 A1 | 7/2008 | Jabbour |
| 2008/0184115 A1 | 7/2008 | Back |
| 2008/0201664 A1 | 8/2008 | O |
| 2008/0239994 A1 | 10/2008 | Xiong |
| 2008/0244417 A1 | 10/2008 | Simpson |
| 2008/0245279 A1 | 10/2008 | Pan |
| 2008/0255794 A1 | 10/2008 | Levine |
| 2008/0256445 A1 | 10/2008 | Olch et al. |
| 2008/0288355 A1 | 11/2008 | Rosen |
| 2008/0291021 A1 | 11/2008 | Bhogal |
| 2008/0300660 A1 | 12/2008 | John |
| 2008/0300914 A1 | 12/2008 | Karkanias et al. |
| 2008/0304365 A1 | 12/2008 | Jarvis et al. |
| 2008/0306351 A1 | 12/2008 | Izumi |
| 2009/0019367 A1 | 1/2009 | Cavagnari |
| 2009/0055234 A1 | 2/2009 | Li |
| 2009/0066486 A1 | 3/2009 | Kiekbusch |
| 2009/0076335 A1 | 3/2009 | Schwarzberg et al. |
| 2009/0078167 A1 | 3/2009 | Ellegaard |
| 2009/0094533 A1 | 4/2009 | Bozionek |
| 2009/0106567 A1 | 4/2009 | Baarman |
| 2009/0132579 A1 | 5/2009 | Kwang |
| 2009/0146982 A1 | 6/2009 | Thielman |
| 2009/0156363 A1 | 6/2009 | Guidi et al. |
| 2009/0164581 A1 | 6/2009 | Bove |
| 2009/0195393 A1 | 8/2009 | Tegeler |
| 2009/0210822 A1 | 8/2009 | Schindler |
| 2009/0212637 A1 | 8/2009 | Baarman |
| 2009/0229475 A1 | 9/2009 | Bally et al. |
| 2009/0270227 A1 | 10/2009 | Ashby et al. |
| 2009/0271713 A1 | 10/2009 | Stull |
| 2009/0273441 A1 | 11/2009 | Mukherjee |
| 2009/0327227 A1 | 12/2009 | Chakra |
| 2010/0017245 A1 | 1/2010 | Kristiansen |
| 2010/0037151 A1 | 2/2010 | Ackerman |
| 2010/0049008 A1 | 2/2010 | Doherty et al. |
| 2010/0070334 A1 | 3/2010 | Monteverde |
| 2010/0073162 A1 | 3/2010 | Johnson et al. |
| 2010/0088239 A1 | 4/2010 | Blair |
| 2010/0102640 A1 | 4/2010 | Joannopoulos |
| 2010/0127575 A1 | 5/2010 | Joannopoulos |
| 2010/0133918 A1 | 6/2010 | Joannopoulos |
| 2010/0133919 A1 | 6/2010 | Joannopoulos |
| 2010/0133920 A1 | 6/2010 | Joannopoulos |
| 2010/0135502 A1 | 6/2010 | Keady et al. |
| 2010/0153160 A1 | 6/2010 | Bezemer |
| 2010/0153983 A1 | 6/2010 | Philmon |
| 2010/0179854 A1 | 7/2010 | Shafer |
| 2010/0185398 A1 | 7/2010 | Berns et al. |
| 2010/0187911 A1 | 7/2010 | Joannopoulos |
| 2010/0198374 A1 | 8/2010 | Carson et al. |
| 2010/0201201 A1 | 8/2010 | Mobarhan et al. |
| 2010/0205542 A1 | 8/2010 | Walman |
| 2010/0207458 A1 | 8/2010 | Joannopoulos |
| 2010/0219694 A1 | 9/2010 | Kurs |
| 2010/0219791 A1 | 9/2010 | Cheng |
| 2010/0231340 A1 | 9/2010 | Fiorello |
| 2010/0234184 A1 | 9/2010 | Le Page et al. |
| 2010/0235216 A1 | 9/2010 | Hehmeyer |
| 2010/0256823 A1 | 10/2010 | Cherukuri |
| 2010/0259110 A1 | 10/2010 | Kurs |
| 2010/0274855 A1 | 10/2010 | Wassingbo |
| 2010/0277121 A1 | 11/2010 | Hall |
| 2010/0283600 A1 | 11/2010 | Herbert |
| 2010/0308939 A1 | 12/2010 | Kurs |
| 2010/0315483 A1 | 12/2010 | King |
| 2010/0319066 A1 | 12/2010 | Berry |
| 2010/0323846 A1 | 12/2010 | Komatsu et al. |
| 2011/0015041 A1 | 1/2011 | Shea |
| 2011/0015495 A1 | 1/2011 | Dothie et al. |
| 2011/0033830 A1 | 2/2011 | Cherian |
| 2011/0043049 A1 | 2/2011 | Karalis |
| 2011/0054359 A1 | 3/2011 | Sazonov et al. |
| 2011/0072482 A1 | 3/2011 | Lau |
| 2011/0074346 A1 | 3/2011 | Hall |
| 2011/0080290 A1 | 4/2011 | Baxi et al. |
| 2011/0084804 A1 | 4/2011 | Khorashadi |
| 2011/0088056 A1 | 4/2011 | Ansari |
| 2011/0095618 A1 | 4/2011 | Schatz |
| 2011/0104649 A1 | 5/2011 | Young et al. |
| 2011/0120351 A1 | 5/2011 | Shoenfeld |
| 2011/0121920 A1 | 5/2011 | Kurs |
| 2011/0126127 A1 | 5/2011 | Mariotti |
| 2011/0149809 A1 | 6/2011 | Narayanaswamy |
| 2011/0153738 A1 | 6/2011 | Bedingfield |
| 2011/0182438 A1 | 7/2011 | Koike et al. |
| 2011/0184748 A1 | 7/2011 | Fierro et al. |
| 2011/0223899 A1 | 9/2011 | Hiraide |
| 2011/0225563 A1 | 9/2011 | Kim |
| 2011/0231216 A1 | 9/2011 | Fyke |
| 2011/0244798 A1 | 10/2011 | Daigle |
| 2011/0245979 A1 | 10/2011 | Koch |
| 2011/0270952 A1 | 11/2011 | Ray |
| 2011/0275939 A1 | 11/2011 | Walsh et al. |
| 2011/0281248 A1 | 11/2011 | Feenstra et al. |
| 2011/0281687 A1 | 11/2011 | Gilley et al. |
| 2011/0295392 A1 | 12/2011 | Cunnington |
| 2011/0296306 A1 | 12/2011 | Oddsson et al. |
| 2011/0296465 A1 | 12/2011 | Krishnan |
| 2012/0007441 A1 | 1/2012 | John |
| 2012/0015779 A1 | 1/2012 | Powch et al. |
| 2012/0016678 A1 | 1/2012 | Gruber |
| 2012/0022909 A1 | 1/2012 | Ayatollahi |
| 2012/0032522 A1 | 2/2012 | Schatz |
| 2012/0051579 A1 | 3/2012 | Cohen |
| 2012/0062345 A1 | 3/2012 | Kurs |
| 2012/0068549 A1 | 3/2012 | Karalis |
| 2012/0068832 A1 | 3/2012 | Feldstein |
| 2012/0072030 A1 | 3/2012 | Elliott |
| 2012/0078676 A1 | 3/2012 | Adams |
| 2012/0086284 A1 | 4/2012 | Capanella |
| 2012/0086867 A1 | 4/2012 | Kesler |
| 2012/0089722 A1 | 4/2012 | Enholm |
| 2012/0091794 A1 | 4/2012 | Campanella |
| 2012/0091795 A1 | 4/2012 | Fiorello |
| 2012/0091796 A1 | 4/2012 | Kesler |
| 2012/0091797 A1 | 4/2012 | Kesler |
| 2012/0091819 A1 | 4/2012 | Kulikowski |
| 2012/0091820 A1 | 4/2012 | Campanella |
| 2012/0091949 A1 | 4/2012 | Campanella |
| 2012/0091950 A1 | 4/2012 | Campanella |
| 2012/0098350 A1 | 4/2012 | Campanella |
| 2012/0112531 A1 | 5/2012 | Kesler |
| 2012/0112532 A1 | 5/2012 | Kesler |
| 2012/0112534 A1 | 5/2012 | Kesler |
| 2012/0112535 A1 | 5/2012 | Karalis |
| 2012/0112536 A1 | 5/2012 | Karalis |
| 2012/0112538 A1 | 5/2012 | Kesler |
| 2012/0112691 A1 | 5/2012 | Kurs |
| 2012/0116550 A1 | 5/2012 | Hoffman et al. |
| 2012/0119569 A1 | 5/2012 | Karalis |
| 2012/0119575 A1 | 5/2012 | Kurs |
| 2012/0119576 A1 | 5/2012 | Kesler |
| 2012/0119698 A1 | 5/2012 | Karalis |
| 2012/0136572 A1 | 5/2012 | Norton |
| 2012/0139355 A1 | 6/2012 | Ganem |
| 2012/0173319 A1 | 7/2012 | Ferrara |
| 2012/0184338 A1 | 7/2012 | Kesler |
| 2012/0192084 A1 | 7/2012 | Dura |
| 2012/0204272 A1 | 8/2012 | Svensson |
| 2012/0206050 A1 | 8/2012 | Spero |

(56) References Cited

U.S. PATENT DOCUMENTS

| | | |
|---|---|---|
| 2012/0206096 A1 | 8/2012 | John |
| 2012/0216129 A1 | 8/2012 | Ng et al. |
| 2012/0223573 A1 | 9/2012 | Schatz |
| 2012/0228952 A1 | 9/2012 | Hall |
| 2012/0228953 A1 | 9/2012 | Kesler |
| 2012/0228954 A1 | 9/2012 | Kesler |
| 2012/0228960 A1 | 9/2012 | Karalis |
| 2012/0233205 A1 | 9/2012 | McDermott |
| 2012/0235500 A1 | 9/2012 | Ganem |
| 2012/0235501 A1 | 9/2012 | Kesler |
| 2012/0235502 A1 | 9/2012 | Kesler |
| 2012/0235503 A1 | 9/2012 | Kesler |
| 2012/0235504 A1 | 9/2012 | Kesler |
| 2012/0235505 A1 | 9/2012 | Schatz |
| 2012/0235566 A1 | 9/2012 | Karalis |
| 2012/0235633 A1 | 9/2012 | Kesler |
| 2012/0235634 A1 | 9/2012 | Hall |
| 2012/0239117 A1 | 9/2012 | Kesler |
| 2012/0239202 A1 | 9/2012 | Voysey |
| 2012/0242159 A1 | 9/2012 | Lou |
| 2012/0243158 A1 | 9/2012 | Gentil |
| 2012/0248886 A1 | 10/2012 | Kesler |
| 2012/0248887 A1 | 10/2012 | Kesler |
| 2012/0248888 A1 | 10/2012 | Kesler |
| 2012/0248981 A1 | 10/2012 | Karalis |
| 2012/0254909 A1 | 10/2012 | Serdiuk |
| 2012/0256494 A1 | 10/2012 | Kesler |
| 2012/0274586 A1 | 11/2012 | Southworth |
| 2012/0284672 A1 | 11/2012 | Madonna |
| 2012/0313449 A1 | 12/2012 | Kurs |
| 2012/0313742 A1 | 12/2012 | Kurs |
| 2012/0316661 A1 | 12/2012 | Rahman et al. |
| 2012/0324589 A1 | 12/2012 | Nukala |
| 2012/0331108 A1 | 12/2012 | Ferdowsi |
| 2012/0331394 A1 | 12/2012 | Trombley-Shapiro |
| 2013/0002533 A1 | 1/2013 | Burroughs et al. |
| 2013/0007949 A1 | 1/2013 | Kurs |
| 2013/0012788 A1 | 1/2013 | Horseman |
| 2013/0013750 A1 | 1/2013 | Butler |
| 2013/0018952 A1 | 1/2013 | McConnell |
| 2013/0018953 A1 | 1/2013 | McConnell |
| 2013/0020878 A1 | 1/2013 | Karalis |
| 2013/0033118 A1 | 2/2013 | Karalis |
| 2013/0038402 A1 | 2/2013 | Karalis |
| 2013/0041973 A1 | 2/2013 | Zhou |
| 2013/0054863 A1 | 2/2013 | Imes |
| 2013/0057364 A1 | 3/2013 | Kesler |
| 2013/0062966 A1 | 3/2013 | Verghese |
| 2013/0069441 A1 | 3/2013 | Verghese |
| 2013/0069543 A1 | 3/2013 | Mohan |
| 2013/0069753 A1 | 3/2013 | Kurs |
| 2013/0073094 A1 | 3/2013 | Knapton |
| 2013/0086841 A1 | 4/2013 | Luper et al. |
| 2013/0088154 A1 | 4/2013 | Van Hoof |
| 2013/0099587 A1 | 4/2013 | Lou |
| 2013/0116092 A1 | 5/2013 | Martinez et al. |
| 2013/0144470 A1 | 6/2013 | Ricci |
| 2013/0157509 A1 | 6/2013 | Srivastava |
| 2013/0167039 A1 | 6/2013 | Howell |
| 2013/0171981 A1 | 7/2013 | Woo |
| 2013/0175874 A1 | 7/2013 | Lou |
| 2013/0181541 A1 | 7/2013 | Karalis |
| 2013/0198653 A1 | 8/2013 | Tse |
| 2013/0199419 A1 | 8/2013 | Hjelm |
| 2013/0199420 A1* | 8/2013 | Hjelm .................. A47B 21/00 108/20 |
| 2013/0200721 A1 | 8/2013 | Kurs |
| 2013/0207889 A1 | 8/2013 | Chang et al. |
| 2013/0208186 A1 | 8/2013 | Malone |
| 2013/0218309 A1 | 8/2013 | Napolitano |
| 2013/0218829 A1 | 8/2013 | Martinez |
| 2013/0221744 A1 | 8/2013 | Hall |
| 2013/0234481 A1 | 9/2013 | Johnson |
| 2013/0234531 A1 | 9/2013 | Budgett |
| 2013/0241439 A1 | 9/2013 | Nishigaki |
| 2013/0246901 A1 | 9/2013 | Massano |
| 2013/0249410 A1 | 9/2013 | Thompson |
| 2013/0262687 A1 | 10/2013 | Avery |
| 2013/0278073 A1 | 10/2013 | Kurs |
| 2013/0278074 A1 | 10/2013 | Kurs |
| 2013/0278075 A1 | 10/2013 | Kurs |
| 2013/0283325 A1 | 10/2013 | Chiniara |
| 2013/0300353 A1 | 11/2013 | Kurs |
| 2013/0304924 A1 | 11/2013 | Dhara |
| 2013/0307349 A1 | 11/2013 | Hall |
| 2013/0314543 A1 | 11/2013 | Sutter |
| 2013/0316316 A1 | 11/2013 | Flavell et al. |
| 2013/0320773 A1 | 12/2013 | Schatz |
| 2013/0331993 A1 | 12/2013 | Detsch et al. |
| 2013/0334892 A1 | 12/2013 | Hall |
| 2013/0334973 A1 | 12/2013 | Wagenaar Cacciola |
| 2014/0002012 A1 | 1/2014 | McCauley |
| 2014/0021798 A1 | 1/2014 | Kesler |
| 2014/0028112 A1 | 1/2014 | Hui |
| 2014/0035378 A1 | 2/2014 | Kesler |
| 2014/0035704 A1 | 2/2014 | Efe |
| 2014/0044281 A1 | 2/2014 | Ganem |
| 2014/0044293 A1 | 2/2014 | Ganem |
| 2014/0049118 A1 | 2/2014 | Karalis |
| 2014/0052974 A1 | 2/2014 | Masters |
| 2014/0054961 A1 | 2/2014 | Metcalf |
| 2014/0062211 A1 | 3/2014 | Hamam |
| 2014/0067865 A1 | 3/2014 | Kirigin |
| 2014/0074930 A1 | 3/2014 | Kumashio |
| 2014/0084703 A1 | 3/2014 | Hall |
| 2014/0084859 A1 | 3/2014 | Hall |
| 2014/0091636 A1 | 4/2014 | Ofstein |
| 2014/0091756 A1 | 4/2014 | Ofstein |
| 2014/0096706 A1 | 4/2014 | Labrosse et al. |
| 2014/0103738 A1 | 4/2014 | Campanella |
| 2014/0108956 A1 | 4/2014 | Varenhorst |
| 2014/0109210 A1 | 4/2014 | Borzycki |
| 2014/0109802 A1 | 4/2014 | Dienes et al. |
| 2014/0111304 A1 | 4/2014 | Hashim-Waris |
| 2014/0135648 A1 | 5/2014 | Holoien |
| 2014/0137773 A1 | 5/2014 | Mandel et al. |
| 2014/0139426 A1 | 5/2014 | Kryze |
| 2014/0150059 A1 | 5/2014 | Uchida |
| 2014/0156645 A1 | 6/2014 | Brust et al. |
| 2014/0159589 A1 | 6/2014 | Pandharipande |
| 2014/0159652 A1 | 6/2014 | Hall |
| 2014/0167618 A1 | 6/2014 | Wang |
| 2014/0175898 A1 | 6/2014 | Kurs |
| 2014/0181704 A1 | 6/2014 | Madonna |
| 2014/0181935 A1 | 6/2014 | Beckmann |
| 2014/0195149 A1 | 7/2014 | Yang |
| 2014/0195291 A1 | 7/2014 | Aaron |
| 2014/0195805 A1 | 7/2014 | Koo |
| 2014/0203659 A1 | 7/2014 | Madawala |
| 2014/0203921 A1 | 7/2014 | Baker |
| 2014/0215551 A1 | 7/2014 | Allain |
| 2014/0217785 A1 | 8/2014 | Arens et al. |
| 2014/0229578 A1 | 8/2014 | Chu |
| 2014/0236659 A1 | 8/2014 | Hapse |
| 2014/0244043 A1 | 8/2014 | Foster |
| 2014/0245932 A1 | 9/2014 | McKenzie, III et al. |
| 2014/0249853 A1 | 9/2014 | Proud et al. |
| 2014/0253813 A1 | 9/2014 | Bakar |
| 2014/0259047 A1 | 9/2014 | Bakar |
| 2014/0269531 A1 | 9/2014 | Luna |
| 2014/0270254 A1 | 9/2014 | Oishi et al. |
| 2014/0274005 A1 | 9/2014 | Luna |
| 2014/0277757 A1 | 9/2014 | Wang |
| 2014/0277763 A1 | 9/2014 | Ramachandran |
| 2014/0278057 A1 | 9/2014 | Berns |
| 2014/0282013 A1 | 9/2014 | Amijee |
| 2014/0285113 A1 | 9/2014 | Huang |
| 2014/0297758 A1 | 10/2014 | Kidron |
| 2014/0300277 A1 | 10/2014 | Ono |
| 2014/0302795 A1 | 10/2014 | Chacon |
| 2014/0354429 A1 | 12/2014 | Henderson |
| 2015/0012843 A1 | 1/2015 | Ouyang et al. |
| 2015/0035440 A1 | 2/2015 | Spero |
| 2015/0064671 A1 | 3/2015 | Murville et al. |

(56) References Cited

U.S. PATENT DOCUMENTS

| | | |
|---|---|---|
| 2015/0069915 A1 | 3/2015 | Ogawa |
| 2015/0071453 A1 | 3/2015 | Po et al. |
| 2015/0142381 A1 | 5/2015 | Fitzsimmons et al. |
| 2015/0179012 A1 | 6/2015 | Sharpe |
| 2015/0195620 A1 | 7/2015 | Buchner et al. |
| 2015/0201480 A1 | 7/2015 | Ogawa |
| 2015/0229644 A1 | 8/2015 | Nozawa |
| 2015/0296594 A1 | 10/2015 | Blum |
| 2015/0302150 A1 | 10/2015 | Mazar et al. |
| 2015/0330780 A1 | 11/2015 | Yuzawa |
| 2015/0370272 A1 | 12/2015 | Reddy |
| 2016/0044071 A1 | 2/2016 | Sandholm |
| 2016/0051042 A1 | 2/2016 | Koch |
| 2016/0171566 A1 | 6/2016 | Pugh |
| 2016/0304013 A1 | 10/2016 | Wolas et al. |
| 2016/0309889 A1 | 10/2016 | Lin et al. |
| 2016/0327922 A1 | 11/2016 | Sekiguchi |
| 2016/0342950 A1 | 11/2016 | Pignataro |
| 2017/0046113 A1 | 2/2017 | Noyes et al. |
| 2017/0052517 A1 | 2/2017 | Tsai et al. |
| 2017/0060350 A1 | 3/2017 | Zheng et al. |
| 2017/0135636 A1 | 5/2017 | Park et al. |
| 2017/0208664 A1 | 7/2017 | Mead |

FOREIGN PATENT DOCUMENTS

| | | |
|---|---|---|
| AU | 2013203947 A1 | 5/2013 |
| CN | 102239633 A | 11/2011 |
| CN | 102439669 A | 5/2012 |
| CN | 202286910 U | 7/2012 |
| CN | 102870338 A | 1/2013 |
| DE | 19604329 A1 | 8/1997 |
| DE | 10260478 A1 | 7/2004 |
| DE | 102008044848 A1 | 3/2010 |
| DE | 202014005160 U1 | 7/2014 |
| EP | 0935263 A2 | 8/1999 |
| EP | 1159989 A1 | 12/2001 |
| EP | 1470766 A1 | 10/2004 |
| EP | 2367146 A1 | 9/2011 |
| EP | 2388977 A1 | 11/2011 |
| EP | 2439686 A1 | 4/2012 |
| GB | 2424084 A | 9/2006 |
| JP | H11178798 A | 7/1999 |
| JP | 2001289975 A | 10/2001 |
| JP | 2005267491 A | 9/2005 |
| KR | 20140007006 A | 1/2014 |
| SE | 516479 C2 | 1/2002 |
| WO | 0219603 A2 | 3/2002 |
| WO | 02062425 A1 | 8/2002 |
| WO | 2005032363 A1 | 4/2005 |
| WO | 2005074754 A1 | 8/2005 |
| WO | 2006042415 A1 | 4/2006 |
| WO | 2006042420 A1 | 4/2006 |
| WO | 2006065679 A2 | 6/2006 |
| WO | 2007008646 A2 | 1/2007 |
| WO | 2007099206 A1 | 9/2007 |
| WO | 2008008729 A2 | 1/2008 |
| WO | 2008050590 A1 | 2/2008 |
| WO | 2008101085 A2 | 8/2008 |
| WO | 2008118178 A1 | 10/2008 |
| WO | 2009085896 A1 | 7/2009 |
| WO | 2009108958 A1 | 9/2009 |
| WO | 2009108959 A1 | 9/2009 |
| WO | 2010019644 A2 | 2/2010 |
| WO | 2010023414 A1 | 3/2010 |
| WO | 2010093997 A1 | 8/2010 |
| WO | 2011034759 A2 | 3/2011 |
| WO | 2011099873 A1 | 8/2011 |
| WO | 2011112795 A1 | 9/2011 |
| WO | 2011133628 A1 | 10/2011 |
| WO | 2012037279 A1 | 3/2012 |
| WO | 2012061438 A2 | 5/2012 |
| WO | 2012108938 A1 | 8/2012 |
| WO | 2012170278 A3 | 12/2012 |
| WO | 2013008252 A2 | 1/2013 |
| WO | 2013033788 A1 | 3/2013 |
| WO | 2013059441 A1 | 4/2013 |
| WO | 2013112185 A2 | 8/2013 |
| WO | 2013122483 A1 | 8/2013 |
| WO | 2014007656 A1 | 1/2014 |
| WO | 2014011059 A1 | 1/2014 |
| WO | 2014035260 A1 | 3/2014 |
| WO | 2014035263 A1 | 3/2014 |
| WO | 2014038966 A1 | 3/2014 |
| WO | 2014054953 A1 | 4/2014 |
| WO | 2014094107 A1 | 6/2014 |
| WO | 2014139781 A2 | 9/2014 |

OTHER PUBLICATIONS

Benallal, et al., A Simple Algorithm for Object Location from a Single Image Without Camera Calibration, In International Conference on Computational Science and Its Applications, pp. 99-104. Springer Berlin Heidelberg, 2003.

Bendixen, et al., Pattern of Ventilation in Young Adults, Journal of Applied Physiology, 1964, 19(2):195-198.

BrianLaF, asp.net 4.0 TimePicker User Control, www.codeproject.com/articles/329011/asp-net-timepicker-user-control, Feb. 25, 2012, 5 pages.

Ejaz, Time Picker Ajax Extender Control, www.codeproject.com/articles/213311/time-picker-ajax-extender-control, Jun. 22, 2011, 8 pages.

Heddings, Stop Hitting Snooze: Change the Default Reminder Time for Outlook Appointments, www.howtogeek.com/howto/microsoft-office/stop-hitting-snooze-change-the-default-reminder-time-for-outlook-appointments, Apr. 25, 2008, 2 pages.

Hopkins Medicine, Vital Signs (Body Temperature, Pulse Rate, Respiration Rate, Blood Pressure). Source: Johns Hopkins Medicine Health Library, 2016, pp. 1-4.

Kriebel, How to Create a Two-Panel Column Chart in Tableau (And Save Lots of Time Compared to Excel), www.vizwiz.com/2012/02/how-to-create-two-panel-column-chart-in.html, 2012, 14 pages.

LINAK, Deskline Deskpower DB4/DL4 Systems User Manual, Copyright LINAK 2007.

LINAK, Deskline DL9/DB9/DL11 System User Manual, Copyright LINAK 2007.

LINAK, Deskline Controls/Handsets User Manual, Copyright LINAK 2017.

LINAK, DPG Desk Panels—A New Way to Adjust Your Office Desk, Product News, May 19, 2017.

Microsoft, Automatically Adjust the Start and Finish Dates for New Projects, Applies to: Project 2007, Project Standard 2007, https://support.office.com/en-us/article/Automatically-adjust-the-start-and-finish-dates-for-new-projects-27c57cd1-44f3-4ea8-941a-dc5d56bdc540?ui=en-US&rs=en-US&ad=US&fromAR=1, Copyright 2017 Microsoft.

mrexcel.com, Forum: How to Calculate Percentage of Total Used Time, www.mrexcel.com/forum/excel-qestions/192521-how-calculate-percentage-total-used-time.html., Post Date: Mar. 20, 2006, 4 pages.

Office Details, Inc., Height-AdjusTable Worksurfaces User Instructions, Copyright 2004 Office Details, Inc.

Paolo, Arduino Forum, Measuring Point to Point Distances With Accelerometer, http://forum.arduino.cc/index.php?action=printpage;topic=49902.0;images, Post Date: Jan. 26, 2011, 5 pages.

Process Dash, Using the Task & Schedule Tool, www.processdash.com/static/help/Topics/Planning/UsingTaskSchedule.html, Mar. 4, 2011.

Steelcase, Inc., Airtouch Height-Adjustable Tables, Brochure, Copyright 2015 Steelcase Inc.

Steelcase, Inc., Migration Height-Adjustable Desk, Brochure, Copyright 2015 Steelcase Inc.

Steelcase, Inc., Ology Height-Adjustable Desk, Brochure, Copyright 2016 Steelcase Inc.

Steelcase, Inc., Series 5 Sit-To-Stand Height-Adjustable Tables, Brochure, Copyright 2015 Steelcase Inc.

Steelcase, Inc., Series 7 Enhanced Sit-To-Stand Height-Adjustable Tables, Brochure, Copyright 2015 Steelcase Inc.

(56) References Cited

OTHER PUBLICATIONS

Sun Microsystems, Lights Out Management Module, https://docs.oracle.com/cd/E19585-01/819-0445-10/lights_out.html, Copyright 2004, Sun Microsystems, Inc.
Wideman, Issues Regarding Total Time and Stage 1 Time, http://maxwideman.com/papers/resource/issues.html, 1994.
Citrix, GoToMeeting User Guide, Copyright 2015 Citrix Systems.
ioin.me forum and FAQ, Apr. 3, 2014.
Cisco, WebEx Meeting Center User Guide for Hosts, Presenters, and Participants, Version 8.23, Copyright 1997-2011 Cisco and/or its affiliates.
Krumm, et al., The NearMe Wireless Proximity Server, UbiComp 2004, The Sixth International Conference on Ubiquitous Computing, pp. 283-300, Sep. 7-10, 2004.
NFS Technology Group, Rendezvous—Technology for Meeting Room, Desk Scheduling and Event Management, http://myrendezvous.net/rendezvous-event-booking-software/calendar-management/.
Citrix, GoToWebinar User Guide, Copyright 2015 Citrix Systems.
CiviCRM Books: User and Administrator Guide for Version 4.5, Published Sep. 2014, http://book.civicrm.org/user/current/email/scheduled-reminders/.
Lee, TechnicLee—My Thoughts on Technology, Business, and Innovation, Posted in Outlook, Scripting, Jan. 20, 2012, http://techniclee.wordpress.com/2012/01/20/sending-a-meeting-reminder-email-in-outlook/.
Events and Room Reserve Scheduled Task Setup for Email Notifications, Article No. 268, Apr. 22, 2013, http://kb.evanced.info/article.php?id=268.
Oracle Communications, Oracle Data Sheet—Calendar Server, Copyright 2015 Oracle and/or its affiliates, http://www.oracle.com/us/industries/communications/communications-calendar-server-ds-071728.pdf.
Stirworks, Inc., The Height-Adjustable, Standing Stir Kinetic Desk, http://www.stirworks.com/, Copyright 2015 Stirworks, Inc., 6 pages.

* cited by examiner

SMART WORKSTATION METHOD AND SYSTEM

CROSS-REFERENCE TO RELATED APPLICATIONS

This application is a continuation of U.S. patent application Ser. No. 15/173,212 filed Jun. 3, 2016, and which is titled "Smart Workstation Method and System".

This application is related to U.S. patent application Ser. No. 14/727,398 which was filed on Jun. 1, 2015 and which is titled "Powered Furniture Assembly" which claims priority to U.S. Provisional Patent Application Ser. No. 62/008,723 filed Jun. 6, 2014, U.S. Provisional Patent Application No. 62/040,485 filed Aug. 22, 2014, and U.S. Provisional Patent Application No. 62/106,040 filed on Jan. 21, 2015, each of which is incorporated herein by reference in its entirety.

This application is also related to U.S. patent application Ser. No. 15/170,550 which was filed on Jun. 1, 2016 and which is titled "Space Guidance And Management System And Method" and which claims priority to U.S. provisional patent application Ser. No. 62/171,401 which was filed on Jun. 5, 2015 and which is titled "Space Guidance And Management System And Method" and also is a continuation in part of U.S. patent application Ser. No. 14/871,097 which was filed on Sep. 30, 2015 and which is titled "Method And System For Locating Resources And Communicating Within An Enterprise" which further claims priority to U.S. provisional patent application Ser. No. 62/059,602 which was filed on Oct. 3, 2014 and which is also titled "Method And System For Locating Resources And Communicating Within An Enterprise", each of which is incorporated herein in its entirety by reference. U.S. patent application Ser. No. 15/170,550 is also a continuation in part of U.S. patent application Ser. No. 14/730,996 which was filed on Jun. 4, 2015 and which is titled "Environment Optimization For Space Based On Presence And Activities" which claims priority to U.S. provisional application No. 62/008,283 which was filed on Jun. 5, 2014 and which also is titled "Environment Optimization For Space Based On Presence And Activities", each of which is also incorporated herein by reference in its entirety.

This application is also related to U.S. patent application Ser. No. 15/170,070 which was filed on Jun. 1, 2016 and which is titled "Affordance Template System And Method" which claims priority to U.S. provisional patent application Ser. No. 62/169,645 filed on Jun. 2, 2015 which is titled "Affordance Template System And Method" as well as to U.S. provisional patent application Ser. No. 62/205,392 which was filed on Aug. 31, 2015 and which is also titled "Affordance Template System And Method", each of which is incorporated herein in its entirety by reference. For the avoidance of doubt, all of the applications cited in the preceding paragraphs are incorporated herein by reference in their entireties.

FIELD OF THE DISCLOSURE

The field of the disclosure is furniture, and more specifically, furniture having on-board power sufficient to enable use of one or more feature modules, on board sensor devices and, in at least some cases, on board or associated actuators that can be controlled to change various environmental characteristics associated with the furniture. This disclosure also describes a system for providing feedback and encouragement to furniture users to encourage healthy behaviors.

BACKGROUND OF THE DISCLOSURE

The value of electronic sensing devices for sensing physiological parameters of a person has been known in the medical industry for many years. To this end, many sensing devices have been developed that can be adhered or mechanically attached to a person's body at specific locations to sense specific parameter such as heart beat, breathing rate, temperature, blood flow, perspiration rate, etc. In addition, many applications have been developed to use sensed physiological parameters data to determine other conditions of a person. In some cases, physicians or other health care specialists have used sensed data to detect physical conditions of clients and to advise clients on lifestyle changes designed to help clients live healthier lives. In other cases, systems have been developed for home use to monitor biometric parameters and provide feedback to a person or the person's physician to indicate current health conditions or physiological parameter trending over time. In some cases sensed data has been used by other entities such as, for instance, insurance companies, to customize policies based on perceived health of particular persons.

One problem with early sensing systems was that those systems generally required a person to be located at a specific location in order to use the sensing systems. For instance, in some cases a person was required to be at a medical facility to be connected up to a sensing system. As another instance, in some cases a person was required to be at home where a processor and sensor assembly was located in order to use a sensing system.

Recently, with the advent of smaller electronic devices, smaller power sources and portable interface devices (e.g., smartphones, pad-type devices, etc.), many personal portable sensing devices have been developed along with associated applications that can be used by individuals or proxies (e.g., a primary care physician) to track physiological parameters over long periods of time outside of a hospital or home environment. For instance, there are many wrist mountable devices on the market today which monitor various physiological parameters and provide those parameters to an application run on a computing device (e.g., a pad-type device) which in turn processes the received data and outputs the data or other data derived therefrom to the person wearing the device for consideration. In many cases the idea here is to make a person aware of their physiological parameters and encourage a lifestyle change or at least maintenance of a healthy lifestyle that currently exists. Thereafter, the person receiving the data is required to act based on the received data to change or maintain their lifestyle. One particular advantage of wearable devices is that those devices may be in contact with a person's body for many hours each day and therefore data can be obtained over long periods of time and during different activities (e.g., exercise, relaxation, cognitively stressful periods, etc.). Thus, these devices that are in contact with a person's body over the long term, can feed new and more complex applications based on long term parameter values.

In addition to physiological parameter sensors, other sensor systems and devices have been developed for sensing various aspects of a person's behavior. For instance, wrist mounted or otherwise wearable pedometers have been developed that can estimate or count the number of steps a person takes during the course of a day or a distance traveled during a day or during an event (e.g., during a run). Other sensors have been developed to sense other behaviors or activities of a person (e.g., sitting, standing, etc.).

One problem with wearable devices like wrist mounted devices is that many people simply do not like wearing electronic devices. For instance, in many cases these devices are relatively large and clunky and can physically get in the way of some activities. As another instance, many wearable devices have an industrial look and feel and therefore are aesthetically unappealing. Still one other problem with wearable devices is that many of these devices are expensive and therefore cannot be personally purchased by many people that would like to take advantage of the functionality associated therewith. Still one other problem with these devices is that they typically require batteries and therefore, at least periodically, require some affirmative step by a user to initiate a recharge cycle. In most cases recharging require removal of the device and connection to some stationary charging station. Still one other problem with these devices is that they require a user to react correctly to generated data in order to make a change in the person's health (i.e., if a person is too sedentary, the person needs to become more active to improve their health).

One way to overcome many of the problems associated with wearable sensing devices is to provide sensing devices within a person's environment that are separate from the person but in proximity such that the devices can still sense physiological parameters and behaviors. Optimal places for sensors are locations where a person is located for a long time. For instance, most people spend one quarter to one third of their time in their beds. For this reason, some systems have been developed to place at least some types of sensors in mattress or other bed structure. As another instance, many people spend at least some time each day driving in their vehicles. For this reason, some systems have been developed that include sensors proximate a vehicle driver for sensing biometrics.

For many people, the place they spend most of their time after their bed is at work. For instance, many people spend eight, ten, or more hours at a facility operated by their employer. In many cases when a person spends a lot of time at work, most of that time is spent in a relatively small area. For example, many employees spend most of their time at work in a personal office or at a personal workstation or in a temporarily selected office or workstation. In fact, in many cases, a person spends most of her time in only a portion of an office or space proximate a work station. For instance, in many cases, an employee will be seated in a task chair proximate a desk or workstation where the chair is only moved within a small area (e.g., 5 by 5 feet) throughout a work day. In fact, in many cases a hard plastic floor mat is provided under a task chair to facilitate movement of the chair on casters adjacent a desk or workstation. Here, in most cases, a person is inclined to use their chair on the mat within the relatively small space (e.g., 5 by 5 feet) defined thereby. In cases where there is no mat, a person still typically only uses their chair in a space immediately adjacent a work station. Thus, in many cases each employee within an employer's facility spends most of her time within a relatively small defined space.

With respect to poor habits or behaviors or physiological parameters that adversely affect a person's health, it may be that some unhealthy activities for certain people occur at work. For instance, it is known that it is unhealthy for a person to remain stationary for long periods of time. Nevertheless, many people sit in a task chair for hours at a time without standing, walking or other physical activity. As another instance, it is known that it may be unhealthy to remain in the same position for a long time as such inaction puts undue stress on certain parts of a person's body which, in many cases, ultimately results in some form of pain. Nevertheless, many people working at a workstation maintain a single position, often times with poor posture, for hours on end without significant movement.

One other behavior that is often more prevalent within a working environment than in home environments is poor eating. In this regard, while people can control the foods they bring into their homes and often can spend additional time seeking out and preparing healthy foods when not at work, time restraints and lack of cooking resources often mean that eating habits at work facilities suffer appreciably. Poor eating habits are exacerbated in work environments where co-workers often bring unhealthy options to share during holidays or special occasions when there is added pressure to participate in festivities.

Thus, for various reasons it makes sense to provide physiological parameter sensors and behavioral sensors in work spaces used by people. First, many people are located in their work spaces for long and continuous periods and therefore instantaneous and long term physiological parameter data can be collected and analyzed. Second, by providing sensors to sense physiological and behavioral data within a work space, that data can be collected during normal daily activities to get a different view of a person's health and behavior. Third, by detecting parameters and behavior essentially in real time in a work environment, feedback can be provided to a person whenever some parameter is outside a range of acceptable values or when an altered behavior is determined to be relatively optimal.

A typical workstation includes, among other things, a desk or table that forms at least one work surface and a task chair adjacent thereto. In many cases a workstation will also include some type of stationary computing device such as a computer with a keyboard for user input and a flat panel or other type of display screen for providing information to a workstation user. A task chair is the one workstation device or assembly that most workstation users are in contact with most of the time while using a workstation. For this reason, locating sensors within a chair seat for sensing basic information such as presence, temperature, etc., is particularly advantageous and is generally known.

One problem with placing a sensor in a mobile chair has to do with how to get power to the sensors and how to get data from the sensors to a system processor for analysis, storage and reporting.

Thus, what is needed is a system that can sense many different physiological parameters of a person within a workspace and can use sensed parameter values to perform various functions. More specifically, what is needed is a system including sensors provided within furniture affordances that are proximate a workspace user and that optimally make contact (either direct or through clothing) with a person during workspace use so that reliable physiological parameter data can be obtained. In the case of a task chair, what is needed is a way to deliver power to the chair for powering sensors that is efficient and extremely easy to use, optimally requiring little if any activity from a chair user to provide the power. In addition, it would be advantageous if a chair could automatically adjust operations as a function of sensed physiological parameters or behaviors of a user of the chair in ways intended to increase overall chair user health and wellbeing.

With an enterprise facility, second to the chair, the affordance most people are near or touching most often and for extended periods of time is a workstation table. Thus, it would also be advantageous to integrate sensor devices within a workstation table assembly in addition to or instead of in a chair.

One particularly useful way to positively affect a chair user's health is to, in many cases, encourage the chair user to get out of the chair, to intermittently stand for periods between sitting periods. To support a user that alternates between standing and sitting, workstations with height adjustable tabletops have been developed. In at least some cases simple reminder systems have been developed that provide reminders to change from sitting to standing and vice versa based on the duration of a workstation tabletop in the sitting and standing positions. For instance, in a simple case, if a user has been sitting for one hour, a reminder may be provided to encourage the user to stand.

While simple sit-stand reminder systems in height adjustable workstations are advantageous, they have several shortcomings. First, in known systems reminder times are based on duration of periods that tabletops are in sit and stand positions. While durations of sit and stand periods are interesting, they only represent a very small amount of information which is simply not a reliable proxy for a station user's current condition. For instance, if a person sits from 10 AM to noon while working at her workstation and then runs for two hours during an extended lunch break and returns to her workstation, a sit-stand reminder system would likely encourage her to stand for some time. Here the encouragement to stand would be based on the two hour sitting period from 10 AM to noon and would ignore the two hour run and, in the context of the run, would simply be bothersome and make no sense.

As another instance, if a station user stands at his station from 11 AM to noon and then attends a two hour lunch meeting where he sits in a conference room for the entire two hour meeting, upon returning to his station, based on the 11 AM to noon standing period and ignoring the two hours of sitting at the meeting, the system would likely recommend a sitting period which again, would be bothersome and make no sense.

Second, the assumption that a workstation user is standing and sitting when a workstation tabletop is at a standing and sitting height, respectively, is often wrong. For instance, in many cases high stools or task chairs may be used at stations to support users in sitting positions while using a standing height tabletop. As another instance, most sit-stand tables only provide a portion of workstation worksurface where other worksurface area is persistently at a sitting height. In these cases, for instance, a height adjustable leg structure may support a rectangular tabletop for height adjustment while one or more other tabletops at a station are persistently at the sitting height. In many cases even when a height adjustable tabletop is high, a station user will use one of the low station worksurfaces while sitting.

As yet another instance, tying reminders to sensed prior sit-stand periods along ignore another source of informative data that could be used to better determine when to suggest user position changes. To this end, a user's schedule, as captured by electronic scheduling software, can be mined for tell-tale signs of the user's physical posture while away from a workstation (e.g., assume the user is sitting when scheduled for meeting in a conference room, assume the user is walking when traveling on campus for 20 minutes between two conference rooms, etc.).

As another instance, simple tabletop height based sit-stand processes fail to take into consideration a user's real time physiological condition such as heart rate, blood pressure, temperature, state of perspiration, breathing condition, etc., and therefore, often times may suggest a position change that could negatively affect a station user's condition. Similarly, basing sit-stand recommendations solely on tabletop height periods ignores a station user's state of mine and can often serve as a distraction that may adversely affect user work product. For instance, where a user is currently deep in thought (e.g., in a state of "flow"), a reminder to change position can often disturb the user's state and therefore adversely affect work product.

Another general shortcoming with known workstations is that many stations include lighting, power, audio and video capabilities that are simply not adjustable to user preferences. For instance, some user's may like ceiling lighting on worksurfaces while others may strongly prefer quiet baroque music while other want background white noise while working. In many cases workstation affordances cannot be adjusted to meet these and other preferences. In cases where affordances are adjustable to meet personal preferences, in many cases users simply do not take the time to set their preferences. This is especially true in the case of workstations that are used by many users or part of a shared hotelling facility space as opposed to in dedicated user workstations.

Yet one other problem with known workstations and furniture affordances that do sense at least some user activities and/or physiological conditions is that user can perceive that their privacy is being invaded. Thus, for instance, if a user's identity has to be known for a system to access personal physiological data needed to drive sit-stand processes, position change processes or other workstation services, many users may view the identity and physiological parameters combination as a personal data privacy violation.

SUMMARY OF THE DISCLOSURE

It has been recognized that, other than a bed, office furniture are the objects that many people make the most contact with during the course of a day. For this reason, placement of physiological sensors in office furniture such as an office chair or workstation table is particularly advantageous. The value of placement of sensors within a chair and or table that a person contacts or is proximate for hours a day is enhanced as often times health challenges may occur during working hours when a person is too sedentary, sometimes under stress and often times eating foods that are less than optimal.

It has also been recognized that the locations of sensors on or in a chair can appreciably affect the accuracy of the data obtained thereby. For instance, placement of a sensor on a chair arm rest where a bare forearm may reside or where a forearm is often covered with a relatively thin shirt material may be advantageous. Similarly, placement of a sensor in the front surface of a backrest may also be advantageous. Seat sensors may also be advantageous, for example, placement of a sensor in the front edge of a seat may yield accurate data when the back portion of a user's knees are pressed up against the front edge of the seat.

It has further been recognized that where a moveable/portable chair includes an on-board battery, a charging system may be provided that automatically starts charging when no person is located within a pre-defined space and where charging is discontinued automatically whenever someone enters the predefined space. For instance, in at least some embodiments a 5 by 5 foot chair mat may be fitted with one or more inductive coupling antennas and a coil may be mounted to the underside of the chair (e.g., within the base of the chair). A sensor may sense when no one is in a room in which the chair is located and may start battery charging when no one is in the room. Upon sensing a person entering the space, the system may automatically stop charging the battery. Thus, for instance, if a person leaves a room to grab lunch, while the person is outside the room, the system may charge the battery through the mat. By charging the battery only when no one is in the room, any concerns a person may have about being present within an inductive field are avoided. As another instance, when no person is located proximate the charging mat (e.g., a specific space), the system may start the charging process.

In other cases, instead of including an inductive mat with a chair that includes a coil, an electrical mat may be provided for use with a chair that includes electrical probes or brushes that extend down from an undersurface of the chair to the mat to make electrical contact therewith for battery charging purposes. Here, again, charging may only occur when there is no one in a space (e.g., a room, a proximate area about the mat, etc.). In some cases the probes or brushes may be stationary and always contact the charging matt there below. In other cases, the probes may be mounted to pistons or the like that are powered to move the probes up and down to break and make contact with the charging pad there below. Here, for instance, where a chair has a five spoke base with wheels or casters at distal ends, first and second probes may be mounted to two of the spokes proximate two of the casters. When a person is in a room in which the chair is located, the probes may be raised up so that they do not contact the mat and power to the mat may be turned off. When no person is located in the room, the probes may be pushed downward and contact the mat to start the charging process.

Moveable electrical probes may be provided on other parts of a task chair for connection to other charging devices. For instance, in some cases first and second probes may be provided in the top surfaces of first and second chair armrest members. Here, a charging mat or similar device may be provided on the undersurface of a workstation table. To charge a battery mounted on the chair, the chair may have to be placed in a stowed position with the armrests under a front edge of the workstation table below the charging mat. When so positioned, the system may cause the armrests to raise so that the probes contact the charging mat and charging commences. In other cases the probes themselves instead of the armrests may be raised to make contact with the charging mat. In this case, instead of sensing the location of a person, the system may sense the location of the chair relative to the charging mat. Here, charging would not occur until the chair is in a location under the workstation, which would prevent a person from sitting on the chair. In other cases charging still may not occur until no one is sensed within the room or the space associated with the chair.

In at least some cases, instead of providing a motorized moveable probe on the chair, the moveable probes may be provided as part of the charging mat or device. For instance, in the case of a mat on the undersurface of a workstation table, a motor may drive the mat downward when chair arms are located beneath the workstation so that different parts (e.g., positive and negative) of the mat contact the armrest members for charging purposes. By providing the motors and moveable probes on the workstation as opposed to the moveable chair several advantages result. First, the chair can have an appearance that is more like the appearance of popular task chairs manufactured today. Second, motors and moveable probes that may be relatively more subject to damage than other components are provided as part of a stationary furniture affordance as opposed to the moveable chair which should result in a more robust overall design.

The sensor that determines if a person is within the space and/or the location of a chair within a space may take any of several different forms including a simple presence sensor, an entry and exit counter, a movement sensor, a camera that processes high definition images, etc.

In at least some embodiments it is contemplated that some type of indicator may be provided that affirmatively indicates whether a chair battery is being charged. For example, there may be an indicator that signals to a user of a chair that the chair battery is not being charged while the chair is in use. Where an indicator of no charge is provided, any user concern regarding simultaneous charging may be eliminated. For example, in some cases a small device may be provided for placement on the top surface of a workstation table or the like that includes red and green LED indicators aligned with a two state legend that indicates "charging" and "not charging", respectively. Here, when the green LED is illuminated, a chair user would know that the battery is not being charged and when the red LED is illuminated a person could determine that the chair is currently being charged.

In any case where a chair needs to be positioned relative to a charging device for a battery to be charged, it is contemplated that one or more motors may be provided on the chair for moving the chair to a charging position automatically. For instance, where a chair seat is mounted for rotation about a center post to a castered base, one motor may be provided on one of the casters and a second motor may be provided on the base to rotate the seat there above to any rotational angle with respect to the base. The motor on the caster should be able to move the base to any location on a floor mat or an ambient floor there below, albeit where the base may assume any orientation. The second motor between the base and the seat should be controllable to rotate the seat to a position where the armrests are directed toward an open space under the workstation table top and a charging pad mounted there under, once the seat and armrest are aligned with the open space, the first caster motor can drive the chair toward the table until the arm rests are located under the pad. While the chair is moving toward the table, if the base rotates somewhat, the motor between the base and the seat can compensate for that rotation by rotating the seat and armrests attached thereto to maintain alignment with the pad. Once the armrests are under the pad, the pad may be lowered to contact probes in the armrests and charge the batter. In an alternative embodiment the two motors may be linked to first and second different casters for driving the chair into the charging position.

Where a chair base includes five casters, the first and second powered casters may be adjacent each other or may be separated by a non-powered caster. In either case, the two powered casters may be controlled together to move the chair to any desired position for charging.

In at least some cases where a chair includes motors, when a person enters a space associated with the chair during a charging cycle, in addition to automatically stopping the charging cycle, the system may also control the motors in the chair to move the chair into a welcoming position facing an entry egress into the space. For instance, a motor may drive a powered caster to move the chair back away from a charging position proximate a workstation table and a motor between the chair base and the seat may rotate the seat to face the egress. In some cases, after a chair battery is fully charged, the chair motors may be controlled to automatically move the chair into the welcoming position regardless of whether or not a person is located within the space associated with the chair.

In some cases, instead of powering one or more casters for moving a chair to a charging position, a separate driving device may be provided that is designed specifically to move the chair toward and/or away from a charging position. To this end, for instance, a driving device including first and second spaced apart wheels may be provided below a central portion of a chair base. Here, the driving member may be at least couplable to a central pivot post between the base and a seat and the two wheels that comprise part of the driving device may be located on opposite sides of a vertical axis through the central pivot post. In this case, where the wheels are driven in opposite directions while the driving member is coupled to the central post, the seat may be rotated and where the wheels are driven in the same direction the chair may be moved from one location to another. Thus, both rotational and directional control using a single driving device may be facilitated.

It has also been recognized that a chair can be used automatically to change a condition or a person's behavior when some undesirable condition occurs. For instance, in at least some embodiments, motors may be provided on a chair and linked to various components to alter the relative juxtaposition of chair components periodically to change the position of a person sitting in the chair.

In accordance with the present invention, methods and systems for communicating with a user of an article of furniture are provided that substantially eliminate or reduce the disadvantages and problems associated with previous systems and methods. In particular, the present invention contemplates methods and systems for providing information to a user of an article of furniture regarding his or her interaction with the environment and physical or mental engagement or health.

In one embodiment, a method of providing information to a user of an article of furniture comprises sensing a first data set about a user of an article of furniture through the use of a sensor, sending the first data set to a processor, generating a conclusion based on the first data set, generating a second data set about the user through input by the user, where the input relates to the conclusion, sending the second data set to the processor, generating an output about the user based on the first data set and the second data set, and sending the output to the user. Other embodiments include a system for providing information to a user of an article of furniture that comprises a sensor configured to sense a first data set about a user of an article of furniture, and a processor configured to receive the first data set from the sensor, generate a conclusion based on the first data set, receive a second data set about the user based on input from the user, where the input relates to the conclusion, generate an output about the user based on the first data set and the second data set, and send the output to the user. Some embodiments include a non-transitory computer-readable storage medium containing program instructions, which when executed by a processor cause the processor to execute a method of providing information to a user of an article of furniture, the method comprising receiving a first data set generated by a sensor about a user of an article of furniture, generating a conclusion based on the first data set, prompting the solicitation of a second data set from about the user through input by the user, where the input relates to the conclusion, receiving the second data set to the processor, generating an output about the user based on the first data set and the second data set, and sending the output to the user. Similar embodiments may include a method for collecting information about a user of an article of furniture and sending the information to a processor, the method comprising identifying a selected position for a sensor within a work environment appropriate to sense a first data set about a user of an article of furniture within the work environment, placing the sensor in the selected position, creating a network between at least the sensor, a processor, and a device configured to solicit a second data set from a user, ensuring the sensor is configured to send the first data set to the processor, and ensuring the processor is configured to receive the first data set from the sensor and the second data set from the device, generate an output about the user based on the first data set and the second data set, and send the output to the user. Another embodiment may include a system for collecting information about a plurality of users in a work environment, the system comprising a plurality of articles of furniture in a work environment, a plurality of sensors positioned within the work environment and configured to sense individual data sets about a plurality of users of the article of furniture, and a processor configured to receive the individual data sets from the plurality of sensors, generate a plurality of conclusions, each conclusion based on one of the individual data sets, receive input data sets, each input data set resulting from input from one user of the plurality of users and relating to one conclusion of the plurality of conclusions, generate outputs, each output based on at least one of the individual data sets and one of the input data sets, and send one or more outputs to one or more users of the plurality of users.

In another embodiment, a method for providing information to a user of an article of furniture comprises sensing a data set about a user, sending the data set to a processor, generating an output based on the data set and an input from an organizational user, and sending the output to the user. Other embodiments include a system for providing information to a user of an article of furniture, the system comprising a sensor configured to sense a data set about a user and transmit the data set, and a processor configured to receive the data set from the sensor, generate an output based on the data set and an input from an organizational user, and transmit the output to the user. Some embodiments include a non-transitory computer-readable storage medium containing program instructions, which when executed by a processor cause the processor to execute a method of providing information to a user of an article of furniture, the method comprising receiving a data set generated by a sensor about a user of an article of furniture, receiving an input from an organizational user, generating an output based on the data set and the input from the organizational user, and sending the output to the user. A similar embodiment includes a method for collecting information about a user of an article of furniture and sending the information to a processor, the method comprising identifying a selected position for a sensor within a work environment appropriate to sense a data set about a user of an article of furniture within the work environment, placing the sensor in the selected position, and ensuring the sensor is configured to send the data set to a processor, and ensuring the processor is configured to receive the data set from the sensor and an input from an organizational user, generate an output based on the first data set and the input from the organizational user, and send the output to the user. An additional embodiment includes a system for collecting information about a plurality of users in a work environment, the system comprising a plurality of articles of furniture in a work environment, a plurality of sensors positioned within the work environment and configured to sense individual data sets about a plurality of users of the article of furniture, and a processor configured to receive the individual data sets from the plurality of sensors, receive an input from an organizational user, generate a plurality of outputs based on the individual data sets and the input from the organizational user, and send one or more outputs of the plurality of outputs to one or more users of the plurality of users.

In another embodiment, a method for providing information to a user of an article of furniture comprises sensing a data set about a user of an article of furniture, sending the data set to a processor, generating an output based on the data set, determining a preferred time range for communication with the user, and sending the output to the user during the preferred time range for communication. Other embodiments include a system for providing information to a user of an article of furniture, the system comprising a sensor configured to sense a data set about a user and transmit the data set, and a processor configured to receive the data set, generate an output based on the data set, determine a preferred time range for communication with the user, and send the output to the user during the preferred time range for communication. Some embodiments include a non-transitory computer-readable storage medium containing program instructions, which when executed by a processor cause the processor to execute a method of providing information to a user of an article of furniture, the method comprising receiving a first data set generated about a user of an article of furniture, generating an output based on the first data set, determining a preferred time range for communication with the user, and sending the output to the user during the preferred time range for communication. Similar embodiments include a method for collecting information about a user of an article of furniture and sending the information to a processor, the method comprising identifying a selected position within a work environment appropriate to sense a data set about a user of an article of furniture within the work environment, placing a sensor in the selected position, and ensuring the sensor is configured to send the data set to a processor, wherein the processor is configured to generate an output based on the data set, determine a preferred time range for communication with the user, and send the output to the user during the preferred time range for communication. An additional embodiment includes a system for collecting information about a plurality of users in a work environment, the system comprising a plurality of articles of furniture in a work environment, a plurality of sensors positioned within the work environment and configured to sense individual data sets about a plurality of users of the article of furniture, and a processor configured to receive the individual data sets from the plurality of sensors, to determine a preferred time range for communication with one or more users of the plurality of users, and to send the one or more outputs to the one or more users during the preferred time range for communication.

In another embodiment, a method for providing information to a user of an article of furniture comprises sensing a first data set about a first user of a first article of furniture, sensing a second data set about a second user of a second article of furniture, sending the first and second data sets to a processor, generating an output based on the first and second data sets and an input from the organizational user, and sending the output to the first user. Other embodiments include a system for providing information to a user of an article of furniture, the system comprising a first sensor configured to sense a first data set about a first user of a first article of furniture, a second sensor configured to sense a second data set about a second user of a second article of furniture, and a processor configured to receive the first and second data sets, generate an output based on the first and second data sets and an input from the organizational user, and send the output to the first user. Some embodiments include a non-transitory computer-readable storage medium containing program instructions, which when executed by a processor cause the processor to execute a method of providing information to a user of an article of furniture, the method comprising sensing a first data set about a first user of a first article of furniture, sensing a second data set about a second user of a second article of furniture, sending the first and second data sets to a processor, generating an output based on the first and second data sets and an input from an organizational user, and sending the output to the first user. A similar embodiment includes a method for collecting information about users within a work environment, the method comprising identifying a plurality of positions within a work environment appropriate for sensing, placing a first sensor in a first position of the plurality of positions, wherein the first position is a position appropriate to sense a first data set about a first user of a first article of furniture placing a second sensor in a second position of the plurality of positions, wherein the second position is a position appropriate to sense a second data set about a second user of a second article of furniture, and ensuring the first and second sensors are configured to send the first and second data sets to a processor, wherein the processor is configured to generate an output based on the first and second data sets and an input from an organizational user and to send the output to the first user. Another embodiment includes a system for collecting information about a plurality of users in a work environment, the system comprising a plurality of articles of furniture in a work environment, a plurality of sensors positioned in the work environment and configured to sense individual data sets about a plurality of users of the plurality of articles of furniture, and a processor configured to receive the individual data sets from the plurality of sensors, generate one or more outputs based on the data sets and one or more inputs from an organizational user, and send the one or more outputs to the one or more users.

An additional embodiment includes a method for providing information to a user of a work space that comprises identifying a user within a pre-determined proximity of a workspace, adjusting an environmental factor in the workspace based on the user, generating a first data set about the user through a sensor within the workspace, sending the first data set to the processor, receiving an input from the user while the user is within the workspace, and adjusting a second environmental factor in the workspace based on the user.

Technical advantages of various embodiments include the ability to communicate with an individual regarding his physical activity, posture, work location, mental activity, including a level of engagement with his work, health factors, and other factors that may impact his wellbeing. In addition, by collecting information from the individual as he interacts with his physical environment, including chairs, tables, and other furniture, communication may be more individually tailored to provide information, encouragement, motivation, coaching, and rewards designed to improve physical and mental health and satisfaction. Advantages may include the ability to utilize the system as it relates to a group of individuals and to communicate with the group regarding its collective occupancy and wellbeing. In some embodiments, advantages may also arise from sharing information with a professional charged with optimizing an organization's resources, such as a facility manager.

In at least some cases it has been recognized that a global user dataset can be maintained for employees that use facility workstations and other affordances and that the global dataset can drive space affordance operations as well as to provide generally optimal user behavior guidance/encouragement. Here, a user's global dataset may include a large use preference dataset or specification indicating preferred affordance settings and station and other services. The global dataset may also include data related to sensed station parameters as well as physiological conditions of a user sensed by station sensors. The global dataset may also include sensed user conditions from sensors that are separate from the workstation (e.g., a wrist mounted computing device) as well as data from a user's electronically maintained schedule and/or from third party information providers like a weather or traffic reporting service.

Some embodiments include a method for anonymously associating a workstation user's station control preferences with a workstation, the method comprising the steps of correlating anonymous user IDs with user preference sets in a database, obtaining input from a user at a workstation, comparing the user input to the anonymous user IDs to distinguish one distinguished user from other users without determining the identity of the user, accessing the user preference set associated with the distinguished user and controlling workstation affordances per the accessed user preferences while the user is located within a present zone proximate the workstation.

In some cases the step of obtaining input from a user includes receiving an anonymous code that the user inputs at the workstation. In some cases the step of obtaining input from a user further includes querying the user for the anonymous code. Some cases further include the steps of, where a user preference set is not stored for a specific user, controlling the workstation in a manner consistent with a default preference set. Some cases further include the steps of, where a user preference set is not stored for a specific user, sensing at least one physiological parameter of a user proximate the workstation, using the sensed parameter to generate a prescriptive preference set and using the prescriptive preference set to control workstation affordances.

In some cases the anonymous user IDs include biosignatures for each of the users and wherein the step of obtaining input includes sensing biometric information from a user. In some cases the step of comparing includes comparing the sensed biometric information to the biosignatures to identify the user. In some cases the workstation affordances are placed in a standby state when the user moves out of the present zone. In some cases the step of controlling further includes associating the user preferences with the station and wherein the association is maintained for at least a timeout period after the user moves out of the present zone.

In some cases, if the user moves back into the present zone during the timeout period, the step of controlling again includes controlling the workstation affordances per the user preferences. Some cases further include the step of monitoring for user changes to workstation control and altering user preferences based on at least some changes to workstation control. In some cases the user preferences include preferences related to services to the facilitated by the workstation affordances.

Other embodiments include a method for associating a user's portable computing device with a workstation, the method comprising the steps of sensing a link activity at the workstation indicating that a user wants to associate the user's portable computing device with the workstation, determining that the user's portable computing device is located within a wireless near field zone, obtaining a device ID from the user's portable device that is located in the wireless near field zone, establishing wireless communication with the user's portable device via the device ID, presenting a workstation control interface via a display screen on the portable device, monitoring the location of the user's portable device within a wireless present zone associated with the workstation wherein the wireless present zone is larger than the near field zone and if the user's portable device is no longer detected within the wireless present zone, removing the workstation control interface from the display screen.

Some cases further include the steps of, while the workstation control interface is presented on the display screen, receiving a workstation control signal from the portable device and controlling workstation affordances per the control signal. Some cases further include the steps of, after removing the workstation control interface form the display screen, if the user's portable device is again detected within the wireless present zone, presenting the workstation control interface on the display screen. In some cases the step of establishing wireless communication with the user's portable device via the device ID includes establishing an association between the user's portable device and a workstation processor.

Some cases further include the steps of monitoring the location of the user's portable device within a wireless station zone associated with the workstation wherein the wireless station zone is larger than the present zone and if the user's portable device is no longer detected within the wireless present zone and is still within the station zone, maintaining the association between the portable device and the workstation processor and if the portable device is outside the station zone, disassociating the portable device from the workstation processor. In some cases the near field zone is located above a portion of a workstation tabletop assembly. In some cases the link activity includes bumping the portable device into a workstation component and a workstation sensor sensing the bumping action. In some cases the link activity includes a user tapping on a workstation component and a workstation sensor sensing the tapping action.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE DISCLOSURE

Figure 1:
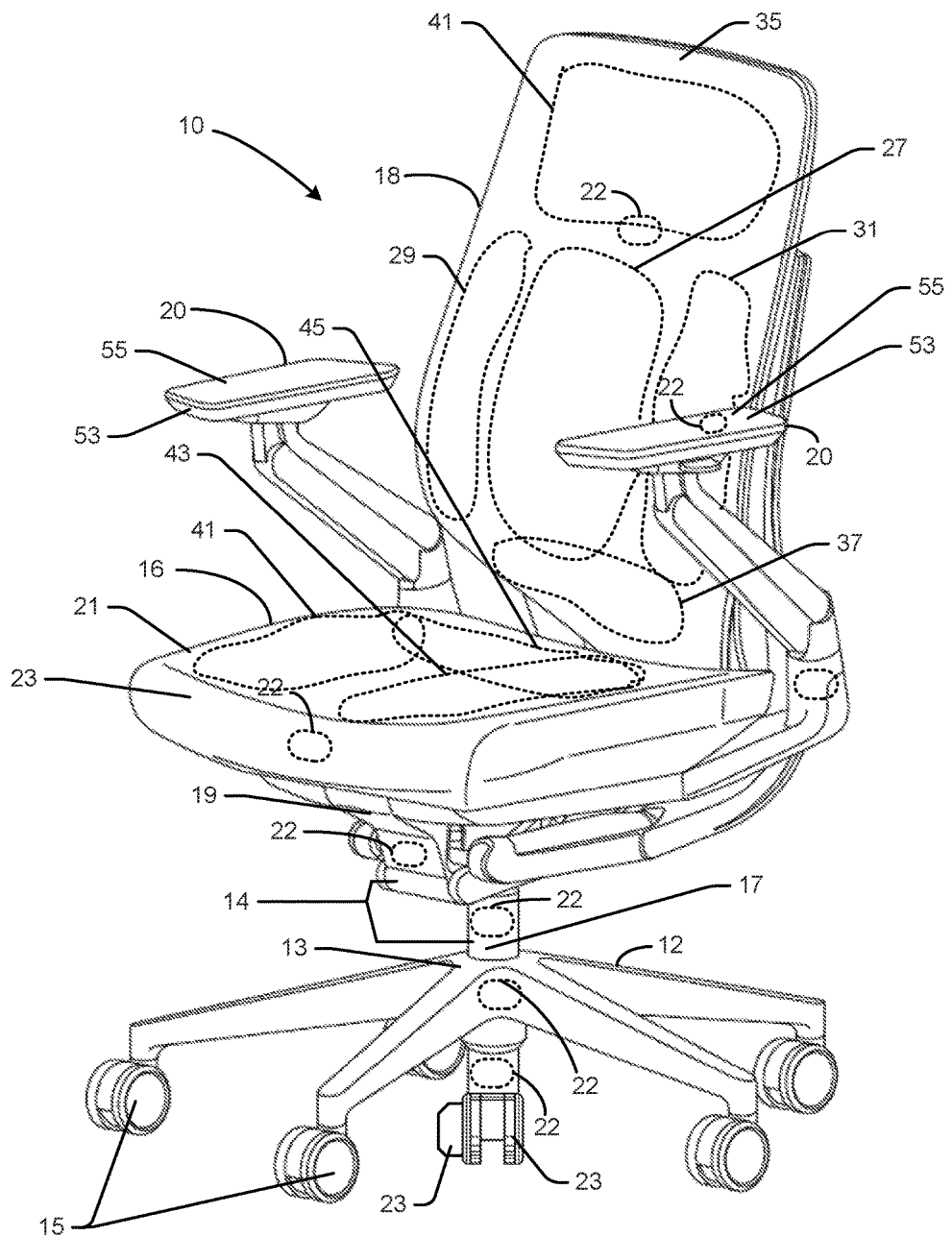
FIG. 1 is a chair assembly, in accordance with an aspect of the present disclosure.

For purposes of description herein, the terms "upper," "lower," "right," "left," "rear," "front," "vertical," "horizontal," and derivatives thereof shall relate to the orientation experienced by a user occupying the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise. Various elements of the embodiments disclosed herein may be described as being operably coupled to one another, which includes elements either directly or indirectly coupled to one another. Further, the term "chair" as utilized herein encompasses various seating arrangements of office chairs, vehicle seating, home seating, stadium seating, theater seating, and the like.

Unless indicated otherwise, the term "user" will be used in this specification to refer to a person that uses resources or other affordances within an enterprise space. For instance, a user may be an employee of a company or other entity (i.e., an enterprise) that uses a task chair and a workstation (e.g., resources) in a company facility. The term "enterprise" will be used to refer to a facility operator entity such as employer, a workspace management company, etc., and an enterprise facility will include any facility operated by the enterprise.

Figure 2:
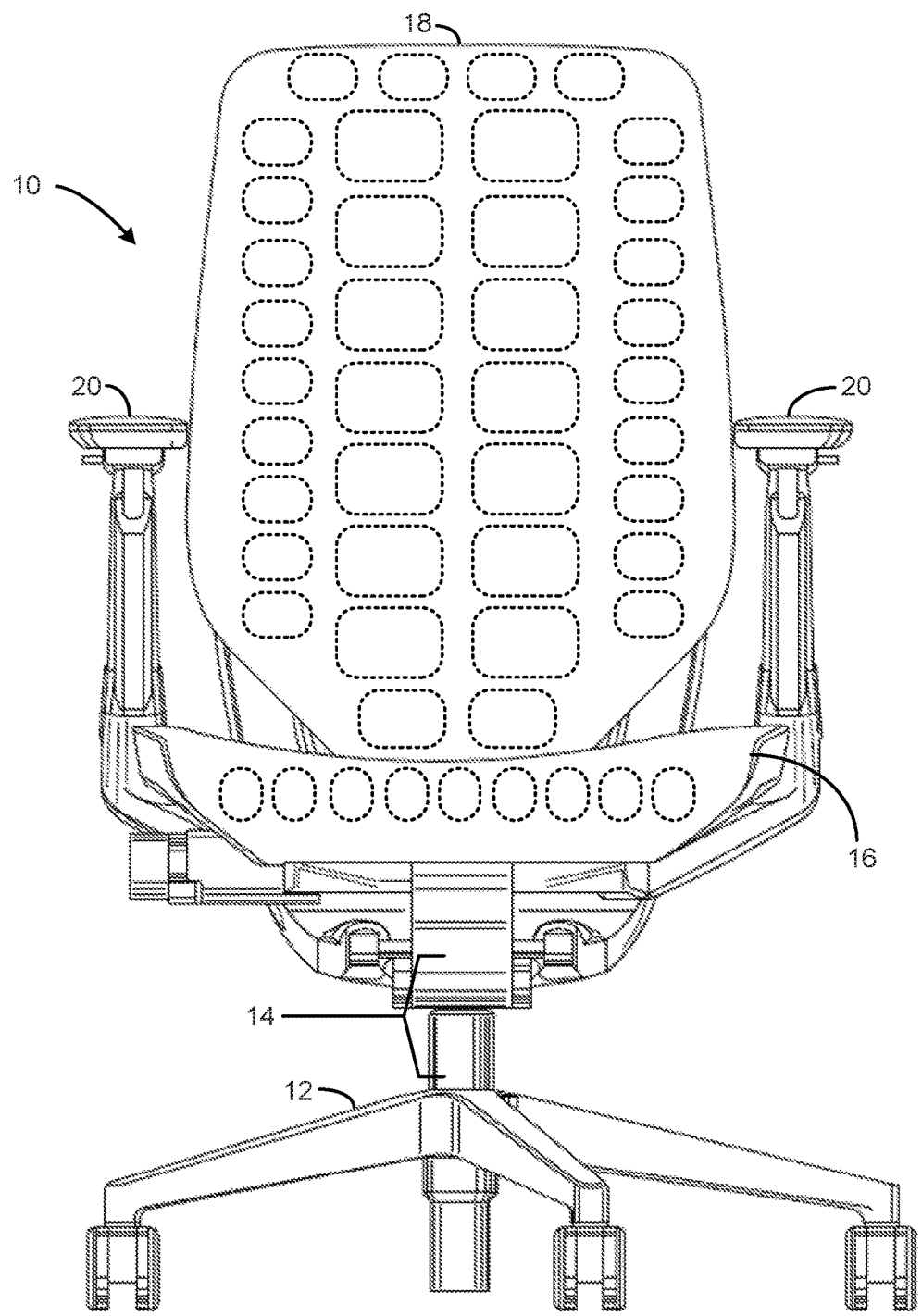
FIG. 2 is a chair assembly, in accordance with an aspect of the present disclosure.
Figure 3:
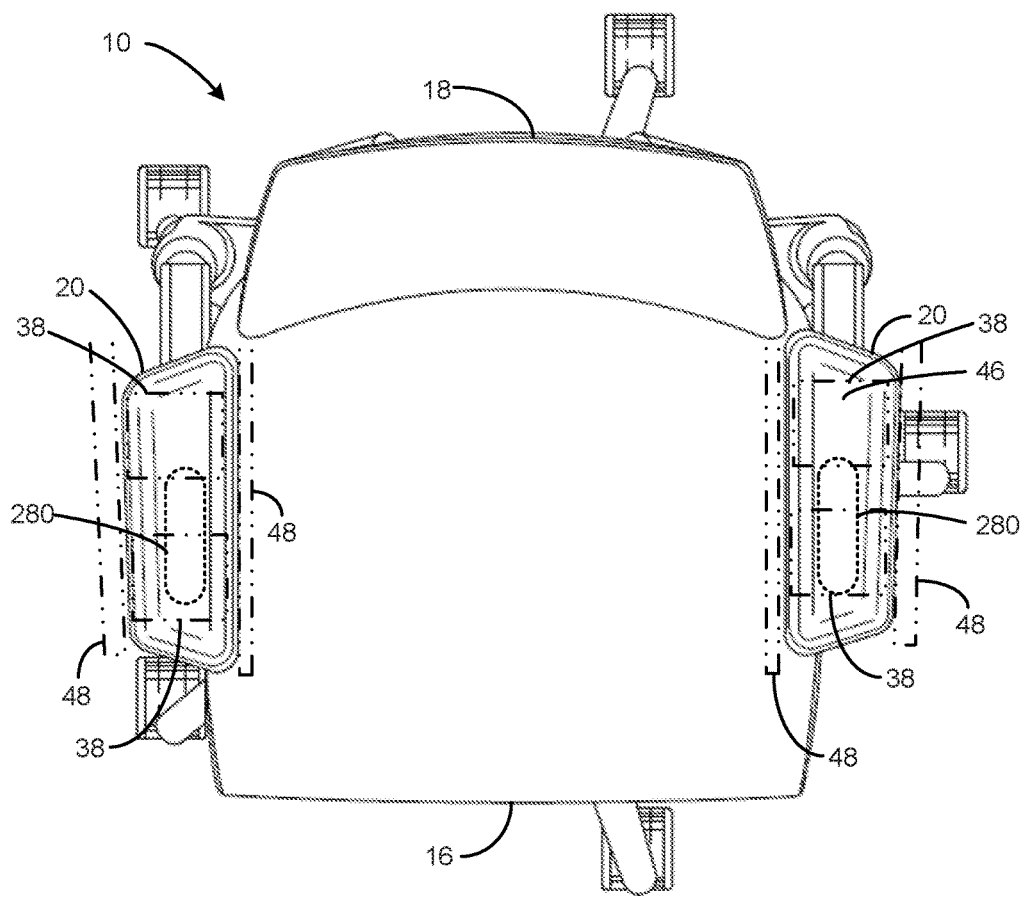
FIG. 3 is a chair assembly, in accordance with an aspect of the present disclosure.
Figure 4:
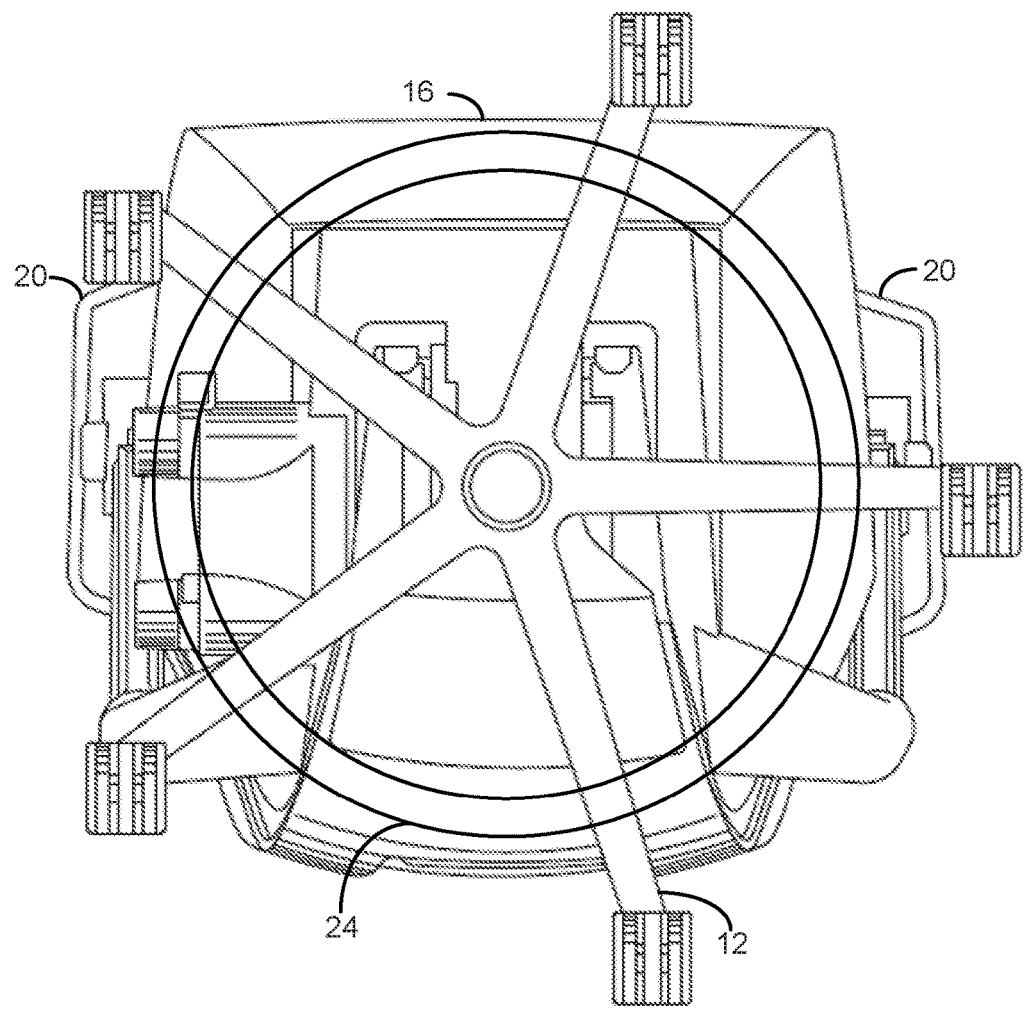
FIG. 4 is a chair assembly, in accordance with an aspect of the present disclosure.
Figure 5:
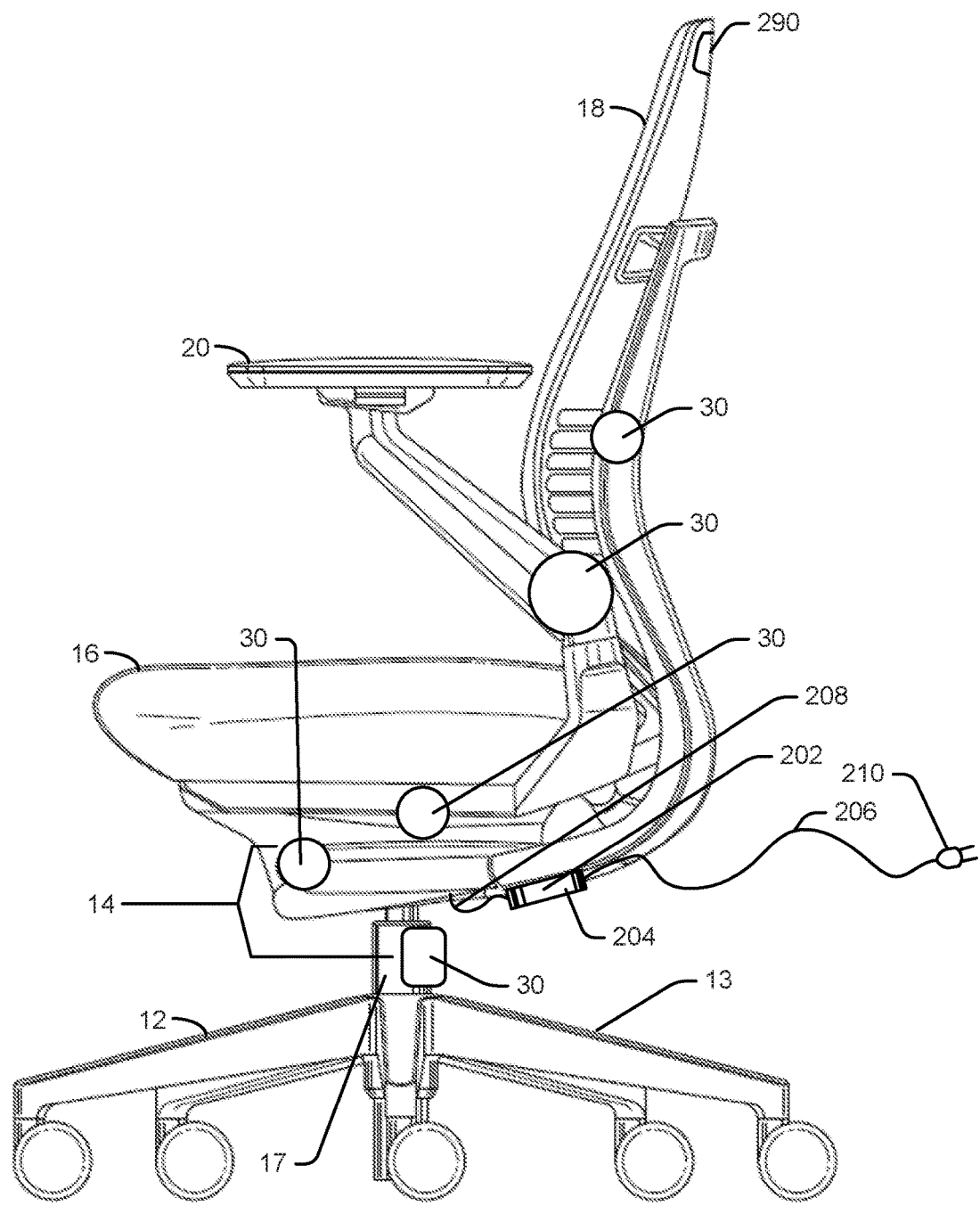
FIG. 5 is a chair assembly, in accordance with an aspect of the present disclosure.
Figure 6:
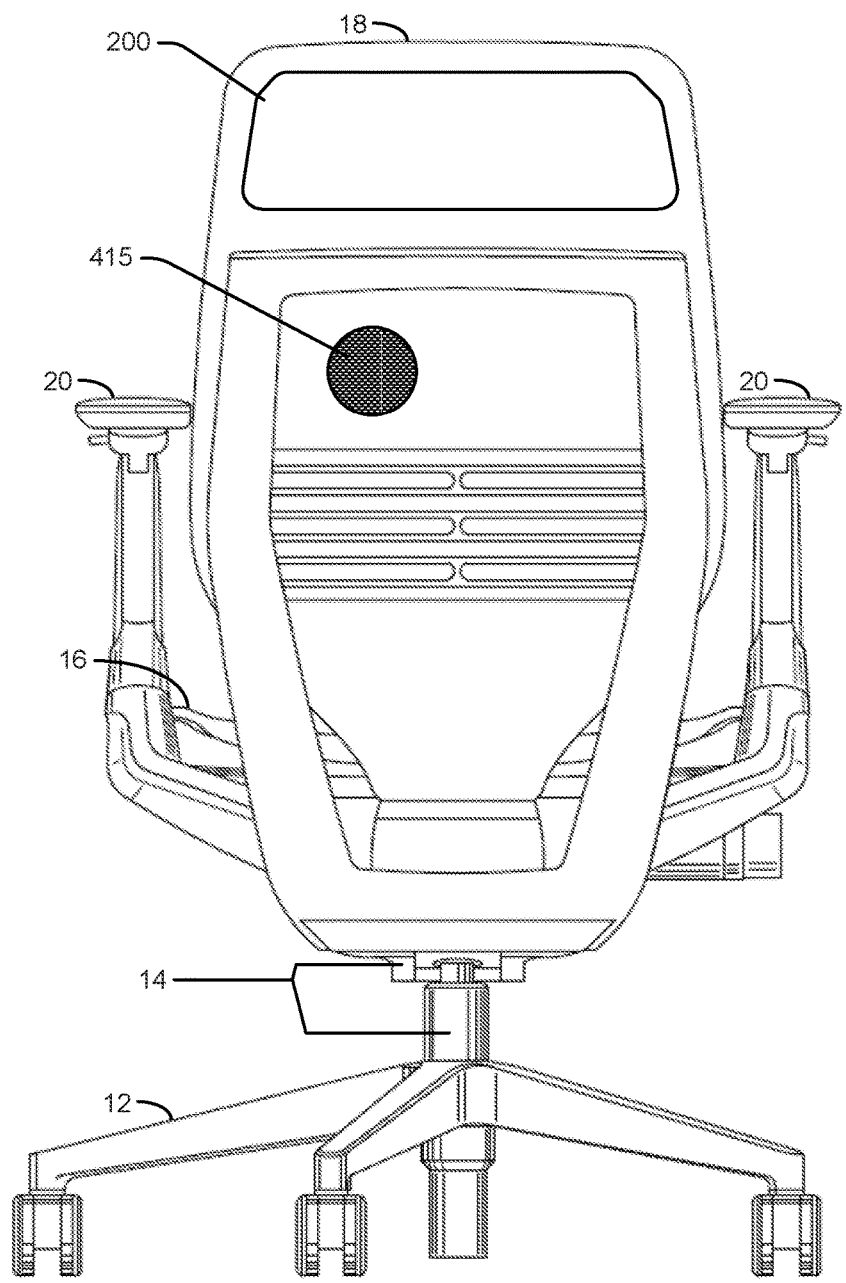
FIG. 6 is a chair assembly, in accordance with an aspect of the present disclosure.

Reference numeral 10 (FIGS. 1-6) generally designates a chair assembly as set forth in the present disclosure. In the illustrated example, the chair assembly 10 includes a base assembly 12, a support assembly 14 affixed to the base assembly 12, a seat assembly 16 affixed to the support assembly, a back assembly 18 affixed to the seat assembly 16 or the support assembly 14, and a pair of arm assemblies 20 each affixed to the seat assembly 16, the back assembly 18, or the support assembly 14. FIG. 1 shows the chair assembly 10 in a perspective view from the front-left of the chair assembly 10. FIG. 2 shows the chair assembly from the front of the chair assembly 10. FIG. 3 shows the chair assembly from the top of the chair assembly 10. FIG. 4 shows the chair assembly from the bottom of the chair assembly. FIG. 5 shows the chair assembly from the left side of the chair assembly 10. FIG. 6 shows the chair assembly from the back of the chair assembly 10.

While this disclosure focuses on aspects relating to a chair assembly 10, it is contemplated that many of the features described herein can be deployed in other types of furniture, such as the following non-limiting examples: a couch, a bed, a table, a cart, a monitor assembly, a projection screen assembly, and the like.

The base assembly 12 can take the form shown in FIGS. 1-6 or any other form known to be suitable for stably supporting the rest of the chair assembly 10 while a user occupies the chair assembly 10. The exemplary base assembly 12 includes an integral base member 13 and five casters 15. The base member 13 is a five spoke base member that may be formed of metal, plastic or any other rigid material. A separate caster 15 is mounted to a distal end of each of the five base spokes. Each caster can swivel about a vertical axis as well as rotate about a horizontal axis.

Examples of other suitable base assemblies 12 include, but are not limited to, at least three radially-oriented arms having rolling members affixed thereto for engaging a surface, a single base member having a footprint that is sufficient for supporting the chair assembly 10 and having a plurality of rolling members affixed thereto for engaging a surface, an assembly with one or more rolling members for engaging a surface and a gyroscopic device for maintaining balance of the chair assembly, and the like.

The support assembly 14 can take the form shown in FIGS. 1-6 or any other form known to be suitable for stably connecting the base assembly 12 with the remainder of the chair assembly 10. The exemplary support assembly 14 includes a post member 17 and an upper support assembly 19. Post 17 extends upward from a central portion of the base member 13 and upper support assembly 19 is mounted to the top end of the post 17 for rotation about a vertical axis. In at least some embodiments post 17 may be mounted to the base member 13 so that the post can be raised and lowered to accommodate different seat height preferences by a chair user.

While not shown in detail, support assembly 19 may have many different features and subassemblies that facilitate various adjustments of chair components to accommodate different user preferences. For instance, assembly 19 may include subassemblies that allow seat 16 to be moved forward and rearward relative to post 17 or may allow the front or rear portion of the seat 19 to be raised and lowered to accommodate different preferred seat tilt angles. As another instance, assembly 19 may include a sub-assembly that enables adjustment of the force required to tilt seat 16. In some embodiments, the base assembly 12 and the support assembly 14 may be integrated into a combined base/support assembly.

The seat assembly 16 can take the form shown in FIGS. 1-6 or any other form known to be suitable for supporting the weight of a user substantially from below the user. The seat assembly 16 can be configured to ergonomically support a user's buttocks, thighs, knees, shins, ankles, or any combinations thereof. The exemplary seat assembly 16 includes, among other features, a top surface 21 having a front edge portion 23, a rear portion 45, and first and second lateral portions 41 and 43, respectively. In at least some embodiments the seat assembly 16 may include a plastic or other type rigid shell member, a foam cushion mounted to or over molded onto the shell member and a fabric, leather or other material cover member. In other embodiments the seat may include a stretched membrane fitted onto a circumferential frame. In still other embodiments the seat assembly 16 may simply include a molded plastic shell that forms a shape that compliments a user's buttocks.

The back assembly 18 can take the form shown in FIGS. 1-6 or any other form known to be suitable for supporting the weight of a user substantially from any side of the user, such as substantially from the back of the user. The back assembly 18 can be configured to ergonomically support a user's torso, head, arm, pelvis, thighs, or any combination thereof. The back assembly 18 is an optional feature and this disclosure envisions chair assemblies 10 that include no back assemblies 18.

The exemplary back assembly 18 includes, among other features, a front surface 35 that includes a central portion 27, first and second lateral portions 29 and 31 on opposite sides of the central portion and upper and lower portions 141 and 37 above and below the central portion. In at least some embodiments the back assembly 18 may include a plastic or other type rigid shell member, a foam cushion mounted to or over molded onto the shell member and a fabric, leather or other material cover member. In other embodiments the backrest assembly may include a stretched membrane fitted onto a circumferential frame. In still other embodiments the backrest assembly 18 may simply include a molded plastic shell that forms a shape that compliments a user's buttocks. In at least some embodiments the backrest assembly may also include other assemblies that allow a chair user to adjust various aspects of the backrest assembly to accommodate user preferences. For instance, in at least some cases one or more of the subassemblies may allow a user to adjust the lumbar support of the backrest assembly to raise/lower a lumbar support, to increase or decrease the lumbar support, to change the tilt of the front surface 35 of the backrest, to adjust the force required to recline the backrest, etc. Subassemblies for accomplishing these adjustments are well known in the art and therefore will not be described here in detail.

The arm assembly 20 can take the form shown in FIGS. 1-6 or any other form known to be suitable for supporting a user's arm substantially from the bottom or side of the user's arm. The arm assembly 20 can be configured to ergonomically support a user's upper arm, elbow, forearm, wrist, hand, or any combination thereof. The arm assembly 20 is an optional feature and this disclosure envisions chair assemblies 10 that include no arm assemblies 20.

The exemplary arm assembly 20 shown in FIG. 1 includes an arm support structure 51 and a forearm rest member 53 having a top surface 55 that can also be referred to as a comfort surface. Support structure 51 extends upward from upper support assembly 19 and generally angles upward and forward to an upper distal end. Forearm rest member 53 is mounted to the top distal end of support structure 51. Structure 51 includes components that can be adjusted to move the forearm support member 53 to any of several different positions. For instance, support member 53 may be moved upward or downward, forward or backward, inward (e.g., over the seat 16) or outward, may pivot about a vertical axis, etc., within supported ranges. Chair assembly 10 is manually moveable across a smooth, flat floor surface by applying a lateral force.

Figure 7:
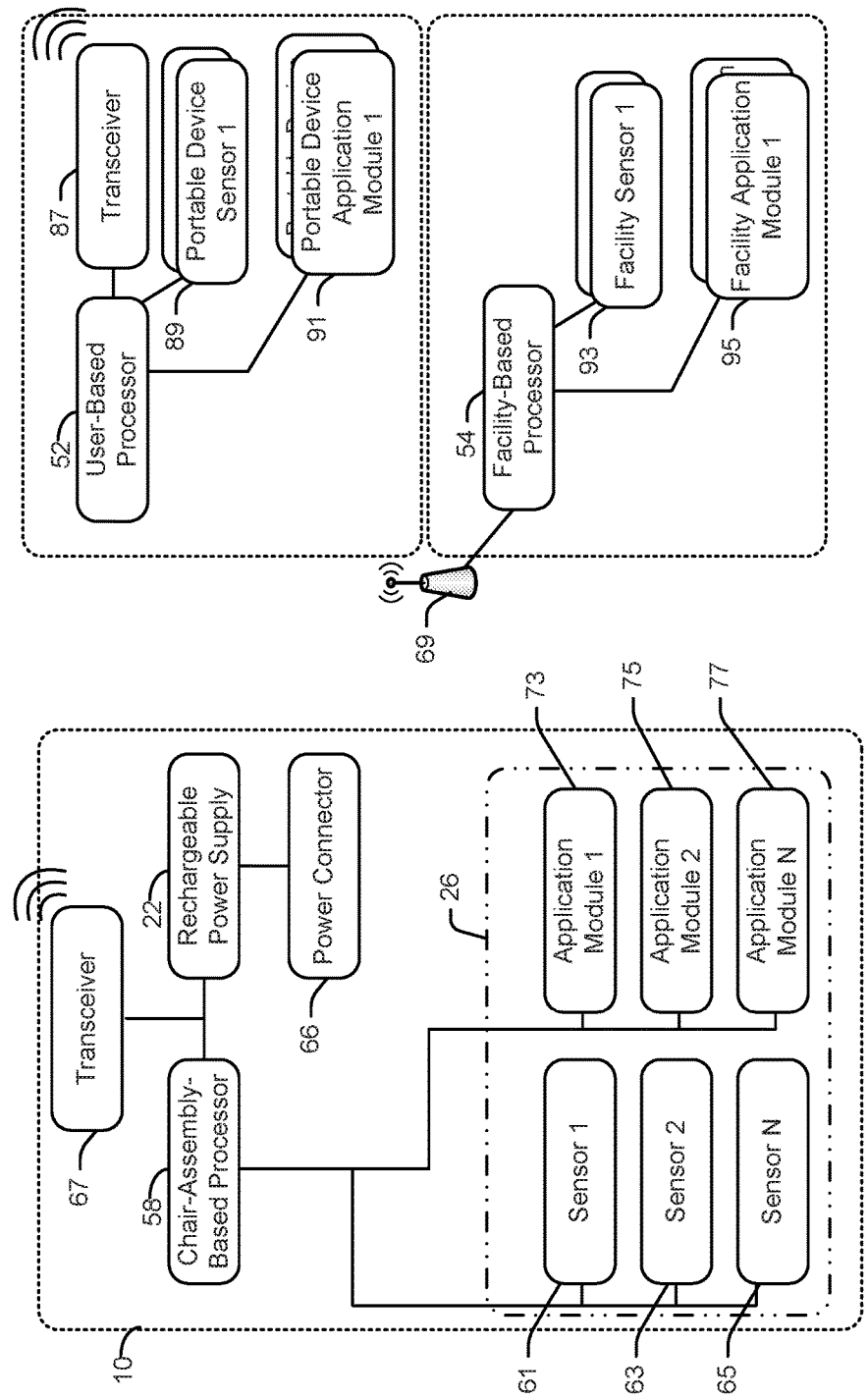
FIG. 7 is a schematic of an electronic configuration of a chair assembly, user-based processor, and facility-based processor, in accordance with an aspect of the present disclosure.

Referring now to FIG. 7, in addition to the components described above, at least some embodiments of chair assembly 10 also include a processor 58, a power supply 22, and one or more of a sensing module or sensor 61, 63, 65 and/or one or more application modules or actuators 73, 75 and 77. Hereinafter, the phrase "feature module" will be used to refer to either of a sensor or an application module.

Processor 58 includes circuitry for performing various functions required to support whatever features chair 10 includes. For instance, processor 58 may include a memory device that stores software that can be used to perform various functions such as obtaining sensed data from a sensor, processing the obtained data and generating some type of output. For instance, the output may include transmission of the data or some conclusion derived there from to server or the like via an access point within the vicinity of chair 10. As another instance, processor 58 may be programmed to control one or more motors (e.g., an application module) to change the relative juxtapositions of chair 10 components either under control from a chair user or automatically based on some sensed circumstance. It is contemplated that processor 58 may be programmed to perform many other processes, some of which are described hereinafter.

In addition to including circuitry and a memory for storing programs, processor 58 may include a memory for storing at least some sensed data from one or more sensors included in the chair 10.

Power supply 22 may be any type of power supply in at least some embodiments. For instance, supply 22 may include a transformer linked to a cord that can be plugged into a powered receptacle to power processor 58, sensors and other modules. As another instance, supply 22 may include a battery that can be periodically replaced. As yet another instance, supply 22 may include a rechargeable battery pack that can be removed and replaced, where the removed battery pack can be recharged as the replacement battery pack is being used. In still other embodiments, supply 22 may include a rechargeable battery that can be recharged periodically. Where supply 22 is rechargeable or needs to be connected to a receptacle, a power connector 60 is provided that is linked to supply 22.

Referring again to FIG. 1, rechargeable power supply 22 is shown mounted at various positions on chair assembly 10. For example, the rechargeable power supply 22 can be located in or affixed to the base assembly 12, the support assembly 14, the seat assembly 16, the back assembly 18, the arm assembly 20, or any combination thereof. It should be appreciated that the rechargeable power supply 22 can occupy any location within the chair assembly 10, so long as the rechargeable power supply 22 can be sufficiently supported by the chair assembly 10 and can be operably coupled to aspects of the chair assembly 10 that relate to charging and usage of power. Supply 22 can include two or more power supply units, which can be located adjacent to one another or remote from one another. Supply 22 can be configured to transmit a power level signal to the processor, which indicates the power level of the rechargeable power supply.

Sensors 61, 63, 65, etc., may take any of several different forms and at least some exemplary sensor types are described hereinafter. In general, a sensor may be for sensing any of several different types of parameters including user input parameters (e.g., parameters input by a chair user to adjust the chair or to indicate a user's condition), biometric or physiological parameters (e.g., temperature, heart rate, blood flow, respiratory rate, etc.), behavioral parameters (e.g., a chair user's position, rate of movement, etc.), chair arrangement parameters (e.g., tilt of backrest, height of seat, position of forearm support member, etc.) or chair juxtaposition parameters (e.g., location of chair 10 within an ambient space or relative to some affordance (e.g., a charging station) within the ambient space).

Application modules 73, 75, 77 include subassemblies or systems that perform some activity such as chair component adjustment, heating or cooling adjustment, control of haptic activities, providing feedback to a chair user, automatic movement of the chair to different locations within an ambient space (e.g., for alignment with a recharging station), automatic adjustment of chair orientation, controlling hardware required for recharging in some cases, etc.

Processor 58 can be located in or affixed to base assembly 12, support assembly 14, seat assembly 16, backrest assembly 18, or an arm assembly 20. The chair-assembly-based processor can occupy substantially the same locations as the feature modules (e.g., sensors and application modules) described below in at least some embodiments.

In at least some embodiments at least some of the processes and methods described herein may be performed by one or more processors that reside external to chair 10 or by the chair processor in conjunction with one of the external processors. For example, see user-based processor 52 and facility-based processor 54 in FIG. 7. User-based processor 52 includes a processor that is located on, within, or near (e.g., carried by) a user. For example, a person using chair 10 may also use a portable computing device like a smartphone, a pad type computing device, a laptop computer, a wrist or otherwise wearable computing device such as smart jewelry, smart clothing, smart footwear, smart handwear, smart eyewear, ear technology with an on-board processor, such as a hearing aid or smart contact lenses; or in an implantable device, such as an implantable computing device. Here, processor 52 may receive signals from the chair based processor 58 via a wireless transceiver 67 (e.g., transmitted-receiver) in chair 10 and a mobile device transceiver 87. Thus, in some cases, processor 58 may obtain sensed data from sensors 61, 63, etc., and provide the raw data to processor 52 which would process the information and determine what to do with the results. In some cases the results may cause processor 52 to transmit control signals back to chair 58 to perform some function.

Referring still to FIG. 7, facility based processor 54 includes one or more processors that are associated with the facility in which chair resides and may include, for instance, a processor that forms part of a facility server, a desktop or other stationary computer within the room in which chair 10 is located, etc. In some cases processor 54 may be remotely located in a different facility (e.g., an enterprise server in a headquarters building in a remote city). Processor 54 may be linked to one or more access points 69 in a facility for wirelessly communicating with transceiver 67.

In some cases there may be sensors and application modules that are located outside chair 10 and that are linked or at least linkable to one of the user-based processor 52 or the facility-based processor 54. To this end, see again FIG. 7 that shows portable device sensors 89 and application modules 91 linked to processor 52 and sensors 93 and application modules 95 linked to the facility-based processor 54. Here, for instance, a biometric sensor located in a wrist mounted computer may sense one or more physiological parameters of a wearer and may transmit that data to chair processor 58 to be processed. In the alternative, the wrist based processor 52 may process the physiological parameter and transmit a control signal based thereon to the chair processor 58 to perform some function. As another instance, where a smartphone includes processor 52, data sensed by chair processor 67 may be used to drive a vibrator or the like (e.g., an application module 91) in the phone to provide some signal to a chair user (e.g., to signal that the user should change position if the user has been too stagnant in one application).

Similarly, facility-base processor 54 may receive signals from sensors 93 or from processor 58 and perform various functions to control application modules 95 or to send command signals back to processor 58 to perform some function to control one or more application modules 73, 75, 77, etc. For instance, one of sensors 93 may include a camera (see 100 or 102 in FIG. 8 or 516 in FIG. 31) that senses when no one is in a space associated with chair 10. When no one is in the space associated with chair 10, processor 54 may perform some function to start a battery recharging process. As another instance, when any of the system processors recognizes, based on sensed data, that a person sitting in chair 10 is becoming drowsy, facility-based processor 54 may control lighting in the space that includes chair 10 to increase intensity to help the person wake up. Many other processes associated with application modules are contemplated, many of which are described hereafter.

The chair-assembly-based processor 58, the user-based processor 52, and the facility-based processor 54 can communicate signals to one another to achieve any of the various sensing, application, operations, or functions described herein.

In at least some embodiments chair assembly 10 may contain one or more features that are inactive until activated by an application run on a device containing a user-based processor. For example, chair assembly 10 may contain a heating function or other function that is inactive until a user activates the heating function or other function from an application run on the portable device that includes processor 52.

Chair Assembly Power

In at least some embodiments the amount of power required to operate chair components may be relatively small. For instance, where a chair 10 only includes one or a small number of sensing devices and a transceiver to transmit sensed data to an off-chair processor and no actuators (e.g., application modules), the power required by the chair features may be relatively small. In other cases the amount of power required to support chair features may be relatively large. For instance, where a chair 10 includes a large number of sensors and/or one or more actuators such as motors, vibrators, heaters, cooling mechanisms, etc. the required power may be substantial. The type of power source 22 selected for a chair will be related to the amount of power required by the chair. For instance, where minimal power is required, a relatively small solar cell may be provided on a chair surface that can collect energy from an ambient light source to drive components. To this end, see exemplary solar cell 200 shown on a rear surface of the backrest assembly 18 in FIG. 6. Cell 200 may provide power directly to feature modules or may be linked to a rechargeable battery type power source 22 to store power which is then fed to processor 58, features modules and other devices (e.g., the transceiver 67) when required.

Where a more substantial amount of power is required, several power options are available, some of which are more advantageous than others. For instance, see exemplary power cord assembly 202 in FIG. 5. Assembly 202 includes a spring loaded retractor mechanism 204 and a cord 206. Cord 206 has a proximal end 208 linked to chair support assembly 14 and a distal end 210 where an intermediate portion between ends 208 and 210 passes through retractor mechanism 204 to be wound thereby. Here, distal end 210 can be pulled from mechanism 204 and plugged into a powered receptacle (not illustrated), for example in a wall or in another device. In this case, power source 22 may include a power transformer and cord 206 may have to be plugged into a receptacle at any time that power is required by chair components. When power is not required, mechanism 204 may be used to aid in winding cord 206 into a housing structure for storage.

In other embodiments power source 22 may include a battery or some other type of replaceable fuel cell. Here, one advantage is that chair 10 can be used without requiring a cord 206 which often times can get in the way of a chair user. For instance, in many cases a chair user will rotate seat 16 several times during a day during normal use which can cause cord 206 to wrap around the chair base. One problem with batteries or other power sources that need to be periodically replaced is that they place a maintenance burden on a chair user or some other personnel.

In particularly advantageous embodiments it is contemplated that rechargeable batteries or fuel cells may be provided as power source 22. Examples of rechargeable batteries include, but are not limited to, a lithium-ion battery, a lithium-ion polymer battery, a nickel-cadmium battery, a nickel-metal hydride battery, a sealed lead acid battery, an alkaline battery, a nickel-hydrogen battery, a nickel-zinc battery, a lithium-air battery, a lithium cobalt oxide battery, a lithium sulfur battery, a lithium-titanate battery, a sodium-ion battery, a potassium-ion battery, a zinc bromide battery, a zinc cerium battery, a vanadium redox battery, a quantum battery, combinations thereof, and the like. The rechargeable battery can be in the form of a thin film battery, a smart battery, a nanowire battery, etc.

The present disclosure contemplates several different ways to recharge a battery, some requiring at least some manual steps by a chair user and others that are fully automated. For instance, referring again to FIG. 5, in a simple recharging case, the proximal end 208 of power cord 206 may be linked to a rechargeable battery 22. Here, when a chair user knows that she will be leaving her office for an extended period of time, she can simply pull distal cord end 210 from the retractor mechanism housing and plug the cord into a power receptacle. When the user returns, the user can unplug the cord and restore the cord in the storage housing to avoid entangling cord 206 with the chair base.

In other cases recharging power may be delivered to rechargeable battery 22 in ways that do not require a cord yet still require some simple user activity. For example, referring again to FIG. 7, in at least some cases it is contemplated that power connectors 66 may be built into the chair 10 for making a direct connection to recharging electrodes provided in some type of recharging subassembly that is separate from the chair 10. In this regard, see FIG. 8 that shows a chair assembly 10 in a private office 30 on a chair mat 28 adjacent a workstation table or desk 32. Here, a recharging station assembly 210 is provided that abuts an office wall adjacent an edge of mat 28. Referring also to FIG. 10, station assembly 210 has a low profile so that it lies low along a portion of the wall adjacent a floor surface and has a length dimension that is longer than a dimension defined by the distal ends of two of the chair base assembly spoke members 212 and 214. Referring also to FIG. 9, station assembly 210 includes a plate member 218 and a housing structure 220 that extend upward therefrom to form a sideways opening channel or cavity 222 that opens away from an adjacent office wall member and toward the mat 28 edge. Here, the channel 222 is designed to have an upper arm section which resides generally above a distal end of the spoke members 212 and 214 when those distal ends are places within the channel 222. Positive and negative electrodes 224 and 226 (shown in phantom in FIG. 10) are located on an undersurface of the upper arm section at spaced apart locations (e.g., at opposite ends of the length dimension of station 210). Lateral walls 228 and 230 (shown in phantom in FIG. 10) are provided at opposite ends of station 210 which limit the position in which the distal ends of spokes 212 and 214 can be placed and still be located within the channel 222.

Referring still to FIGS. 9 and 10, electrode pads 232 and 234 (see phantom in FIG. 10) are provided on the top surface portions of spokes 212 and 214 at their distal ends. As shown in FIG. 9, top surfaces of spokes 212 and 214 angle slightly downward when approaching the distal ends so that the pads 232 and 234 have a slight downward tilt.

Figure 8:
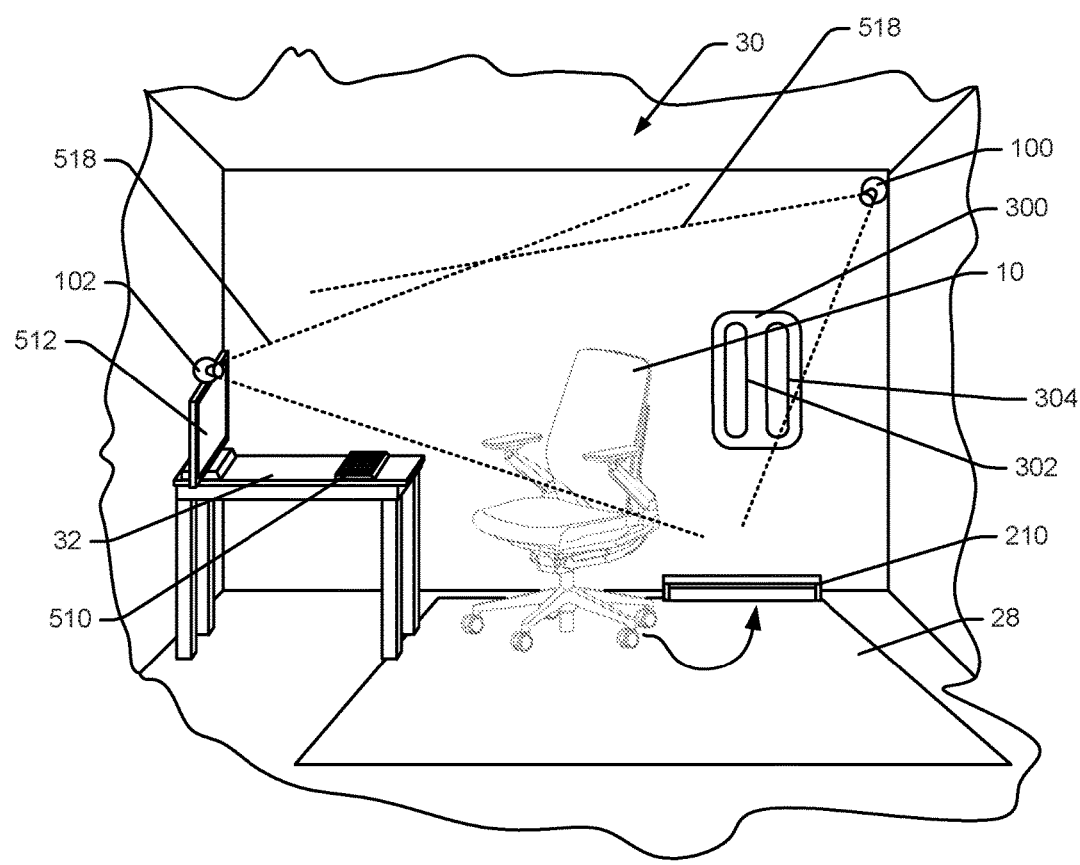
FIG. 8 is workspace including a chair assembly, in accordance with an aspect of the present disclosure.
Figure 9:
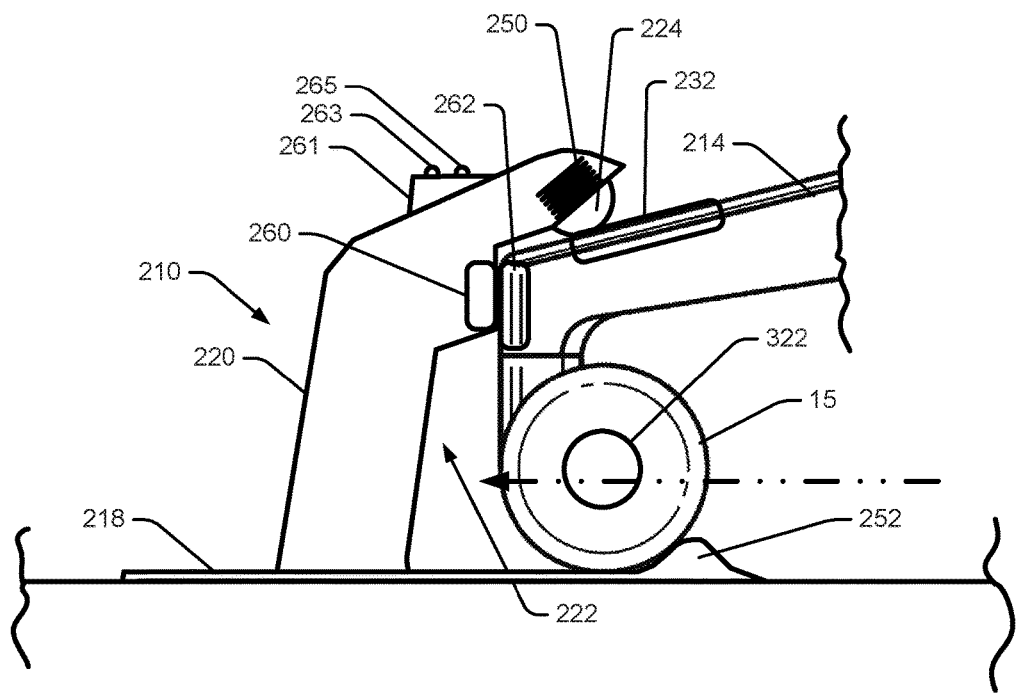
FIG. 9 is a chair assembly shown in a recharging configuration, in accordance with an aspect of the present disclosure.
Figure 10:
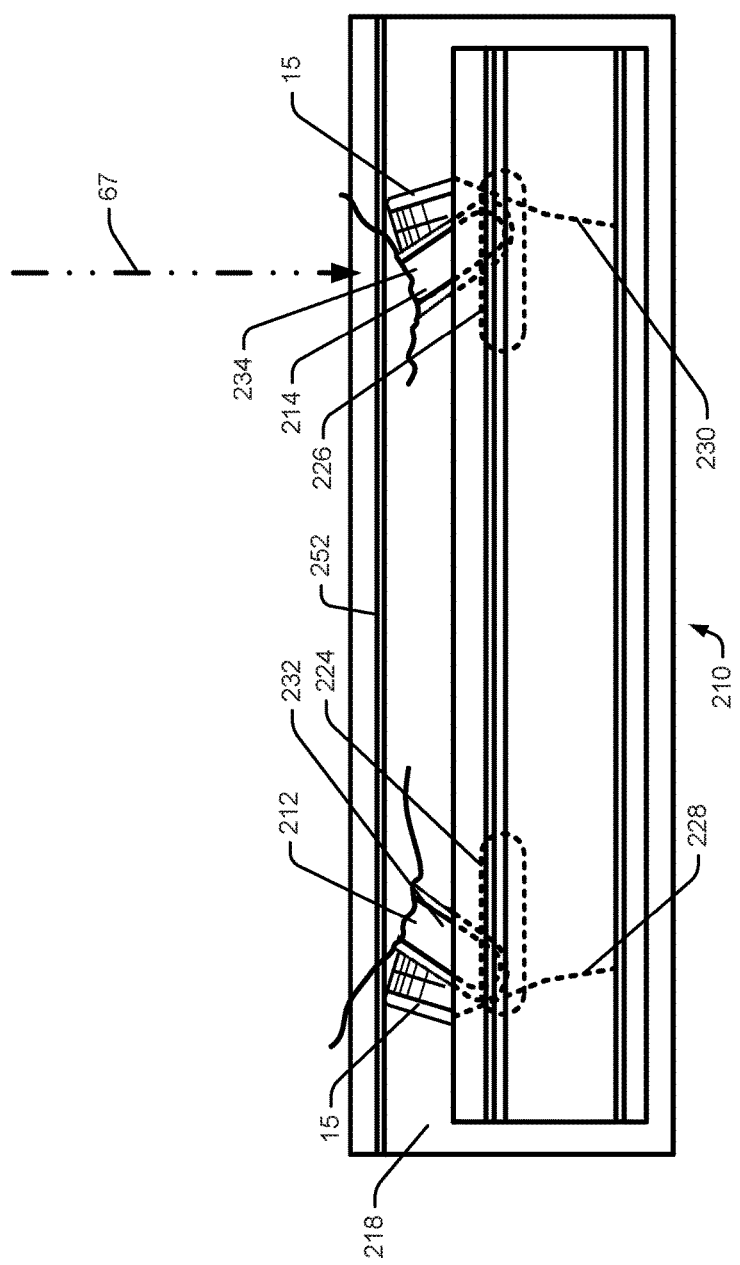
FIG. 10 is a chair assembly shown in a recharging configuration, in accordance with an aspect of the present disclosure.

Referring still to FIGS. 8 through 10, to place chair 10 in a charging position, a user aligns the distal ends of spokes 212 and 214 with channel 222 and moves the chair 10 toward station 210 until electrode pads 232 and 234 contact electrodes 24 and 226. Once the electrode pads contact the electrodes, charging can commence.

Referring again to FIG. 10, wall members 228 and 230 can restrict the position in which the distal spoke ends are located and electrodes 224 and 226 may be designed so that when the spoke ends are received in channel 222, the pads 232 and 234 will always make connection with electrodes 224 and 226. In at least some cases internal surfaces of the wall members 228 and 230 may angle toward each other when moving into channel 222 to help a user guide the spokes into the channel 222. Thus, a user need not hunt for where to place the spoke ends to link to the electrodes in the channel 222.

While only two spokes are shown in FIG. 10 as including electrode pads 232 and 234, in at least some embodiments it is contemplates that an electrode pad may be provided on the top surface of each of the five base spokes proximate distal ends. Here, a user could simply place any two spokes within channel 222 to start charging. In this case, chair processor 58 would be programmed to recognize which two spokes are in the channel 222 and would use those two spokes for charging purposes. Here, a mechanism in either chair 10 or in the charging station 210 would be programmed to make a polarity switch so that positive and negative pads and electrodes are properly aligned. For instance, in FIG. 10, electrode pad 232 may be positive or negative and pad 234 may be positive or negative, based on which charging electrode 224 or 26 the pad is aligned with.

In at least some embodiments it is contemplated that charging will start automatically once the electrode pads make contact with the electrodes 224 and 226 and that charging will continue until battery 22 is fully charged or a user pulls the chair back from station 210 for use. In some cases there will be a mechanism for cutting off power to electrodes 224 and 226 when chair 10 is not in the charging position. For instance, a system processor may monitor for chair position via electrodes 224 and 226 or via some other sensors and may cut power when the chair is not in the proper charging position. Similarly, it is contemplated that a mechanism within the chair will effectively disconnect pads 232 and 234 from the power source 22 until chair 10 is properly placed in a charging position at station 210. For instance, a switch may be provided within the chair assembly 10 that is controlled by chair processor 58 to open until the recharging position occurs. Here, once a system processor recognizes that pads 232 and 234 make contact with electrodes 224 and 226, the system server may send a signal to processor 58 to close the switch and commence the charging process.

In at least some embodiments a charging indicator of some type may be provided. For instance, see again FIG. 9 where an indicator 261 includes a red LED 263 and a green LED 265 mounted to an upper portion of structure 220. Here, when charging is not occurring, red LED 263 may be illuminated and when charging is taking place, green LED 265 may be illuminated.

One advantage to the recharging station 210 described above is that the form of the chair assembly 10 can be substantially similar to conventional chair assemblies and need not include moveable components specially designed to facilitate the charging process. Thus, pads 232 and 234 can be robust and rigid with respect to their supporting structures. The tilted angles of the spokes 212 and 214 facilitate connection to electrodes via a sort of wedging action.

In at least some embodiments it is contemplated that a charging station may include additional features to help ensure a good electrical contact between electrodes and pads. For example, see again FIG. 9 where a spring 250 is shown schematically linked to electrode 224 which may apply a slight downward force to electrode 224 to help maintain contact with pad 232. As another example, in FIGS. 9 and 10, a rib 252 extends up from a top surface of plate member 218 adjacent a front edge of the plate 218 which is positioned to bear against an edge of the casters 15 when distal ends of spokes 212 and 214 are places within channel 222 to hold pads 232 and 234 against electrodes 224 and 226 until the chair is affirmatively removed from the charging station 210.

Referring yet again to FIG. 9, in some embodiments a magnet 238 may be provided in channel 222 to face some surface of the spokes 212 and 214 at their distal ends and each spoke may have a metallic plate 230 at its distal end that is adjacent the magnet 238 upon insertion of the spokes 212 and 214 into channel 222 so that the magnet 238 can releasably hold the spokes in the charging position.

Other types of direct electrode charging stations are contemplated. For instance, see FIGS. 11 and 12 where a table top member 270 is shown along with a portion of a chair assembly 10. Here, spring loaded electrode pads 272 and 274 are located on an undersurface 275 of the top member 270 at spaced apart locations generally proximate a front edge of member 270. Referring also to FIG. 3, electrode pads 280 are provided on top surfaces of arm rest members 53. In this case, to charge a chair battery, a user would first adjust chair arm members to a highest position via the arm assemblies and perhaps by raising the chair support structure 14 (see again FIG. 1) and would then push the chair into a location with the arm members below electrodes 272 and 274. Again, some table structure (e.g., legs or other guide members) may be provided to help the user align the arm members and associated electrode pads with the spring loaded electrodes.

In at least some cases the spring loaded electrodes would be spaced rearward from the front edge of member 270 so that when the support members 53 are aligned under the spring loaded electrodes, the front surface of the backrest member 18 is immediately adjacent the front edge of the table top member 270 so that no user could be located within chair 10. Thus, once members 53 are aligned with electrode pads 272 and 274, charging could commence.

The spring loaded pads 272 and 274 would be located at a height below the top surfaces of members 53 and, in an least some embodiments, would be angled to face the direction in which members 53 move when chair 10 is moved toward the front edge of member 270 so that the contact surfaces would contact members 53 and raise against the spring force to accommodate members 53 there under. The pads 272 and 274 may have a convex external shape so that they can make better point contact with pads 280 in the arm members 53.

In still other embodiments charging electrodes or pads may be provided on one or more surfaces of other affordances within a space that includes a chair 10 where some portion of the chair may be moved into contact with the electrodes or pads to form a connection suitable for charging purposes. For example, electrodes may be provided on an upper rear edge portion of the backrest member 18 as at 290 in FIG. 5 for connection to a wall mounted charging station 300 (see again FIG. 8). In this case, the wall mounted charging station 300 may include vertically elongated and spaced apart first and second electrodes 302 and 304 so that the chair electrode pads at 290 are aligned with the pads 302 and 304 regardless of the height of the chair backrest 18 when the chair is moved into a charging position. Here again, some mechanism to hold the chair in the charging position may be provided such as a releasable magnetic locking subassembly (see again 260 in FIG. 9) a rib in a mat to capture an edge of the casters 15, a spring loaded mechanism to capture a rear frame section of the backrest assembly 18, etc.

Desirable features in the embodiments described above with respect to FIGS. 8 through 13 are a charging station that includes electrodes that are positioned and dimensioned to make contact with chair based electrodes or pads upon movement of the chair 10 in to a charging position, some type of guidance mechanism to help a user move the chair into a charging position where chair electrodes and charging electrodes are aligned and make contact and some type of retaining mechanism that retains the chair in the charging position until purposefully removed by the chair user. In each case described above, a charging indicator akin to the indicator 261 described above with respect to FIG. 9 may be provided at a location that is within the field of view 518 of a chair user.

In still other embodiments, it is contemplated that when a chair 10 is moved to a charging position with electrode pads adjacent charging electrodes, there may some mechanism for automatically moving the charging electrodes toward the chair mounted pads. To this end, see FIG. 13 where a motor is provided at 310 instead of the spring loading mechanism shown in FIG. 12. Here, the motor 310 may be controlled to move charging pads 272 and 274 up and down to engage the arm rest electrode pads 280 in the chair assembly 10. In this case, the chair user may not be required to move members 53 into a highest position to engage the charging electrodes 272 and 274. Instead, when the chair 10 is placed under the table top member 270, a sensor 312 (e.g., a proximity sensor, a camera within the office occupied by the chair, etc.) may sense the location of the chair and cause a system processor to control the motor 310 to move the pads 272 and 274 down into engagement with the electrode pads 280.

In at least some embodiments it is contemplated that at least one of a charging station and a chair assembly 10 may be equipped with a motive mechanism for moving the assembly to join the charging station and the chair assembly 10. For instance, referring again to FIG. 1, in at least some embodiments, first and second motors 320 and 322 may be provided as part of adjacent casters 15 for moving a chair assembly 10 about within an office space. In FIG. 1 the motors are shown extending from the casters for illustration purposes only and in an actual configuration the motors may be wholly located within a caster structure. Here, the motors would be for moving the chair when there is no one in the chair and therefore the motors would not have to be extremely powerful.

By controlling the motors 320 and 322, the chair processor 58 (see again FIG. 7) could move the chair assembly 10 and reorient the base 12 to any orientation within a room and therefore to align the base spokes (see 212 and 214 in FIG. 10) with a charging station 210. Thus, for instance, by maintaining one of the motorized casters in a stationary position and rotating the other motorized caster, the base could be turned in a controlled fashion. By powering each of the motorized casters in the same direction the chair could be moved along a relatively straight trajectory within a space. In at least some embodiments where a chair includes motorized casters on two base spokes, Electrode pads (e.g., 232 in FIG. 9) may only be provided on two of the spokes as opposed to all five and the chair processor 58 would be programmed to move the chair around until the two pads 232 and 234 make contact with charging station electrodes.

In other embodiments it may be advantageous to provide the first and second motorized casters on base spokes that are separated by a spoke that includes a non-motorized caster. In still other cases a single motorized caster may be able to operate to move a chair 10 into a charging position. Referring still to FIG. 1, in yet other embodiments a single post 350 may extend down from a central portion of the base member 12 and a dual action caster 352 may be provided on the lower end of the post 350 with a single motor 354 linked to the dual action caster 352. Here, the phrase "dual action" means that the caster includes first and second wheel section spaced apart along a horizontal axis that can rotate in either the same direction or in opposite directions to move the chair 10 along a trajectory or to rotate the base about an axis through the center of the vertical post 350. Thus, caster 352 may be controlled to rotate the chair base and also move the chair 10 and therefore could be used to move the chair to any clear location within an office space (e.g., to a charging location).

After charging is complete, the chair processor 58 may be programmed to control the motors 320 and 322 to move the chair into a welcoming position within an office. Thus, for instance, referring again to FIG. 8, a chair 10 may be moved away from a charging station and back to a location that faces an egress into the space 30 to welcome a user to sit down in the chair upon entry into space 30.

Figure 14:
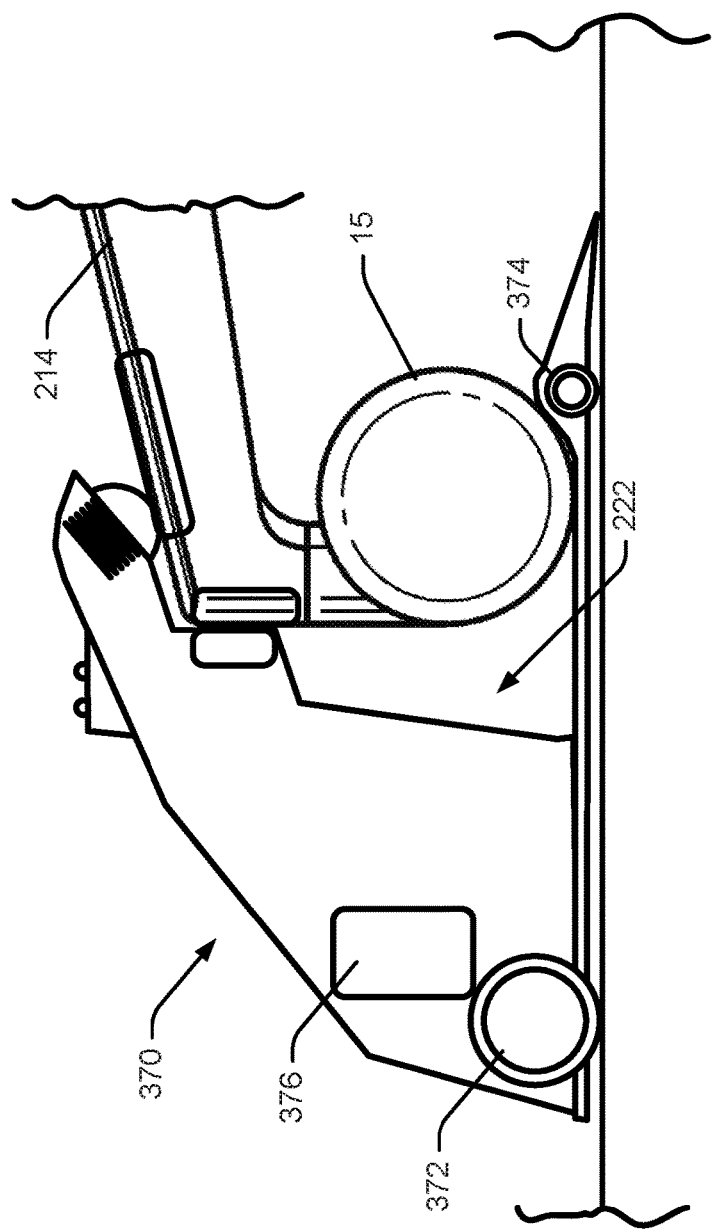
FIG. 14 is a chair assembly interfaced with a movable recharging station, in accordance with an aspect of the present disclosure.

In yet another embodiment, a robot type charging assembly may move to a charging location relative to a chair assembly 10. To this end, see FIG. 14 that shows a robot type or mobile charging assembly 370 akin to the station described above with respect to FIG. 9. The difference in FIG. 14 is that assembly 370 includes powered wheels 372 and casters 374 that can be used to move station 370 about within an office space to assume a charging position with respect to a chair assembly base 12 that includes spoke electrode pads 232 and 234. Although only one powered wheel is shown in FIG. 14, an assembly 370 could have two spaced apart and independently controlled powered wheels 370 so that the assembly could rotate about one stationary wheel by powering the other.

In some cases the robot recharging assembly 370 may be tethered (e.g. connected by a cord) to a wall or other power receptacle. In other cases the recharging assembly 370 may be wireless and be able to move about more freely. In this case, it is contemplated that a stationary robot charging station would be provided for the robot and the robot itself would include a rechargeable battery or other type of power source. Here, the charging station for the robot may include an electrode configuration similar to the electrode configuration on the chair base spokes so that the electrode set on the robot could perform double duty (e.g, to charge the robot power source from the robot charging station and then to charge the chair power source). In this regard, see FIG. 15 that shows a robot recharging station 380 that includes electrode pads 382 and a form that can link the pads 382 to the electrodes on the recharging robot 370. Once the robot battery is charged, the robot can leave charging station 380 and move to the chair base spokes as shown in phantom In some cases a robot power assembly may be located in each office and associated with a specific chair 10 so that the control process can be relatively simple. In other cases it is contemplated that there may be one or a small number of robot recharging stations located on a floor of an office building where travel and recharging robots may roam around the floor recharging any chair battery that is not fully charged or at least at a threshold charge level. In some cases, where a battery provides charge level data to a chair processor 58, the chair processor 58 may transmit a charge request to a facility server 54 and cause that server to control one of the roaming robots to start a recharging process. Thus, for instance, a subset of recharging robots may be located at recharging stations while other robots are out recharging chairs.

In cases where a robot or a chair including motorized casters or other motive means are provided, the chair processor or a robot processor would track the amount of charge on its rechargeable battery and would conserve enough energy to move the associated assembly to a recharging station prior to complete discharge in at least some embodiments. Thus, for instance, in the case of a chair that consumes power, processor 58 would shut down functions and features that use power when a threshold charge on the chair battery is reached. The next time conditions exist for recharging (e.g., a user leaves an office), the chair processor 58 would move the chair to the recharging position and commence charging.

In some embodiments it is contemplated that a chair mat may operate as a chair charging station. In this regard, see FIG. 16 that shows a charging mat 28 in top plan view. Mat 28 is divided into twelve different charging zones 38 where adjacent charging zones have different polarities. For instance, in FIG. 16, cross hatched zones may have a positive polarity and non-cross hatched zones may have a negative polarity when powered. Here, whenever an electrode or electrical probe on a chair assembly 10 contacts one of the zones 38, an electrical connection between a charging source and the chair probe may be formed. In this regard, see also FIG. 17 where a chair base 12 is shown resting on a charging mat. In the illustrated example, in addition to the components described above, base assembly 12 includes five charging probes 390. Here, each charging probe is similarly constructed and operates in a similar fashion and therefore only one of the probes 390 will be described in any detail. An exemplary probe includes a probe housing 394 that is mounted to an undersurface of one of the base spokes proximate a caster 15 that is at the distal end of the spoke. The housing includes a downward opening and an electrical probe type electrode 392a is mounted in the opening. In the illustrated embodiment, the probe 392a is mounted for movement along a vertical axis so that the lower distal end of the probe 392a can be raised and lowered to separate from the mat 28 there below and to make contact with the mat, respectively. Probe 390 includes a motor 396 that can raise and lower the probe 392a like a piston.

Figure 16:
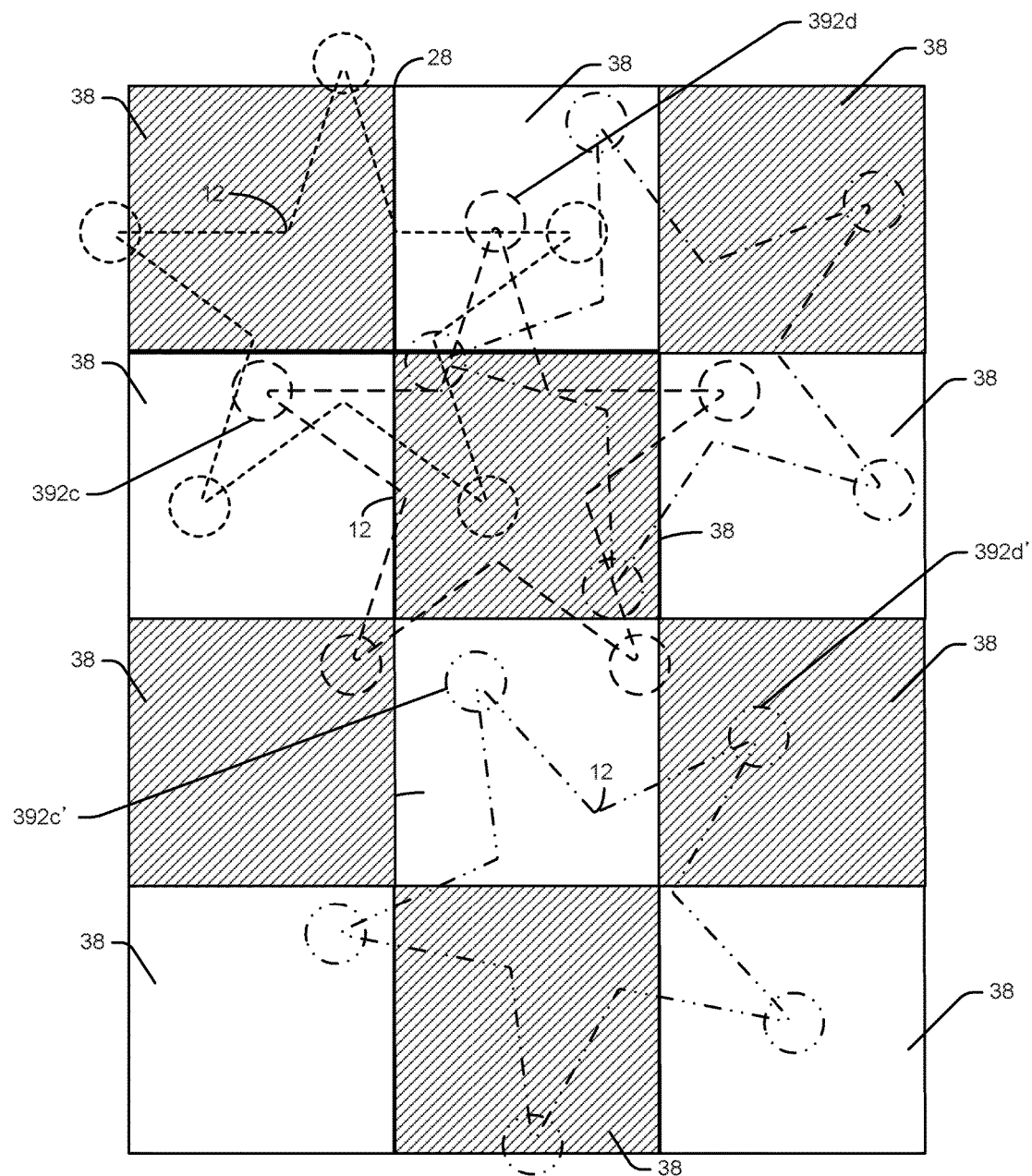
FIG. 16 is a projection view of a base assembly and charging probes atop a functional surface having charging zones, in accordance with an aspect of the present disclosure.
Figure 17:
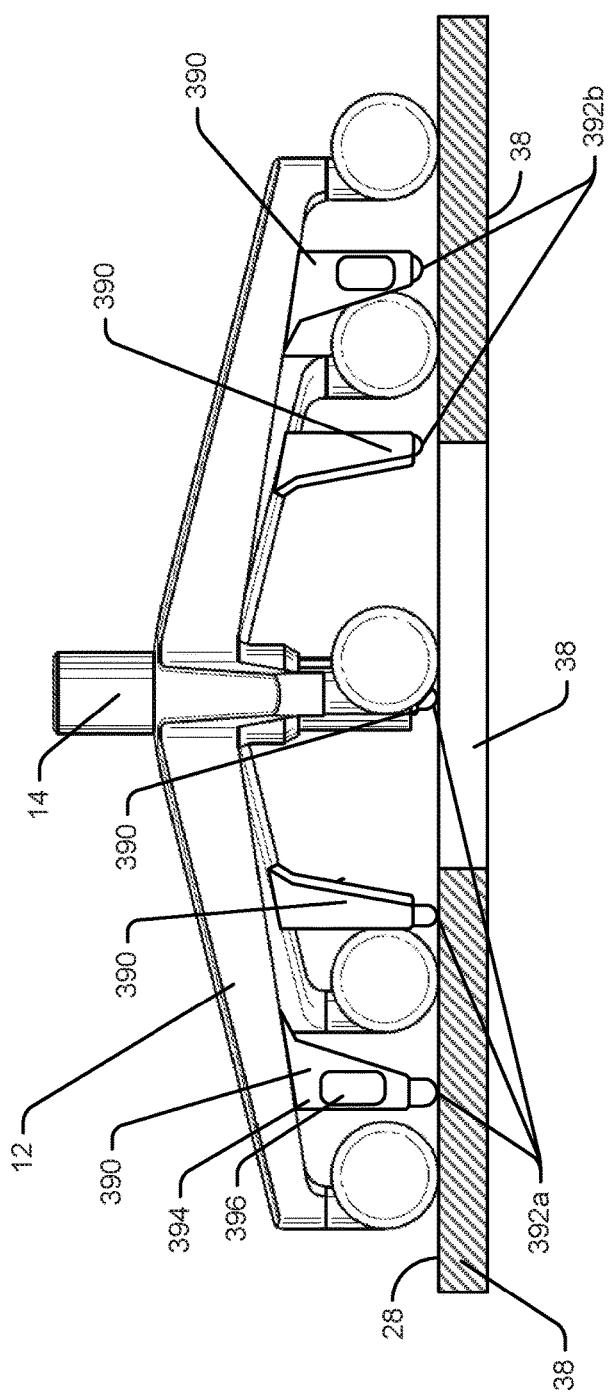
FIG. 17 is a base assembly of a chair assembly having selectively deployable charging probes that can interface with a charging mat, in accordance with an aspect of the present disclosure.

Referring still to FIGS. 16 and 17, the pattern of positive and negative charging zones 38 is designed based on the spacings between the probe assemblies 390. To this end, the pattern of zones 38 are designed so that at least two of the probe assemblies 390 reside above different polarity (e.g., positive and negative) zones at any time that the chair assembly 10 is located on the mat 28. In this regard, see that the chair base 12 is represented in phantom in four different locations with respect to the mat zones 38 and that in each case, even when the chair 10 is only partially on top[of the mat 28, at least two of the probe assemblies reside above different polarity mat sections.

In the FIGS. 16 and 17 embodiment, it is contemplated that a switching mechanism within chair assembly 10 may be controlled to change the charging polarity of each of the probes 390 so that, regardless of which zone 38 a probe is over, the probe may be connected to the zone and commence charging when desired. Thus, for instance, in FIG. 16 two probes 392c and 392d are shown aligned with positive and negative zones 38, respectively. In this case the switching mechanism would be controlled to make probe 392c positive and probe 392d negative. If the chair assembly 10 were moved to the location associated with probes 392c' and 392d' so that those probes were aligned with negative and positive zones, respectively, the switching mechanism would be changed to make probe 392c' and probe 392d' negative and positive, respectively.

As described above in at least some cases the probes are controlled to extend to make an electrical contact during charging and may be retracted to break that contact when not charging. In this regard, see for instance probes 392a in FIG. 17 that are shown extended and probes 392b that are shown retracted. In some cases only two of the probes may be extended at any time. Here, for instance, where the position of the probes is known due to a sensor in the chair or in the space that includes the chair, if first and second probes are known to be located over positive and negative zones, respectively, only the first and second probes may be extended to make a charging contact with the mat 28.

In some cases a chair assembly 10 may only include two extending probes that are arranged to always align with different polarity zones when the chair 10 is on the mat 28. In other cases where there are five probes, even if all five probes are extended during a recharging cycle, the chair processor 58 may only use two of the probes during recharging.

Figure 18:
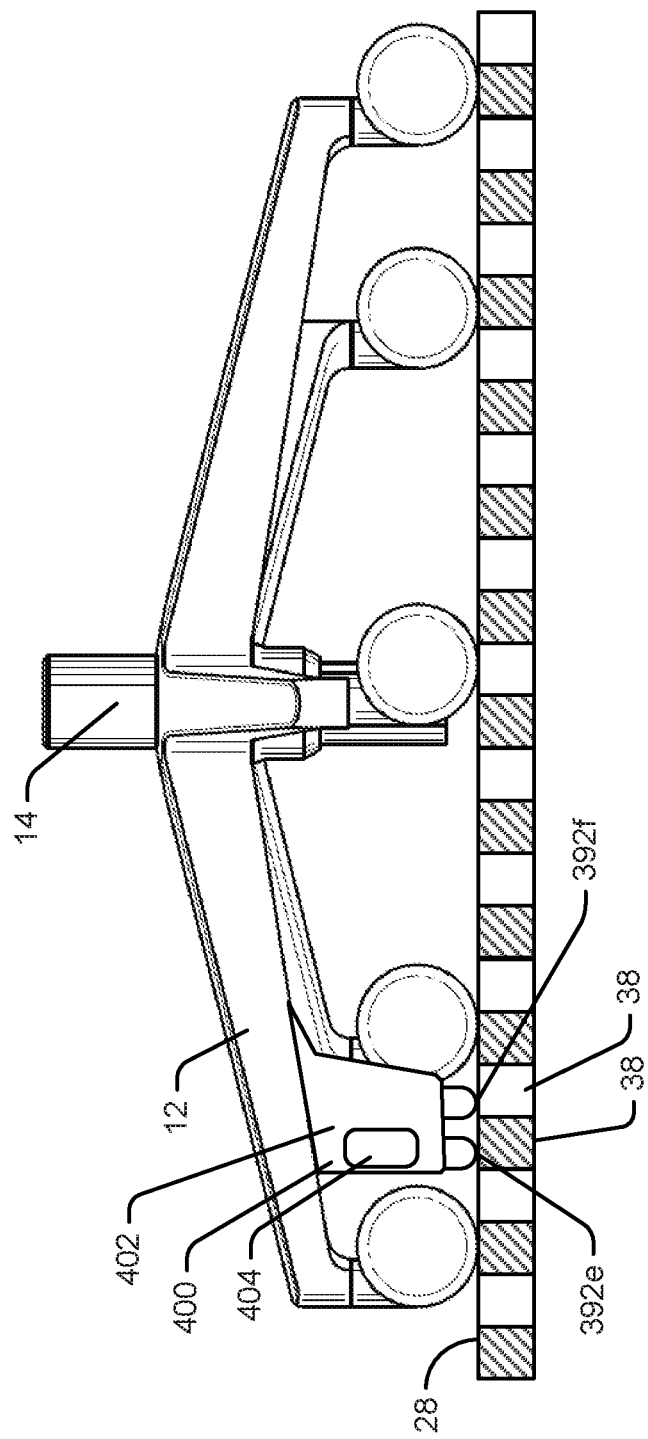
FIG. 18 is a base assembly of a chair assembly having selectively deployable charging probes that can interface with a charging mat, in accordance with an aspect of the present disclosure.

In some cases the mat 28 may have much smaller zones so that different polarity probes may be spaced much closer to each other and still result in probe alignment with different polarity zones. For instance, see FIG. 18 where a mat 28 includes smaller adjacent different polarity zones and where the probe structure includes a single probe assembly 400 that includes a housing 402 mounted to the undersurface of one of the base spokes, a motor 404 for extending and retracting probe electrodes and two electrodes 392e and 392f. Here the probe electrodes are much closer and therefore can be drive by a single small motor 404 to extend and retract when appropriate.

Referring yet again to FIG. 18, in at least some embodiments, instead of including a motor 404, the probe assembly 400 may simply include spring loaded probes 392e and 392f where springs in the probe assemblies push the probe electrodes out to that distal ends thereof engage the upper surface of the mat 28 there below at all times. Here, the spring force would be minimal and the distal ends of the probes would be rounded so that friction between the top surface of the mat 28 and the probe would be minimal.

In still other embodiments other motorized and extendable probes may be mounted to other chair assembly components. For instance, probes may be extendable along a vertical axis upward from one or both of the arm rest members 53 (see again FIG. 1 to make contact with pads on the undersurface of a table top or the like (e.g., see again FIG. 11). Alternatively, probes may be mounted to seat 16 and extend rearward to laterally there from to contact charging pads or the like on a wall or other upright structure.

In still other embodiments power may be provided to a chair assembly 10 to recharge a battery via a wireless and contactless power delivery system. For instance, supply 22 may be recharged by way of near-field or non-radiative techniques including inductive charging from a power source, resonant inductive charging from a power source, capacitive coupling charging from a power source, magnetodynamic coupling charging from a power source, and the like, or radiative techniques, including optical charging from a power source, microwave charging from a power source, etc. When employing recharging by way of a direct connection to a power source, the wired connection can be established manually by a user or automatically by one of the systems described herein.

Figure 19:
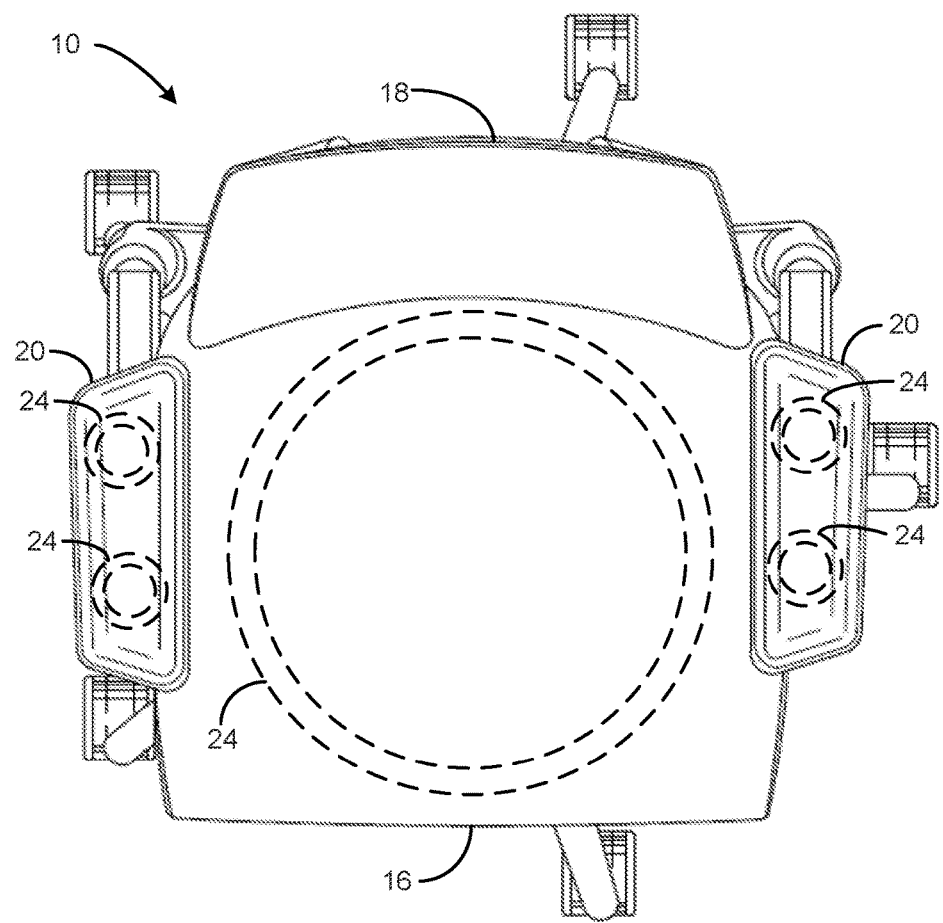
FIG. 19 is a chair assembly, in accordance with an aspect of the present disclosure.

Referring to FIGS. 4 and 19, a wireless charging receiver 24 can be located at various positions within, on, or affixed to chair assembly 10. When employing wireless recharging, the wireless charging receiver 24 and a wireless charging transmitter located remote from the chair assembly 10 can be positioned relative to one another manually by a user or automatically by one of the systems or methods described herein. The wireless charging transmitter can be located on the underside of a desk, in a functional surface (e.g., within a mat 28) on which the chair assembly 10 sits, affixed to a wall, or in any other location suitable for providing wireless charging to the chair assembly 10.

In some embodiments, the wireless charging receiver 24 can be an inductive charging receiver. In other embodiments the wireless charging receiver can be a resonant inductive charging receiver. In still other embodiments, the wireless charging receiver 24 can be a radiative charging receiver. In any case, the charging receiver can be located in or affixed to an arm assembly 20, including the top, front, side, or bottom of the arm assembly 20 (see FIG. 19), in or affixed to a seat assembly 16, including the top, front, side, or bottom of the seat assembly 16; in or affixed to a back assembly, including the front, top, side, or back of the back assembly 18; in or affixed to the base assembly 12, including the bottom, top, front, back, or side of the base assembly 12 (see FIG. 4). In certain embodiments, the wireless charging receiver 24 can be located beneath at least a portion of the base assembly 12 and in a position where a user's feet may not contact the wireless charging receiver 12. In this arrangement, it is contemplated that the wireless charging receiver 24 can be configured to move in a coordinated fashion with the seat assembly 16, so that as a user rotates the seat assembly 16, the wireless charging receiver 24 rotates so that its positioning relative to the user's feet remains substantially the same.

In a recharging position, the distance between the wireless charging receiver 24 and the wireless charging transmitter can be any distance over which a charge suitable for recharging the rechargeable power supply 22 is capable of being transmitted. For certain applications, the distance between the wireless charging receiver 24 and the wireless charging transmitter can be at least ⅛ inch, at least ¼ inch, at least ½ inch, at least 1 inch, at least 2 inches, at least 3 inches, at least 6 inches, at least 9 inches, at least 1 foot, at least 1.5 feet, at least 2 feet, at least 3 feet, or at least 5 feet. For certain applications, the distance between the wireless charging receiver 24 and the wireless charging transmitter can be at most 12 feet, at most 10 feet, at most 8 feet, at most 6 feet, at most 5 feet, at most 4 feet, at most 3 feet, at most 2.5 feet, at most 2 feet, at most 1.5 feet, at most 1 foot, at most 10 inches, at most 8 inches, at most 6 inches, at most 4 inches, at most 2 inches, at most 1 inch, or at most ½ inch.

In a recharging position, the center of the wireless charging receiver 24 and the wireless charging transmitter can be aligned with one another or can have an offset. As one of skill in the art will appreciate, the efficiency of the wireless charging may be impacted by the alignment of the wireless charging receiver 24 and the wireless charging transmitter.

In many of the embodiments contemplated by this disclosure, for various reasons, a chair user may not want to have the rechargeable battery in their chair assembly 10 charging while they are seated in the chair, generally within the space associated with the chair or even in the same room as the chair. In these cases, in at least some embodiments, a chair sensor or some type of room sensor may sense when occupancy within a space (e.g., the seat, the surrounding area or the room containing the chair) around the chair and may only commence a charging cycle when no one is in the space. For instance, if the space is the chair itself, a presence or weight sensor on the chair itself may generate data useable by the chair processor to determine if a person in seated in the chair. As another instance, a room camera 100 (see again FIG. 8) or a camera 102 associated with a computer display 413 in a room that includes the chair may generate images that can be examined by a facility processor 54 to ascertain if anyone is in the space proximate the chair or even within the room 30 associated with the chair 10. Here, when no one is in the space, the facility processor 54 may transmit a vacant signal to the chair processor 58 causing the chair processor to commence a recharging process. For instance, in the case of an automated charging process like the one described above with respect to FIGS. 8, 9 and 10, processor 58 may control the caster motors (e.g., 320) to move the chair over to charging station 210 and commence charging. Here, if a person enters the space while a charging cycle is occurring, the charging process may be halted and processor 58 may control the caster motors to move the chair 10 back into a welcoming position.

Again, here, when charging is occurring, some visual indication may be provided such as illuminating an LED (see again 263 and 265 in FIG. 9) and when charging ceases a different LED or visual indicator may be illuminated to signal to the user whether the system is charging. Other charging and non-charging indicators are contemplated. For instance, in some cases, a speaker 415 (see FIG. 6) may be provided in a surface of the chair that can announce the charging status. For example, when charging commences, the speak may annunciate "Battery is charging" and when charging ceases the speaker may annunciate "Charging has stopped". In certain cases, the speaker may also notify the user that the "Chair requires charging" at some point in the future.

In some cases charging may only commence after processor 58 or some other system processor recognizes that no one has been in the space associated with the chair for at least some threshold period of time (e.g., 15 minutes) or until a user associated with the chair has left some larger space such as a facility which would indicate that the user is likely away for an extended period of time. In still other cases the processor 58 may only commence recharging when no one is in the space associated with the chair during some specific time of day. For instance, recharging may only occur at night and on weekends when no one is in a chair associated space.

In some embodiments, at least one of the facility based sensors 93 (see again FIG. 7) or the portable device sensors 89 may be able to determine the location of a specific person associated with a chair or office in space. For instance, a wrist mounted portable user device may receive signals from a plurality of access points 69 within a facility and may be able to triangulate its location based on signal strength or some type of statistical analysis. The device and, hence, the device user's location may be transmitted to the facility based processor 54 for further processing. Here, in at least some cases where a chair charges when no one is in the space associated with the chair, when the person associated with the chair or office comes within some vicinity of the chair or office (e.g., arrives on a floor of a building that includes the chair after having been away), the system may cause the chair to interrupt the charging process and move into a welcoming position automatically. Thus, for instance, when a chair user rises from a chair 10 and leaves her office, after a threshold period in which the user is outside the office, the chair may be controlled to move to a charging station in the office and commence a charging function. If the user leaves the building in which the chair is located, the charging function may continue. If, then, the user reenters the floor of the building that the chair is on prior to the end of the recharging process, the recharging process may be interrupted and the chair may assume the welcoming position.

In still other embodiments, the rechargeable battery may be recharged by a mechanical motion associated with chair components that move as a chair user moves the chair components. The mechanical motion can be a motion that is intended for a purpose other than recharging, but can incidentally also be used to provide some recharging power, such as a wheel connected to a power generator that provides electric power when a user moves the chair assembly 10 or a power generator that converts some of the force from a user sitting down in the chair assembly 10 into electric power.

In the embodiments described above as including chair components that make direct electrical connection to recharging probes or electrodes, in at least some embodiments the direct connections may be replaced by wireless power transfer components such as inductive coupling antenna or the like. For instance, in FIGS. 9 and 10, the electrodes and pads 224 and 226 and 232 and 234 may be replaced by inductive coupling antenna. Here, as larger antenna usually results in faster transfer of power, the coupling arrangements may be relatively large.

In the embodiments described above as including chair components that employ recharging by way of wired or wireless power by way of an arm assembly 20, it is contemplated that a single arm assembly can house the necessary components. In the embodiments described above as including chair components that employ recharging by way of a direct connection with an arm assembly 20, it is contemplated that an electrode 280 can be placed some distance beneath a comfort surface of the arm assembly 20. In one aspect, the comfort surface can be compressed by the motion of a pad 272 and 274 which can establish a direct electric connection once the comfort surface has been sufficiently compressed. In another aspect, the comfort surface can have holes or grooves that allow an extension electrode coupled to the pad 272 and 274 to penetrate past the comfort surface and make contact with the electrode 280.

In the embodiments described above as including chair components that employ recharging by way of a direct connection with a seat assembly 16, a back assembly 18, or an arm assembly 20, it is contemplated that the charging can occur via a comfort surface of the seat assembly 16, the back assembly 18, or the arm assembly 20, where the comfort surface comprises a material that can suitably receive an electric charge for the purposes of recharging the rechargeable power supply 22. Examples of such a material include, but are not limited to, a smart fabric, electrically conductive polymers, and the like.

In the embodiments described above as including chair components that employ recharging by way of a direct connection, it is contemplated that the electrodes for receiving the recharging can be located on a portion of the chair assembly 10 that is not contacted by a user during normal use.

Figure 20:
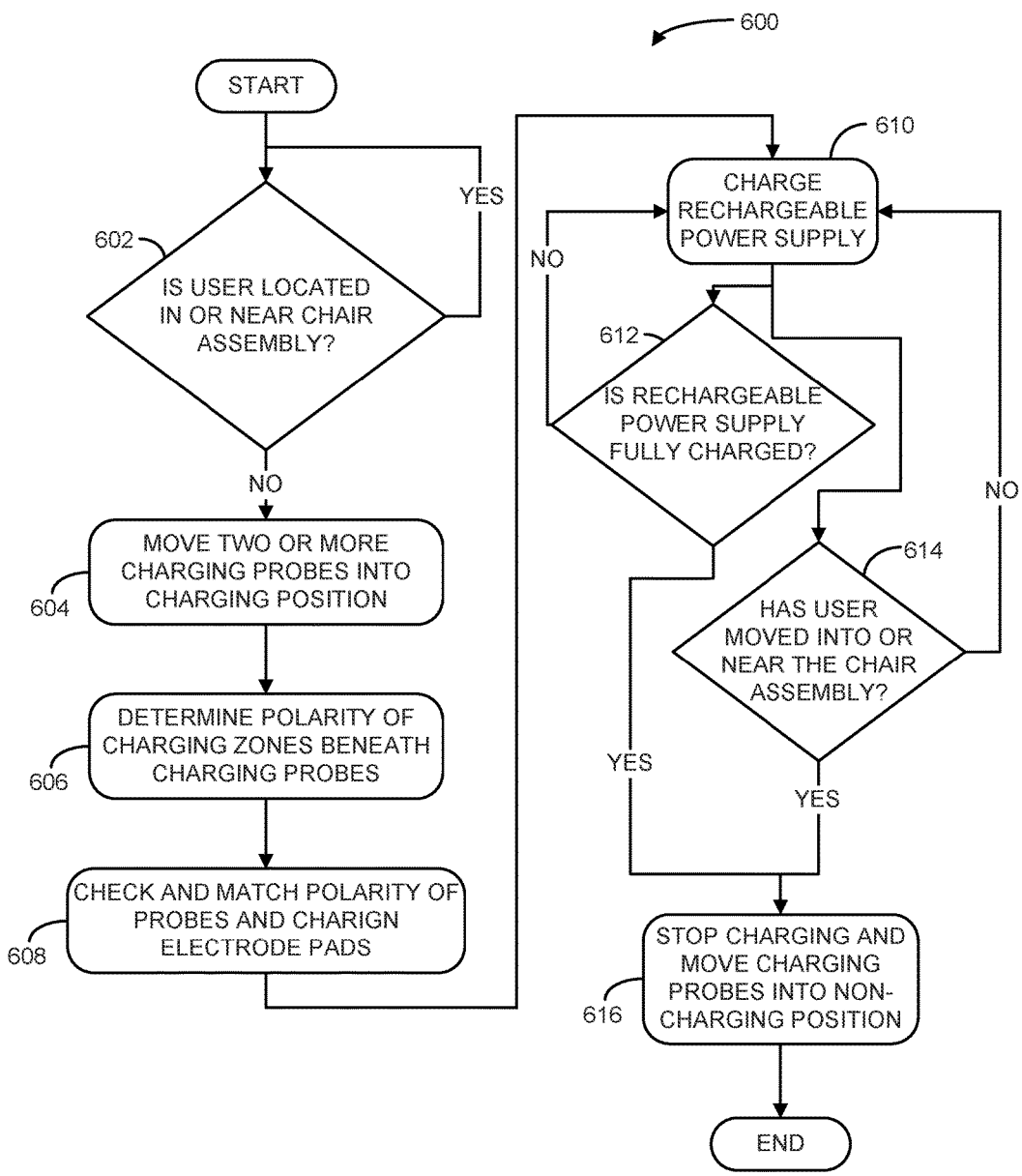
FIG. 20 is a flowchart showing a method of recharging a rechargeable power supply of a chair assembly, in accordance with an aspect of the present disclosure.

Referring to FIGS. 7, 17 and 20, this disclosure provides a method 600 of recharging a chair assembly 10 comprising a rechargeable power supply 22 and a set of moveable electrode probes 292a that are used with a power delivery mat 28. At decision block 602, one or more of the system processors (see again FIG. 7) receiving data from one or more sensors associated with a chair 10 or the space associated with the chair 10 determine if a user is located in or near the chair assembly 10. For instance, images from a camera 100 (see also FIG. 8) may be used to determine if anyone is in the office including the chair 10. If the answer at decision block 602 is YES, then control loops back through decision block 602. If the answer at decision block 602 is NO, control passes to process block 604. At process block 604, chair processor 58 controls the probe motors to move two or more charging probes 392a located above two or more charging zones 38 into a charging position. At process block 606, processor 58 determines the polarity of the two or more charging zones. At process block 608, if the polarity of each probe that contacts one of the charging zones is the same as the polarity of the charging zone, control passes to block 610. If, however, at block 608 the polarity of the probes that contact the charging zones is not the same as the polarity of the charging zones, the polarity of the charging zones or the polarity of the probes 392a must be changed to match the polarities. For instance, the probe polarities can be changed using a simple switching mechanism within the chair assembly 10 itself. As another instance, a facility processor 54 may control a switching mechanism within the mat 28 to change the polarity.

Continuing, at process block 610, recharging commences. While the chair battery is recharging, the method 600 can include parallel decision blocks 612 and 614. At decision block 612, processor 58 determines if the rechargeable power supply 22 is fully charged. If the answer to decision block 612 is NO, control loops back up to process block 610. If the answer to decision block 612 is YES, then control proceeds to process block 616. At decision block 614, the method 600 includes determining if a user has moved in or near the chair assembly. Here, data from any of several different chair, office or facility sensors may be used to discern the current location of a chair user and/or other persons or at least the relative juxtapositions of the user and/or other persons with respect to the chair assembly 10.

If the answer to decision block 614 is NO, then control loops back up to process block 610. If the answer to decision block 614 is YES, then control proceeds to process block 616. At process block 616, the recharging cycle is ended and processor 58 controls the probe motors to move the charging probes 392a into their stored and non-charging positions.

The process described above with respect to FIG. 20 may be altered in many different ways depending on the hardware included in a chair assembly but would take the general form of receiving some form of sensed data from system sensors, using the received data to discern whether or not someone is located within a space associated with a chair assembly 10, if no one is in the space associated with the chair assembly, commencing a charging process, if a chair battery is fully recharged, ceasing the charging process and if someone enters the space associated with the chair during the recharging process, halting the recharging process.

For instance, in a case where a chair includes an inductive or otherwise wireless power coupling antenna or the like and is used with an inductively coupling floor mat, wall mounted mat, under table top mat, etc., the FIG. 20 process would simply skip from block 602 to block 610 without performing blocks 604, 606 and 608 as the probe extension and polarity checking steps could be skipped.

Figure 21:
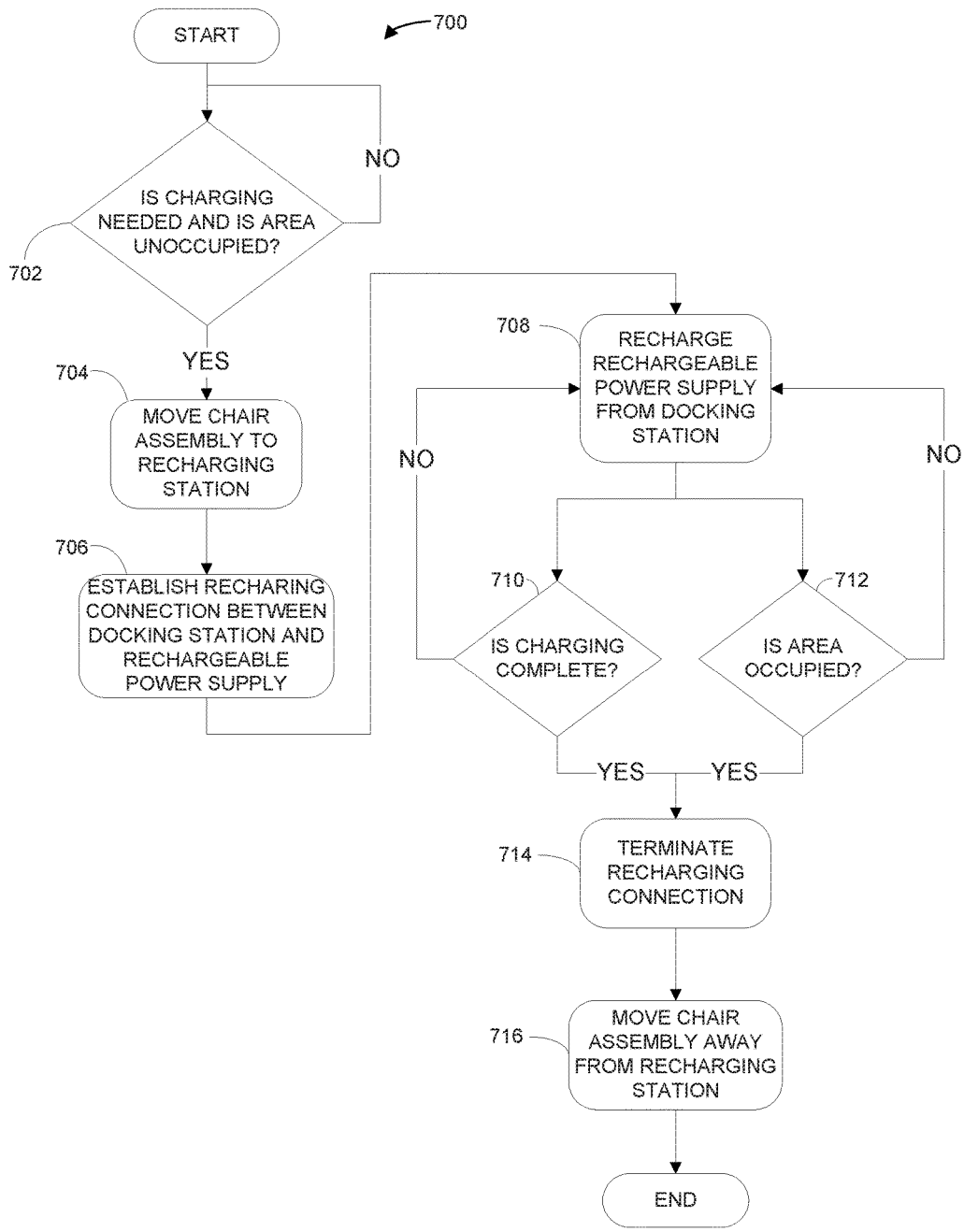
FIG. 21 is a flowchart showing a method of recharging a rechargeable power supply of a chair assembly, in accordance with an aspect of the present disclosure.

As another instance, in a case where a chair is used with a stationary charging station akin to the one described above with respect to FIGS. 8 through 10 and the chair assembly includes a motive mechanism for moving the chair assembly from a use position to a charging position, the FIG. 20 process may be altered to include sub processes whereby the chair assembly 10 is moved prior to and after recharging. To this end, see the process 700 in exemplary FIG. 21 where, at block 702, system processors determine if charging is required and if an area or space associated with a chair assembly 10 is occupied. If charging is not required or the space associated with the chair 10 is occupied, control continues to loop through decision block 702. Once the conditions of block 702 are met control passes to block 704 where chair processor 58 moves the chair 10 to the recharging station and at block 706 a recharging connection is made between the station and the rechargeable chair battery. At block 708 recharging commences. Blocks 710, 712 and 714 in FIG. 21 are akin to blocks 212, 214 and 216, respectively, in FIG. 20. After charging is terminated at block 714, control passes to block 716 where processor 58 moves the chair assembly 10 away from the charging station and into a welcoming position as described above.

Referring still to FIG. 21, the two decisions associated with block 702 may be taken in any order. Thus, for instance, the need for charging may be considered first and only if charging is needed, the occupancy of the space associated with a chair assembly 10 may be considered. In the alternative, the occupancy of the space may be considered first and the need for recharging may only be considered if the space is unoccupied instantaneously or for at least some threshold period of time.

Similarly, the two decisions associated with blocks 710 and 712 may be sequential rather than parallel. For instance, the recharging decision block may be considered prior to the occupancy block 712 so that recharging continues once it is commenced until either recharging is complete or a user manually discontinues the recharging process. The FIG. 21 method 700 can optionally include providing a visual indicator that the rechargeable power supply 22 is being recharged during recharging.

Figure 22:
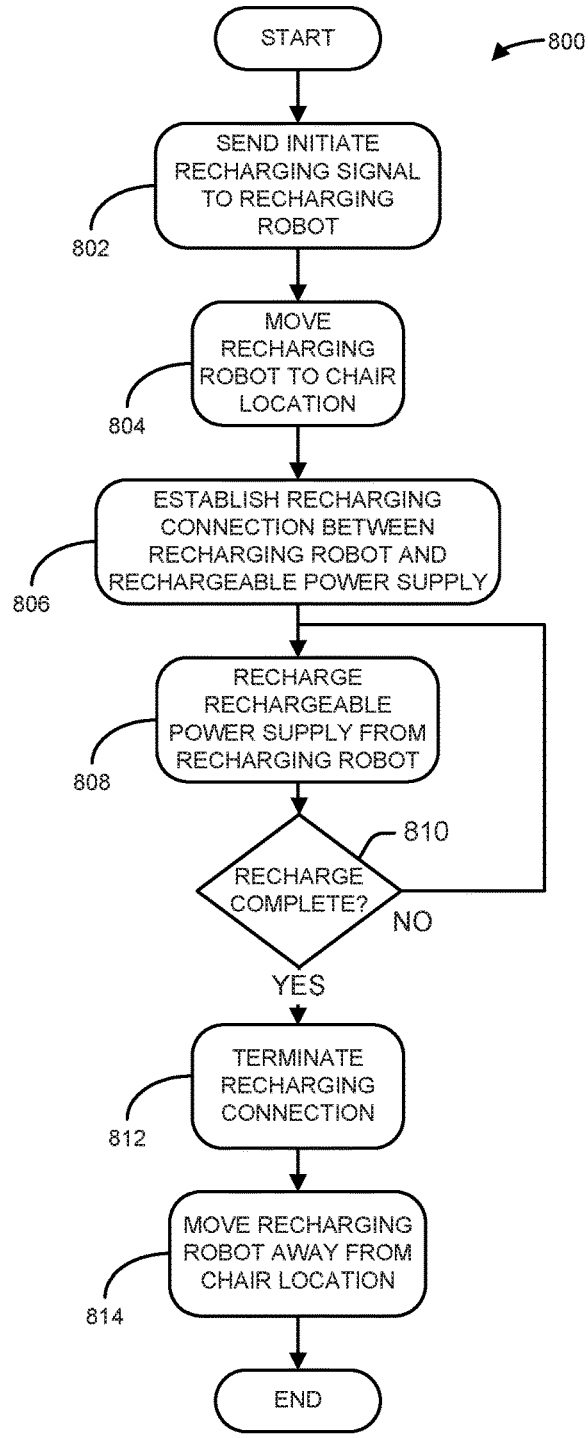
FIG. 22 is a flowchart showing a method of recharging a rechargeable power supply of a chair assembly, in accordance with an aspect of the present disclosure.

FIG. 22 illustrates a method 800 whereby a recharging robot (e.g., motive recharging stations) is employed to recharge a chair battery. Prior to process 800, it is assumed that the chair processor 58 or some other system processor 52, 54, etc., has received data from the rechargeable battery 22 and has determined that the battery requires recharging. It is also assumed that the system processors have determined that other conditions required for recharging have occurred. For instance, the processors may have determined that the space associated with the chair assembly is unoccupied. As another instance, the processors may have determined that a time period (e.g., between midnight and 4 AM) scheduled for recharging chairs has occurred. Many other recharging conditions and sets of conditions and circumstances are contemplated.

Figure 15:
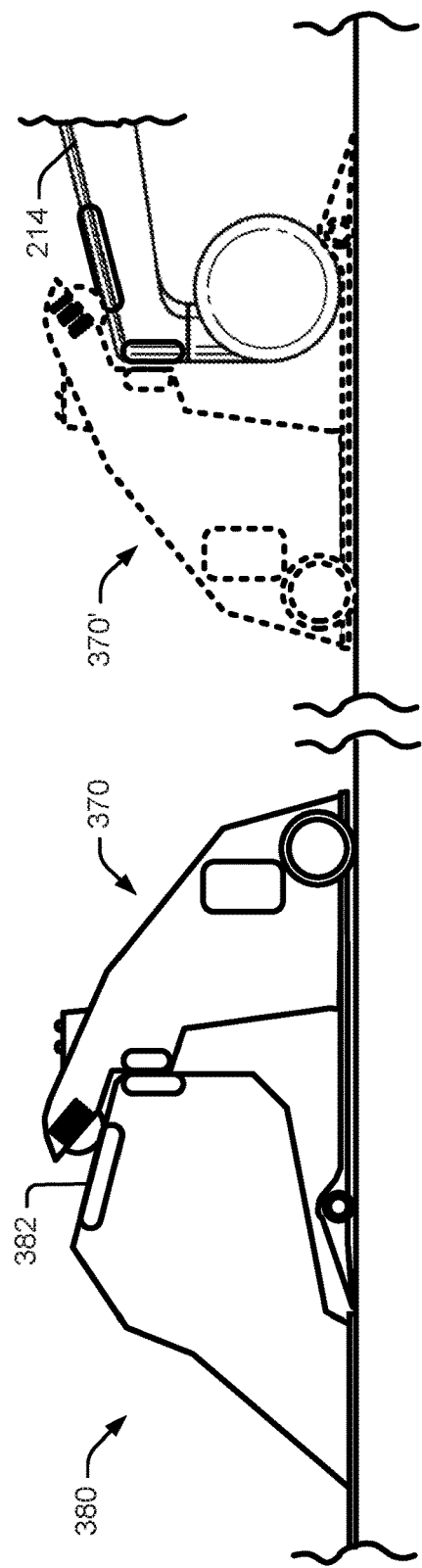
FIG. 15 is a chair assembly and a movable recharging station, showing the movable recharging station interfaced with a stationary recharging station, in accordance with an aspect of the present disclosure.

In FIG. 22, once processors have determined that recharging is required and that conditions for recharging have occurred, at block 802 system processors generate an initiate recharging control signal which is sent to a recharging robot (see 370 in FIGS. 14 and 15). At block 804, the robot 370 is controlled to move to a recharging position relative to the chair assembly 10 and a recharging connection is formed at block 806. At block 808 recharging commences. At block 810, control continues to loop up to block 808 until recharging is complete at which time control passes to block 812 and recharging is terminated. At block 814 the recharging robot moves away from the chair assembly 10. The robot may either move back to a robot recharging station if the robot needs an additional charge or if there are no other chair assemblies requiring a recharge or may move on to a next chair assembly that needs recharging.

Figure 23:
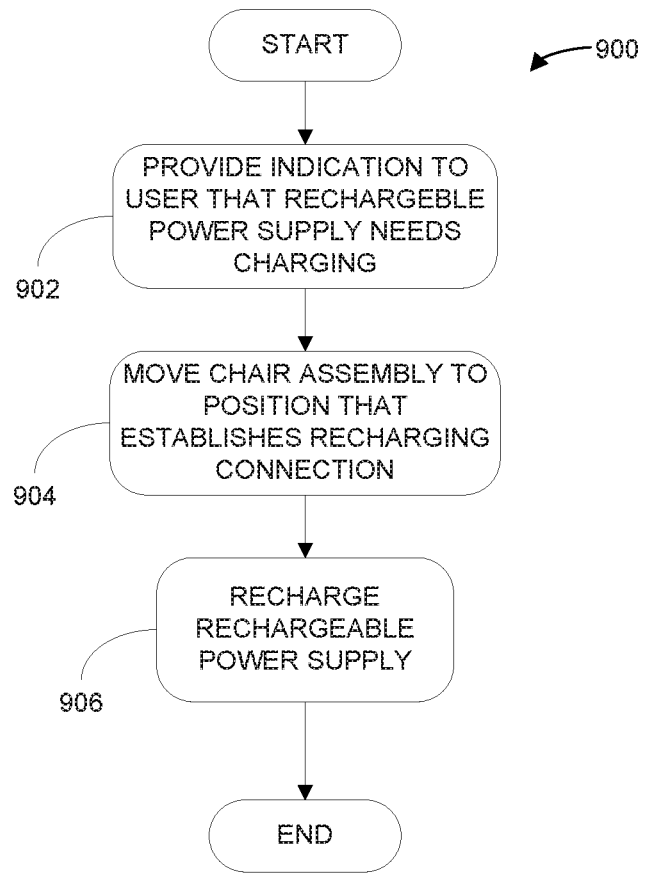
FIG. 23 is a flowchart showing a method of recharging a rechargeable power supply of a chair assembly, in accordance with an aspect of the present disclosure.

Referring to FIG. 23, a method 900 in which a chair user manually moves a chair assembly into a recharging position relative to a recharging assembly is illustrated. At block 902, once one or more system processors determine that recharging is required, an indication is provided to the chair user that recharging is required. The indicating step 902 may include providing an indication selected from the group consisting of a visual indication, an audio indication, a haptic indication, an olfactory indication, and combinations thereof. For instance, a motor in a chair assembly 10 may be used to vibrate a portion of the chair assembly to indicate required recharging. As another instance, in some cases a signal may be provided to a chair user's computer (see 420 in FIG. 8) causing the computer 420 to present a pop up window with a warning that recharging is required. As yet another instance, in some cases a signal may be transmitted to a user's wearable device (e.g., a wrist mounted computer device) causing the wearable device to generate a recharge warning sound, to vibrate or to present a text warning or notification that recharging is required. Many other application modules may be used to provide a warning to recharge.

At block 904, when appropriate, the chair user manually moves the chair to a recharging station and at block 906 recharging commences. As a user attempts to place a chair in a recharging position, the system may provide feedback to the user indicating whether or not a suitable connection has been made and recharging commenced. For instance, the speaker 415 (see again FIG. 6) may generate a voice signal indicating "Recharging commenced" or something akin thereto. In other cases, after connection is made via manual movement, recharging may not commence for a short period to allow the user to be located at a location away from the station (e.g., leave the office including the chair). In this case, once a suitable charging connection is made, speaker 415 may generate a voice signal indicating "Connection made, recharging will commence in five minutes". In still other cases, after connection is made via manual movement, recharging may not commence until the space associated with a chair assembly is unoccupied and charging may automatically cease when anyone enters the chair associated space. Here, the speaker may generate a voice signal indicating "Connection made, charging will start when you leave your office" or some similar suitable indication. Connection and charging indications may be provided via other application modules associated with the chair assembly 10 or provides as part of a facility or a portable user device.

In at least some embodiments it is contemplated that two or more chair assemblies including rechargeable batteries may be located in a single office, conference space, common area of a facility, etc. In this case, it is contemplated that a single recharging station or recharging robot may be used to recharge multiple chairs in sequence. Here, each chair processor 58 may be programmed to determine its own battery charge state or condition and may provide that information wirelessly on a regular basis to a facility server or processor 54. The facility processor 54 can then identify which chair in a space is least charged and commence a recharging process for that chair first, recharging other chairs subsequently as a function of their relative charging states. Thus, for instance, where there are eight chairs in a space, facility processor 54 may send a signal to the processor 58 associated with the least charged of the eight chairs to move to a single charging station within the space to commence recharging. Then, after the first chair battery is recharged, processor 58 may move that chair away from the station and processor 58 may commence a second move and recharging cycle with a second of the chair assemblies.

In at least some cases where there are many chairs within a space, the facility processor may be programmed to keep at least a subset of the chairs in a fully recharged state at all times. Thus, in the case of an eight chair space, regardless of the lowest level of chair charge in the space, processor 587 may control recharging so that four of the chairs are fully charged at all times if possible. For instance, if one chair is only 10% charged, three are fully charged and one is 70% charged, processor 58 may be programmed to charge the 70% charged chair prior to the 10% charged chair. Conversely, in some cases, processor 58 may be programmed to charge first a chair with a lower or lowest existing charge.

Where there are two or more chair assemblies in one space, the system may indicate the chair with the greatest charge level to a user to help the user select a most charged chair. For instance, where one chair is 100% charged and a second is 30% charged in a space, processor 58 may cause the 100% charged chair to assume a welcoming position and the 30% charged chair to assume a side position (e.g., a position at a greater physical distance from an entry into the space). As another instance, if there are eight chairs in a space and four of the eight are fully charged while one is 50% charged and the other three are each 20% charged, the system may indicate the four fully charged in some fashion when a person enters the space. For instance, when a first person enters the space, a motor in each of the four fully charged chairs may cause the chair to vibrate or to rotate back and forth slightly about the center support post under the seat to allow the user to select any of the four fully charged chairs. In the alternative, one of the four fully charged chairs may vibrate, rotate back and forth, etc., to indicate a full charge.

In the above example, once the four fully charge chairs are occupied, when a fifth person enters the space, the fifth chair that is 50% charged may be controlled to indicate that it is the next most fully charged chair, and so on. In still other embodiments, where a subset of chairs is charged above a threshold level and another subset are not, the system may control the chairs to arrange the subset of chairs charged above the level about a conference table and to locate the other chairs at a side location as an indication of relative charge.

Figure 24:
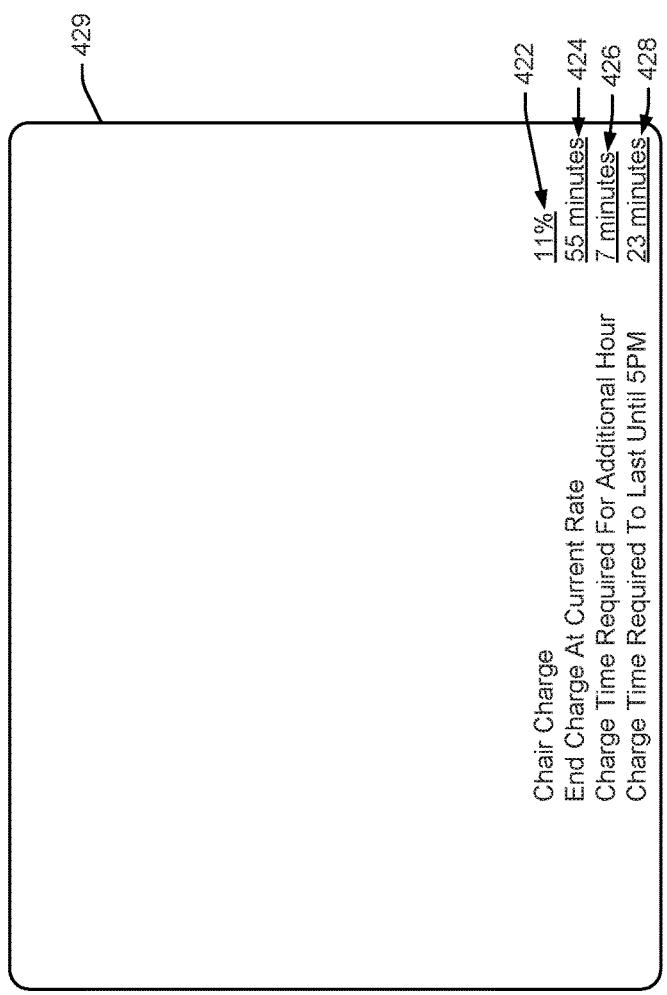
FIG. 24 is a computer display screen shot that indicates a chair charge status, in accordance with an aspect of the present disclosure.

In some cases the system may assess chair battery charge and provide some indication thereof to the user. For instance, again, a chair processor 58 may transmit chair charge level to another system processor like facility processor 54, portable device processor 52 or a processor located within a space based computer 420 in FIG. 8 and the receiving processor may indicate charge status. In this regard, see FIG. 24 that shows a computer display screen shot 429 that indicates chair charge status at 422. Here, the charge status information may be relatively simple, (e.g., % charge still available) or may be far more complex. For example, a system processor 58 may be programmed to calculate a remaining charged time available prior to discharge assuming use of chair features in a fashion similar to recent use. See in this regard the additional time indicator at 424 in FIG. 24. As another example, a system processor 58 may be programmed to calculate the amount of recharging time required for a chair battery to reach a charge level sufficient for the chair to operate in a fashion similar to recent use for another one hour period and may provide an indication of that required recharging time as at 426 in FIG. 24. Similarly, assuming a chair user typically works until 5 PM each evening, a system processor 58 may be able to detect how much additional time would be required to recharge a battery to a charge level sufficient to provide power until 5 PM and provide an indication of that required time as at 428 in FIG. 24. By indicating additional time to charge to a level for powering the chair for a specific amount of time, the chair user may decide to take a recharging break for a few minutes while the chair recharges. Then, the chair may fully charge at some other suitable time (e.g, after 5 PM in the above example).

Feature Modules

Figure 25:
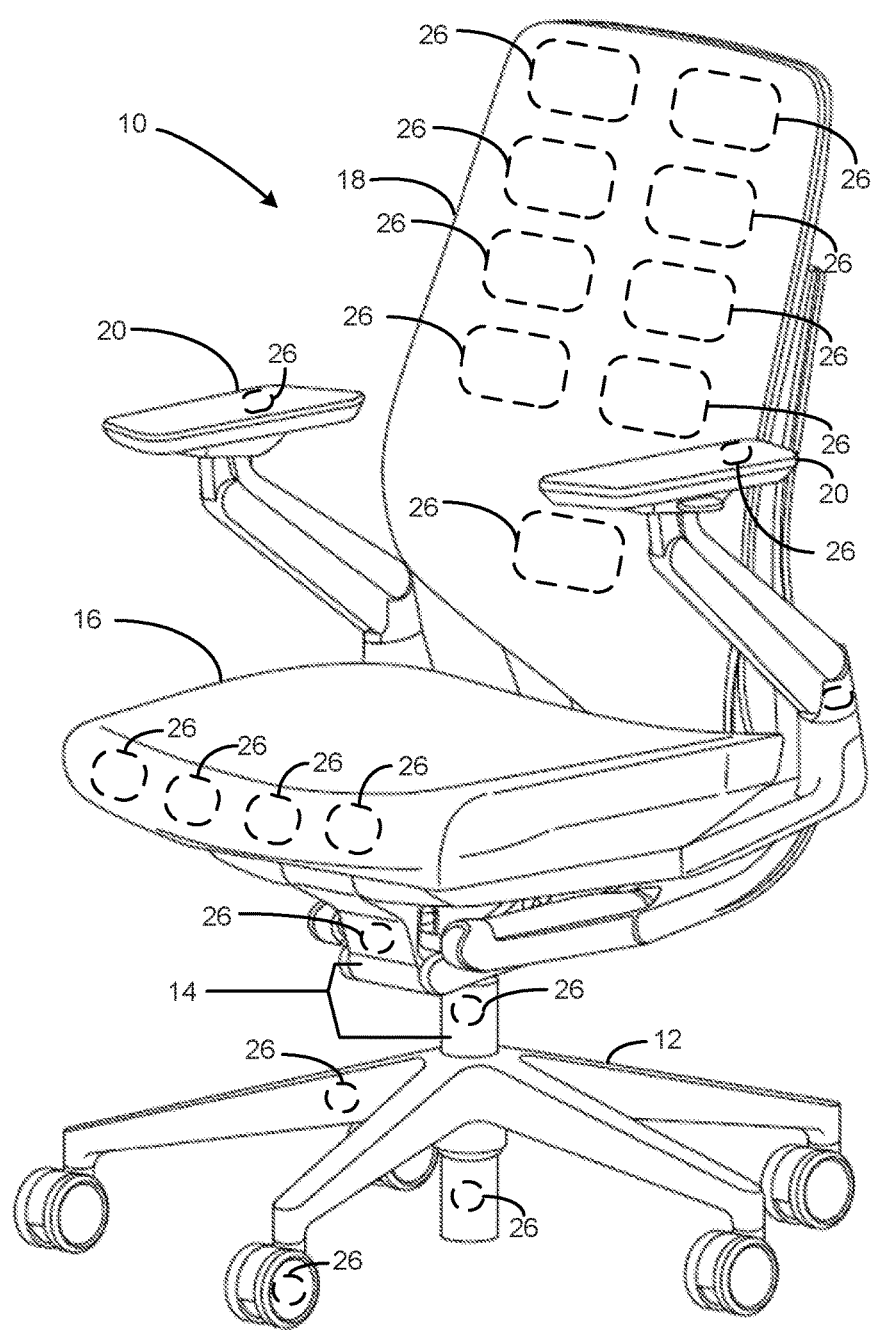
FIG. 25 is a chair assembly, in accordance with an aspect of the present disclosure.
Figure 26:
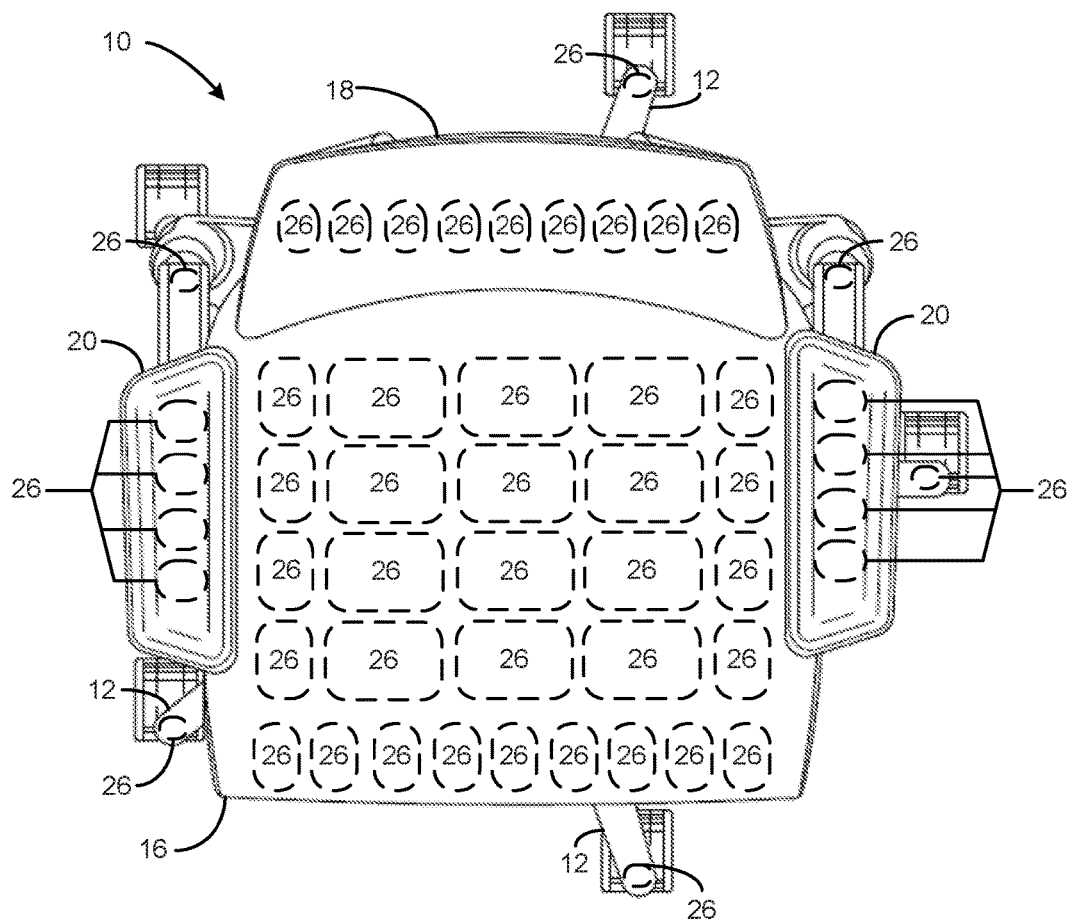
FIG. 26 is a chair assembly, in accordance with an aspect of the present disclosure.
Figure 27:
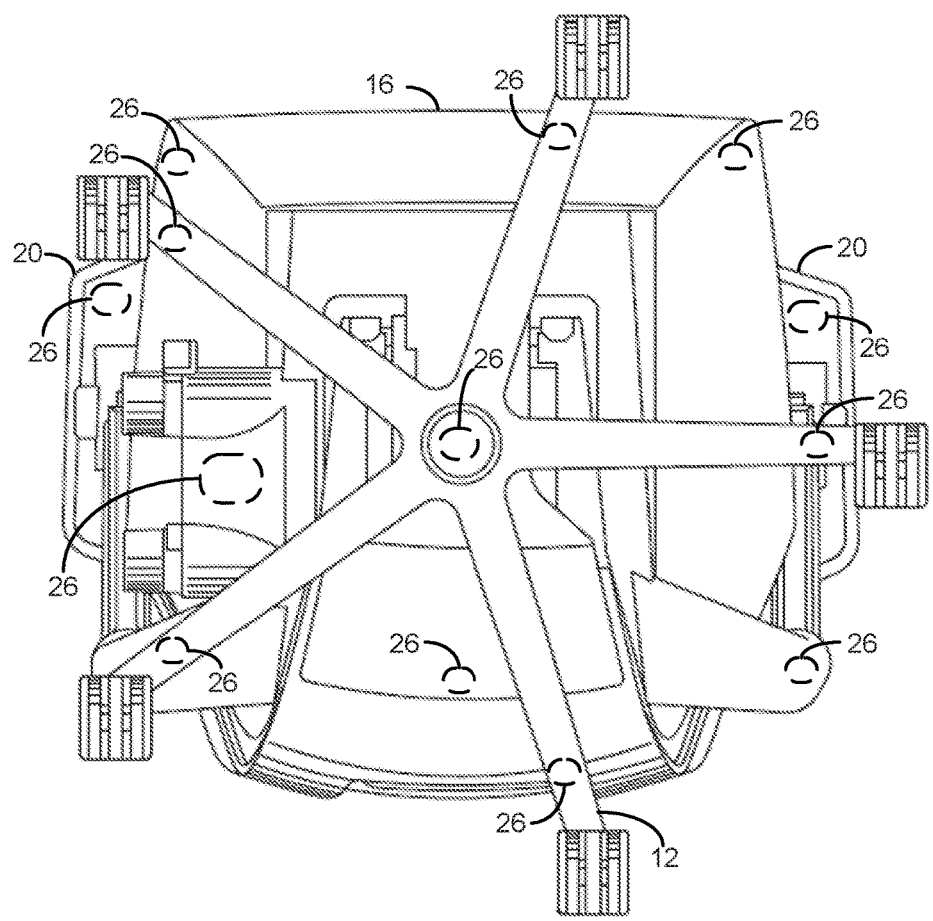
FIG. 27 is a chair assembly, in accordance with an aspect of the present disclosure.

Referring to FIGS. 25 through 27, chair assembly 10 can include one or more feature modules 26 (e.g., sensors or application modules (actuators)). It should be appreciated that the illustrated locations of the feature modules 26 are only examples of the locations they can occupy, and the feature modules 26 can be located in positions others than those shown in the FIGS. 25 through 27. The one or more feature modules 26 can be located on, within, or affixed to a base assembly 12, a support assembly 14, a seat assembly 16, a back assembly 18, or an arm assembly 20. It should also be appreciated that certain feature modules 26 are more appropriately located in certain positions, based on the function of that feature module 26. For example, a feature module 26 that is intended to interact with the back of a user is more suitably positioned in the back assembly 18 than elsewhere in the chair assembly 10. The feature modules 26 can be sensing modules, which can make a measurement relating to a user, the environment, a chair condition, and combinations thereof, application modules, which perform an application relating to the user, the environment, a chair condition, or combinations thereof, or combined sensors/ application modules, which perform the functions of both a sensing module and an application module.

In at least some embodiments, a feature module 26 can be swappable, such that one type of feature module that is located in a particular location on the chair assembly 10 can be removed and replaced with either a replacement of the same type of feature module 26 or a different type of feature module 26. In this way, the chair assembly 10 is customizable to the user's desired experience and can be modified post-market as a user's desired experiences change.

Figure 28:
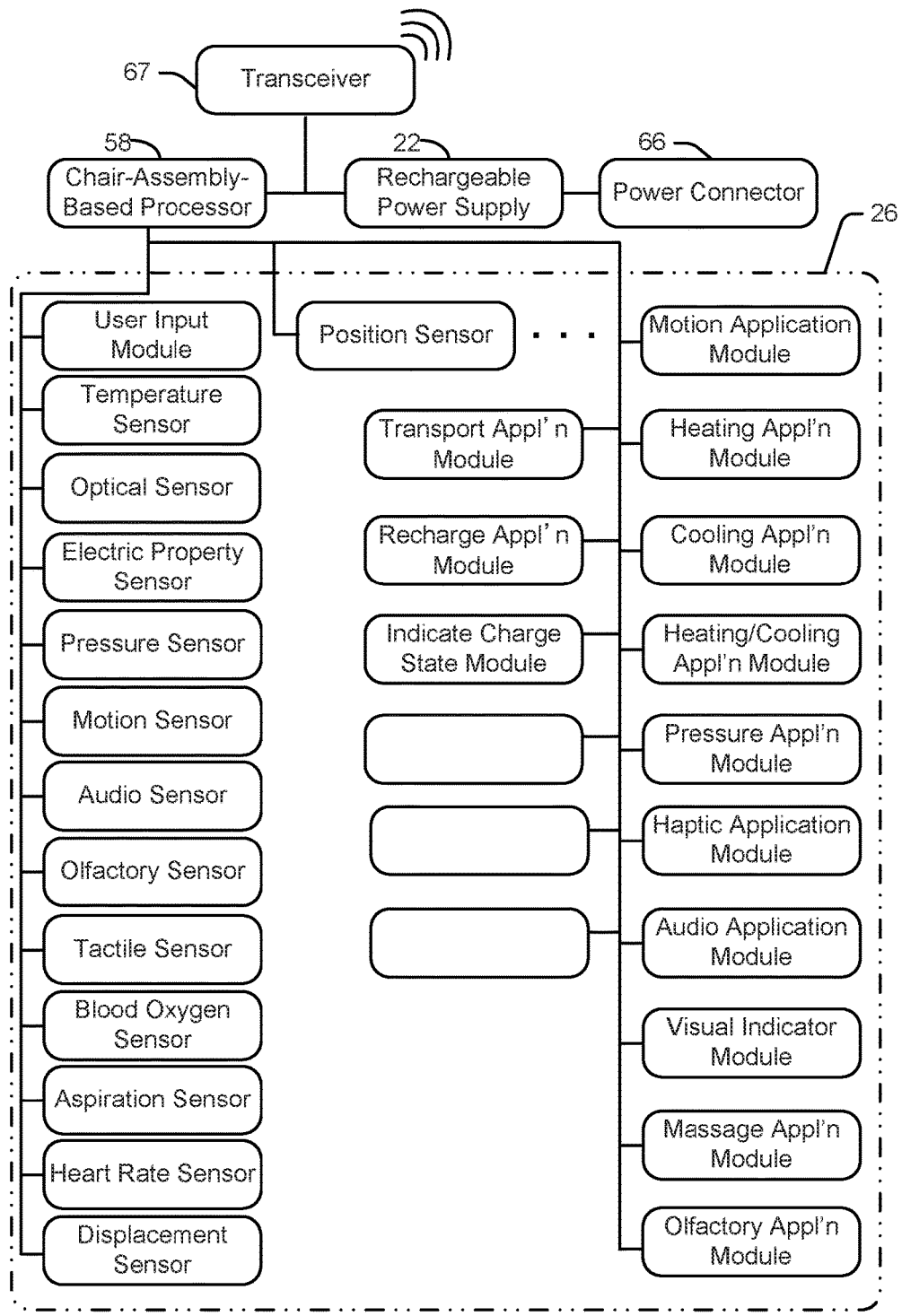
FIG. 28 is a schematic of the electronic configuration of a chair assembly, in accordance with an aspect of the present disclosure.

Referring to FIG. 28, a schematic diagram showing the general electronic configuration of a chair assembly 10 is shown including chair processor 28 and exemplary feature modules 26 generally, which can include any of one, a subset of or all of the listed modules.

Sensing Modules

In an aspect, a sensing module or combined sensing/ application module can include one or more user input modules for receiving a command or instruction from a user. The user input module can be a switch, a button, a touchpad, a transceiver that receives signals from other off-chair user input devices such as a wearable computing device, etc. In some cases, the user input module can be located at any location on the chair assembly that can be accessed by a user, preferably a location that can be accessed by a user in a seated position. For example, the user input module can be located on the top, side, front, or bottom of an arm assembly 20, the front, side, or bottom of a seat assembly 16, the top, side, bottom, or back of a back assembly 18, the top, side, or bottom of a base assembly 12, or the side or bottom of a support assembly 14.

The user input module can be configured to transmit a user input signal to the processor 58 representative of the user input. The user input signal can be a simple signal indicating that a user is actuating the user input module or can have some on-board processing capacity in order to send a more complex signal that is more indicative of a user's intention. As an example of the simple signal, a user input module in the form of a button could communicate a binary signal to the processor indicating whether the button is being actuated or not. As an example of the more complex signal, a touch pad could identify a user activity on the touch pad as representing a specific command and can communicate that command to the processor rather than the user activity itself.

A remote user input module can be remote from the chair assembly 10 and serve the same function as an internal user input module. For example, a device containing a user-based processor, a facility-based processor, or a global processor can serve as a remote user input module. The remote user input module can be configured to transmit a user input signal to the processor 58 representative of the user input.

Figure 31:
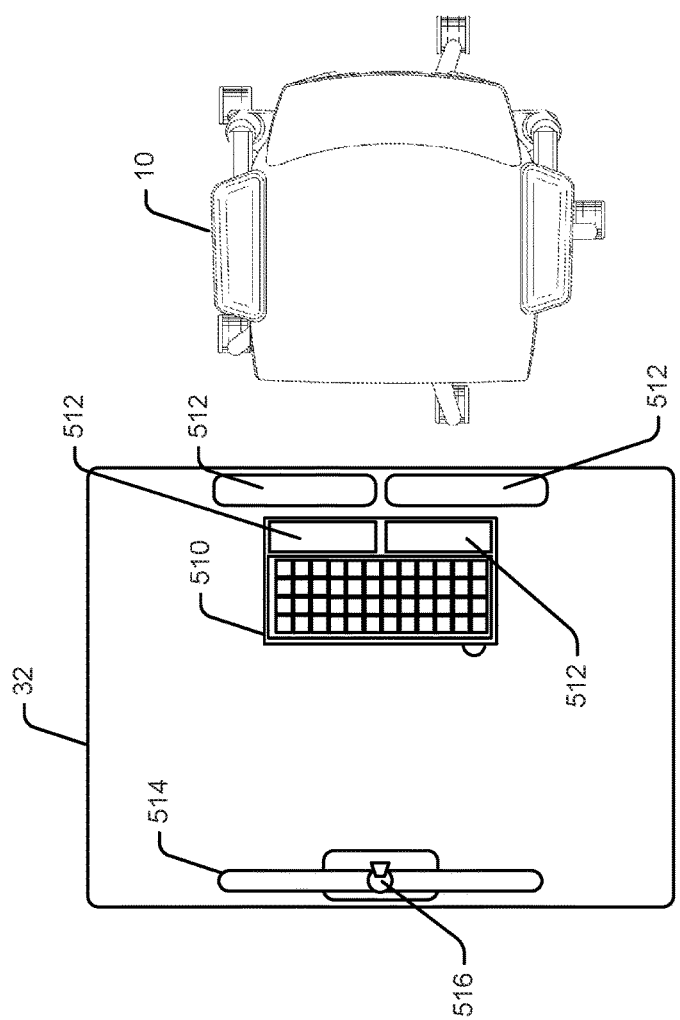
FIG. 31 is a chair assembly located in front of a work surface having various sensors thereon, in accordance with an aspect of the present disclosure.

A user input module or remote user input module can be an audio sensor, such as a microphone (see, 538 of FIG. 6 and 540 of FIG. 31). A user input can be in form of a voice command, a specific sound indicative of a command, a clap of the hands indicative of a command, or any other audio that a user is capable of generating and which the processor has been programmed to interpret.

In an aspect, a sensing module or combined sensing/application module can include a temperature sensing module configured to measure the temperature at one or more locations on or around the chair assembly 10. Examples of a temperature sensing module include, but are not limited to, a thermometer, a thermocouple, a thermistor, combinations thereof, and other temperature sensing means known to those having ordinary skill in the temperature sensing arts. The temperature sensing module can be configured to transmit a temperature sensing signal to the processor representative of the sensed temperature. The temperature sensing module can be located at any suitable location for sensing temperature of a chair user or some chair component (e.g., the surface of a material that is in contact with a user).

In an aspect, a sensing module or combined sensing/application module can include a pressure sensing module for sensing a pressure at one or more locations on the chair assembly 10. Example of a pressure sensing module include, but are not limited to, a pressure sensor, a barometer, combinations thereof, and other pressure sensing means known to those having ordinary skill in the pressure sensing arts. The pressure sensing module can be configured to transmit a pressure sensing signal to the processor 58 representative of the sensed pressure.

In an aspect, a sensing module or combined sensing/application module can include a pressure mapping sensing module for mapping the pressure points of a user relative to the chair assembly 10. The pressure mapping sensing module can include a plurality of pressure sensing modules, pressure sensors, a smart fabric capable of monitoring pressure, combinations thereof, and other pressure mapping means known to those having ordinary skill in the pressure sensing arts. The pressure mapping sensing module can be located in the seat assembly 16, the back assembly 18, or an arm assembly 20. The pressure mapping sensing module is located in the seat assembly 16 in at least some advantageous embodiments.

A remote pressure mapping sensing module can be located remote from the chair assembly 10 and configured to map the pressure points of a user relative to an external surface, such as a functional surface. The remote pressure mapping sensing module can be configured to transmit a pressure mapping sensing signal to the processor representative of the sensed pressure map.

In an aspect, a sensing module or combined sensing/application module can include an optical sensing module for measuring optical radiation from the location of the optical sensor. Examples of optical sensing module include, but are not limited to, a camera, such as a charge-collecting device, a colorimeter, a light-emitting diode configured as a sensor, a fiber optic coupled to a sensing means, a photodetector, a photodiode, a photomultiplier tube, a phototransistor, combinations thereof, and other means of optical sensing known to those having ordinary skill in the optical sensing arts. The optical sensing module can be configured to transmit an optical sensing signal to the processor representative of the sensed optical radiation.

In an aspect, a sensing module or combined sensing/application module can include a LIDAR sensing module adapted to use LIDAR to sense a user, the environment surrounding the chair assembly 10, or both. The LIDAR sensing module can be configured to transmit a LIDAR sensing signal to the processor representative of the sensed LIDAR.

In an aspect, a sensing module or combined sensing/application module can include a radar sensing module adapted to use radar to sense a user, the environment surrounding the chair assembly 10, or both. The radar sensing module can be configured to transmit a radar sensing signal to the processor representative of the sensed radar.

In an aspect, a sensing module or combined sensing/application module can include a sonar sensing module adapted to use sonar to sense a user, the environment surrounding the chair assembly, or both. The sonar sensing module can be configured to transmit a sonar sensing signal to the processor representative of the sensed sonar.

In an aspect, a sensing module or combined sensing/application module can include a displacement sensing module adapted to detect the displacement between two or more portions of the chair assembly 10. Examples of displacement sensing modules include, but are not limited to, a capacitive displacement sensor, an inclinometer, a laser rangefinder, a linear variable differential transformer, a position sensor, a tilt sensor, a variable reluctance sensor, combinations thereof, and other displacement sensing means known to those having ordinary skill in the displacement sensing arts. The displacement sensing module can be configured to transmit a displacement sensing signal to the processor representative of the sensed displacement.

In an aspect, a sensing module or combined sensing/application module can include an occupancy sensing module for sensing the presence or absence of a user in the chair assembly 10; in the vicinity of the chair assembly 10; or in a pre-defined space co-occupied by the chair assembly 10, such as in the same room as the chair assembly 10, on the same floor as the chair assembly 10, or in the same facility as the chair assembly 10.

The occupancy sensing module can include a pressure sensing module adapted to sense the presence or absence of a user in the chair assembly 10 or adapted to sense a change in pressure at one or more locations on the chair assembly 10, the change in pressure indicative of the presence or absence of a user, an optical sensing module, such as a camera, adapted to visually determine the presence or absence of a user, a LIDAR sensing module adapted to use LIDAR to determine the presence or absence of a user, a radar sensing module adapted to use radar to determine the presence or absence of a user, a sonar sensing module adapted to use sonar to determine the presence or absence of a user, a displacement sensing module adapted to use the displacement of a portion of the chair assembly to determine the presence of absence of a user in the chair assembly 10, combinations thereof, and other means of occupancy sensing known to those having ordinary skill in the occupancy sensing arts.

The occupancy sensing module can be configured to transmit an occupancy sensing signal to the processor representative of the presence or absence of a user within the chair assembly 10. In other aspects, the occupancy sensing signal can be representative of the presence or absence of a user in a pre-defined space co-occupied by the chair assembly 10.

In some aspects, a user-based processor can generate an occupancy sensing signal without the use of the occupancy sensing module by utilizing a location feature of the device in which its contained to determine the presence or absence of a user in the chair assembly 10; in the vicinity of the chair assembly 10; or in a pre-defined space co-occupied by the chair assembly 10.

In an aspect, a sensing module or combined sensing/application module can include a foot sensing module for sensing the placement, pressure, or placement and pressure of a user's feet when the user is seated in the chair assembly 10. The foot sensing module can be configured to transmit a foot sensing signal to the processor representative of the sensed placement, pressure, or placement and pressure of the user's feet.

In an aspect, a sensing module or combined sensing/application module can include an orientation sensing module for sensing the state of the chair assembly 10 including, but not limited to, an angle of a part of the chair assembly 10, a height of a part of the chair assembly 10, a rotational angle of a chair assembly 10, combinations thereof, and other means of sensing the orientation of the chair assembly 10 known to those having ordinary skill in the orientation sensing arts. Examples of an orientation sensing module include, but are not limited to, the optical sensing module, the displacement sensing module, combinations thereof, and the like. The orientation sensing module can be configured to transmit an orientation sensing signal to the processor representative of the sensed orientation of the chair assembly 10.

In an aspect, a sensing module or combined sensing/application module can include a proximity sensing module for sensing the proximity of the chair assembly 10 to nearby affordances, irrespective of the chair assembly 10 position or orientation. In some aspects, the proximity sensing module can indicate that a table is some distance to the left of the chair assembly 10, without determining how the table and chair assembly 10 are positioned or oriented with respect to the location that they occupy. In some aspects, the proximity sensing module can be determined by a signal that also contains position or orientation data. The proximity sensing module can be configured to transmit a proximity sensing signal to the processor representative of a proximity of the chair assembly 10 to other affordances.

The orientation or proximity sensing signal can be generated by one or more remote sensors 512 that are remote from the chair assembly 10. For example, a camera 516 that is remote from the chair assembly 10 can acquire an image that is processed to determine the orientation of the chair assembly 10 or the proximity of the chair assembly 10 to a nearby affordance and subsequently generate an orientation or proximity sensing signal representative of the sensed orientation of the chair assembly 10 or proximity of the chair assembly 10 to other affordances.

In an aspect, a sensing module or combined sensing/application module can include a weight sensing module for sensing the weight of a user in the chair assembly 10. The weight sensing module can sense the weight of a user directly, such as by using a weight sensor pad integrated into the chair assembly 10, or indirectly, such as inferring a weight of a user by measuring the amount of displacement of the chair assembly 10 or a displacement or increase in pressure of a pneumatic cylinder that supports the user's body weight. The weight sensing module can be configured to transmit a weight sensing signal to the processor representative of the sensed weight of the user.

In an aspect, a sensing module or combined sensing/application module can include a blood oxygenation sensing module for sensing the oxygenation of the blood of a user. The blood oxygenation sensing module can include one or more transmission pulse oximetry sensors, reflectance pulse oximetry sensors, combinations thereof, and other means of blood oxygenation sensing known to those having ordinary skill in the blood oxygenation sensing arts. The blood oxygenation sensing module can be placed in contact with a user or remote from a user. The blood oxygenation sensing module can be configured to transmit a blood oxygenation sensing signal to the processor representative of the sensed blood oxygenation.

In an aspect, a sensing module or combined sensing/application module can include an electric property sensing module, such as an electromyography sensing module, an electrocardiography sensing module, an electroencephalography sensing module, or any combination thereof for sensing electric properties from a user. Examples of an electric property sensing module include, but are not limited to, a capacitive sensor, a current sensor, a galvanometer, a hall effect sensor, a magnetometer, a magnetic field sensor, a Hall sensor, a voltage sensor, combinations thereof, and other electric property sensing means known to those having ordinary skill in the electric property sensing arts. The electric property sensing module can be configured to transmit an electric sensing signal to the processor representative of the sensed electric property. The electromyography, electrocardiography, and electroencephalography sensing modules can be configured to transmit electromyography, electrocardiography, and electroencephalography sensing signals, respectively, to the processor representative of the respective sensed electromyography, electrocardiography, and electroencephalography.

In an aspect, a sensing module or combined sensing/application module can include a location sensing module for sensing the location of a chair assembly 10 within a particular space. Examples of a location sensing module include, but are not limited to, an optical sensing module, such as a camera, adapted to visually determine the location of the chair assembly 10, a LIDAR sensing module adapted to use LIDAR to determine the location of the chair assembly 10, a radar sensing module adapted to use radar to determine the location of the chair assembly 10, a sonar sensing module adapted to use sonar to determine the location of the chair assembly 10, combinations thereof, and other means of sensing location known to those having ordinary skill in the location sensing arts. The location sensing module may be configured to transmit a location sensing signal to the processor representative of the location of the chair assembly 10. The location sensing signal can be generated by one or more sensors that are remote from the chair assembly 10.

In an aspect, a sensing module or combined sensing/application module can include an aspiration sensing module for sensing the breathing of a user. The aspiration sensing module can determine the breathing rate, the breathing depth, or a combination thereof of a user by directly contacting the user or indirectly by remotely sensing the breathing rate of a user in a location where the breathing rate can be measured, for example, on the back of the user near the diaphragm, on the chest cavity of the user, or combinations thereof. Example of aspiration sensing modules that monitor the heart rate by directly contacting the user include, but are not limited to, one or more electric sensing modules located in a position suitable for coupling to a user's skin, a smart fabric, or combinations thereof, and other aspiration sensing means known to those having ordinary skill in the aspiration sensing arts. Examples of aspiration sensing modules that remotely monitor the heart rate include, but are not limited to, an optical sensing module that can be selectively aimed at one of the locations where the heart rate can be measured, or combinations thereof, and the like. The aspiration sensing module can be configured to transmit an aspiration sensing signal to the processor representative of the sensed aspiration rate or depth.

In an aspect, a sensing module or combined sensing/application module can include a heart rate sensing module for sensing the heart rate of a user. The heart rate sensing module can determine the heart rate of a user by directly contacting the user or indirectly by remotely sensing the heart rate of a user in a location where the heart rate can be measured, for example, on the wrist of the user, behind the knee of the user, or combinations thereof. Example of heart rate sensing modules that monitor the heart rate by directly contacting the user include, but are not limited to, an electric property sensing module, one or more electrodes located in a position suitable for coupling to a user's skin, a smart fabric, or combinations thereof, and other means of directly sensing heart rate known to those having ordinary skill in the heart rate sensing arts. Examples of heart rate sensing modules that remotely monitor the heart rate include, but are not limited to, an optical sensing module, an optical sensor that can be selectively aimed at one of the locations where the heart rate can be measured, or combinations thereof, and other means of remotely sensing the heart rate of user known to those having ordinary skill in the heart rate monitoring arts. The heart rate sensing module can be configured to transmit a heart rate sensing signal to the processor representative of the sensed heart rate.

In an aspect, a sensing module or combined sensing/application module can include an internal motion sensing module for sensing movement of the chair assembly 10. Examples of an internal motion sensing module include, but are not limited to, a gyroscope, a motion detector, the LIDAR sensing module, the radar sensing module, the sonar sensing module, combinations thereof, and other means of sensing internal motion known to those having ordinary skill in the motion sensing arts. The internal motion sensing module can be configured to transmit an internal motion sensing signal to the processor representative of the sensed internal motion.

In an aspect, a sensing module or combined sensing/application module can include an external motion sensing module for sensing movement of a user or other object in the vicinity of the chair assembly 10. Examples of an external motion sensing module include, but are not limited to, a motion detector, the LIDAR sensing module, the radar sensing module, the sonar sensing module, combinations thereof, and other means of sensing external motion known to those having ordinary skill in the motion sensing arts. The external motion sensing module can be configured to transmit an external motion sensing signal to the processor representative of the sensed external motion.

In an aspect, a sensing module or combined sensing/application module can include an audio sensing module for sensing audio in the vicinity of the chair assembly 10. An example of an audio sensing module includes, but is not limited to, a microphone 538 (see, FIG. 6). The audio sensing module can be configured to transmit an audio sensing signal to the processor representative of the sensed audio.

In an aspect, a sensing module or combined sensing/application module can include an olfactory sensing module for sensing the smell of a user or an area surrounding the chair assembly 10. Examples of an olfactory sensing module include, but are not limited to, an olfactometer, an electronic nose, combinations thereof, and other means of sensing olfactory signals known to those having ordinary skill in the olfactory sensing arts. The olfactory sensing module can be configured to transmit an olfactory sensing signal representative of the sensed smell.

In an aspect, a sensing module or combined sensing/application module can include a tactile sensing module for sensing the touch of a user. Examples of a tactile sensing module include, but are not limited to, a smart fabric, a tactile sensor, combinations thereof, and other means of tactile sensing known to those having ordinary skill in the tactile sensing arts. The tactile sensing module can be configured to transmit a tactile sensing signal representative of the sensed touch.

In an aspect, a sensing module or combined sensing/application module can include a maintenance sensing module for sensing an impending or current failure of a part of the chair assembly 10. The maintenance sensing module can be configured to transmit a maintenance sensing signal representative of the need for maintenance.

In an aspect, a sensing module or combined sensing/application module can include an altitude sensing module for sensing the altitude of the chair assembly 10. An example of an altitude sensing module includes, but is not limited to, an altimeter. The altitude sensing module can be configured to transmit an altitude sensing signal representative of the sensed altitude.

In an aspect, a sensing module or combined sensing/application module can include an air flow sensing module for sensing the air flow in and around the chair assembly 10. An example of an air flow sensing module includes, but is not limited to, an air flow meter. The air flow sensing module can be configured to transmit an air flow sensing signal to the processor representative of the sensed air flow.

In an aspect, a sensing module or combined sensing/application module can include a seismic sensing module for sensing seismic activity of the surface on which the chair assembly sits 10. Examples of a seismic sensing module include, but are not limited to, a geophone, a seismometer, combinations thereof, and other means of sensing seismic motion known to those having ordinary skill in the seismic sensing arts. The seismic sensing module can be configured to transmit a seismic sensing signal to the processor representative of the seismic activity of the surface.

In an aspect, a sensing module or combined sensing/application module can include a chemical sensing module for sensing the presence or abundance of a chemical species in the vicinity of the chair assembly 10. Examples of a chemical sensing module can include, but are not limited to, a breathalyzer, a carbon dioxide sensor, a carbon monoxide sensor, a chemical field-effect transistor, an electrochemical gas sensor, a hydrogen sensor, a hydrogen sulfide sensor, a nitrogen oxide sensor, an oxygen sensor, a ozone sensor, a potentiometric sensor, combinations thereof, and other chemical sensing means known to those having ordinary skill in the chemical sensing art. The chemical sensing module can be configured to transmit a chemical sensing signal to the processor representative of the sensed presence or abundance chemical species.

In an aspect, a sensing module or combined sensing/application module can include a moisture sensing module for sensing the presence or abundance of moisture at a location on the chair assembly 10 or in the vicinity of the chair assembly 10. Examples of a moisture sensing module include, but are not limited to, an electric property sensing module, a temperature sensing module, a hygrometer, combinations thereof, and other means of sensing moisture known to those having ordinary skill in the moisture sensing arts. The moisture sensing module can be configured to transmit a moisture sensing signal to the processor representative of the sensed moisture.

In an aspect, a sensing module or combined sensing/application module can include a posture or distribution of weight sensor. This sensor can be a standalone sensor or can be a combination of other sensors from which the posture or distribution of weight is derived or inferred.

In an aspect, a sensing module or combined sensing/application module can include a stress measuring module. This sensor can be a combination of other sensors from which the stress levels of a user are derived.

In an aspect, a sensing module or combined sensing/application module can include a time sensor for determining the length of time that has passed between sensing or actuator events or for determining the time of day.

In an aspect, a sensing module or combined sensing/application module can include a user identity or recognition sensor for determining the identify of a user that is in proximity to the chair assembly 10 or seated in the chair assembly 10.

In an aspect, a sensing module or combined sensing/application module can include a body dimensions sensor for measuring the dimensions of a user's body. For example, the length of a user's femur, the distance between a user's shoulder blades, the circumference of a user's wrist, and other body dimension measurements can be made.

In an aspect, a sensing module or combined sensing/application module can include an alertness or attentiveness sensor for measuring the alertness or attentiveness of a user. This sensor can be a combination of other sensors from which the alertness or attentiveness of a user are derived. For example, an eye-movement sensor can be used to derive the alertness or attentiveness of a user.

In an aspect, a sensing module or combined sensing/application module can include an emotional state sensor. This sensor can be a combination of other sensors from which the emotional state of a user are derived. For example, a galvanic skin response sensor can be used to derive the emotional state of a user.

In an aspect, a sensing module or combined sensing/application module can include a flow sensor. This sensor can be a combination of other sensors from which the flow of a user are derived. For example, a sensor monitoring brain activity can be used to derive the flow of a user.

In an aspect, a sensing module or combined sensing/application module can include an ambient environmental sensor for sensing one or more properties of the ambient environment, including but not limited to, temperature, sound, air flow, light, and the like.

In an aspect, a sensing module or combined sensing/application module can include a microbial sensor for sensing the presence of microbes on or within the chair assembly or on a user.

In an aspect, a sensing module or combined sensing/application module can include a fatigue sensor for measuring the fatigue of a user. This sensor can be a combination of other sensors from which the flow of a user are derived.

In an aspect, a sensing module or combined sensing/application module can include a break necessity sensor for sensing a user's state of needing a break from a given task. This sensor can be a combination of other sensors from which the flow of a user are derived.

In some aspects, sensing modules or combined sensing/application modules can be adapted to only provide a signal when a change of a pre-determined degree has been sensed. This change can be a change within a single sensing module or combined sensing/application module or a collective change between multiple sensing module or combined sensing/application modules. These features can provide power usage efficiency to the sensing modules or combined sensing/application modules.

Application Modules

In an aspect, an application module or combined sensing/application module can include a motion application module, which can move part of the chair assembly 10 or the entire chair assembly 10 in response to a motion application signal. Examples of a motion application module include, but are not limited to, a motor coupled to one or more parts of the chair assembly 10; a smart material and means of providing an external stimulus to actuate the smart material, such as an electroactive material and a means of providing current to the electroactive material, a piezoelectric material and means of providing a voltage, a shape-memory material and a means of adjusting the temperature of the shape-memory material, a magnetostrictive material and means of applying a magnetic field, a pH-sensitive material and a means of adjusting the pH surrounding the pH-sensitive material, a photomechanical material, and a means of providing photons to the photomechanical material, and combinations thereof; a spring-loaded actuator; a pneumatic or hydraulic device; a solenoid; combinations thereof, and other means of applying motion known to those having ordinary skill in the mechanical arts. In one aspect, the motion application module can be a motor coupled to a caster that is affixed to the base assembly 12. The motor can be disconnected while a user is occupying the chair assembly 10 so as to reduce the force necessary to move the chair assembly 10 and to reduce wear on the motor.

In an aspect, to move the entire chair assembly 10, the motion application module can be a motor operatively coupled to a means of impulsion, such as a wheel; a magnetic means of impulsion, such as an electromagnet that is selectively magnetized and moves the chair assembly 10 along a path by virtue of the magnetization; combinations thereof, and other means of impulsion known to those having ordinary skill in the mechanical arts.

Referring to FIG. 5, the chair assembly 10 can include motion application modules, such as motors 39, at various locations that are suitable for moving the various portions of the chair assembly 10.

In an aspect, an application module or combined sensing/application module can include a heating application module for applying heat to a user in response to a heating application signal. Examples of heating application modules can include, but are not limited to, a heating pad, a carbon fiber heating cover, combinations thereof, and other means of applying heat known to those having ordinary skill in the heat application arts. Heating application modules can be located within the back assembly 18 at a location that contacts a user's lower back or lumbar region, including a central portion of the lower back, a peripheral portion of the lower back, or both, a user's mid back, including a central portion of the mid back, a peripheral portion of the mid back, or both, or a user's upper back, including a central portion of the upper back, a peripheral portion of the upper back, or both. Heating application modules can be located within the back assembly 18 at locations that target specific muscles, such as the intratransversarii muscles, the multifidus muscles, the trapezius muscles, the large latissimus dorsi, or any combination thereof.

In an aspect, an application module or combined sensing/application module can include a cooling application module for applying cooling to a user in response to a cooling application signal. Examples of cooling application modules can include, but are not limited to, a fan, a cooling pad, combinations thereof, and other means of applying cooling known to those having ordinary skill in the cooling application arts.

The heating application module and the cooling application module can be separate or can be contained within a single heating/cooling application module in response to a heating/cooling application signal.

In an aspect, an application module or combined sensing/application module can include a pressure application module for applying pressure to a user in response to a pressure application signal. Examples of the pressure application module include, but are not limited to, a motion application module configured to apply pressure to a particular area on a user, combinations thereof, and other pressure application means known to those having ordinary skill in the pressure application arts.

In an aspect, an application module or combined sensing/application module can include a haptic application module for stimulating the sense of touch of a user in response to a haptic application signal. Examples of a haptic application module include, but are not limited to, a vibratory motor, an electroactive material, a piezoelectric material, an acoustic radiation source, combinations thereof, and other means of haptic application known to those having ordinary skill in the haptic arts. In certain aspects, the haptic application module can be a motor 23 located within or affixed to a caster 15 that is disengaged from the caster 15 and engaged with an unbalanced weight to provide vibration to the chair assembly 10.

In an aspect, an application module or combined sensing/application module can include an audio application module for transmitting sound to a user or the vicinity of the chair assembly 10. The audio application module can receive an audio application signal from the processor that carries instructions that direct the audio application module to provide a particular audio response.

Examples of audio application modules can include, but are not limited to, a sound transducer, such as a speaker, an air-induced sound generating device, such as a whistle, a percussive sound generating device, such as an alarm bell, combinations thereof, and other audio sources known to those having ordinary skill in the audio arts.

In an aspect, an application module or combined sensing/application module can include a visual indicator module for providing a visual indication. The visual indicator module can receive a visual indicator signal from the processor that carries instructions that direct the visual indicator module to provide a particular visual indicator. Alternatively, the visual indicator module can receive a signal directly from a separate feature module and can provide a visual indication in response to the signal.

Examples of visual indicator modules can include, but are not limited to, a light-emitting diode, a display screen, a projector, a laser or other light source, one or more optical fibers coupled to a laser or other light source, combinations thereof, and other visual indicators known to those having ordinary skill in the optical arts.

In certain aspects, a remote visual indicator can serve the same function as the visual indicator module, but is not included in the chair assembly 10 itself. The remote visual indicator can be the same kind of visual indicator as set forth above for the visual indicator module. The remote visual indicator can be located on a docking station, within a workspace, on a device including a user-based processor, a facility-based processor, or a global processor, or any combination thereof.

In an aspect, an application module or combined sensing/application module can include a massage application module for applying massage to a user in response to a massage application signal. Examples of massage application modules include, but are not limited to, a haptic application module, a shiatsu massager, combinations thereof, and other means of applying massage known to those having ordinary skill in the massage application arts.

In an aspect, an application module or combined sensing/application module can include an olfactory application module for generating a particular olfactory experience for a user or in the vicinity of the chair assembly 10 in response to an olfactory application signal. Examples of olfactory application modules include, but are not limited to, a nozzle coupled to a source of aroma, a pheromone emitter, combinations thereof, and other means of generating an olfactory experience known to those having ordinary skill in the olfactory arts.

Referring to FIG. 28, a block diagram showing the general electronic configuration of a chair assembly 10 is shown that includes the processor 58, transceiver 67 and power supply 22 described above along with one or more features modules 26 such as sensors and/or application modules. The sensors in a chair assembly may include user input modules 1, 2, . . . , N, temperature sensing modules 1, 2, . . . , N, optical sensing modules 1, 2, . . . , N, electric property sensing modules 1, 2, . . . , N, pressure sensing modules 1, 2, . . . , N, motion sensing modules 1, 2, . . . , N, audio sensing modules 1, 2, . . . , N, olfactory sensing modules 1, 2, . . . , N, tactile sensing modules 1, 2, . . . , N, blood oxygenation sensing modules 1, 2, . . . , N, aspiration sensing modules 1, 2, . . . , N, heart rate sensing modules 1, 2, . . . , N, displacement sensing modules 1, 2, . . . , N, or other sensing modules 1, 2, . . . , N described herein connected in the same fashion.

The application modules in a chair assembly 10 may include motion application modules 1, 2, . . . , N, heating application modules 1, 2, . . . , N, cooling application modules 1, 2, . . . , N, heating/cooling application modules 1, 2, . . . , N, pressure application modules 1, 2, . . . , N, haptic application modules 1, 2, . . . , N, audio application modules 1, 2, . . . , N, visual indicator modules 1, 2, . . . , N, massage application modules 1, 2, . . . , N, olfactory application modules 1, 2, . . . , N, or other application modules 1, 2, . . . , N described herein connected in the same fashion.

As described above, in many cases a user's portable computing device and/or a facility in which a chair assembly resides may include one or more additional sensors and application modules for performing various functions that are consistent with at least some aspects of the present disclosure. In this regard, see, for instance, FIG. 29 where a set of facility sensors and application modules are presented at 430 that may be linked to the facility processor 54. Similarly, see FIG. 30 where a set of user based device sensors and application modules are presented at 440 that may be linked to the user based processor 52. Many of the sensors in FIG. 29 may be integrated into a workstation or at least may be added to an existing station and be linked to a facility or station processor via an internet of things (IOT) as described in more detail hereafter.

Figure 29:
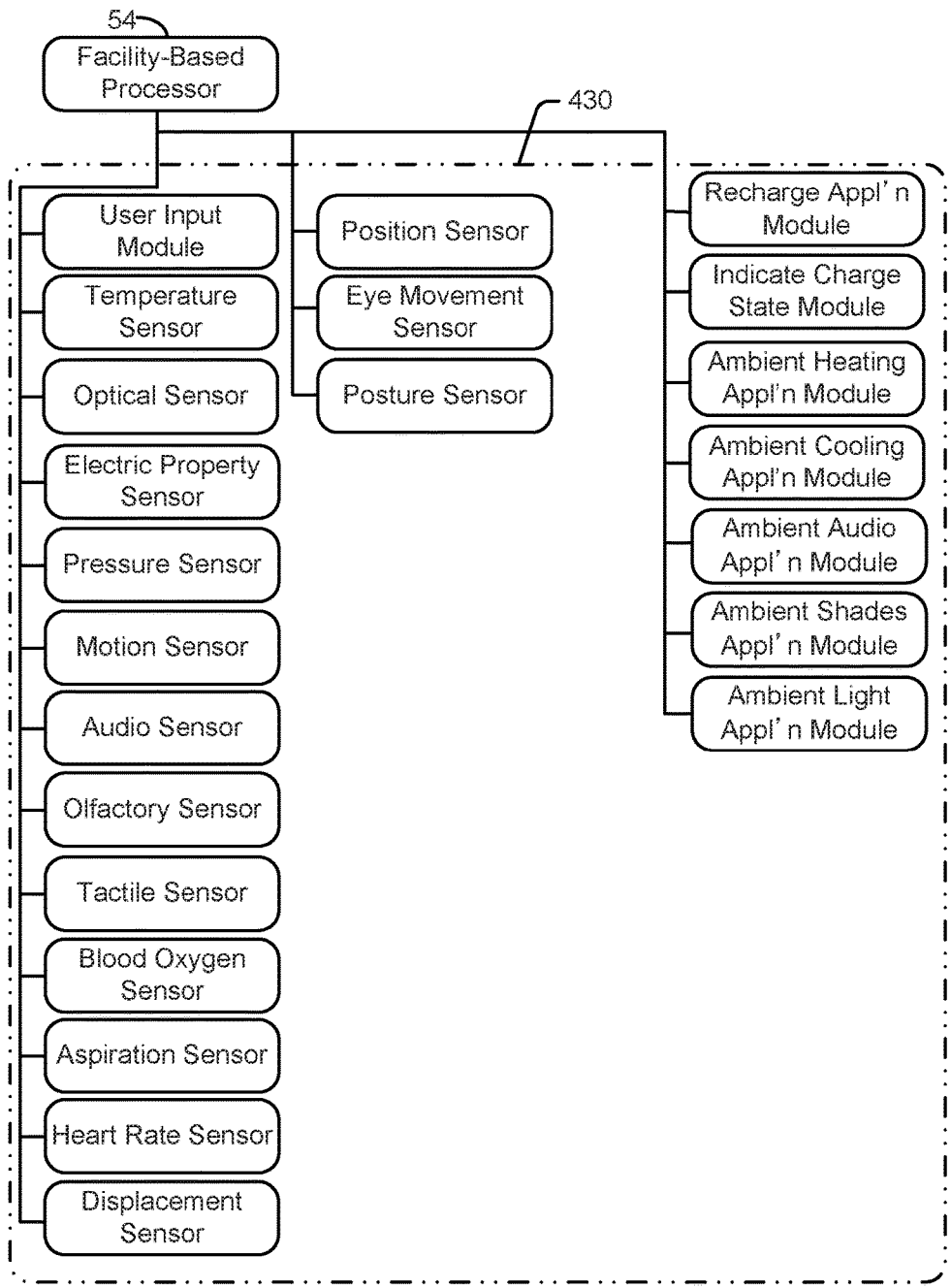
FIG. 29 is a schematic of the electronic configuration of a chair assembly, in accordance with an aspect of the present disclosure.
Figure 30:
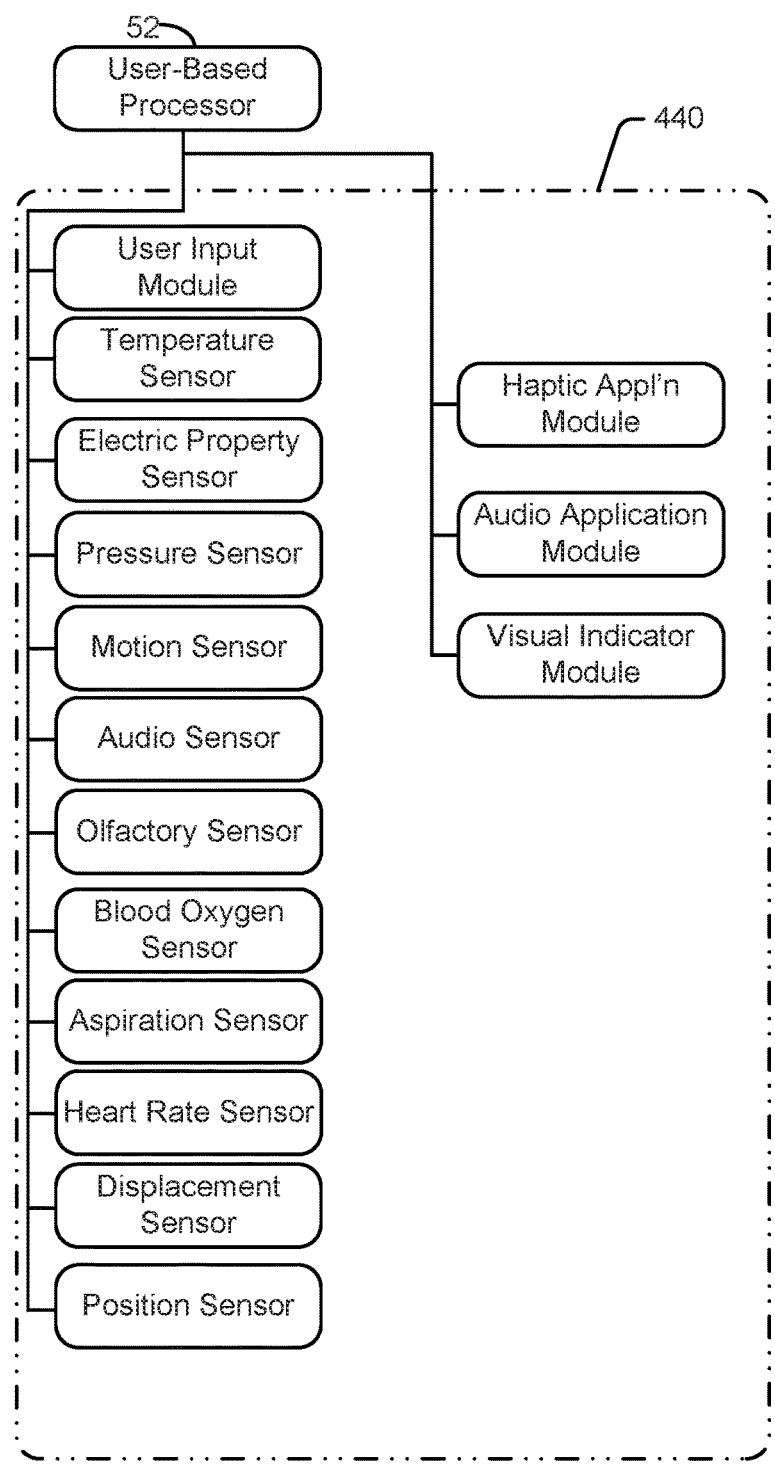
FIG. 30 is a schematic of the electronic configuration of a chair assembly, in accordance with an aspect of the present disclosure.

Referring to FIGS. 28 through 30, the processors 58, 54 and 52 may communicate data, commands and other information back and forth to facilitate any of the processes contemplated herein. In addition, any subset of the sensors and application modules described above may be used to perform various processes. Thus, for instance, a combination of 3 sensors from modules 26, 2 sensors from modules 440 and one sensor from modules 430 may be combined to generate three command signals that are used to drive three separate application modules, one in each of the module sets 26, 420 and 430. Many processes that use many different sensor combinations and control many different sets of application modules are contemplated in this disclosure.

Modes of Operation

In an aspect, the processor can be configured to operate in an occupancy sensing mode to sense the presence or absence of a user in the chair assembly 10; in the vicinity of the chair assembly 10, or in a pre-defined space co-occupied by the chair assembly 10, such as in the same room as the chair assembly 10, on the same floor as the chair assembly 10, or in the same facility as the chair assembly 10.

The occupancy sensing mode can be triggered by an occupancy sensing signal, a user input signal, a temperature sensing signal, a pressure sensing signal, a pressure mapping sensing signal, a pressure mapping sensing signal, an optical sensing signal, a LIDAR sensing signal, a radar sensing signal, a sonar sensing signal, a displacement sensing signal, a foot sensing signal, a weight sensing signal, a blood oxygenation sensing signal, an electric property signal, an electromyography sensing signal, an electrocardiography sensing signal, an electroencephalography sensing signal, an aspiration sensing signal, a heart rate sensing signal, an internal motion sensing signal, an external motion sensing signal, an audio sensing signal, an olfactory sensing signal, a tactile sensing signal, or any combination thereof.

In some aspects, processor 58 can receive an occupancy signal from outside the chair assembly 10 that indicates that a user has just begun occupying the chair assembly 10, that the user may occupy the chair assembly 10 in the near future, or that the user is intending to occupy the chair assembly 10 in the near future. For example, an access key to a certain area of the facility can trigger the access key reader or electronics associated with the access key reader to provide an occupancy signal to the processor; identifying a user on a camera that provides images of a certain area of the facility using facial recognition or other recognition software, such as an employee badge or other wearable piece that emits or reflects light in a way that can be acquired by a camera, can trigger the delivery of an occupancy signal to the processor; and combinations thereof.

When operating in the occupancy sensing mode, the processor can be configured to generate a processor occupancy sensing signal for use in the processor or to transmit a processor occupancy sensing signal. The processor occupancy sensing signal can correspond to the presence or absence of a user in the chair assembly 10; in the vicinity of the chair assembly 10; or in a pre-defined space co-occupied by the chair assembly 10, such as in the same room as the chair assembly 10, on the same floor as the chair assembly 10, or in the same facility as the chair assembly 10. The processor occupancy sensing signal can be the same as or different than the occupancy sensing signal.

Upon sensing the presence of a user in the chair assembly 10; in the vicinity of the chair assembly 10; or in a pre-defined space co-occupied by the chair assembly 10, such as in the same room as the chair assembly 10, on the same floor as the chair assembly 10, or in the same facility as the chair assembly 10, the processor can be configured to provide a motion application signal to a motion application module, a heating application signal to a heating application module, a cooling application signal to a cooling application module, a cooling/heating application signal to a cooling/heating application module, a pressure application signal to a pressure application module, a haptic application signal to a haptic application module, an audio application signal to an audio application module, a visual indicator signal to a visual indicator module, a massage application signal to a massage application module, an olfactory application signal to an olfactory application module, or any combination thereof.

If a chair-assembly-based or user-based processor is operating in an occupancy sensing mode, the chair-assembly-based or user-based processor can record on associated memory a single-user occupancy record including the time that the user occupies the chair assembly 10. For example, the chair-assembly-based or user-based processor can record data to associated memory indicating that a user occupied the chair assembly 10 during a specific time frame and was near the chair assembly 10 during a different specific time frame.

If a facility-based or global processor is operating in an occupancy sensing mode, the facility-based or global processor can provide real-time monitoring of the use of chairs for a group of users, can record user-specific data to a single-user occupancy sensing record or a multi-user occupancy sensing record indicating the time that the user or users occupy the chair assembly 10, or a combination thereof. For example, the facility-based or global processor can display a real-time picture or real-time statistics of chair usage for a facility or group of users. As another example, the facility-based or global processor can record data to associated memory indicating the chair assembly 10 usage habits of a user or group of users.

In an aspect, the processor can be configured to operate in a user-identification mode, where the processor identifies the particular user that is occupying a chair assembly 10 or a particular user than might imminently occupy the chair assembly 10. When operating in the user-identification mode, the processor can be configured to generate a user-identification signal for use in the processor, to transmit a user-identification signal, or both. The user-identification signal can correspond to the identity of a specific user. The user-identification signal can be utilized in one or more of the operation modes described herein.

In an aspect, the processor can be configured to operate in a user-specific configuration mode, where the processor configures the chair assembly 10 to a particular user's desired configuration. The user-specific configuration mode can be triggered by the user-identification signal or another signal identifying a specific user. The particular user's desired configuration can be stored on memory accessible by the processor. On receiving a user-identification signal, the processor can provide a user-specific motion application signal to a motion application module, a user-specific heating application signal to a heating application module, a user-specific cooling application signal to a cooling application module, a user-specific cooling/heating application signal to a cooling/heating application module, a user-specific pressure application signal to a pressure application module, a user-specific haptic application signal to a haptic application module, a user-specific audio application signal to an audio application module, a user-specific visual indicator signal to a visual indicator module, a user-specific massage application signal to a massage application module, a user-specific olfactory application signal to an olfactory application module, or any combination thereof.

For example, the user-specific configuration mode can direct the chair assembly 10 to: move to a certain chair configuration that is tailored to the user; apply heating or cooling at certain locations that are tailored to the user; apply pressure at certain locations that are tailored to the user; apply certain haptic effects at certain locations that are tailored to the user; provide an audio environment that is tailored to the user; provide a visual environment that is tailored to the user; provide a massage application at certain locations that is tailored to the user; provide an olfactory experience that is tailored to the user; or a combination thereof.

A user-based processor can be configured to override other processors by transmitting an override user configuration signal that identifies the particular user to which the user-based processor is associated. For example, when a user enters a facility, a room containing the chair assembly, or sits in the chair assembly, the user-based processor can instruct a particular chair assembly 10 to be configured for the particular user's desired configuration, which can be stored on memory accessible by the processor.

In an aspect, the processor can be configured to operate in a posture determination mode to determine the posture of a user occupying the chair assembly 10. In the posture determination mode, the processor receives one or more signals from one or more sensing modules or combined sensing/application modules and determines the posture of the user. The processor can use a user input signal, a pressure sensing signal, a pressure mapping sensing signal, an optical sensing signal, a LIDAR sensing signal, a radar sensing signal, a sonar sensing signal, a displacement sensing signal, an occupancy sensing signal, a processor occupancy sensing signal, a foot sensing signal, an orientation sensing signal, an internal motion sensing signal, an external motion sensing signal, a tactile sensing signal, or a combination thereof. When operating in the posture determination mode, the processor can be configured to generate a posture sensing signal for use in the processor or to transmit a posture sensing signal. The posture sensing signal can correspond to a determined posture of the user.

Upon sensing the posture of the user, the processor can be configured to respond by providing a motion application signal to a motion application module, a heating application signal to a heating application module, a cooling application signal to a cooling application module, a cooling/heating application signal to a cooling/heating application module, a pressure application signal to a pressure application module, a haptic application signal to a haptic application module, an audio application signal to an audio application module, a visual indicator signal to a visual indicator module, a massage application signal to a massage application module, an olfactory application signal to an olfactory application module, or any combination thereof.

In response to a posture sensing signal, the processor can be configured to operate in a posture adjustment mode to adjust the posture of the user by providing a posture-adjusting motion application signal to a motion application module, a posture-adjusting heating application signal to a heating application module, a posture-adjusting cooling application signal to a cooling application module, a posture-adjusting cooling/heating application signal to a cooling/heating application module, a posture-adjusting pressure application signal to a pressure application module, a posture-adjusting haptic application signal to a haptic application module, a posture-adjusting audio application signal to an audio application module, a posture-adjusting visual indicator signal to a visual indicator module, a posture-adjusting massage application signal to a massage application module, a posture-adjusting olfactory application signal to an olfactory application module, or any combination thereof.

For example, if the posture sensing mode determines that a user is sitting with bad posture, the chair assembly 10 can induce the user to adopt a better posture position by doing one or more of the following: the motion application module or modules can provide motion to the chair assembly 10 in a way that induces improved posture; the heating, cooling, or heating/cooling application module can apply heating or cooling to particular places on the user that induce improved posture, for example, to the lower back of a user or to the upper back of a user; the pressure application module can apply pressure to particular places on the user that induce improved posture; the audio application module can provide an audio cue, the visual indicator signal can provide a visual cue, the haptic application module can provide a haptic cue, the olfactory application signal can provide an olfactory cue, or a combination thereof to instruct the user that the user is sitting with bad posture and to suggest that the user adopt a better posture; the massage application module can apply massage to the user in ways that induce improved posture. The conditions that improve a user's posture can be pre-programmed, can be based on an average effect for a group of users, can be based on a scientific study of improved posture, can be learned by the processor over time, or any combination thereof.

In an aspect related to the posture adjustment mode, the processor can be configured to operate in a blood flow improvement mode where the aforementioned posture adjustment mode is specialized for the purpose of improving blood flow in the user.

In an aspect, the processor can be configured to operate in an automatic motion mode to provide motion to the chair assembly 10 without necessitating a user input. Generally, in the automatic motion mode, the processor can be programmed to provide a motion signal to one or more motion application modules in response to a pre-determined automatic motion condition. The pre-determined automatic motion condition can include an occupancy sensing signal or processor occupancy sensing signal indicating the presence or absence of a user, an optical sensing signal indicating the presence or absence of a user, an audio sensing signal indicating the presence or absence of a user, the triggering of the user specific configuration mode, the triggering of the posture adjustment mode, or a combination thereof.

The automatic motion mode can include moving the chair assembly 10 to a different position within a workspace. The automatic motion mode can move the chair assembly 10 without a user seated in the chair assembly 10. The automatic motion mode can move the chair assembly 10 with a user seated in the chair assembly 10.

In an aspect, the processor can be configured to operate in a manual motion mode to provide motion to the chair assembly 10 based at least partially on a user input. Generally, in the manual motion mode, the processor can be programmed to provide a motion signal to a motion application module in response to a signal from to the user input module indicating that a user has instructed the chair assembly 10 to move in a particular fashion.

The manual motion mode can include manually adjusting parameters of the chair assembly 10 to be tailored for a specific user. The manual motion mode can include moving the chair assembly 10 to a different position within a workspace at least partially in response to a user command provided to the user input module or remote user input module and communicated to the processor.

As a subset of the automatic motion mode or the manual motion mode, the processor can be configured to operate in a return-to-docking-station mode. In the return-to-docking-station mode, the processor can provide a motion application signal that directs one or more motion application modules to move the chair assembly 10 to the docking station to allow the chair to recharge at the docking station. The return-to-docking-station mode can be triggered by an occupancy sensing signal or processor occupancy sensing signal indicating the absence of a user, a user input signal directing the chair assembly 10 to return to the docking station, a power level signal that is below a pre-determined threshold, or a combination thereof.

As a subset of the automatic motion mode or the manual motion mode, the processor can be configured to operate in a move-to-recharging-position mode. In the move-to-recharging-position mode, the processor can provide a motion application signal that directs the motion application module to move the chair assembly 10 to a recharging position to allow the chair to recharge at the docking station. The move-to-recharging-position mode can be triggered by an occupancy sensing signal or processor occupancy sensing signal indicating the absence of a user, a user input signal directing the chair assembly 10 to move to a recharging position, a power level signal that is below a pre-determined threshold, or a combination thereof.

In an aspect, the processor can be configured to operate in a heating application mode to apply heating to one or more specific locations on a user. In heating application mode, the processor can transmit a heating application signal to one or more heating application modules.

In an aspect, the processor can be configured to operate in a cooling application mode to apply cooling to one or more specific locations on a user. In cooling application mode, the processor can transmit a cooling application signal to one or more cooling application modules.

In an aspect, the processor can be configured to operate in a pressure application mode to apply pressure to one or more specific locations on a user. In pressure application mode, the processor can transmit a pressure application signal to one or more pressure application modules.

In an aspect, the processor can be configured to operate in a combined heating/pressure application mode or a combined cooling/pressure application mode. The combined heating/pressure application mode and combined cooling/pressure application mode can be configured substantially the same as the respective heating application mode and pressure application mode or cooling application mode and pressure application mode, but with a respective transmission of combined heating and pressure signal or cooling and pressure signal.

In an aspect, the processor can be configured to operate in a massage mode to apply massage to one or more specific locations on a user. In massage mode, the processor can transmit a massage application signal to one or more massage application modules.

In an aspect, the processor can be configured to operate in a haptic modification mode to alter the sense of feel of a user relative to the chair assembly 10. In haptic modification mode, the processor can transmit a haptic application signal to one or more haptic application modules.

In an aspect, the processor can be configured to operate in an olfactory modification mode to modify the olfactory environment of a user or the chair assembly 10. In olfactory modification mode, the processor can transmit an olfactory application signal to one or more olfactory application modules.

In an aspect, the processor can be configured to operate in a discomfort sensing mode. In discomfort sensing mode, the processor can generate a discomfort sensing signal for use within the processor or for transmission to a separate processor or one or more feature modules. The discomfort sensing mode can be triggered by a user input signal representing a user indication of discomfort, or a temperature sensing signal.

In an aspect, the processor can be configured to operate in a discomfort prevention mode. Discomfort prevention mode can be triggered by a discomfort sensing signal indicating that the user is experiencing discomfort. In discomfort prevention mode, the processor can activate one or more application modules to reduce the user's discomfort.

In an aspect, the processor can be configured to operate in a stress sensing mode. In stress sensing mode, the processor can generate a stress sensing signal for use within the processor or for transmission to a separate processor or one or more feature modules.

In an aspect, the processor can be configured to operate in a stress reduction mode. Stress reduction mode can be triggered by a stress sensing signal indicating that the user is experiencing stress. In stress reduction mode, the processor can activate one or more application modules to reduce the user's stress.

In an aspect, the processor can be configured to operate in a chair maintenance mode. In the chair maintenance mode, the processor can receive a maintenance sensing signal indicating that the chair assembly 10 is in need of maintenance. The processor can subsequently communicate the need for maintenance to the user, a facilities manager, a repair company, or other individual or group that could attend to the maintenance. The chair maintenance mode can be triggered by sensing an impending or current failure of a part of the chair assembly 10.

The chair maintenance mode can be triggered by a user, for example, by a maintenance signal provided to the processor by the user input module indicating that the chair is in need of maintenance in response to a user command at the user input module. For example, a user can identify a damage to the chair assembly 10, such as a tear in fabric, a malfunctioning feature module, rechargeable power supply, wheel, or cylinder, then the user can command the user input module to communicate a maintenance signal to the processor, and the processor can notify the appropriate party.

In an aspect, the processor can be configured to operate in a chair assembly 10 tracking mode. In the chair assembly 10 tracking mode, the processor can interface with one or more sensors that are adapted to determine the location of the chair assembly 10 having a corresponding tag that can be sensed by the one or more sensors, including, but not limited to, RFID sensors and an RFID tag, barcode scanners and a barcode, combinations thereof, and other location sensors and corresponding tags known to those having ordinary skill in the item tracking arts.

In an aspect, the processor can be configured to operate in a feedback mode to provide feedback to a user, a facilities manager, or other individual or group. In feedback mode, the processor can transmit a feedback signal to the processor or to another external computing device. The feedback mode can provide feedback regarding the occupancy status of a chair assembly 10 or a group of chair assemblies.

The feedback mode can provide feedback regarding change in a user's weight. Feedback regarding change in a user's weight can be provided to a facility-wide or global database or real-time monitoring, a user-specific database, a visual indicator, such as a display screen, an audio indicator, such as a speaker, or a combination thereof.

The feedback mode can provide feedback regarding the charge state or charging status of the rechargeable power supply 22. The feedback regarding the charge state or charging status of the rechargeable power supply 22 can be provided to a facility-wide or global database or real-time monitoring, a visual indicator, such as an LED that indicates that the rechargeable power supply 22 is being charged or is fully charged, an audio indicator that makes a sound when the rechargeable power supply becomes fully charged, or a combination thereof.

In an aspect, the processor can be configured to operate in an environment adjustment mode. In the environment adjustment mode, the processor can be configured to provide an environment adjustment signal to one or more adjustable features within the environment, such as the lighting within the environment, a desk height, the transparency of selectively-transparent glass in the environment, the positioning of window treatments (e.g., blinds, shades, curtains) in the environment, or a combination thereof.

In an aspect, the processor can be configured to operate in a power saving mode where the processor prioritizes power delivery to certain function modules based on a pre-determined prioritization.

In an aspect, the chair assembly 10 can operate in an unpowered mode where the power supply is disconnected or fully discharged. The chair assembly 10 can enter unpowered mode in response to a user instruction from the user input module. In some aspects, a user can interact with the user input module in a fashion that indicates the user's desire to enter the chair assembly into the unpowered mode (for example, by flipping a switch from "powered mode" to "unpowered mode", by pressing a "enter/exit powered/ unpowered mode" button, by entering a certain gesture to a touch-pad, or the like), then the user input can send a signal to the processor indicating that unpowered mode is desired. The processor can then send a signal to the power supply that causes the power supply to stop emitting power or causes the power supply to be electrically isolated from the feature modules. It is therefore evident that the particular embodiments disclosed above may be altered or modified and all such variations are considered within the scope and spirit of the invention. Accordingly, the protection sought herein is as set forth in the claims below.

Referring to FIG. 31, a chair assembly 10 can be positioned in front of a work surface in a position where a user could use a keyboard 510 on the workstation table or desk 32. The desk 32, the keyboard 510, or both can include one or more remote sensors 512 configured to sense one or more of the properties discussed herein. On top of the desk 32, a monitor 514 can be placed, with an optional camera 516 affixed to the top of the monitor 514 for optically sensing a user that is occupying the chair assembly 10. Also on the desk, a microphone 540 can be positioned for sensing audio from a location remote from the chair. While specific locations are shown for the remote sensors 512, the camera 516, and the microphone 540, it is contemplated that they can be positioned anywhere that they can serve their respective purpose.

Figure 32:
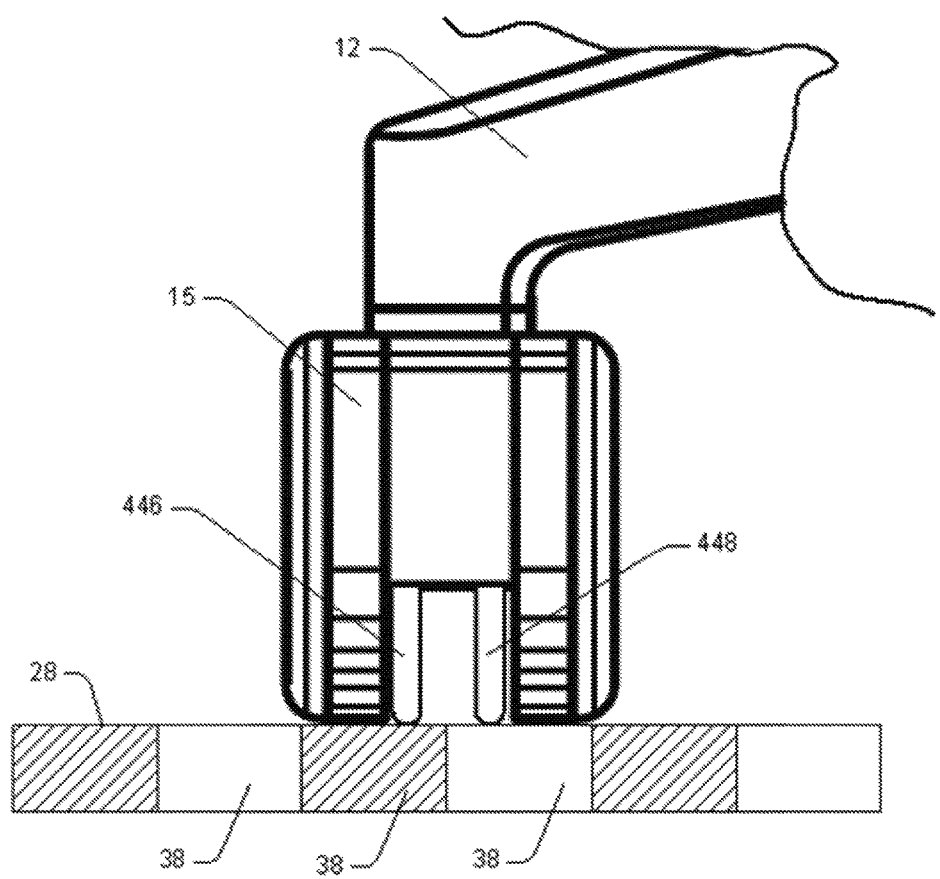
FIG. 32 is a caster of a chair assembly having recharging probes that can interface with a recharging mat, in accordance with an aspect of the present disclosure.

In other embodiments, referring to FIG. 32, it is contemplated that recharging probes 446 and 448 can be located within the one or more casters 15 affixed to the chair base 12, such as between two wheels of the caster 15. The chair base 12 is shown resting on a charging mat 28 having charging zones 38 of alternative polarity. The recharging probes 446 and 448 can be spaced to ensure that they are always interfacing with charging zones having opposite polarity, such as neighboring charging zones 38 having opposite polarity.

Figure 33:
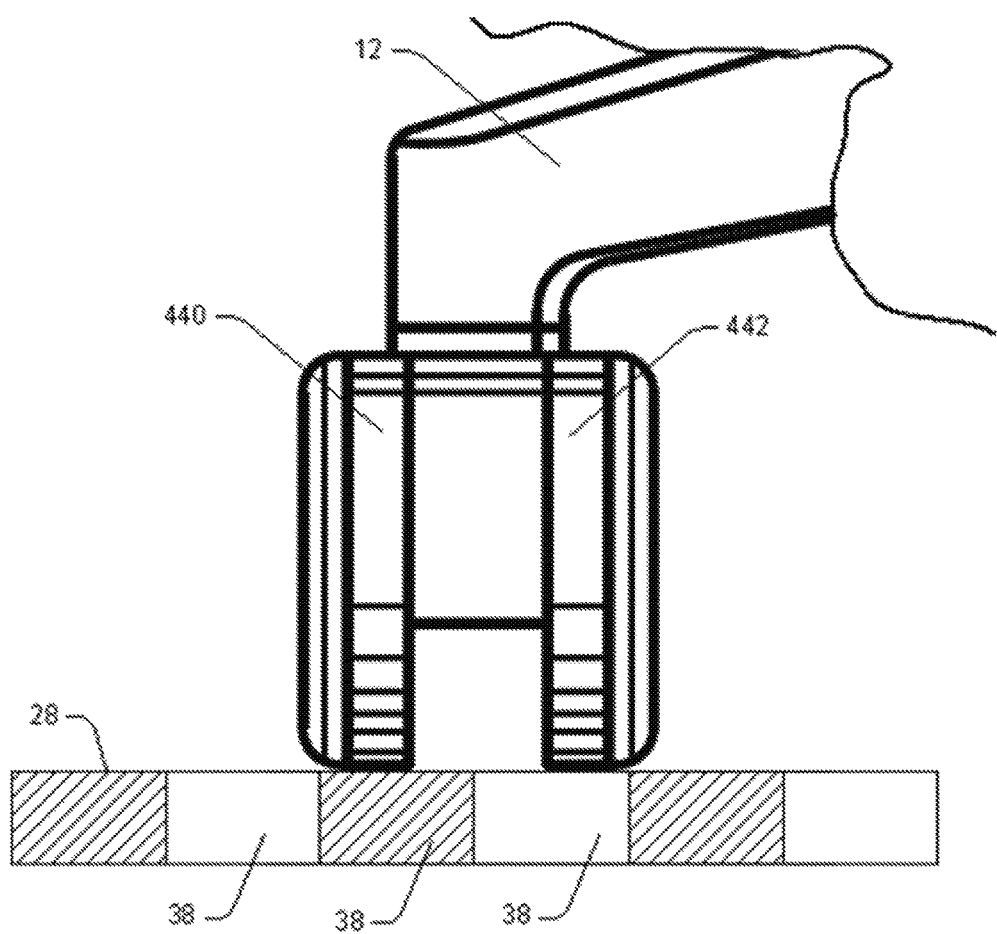
FIG. 33 is a caster of a chair assembly having recharging-probe-containing wheels that can interface with a recharging mat, in accordance with an aspect of the present disclosure.

In other embodiments, referring to FIG. 33, it is contemplated that recharging-probe-containing wheels 440 and 442 of one or more casters 15 affixed to the chair base 12 can be used for recharging. In this embodiment, the wheels of the caster 15 are themselves recharging probes. The chair base 12 is shown resting on a charging mat 28 having charging zones 38 of alternative polarity. The recharging-probe-containing wheels 440 and 442 can be spaced to ensure that they are always interfacing with charging zones having opposite polarity, such as neighboring charging zones 38 having opposite polarity.

As mentioned briefly above, in some embodiments it is contemplated that a personal device like a cell phone or a wearable device like a wrist band based device may perform various methods that are used with a chair assembly 10. In at least some cases it is contemplated that a chair assembly and other system devices (e.g., feature modules like sensors and actuators) may be able to perform many different functions and processes and that a user may select one or more different processes at her preference to be performed. Here, in at least some cases, a user may access an on line applications web site and down load applications to the user's personal device for controlling chair and facility affordances. For instance, the applications may include heating applications that can be used to control heating devices located in the chair seat, backrest, arm rests, etc. In this case, a chair user may control chair heating elements manually via a user input screen on the user's personal device or the user's personal device processor may automatically control chair component heating elements based on sensed data or a programmed heating cycle. As another instance, the applications may include different types of backrest movement applications that can be downloaded to the user's personal device for control backrest position either manually or automatically based on sensed data or user preferences. For example, a user may use an application to select different backrest positions at different times of the day and then, each day, the user's personal device processor 52 may control the chair to cycle through the specified positions when the user's device is proximate the chair and the user is located in the chair. Thus, in some cases a user's personal device processor may control the chair based on any of a large number of user selectable applications that are downloaded from a web site or the like.

Referring again to FIG. 8, in other embodiments a chair user may use a computer 427 (see FIG. 8) proximate a chair 10 to access applications on a web site and download those applications to either the computer itself to control operations or to the chair processor 58 to control chair and other operations. Again, here, the chair 10 may be purchased with hardware to perform a large number of applications, only a small number of which are enabled or loaded into system processors and thereafter, a user may be able to change the applications run by any of the system processors to fit user preferences.

As discussed elsewhere, the chair assembly 10 can operate in an occupancy sensing modes. Referring to FIG. 1, the occupancy sensing can be achieved by an intelligent fabric located on the top surface 21 of the seat assembly 16, the front surface 35 of the back assembly 18, or the top surface 55 of the forearm rest member 53; a pressure sensing module located at the front edge portion 23, rear portion 45, first or second lateral portions 41 and 43 of the top surface 21 of the seat assembly 16, the central portion 27, the first or second lateral portions 29 and 31, or the upper or lower portion 141 and 37 of the front surface 35 of the back assembly 18; or the top surface 55 of the forearm rest member 53. A presence sensing switch as described herein can occupy the same locations set forth for the occupancy sensing module.

In response to a user input indicating availability or a sensed condition that the processor is programmed to interpret as indicating availability, the processor can send an availability signal indicating that the user of the chair is available to the facility-based processor, a separate user's user-based processor, or any other processor remote from the chair assembly 10. This feature allows a facility manager to quickly assess the portion of the workforce that is available to accomplish a specific task or allows a co-worker to determine whether an unscheduled meeting would be welcomed by the user.

This disclosure contemplates that the aforementioned sensing modules and processors can be utilized to monitor activity of a user, such as movement of a user, sound produced by a user, including talking, and the like.

This disclosure contemplates that the aforementioned sensing modules and processors can be utilized to measure the frequency or magnitude of a user's muscle action.

This disclosure contemplates that the aforementioned sensing modules and processors can be utilized to determine the state of the chair assembly 10, such as the height, various angles, rotational movements, and the like.

This disclosure contemplates that the aforementioned sensing modules, application modules, and processors can be utilized to achieve a therapeutic benefit for a user. For example, the processor can use sensing modules to monitor one or more properties of a user that are related to the user's health, the processor can use application modules to alter one or more properties of a user that are related to the user's health, or a combination thereof.

This disclosure contemplates that the aforementioned sensing modules, application modules, and processors can be utilized to improve a comfort level of a user. The improvement in comfort level can be automatic, in response to a sensed comfort level that can be determined by a processor using signals from one or more sensing modules that sense a property that is associated with comfort. The automatic comfort improvement can be perceptible by a user or imperceptible by a user. The improvement in comfort level can be user-controlled, in response to a user input signal from a user input. The user-controlled comfort level improvement gives a user the feeling of heightened control over their comfort.

In at least some embodiments it is contemplated that operating characteristics of the chair may be controlled in a manner that encourages a chair user to behave in desirable or healthy ways. For instance, it is known that a posture in which a user engages fully the upright backrest is, in general, a relatively healthy posture for a person sitting in a task chair for a period of time. It is also known that many people enjoy having heat applied to their backs for various reasons including therapy, comfort, etc. In a simple case, referring again to FIG. 1, heat may be applied to at least a portion of the front surface of a backrest assembly 18 at one or more locations that a typical chair user's back cannot contact unless the user is sitting in a generally upright position. For instance, heat may be applied to a lower section 37 of a backrest surface below a lumbar region which can only be contacted by a user's lower back when the user has her buttocks pushed back toward the rear portion of the chair seat 16 which is consistent with an upright posture. As another instance, only the central lumbar region 27 of the backrest assembly 18 may be heated so that a chair user is required to sit back against that central section to feel the heat. In other cased one or more of a shoulder support region 141 and/or left or right lumbar regions 29 or 31 may be heated if appropriate to encourage proper posture.

In still other embodiments heat may be applied to any one or more portions of the top surface of the seat assembly 16 in order to encourage proper posture. For example, see again FIG. 1 where heat may be applied to the rear portion 45 of the top surface of the seat assembly to encourage a seated user to move her buttocks rearward or heat may be applied to one or the other of left and right portions 41 and 43 of the top surface of the seat assembly 16.

Referring to FIG. 5, the chair assembly 10 can include motion application modules in the form of motors 39 that can actuate parts of the chair assembly 10. Motors 39 can also be located anywhere on a chair assembly 10 that application modules are shown.

The motors 39 can be positioned in the chair assembly 10 at locations where the chair assembly 10 is traditionally configured to move in response to manual motion, such as on a post member 17 that extends upward from the base member 13, at a joint of a support for the arm assembly 20, at a joint between the back assembly 18 and the rest of the chair assembly 10, locations where motion is described elsewhere herein, and the like. The motors 39 can be coupled to a mechanical mechanism that is traditionally located within a chair assembly 10, such as a hydraulic actuator, an arm articulation mechanism, a back recline mechanism, and the like.

The motors 39 can also be positioned at locations in the chair assembly 10 to provide motion at locations that are not traditionally associated with motion of a chair assembly 10, such as a motor 39 positioned to selectively extend a lumbar support in response to a posture sensing signal indicative of a need for lumbar support, a motor 39 positioned to selectively extend an upper back support in response to a posture sensing signal indicative of a need for upper back support, a motor 39 positioned to selectively move the seat assembly 16 backward to bring a user's back into better contact with the back assembly 16 in response to a posture sensing signal indicative of a user not engaging the back assembly 18, and the like.

While some motors for moving a chair assembly and adjusting chair assembly component juxtapositions are described above, other motor locations, arrangements and combinations are contemplated. For instance, in some cases one motor may be provided on the post between a chair base and the seat support structure for rotating the seat and other components supported by the support structure to different angular orientations relative to the base. Here, a second motor may be mounted to a caster for moving the chair about in a space. In this case, the first and second motors should be able to move and angularly orient the chair assembly in essentially any location and orientation within a space that is not blocked by other affordances. Many other motor combinations for moving a chair are contemplated.

As another example of a motion application module, the chair assembly can include one or more airbags that inflate in response to a signal from a processor to move the top surface 21 of the seat assembly 16 or the top surface 55 of the forearm rest member 53 substantially upward and downward, or the front surface 35 of the back assembly 18 substantially forward and backward. The airbags can also provide movement along any of the contours of the surfaces described herein. Airbags can be located at the front edge portion 23, rear portion 45, first or second lateral portions 41 and 43 of the top surface 21 of the seat assembly 16, the central portion 27, the first or second lateral portions 29 and 31, or the upper or lower portion 141 and 37 of the front surface 35 of the back assembly 18; or the top surface 55 of the forearm rest member 53.

In some cases chair settings may be altered as a function of a user's weight, size, height or other body dimensions (e.g., leg length, arm length, torso dimensions) that may be sensed prior to or while the user is supported by the chair. For instance, in some cases where airbags are provided in a seat or backrest assembly, the amount of air in the airbags may be adjusted based on a measured weight of a chair user. In other cases, where a user has particularly long arms, chair arm rests may be moved forward to support a user's arms in an optimal fashion.

It is also known that in many cases, while an upright posture is generally healthy, movement of a chair user's body during a several hour period is also generally advantageous. In at least some embodiments chair conditions may be changed over time to encourage movement and other healthy behaviors. For instance, in the case where heat can be applied to different locations on the front surface of a backrest assembly or the top surface of a seat or both, in at least some cases a system processor (e.g., 52, 54, 58, etc.) may be programmed to cycle heat to different locations on the surfaces thereby encouraging the seat user to move to continue to feel the applied heat. Thus, referring again to FIG. 1, heat may first be applied to the lower back portion 37 of backrest assembly 18 for 15 minutes. After the first 16 minute period, heat may be applied to the top portion 141 of the backrest assembly 18 for the next 15 minutes. Then, heat may be applied to the left portion 29 of the backrest assembly for 15 minutes and then applied to the right hand portion for 15 minutes and then the cycle of moving heat may be repeated. The heat cycle described herein is only exemplary and many other heat cycles are contemplated.

While heated surfaces are one good way to encourage healthy behavior of a chair user, other actuators and application modules are contemplated that achieve a similar purpose. For instance, referring again to FIG. 1, in at least some embodiments, some type of vibrating element may be located at different locations on the front surface of the backrest assembly 18 or the top surface or an edge of the seat assembly 16 that can be felt when a portion of a user's body contacts the surface(s). Again, for instance, a vibrating mechanism may be mounted at the lower back region 37 or the upper back region 35 to encourage optimal posture. As another instance, a cooling element or some device that cools may be provided at any surface location to encourage optimal posture or any other positional behavior by a chair user.

In still other cases one or more sensors may be used to ascertain if a chair user's behavior is optimized and if not, the chair may disallow certain chair features until the behavior is optimized. For instance, in the case of posture and application of heat to encourage optimal posture, a system processor may only apply heat when a user is sitting in one of several pre-designated postures and may turn off the heat when the user is not sitting in one of the pre-designated postures. Similarly, vibration or any other haptic effect may be available in select pre-designated postures. In some cases, heat, vibration, and other haptic effects may be available when a user changes postures regularly.

As yet one other instance, heat, vibration or any other pleasing effect may only be applied for specific durations and may be turned off for other periods and until some required activity occurs. For instance, to encourage a chair user to periodically get up and take a short walk, chair heat may only be enabled for 45 minutes at a time and then be off for 15 minutes encouraging a break. In other cases the heat may remain off until a chair user has gotten up and left the chair for at least 5 minutes. Thus, if the user remained in the chair for one and a half hours straight without getting up, heat would be applied for 45 minutes and then be turned off for the remaining 45 minutes (e.g., until the user got up for at least five minutes). In this case, if the user got up and took a walk immediately after the initial 45 minutes, the heat would be re-enabled after the user is absent for the 5 minute interim period.

Figure 34:
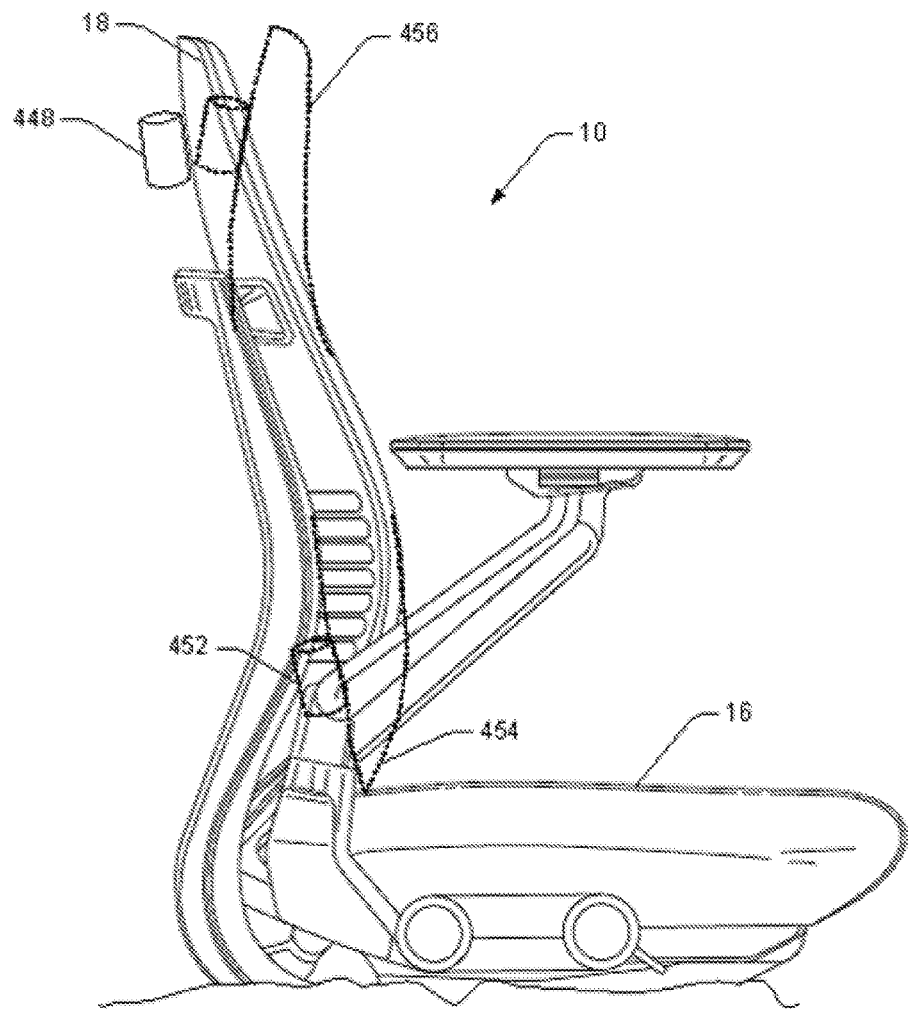
FIG. 34 is a chair assembly having motors in an upper and lower portion of the back assembly, in accordance with an aspect of the present disclosure.

In at least some embodiments it is contemplated that a chair assembly 10 may include components so that at least some aspects of the chair assembly are automatically adjustable to optimally support a chair user that is in a less than optimal position on the chair assembly. In particular, because motors are added to at least some chair embodiments, the motors can be used to drive chair components into supporting positions relative to a user. To this end, see FIG. 34 that shows a chair backrest assembly 18 that includes first and second motors 448 and 452 that are arranged at upper 456 and lower 454 portions of the backrest assembly 18. Here, the motors are shown schematically and would be linked to the assembly 18 so that motor 448 can be controlled to push the top end of the backrest assembly 18 forward and pull the top end backward to adjust the forward-rearward position of top end 456 and motor 452 could be controlled to push the bottom end 454 of backrest assembly 18 forward and pull the bottom end rearward to adjust the forward-rearward position of the bottom end 454. For example, the top end 456 may be able to move through a range of between two inches and ten inches.

Similarly, the bottom or lower end 454 may be able to move through a range between two and ten inches. In this case, if a chair user is slouching with his buttocks near a central portion of chair seat 16 and spaced away from the rear portion of the seat, the rear portion 454 of the backrest assembly may be pushed forward so that a front surface thereof contacts the lower portion of the user's back and provides some support. The upper portion 456 may similarly be moved about to support the upper portion of a chair user's back automatically in a similar fashion.

In still other cases it is contemplated that a chair assembly may move components automatically to make contact with and provide support to a user's back or other portions of the user's body when a user maintains a less than optimal position long term. The chair assembly may also be controlled to apply an appealing effect like heat or vibration. In some cases, it may then, over time, move back into a position or positions consistent with a preferred back position to encourage the user to reorient himself into a different posture. Thus, for instance, referring again to FIG. 34, in some cases the lower portion 454 of the backrest assembly 18 may be moved forward 8 inches to contact a user's lower back surface. Then, heat may be applied to the lower portion of the backrest front surface (see 37 in FIG. 1).

After a set time interval, e.g., one minute, of heat application, the lower portion of the backrest assembly may be moved rearward by one inch while still applying heat. If the user moves his lower back rearward to maintain contact with the heated portion of the seat, after another minute, the lower portion of the backrest assembly may be moved another inch rearward, again, encouraging movement of the user's lower back rearward and toward an optimal posture position. This coaxing would continue in an effort to cause the user to move into a different and preferred posture. If, at any time a user does not follow the coaxing action, the action may be reversed to again provide support for the user in the user's selected posture and the coaxing may either end or recommence.

Figure 35:
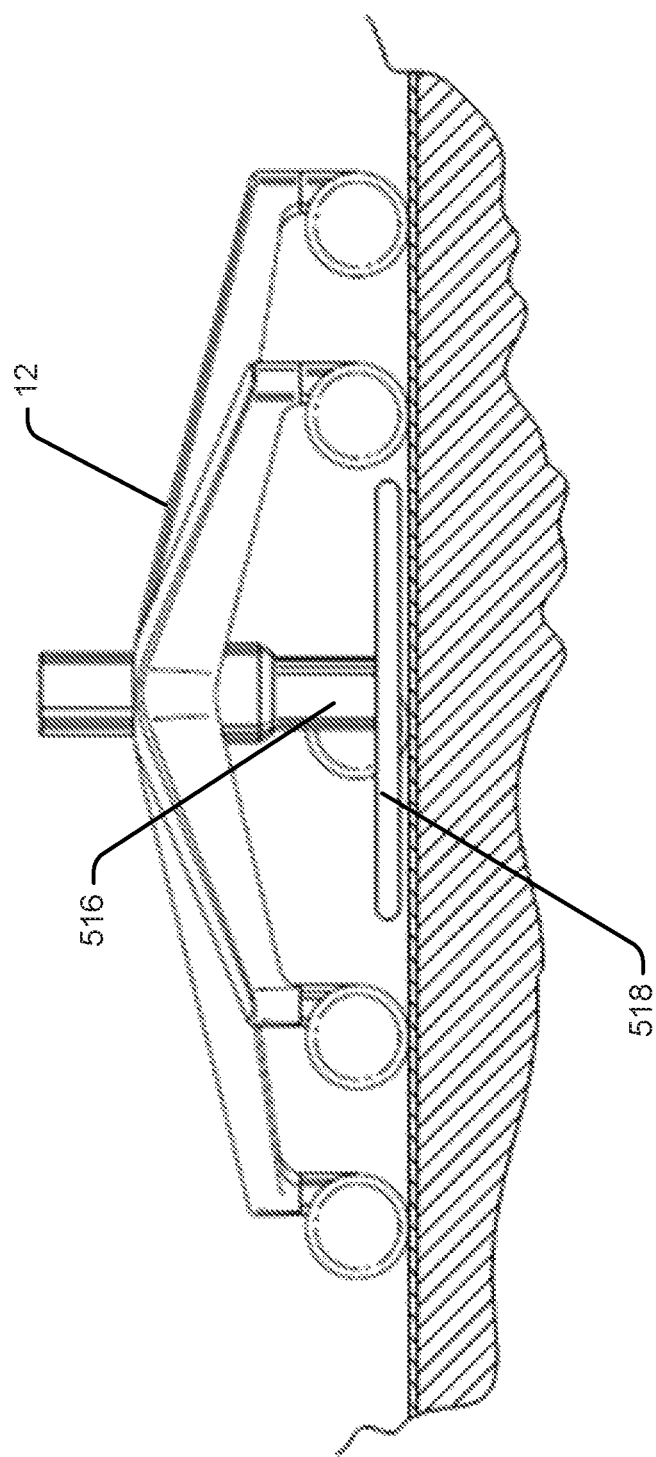
FIG. 35 is a base assembly of a chair assembly having a single-post that can extend down and contains a wireless charging receiver, in accordance with an aspect of the present disclosure.

Referring to FIG. 35, in another embodiment, a single post 516 can extend down from a central portion of the base assembly 12 and a wireless charging receiver 518 can be attached to the single post. An advantage of this arrangement is that the user's feet typically do not occupy the space near to the single post 516. Another advantage is that the height of the wireless charging receiver 518 is not changed as a user adjusts various chair heights and positioning.

Figure 36:
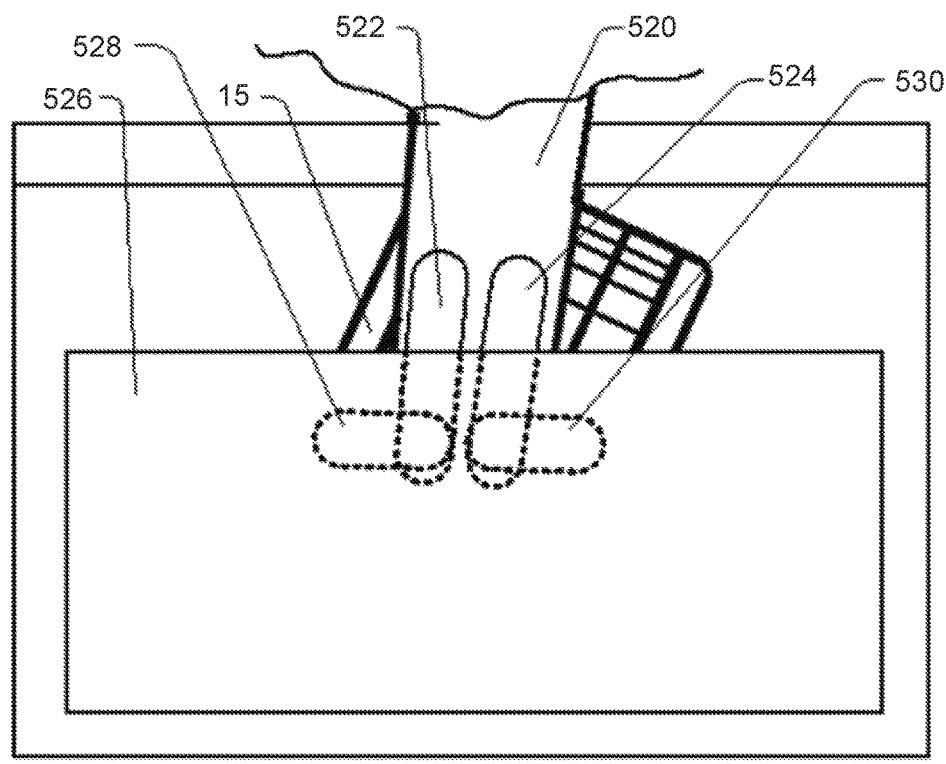
FIG. 36 is a chair assembly shown in a recharging configuration, in accordance with an aspect of the present disclosure.

Referring to FIG. 36, a variation on the embodiments shown in FIGS. 9 and 10 is illustrated, where the chair assembly 10 can be recharged via a single base assembly spoke member 520. Two or more electrode pads 522 and 524 can be positioned on the top surface portions of the spoke member 520 at its distal end. Still referring to FIG. 36, the chair assembly 10 can engage a station assembly 526 that includes positive and negative electrodes 528 and 530 (shown in phantom in FIG. 36) positioned to provide electrical contact with the electrode pads 522 and 524. This embodiment can include any of the features described elsewhere with respect to a spoke member-based electrode pad and station assembly, but configured to recharge the chair via a single spoke member 520.

Figure 11:
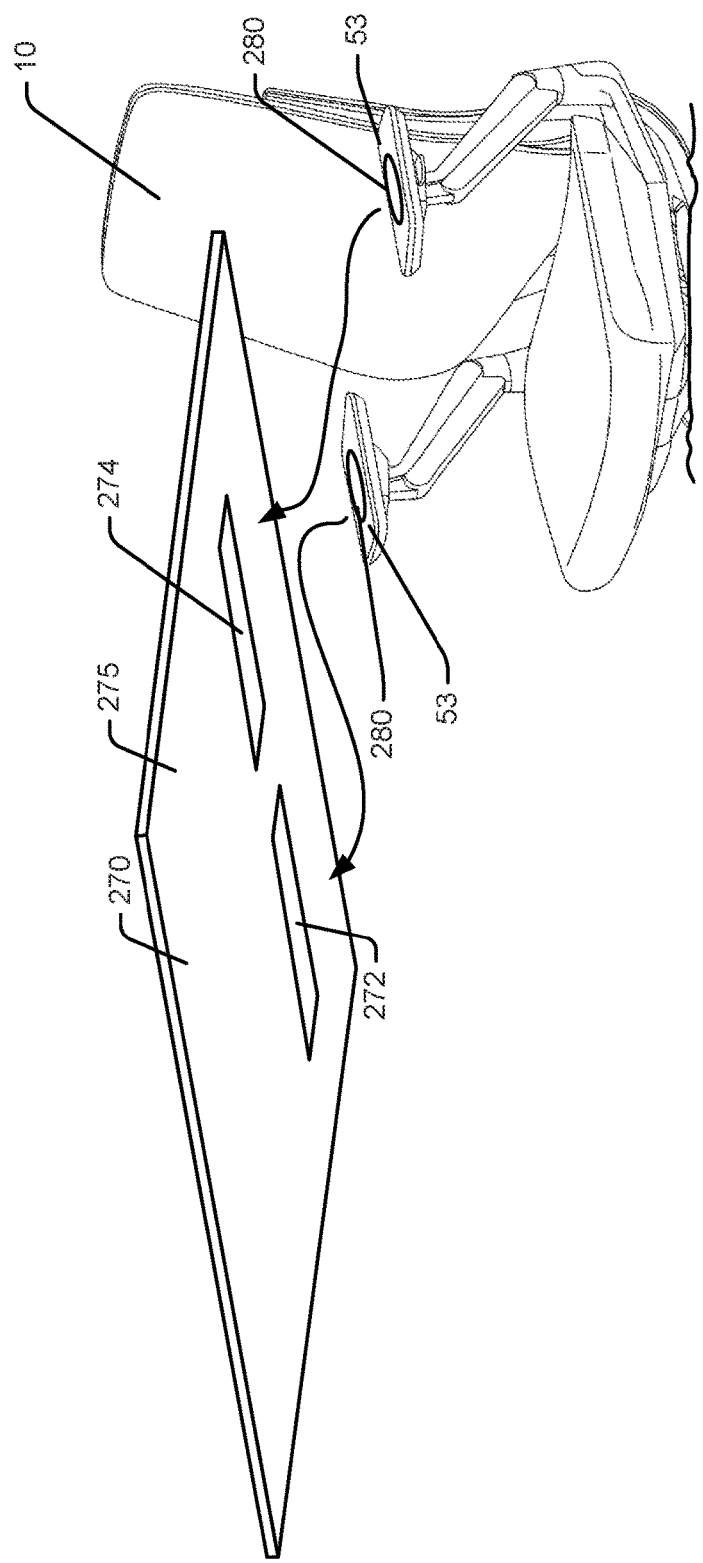
FIG. 11 is chair assembly with a charging mechanism that interfaces with an underside of a work surface, in accordance with an aspect of the present disclosure.
Figure 12:
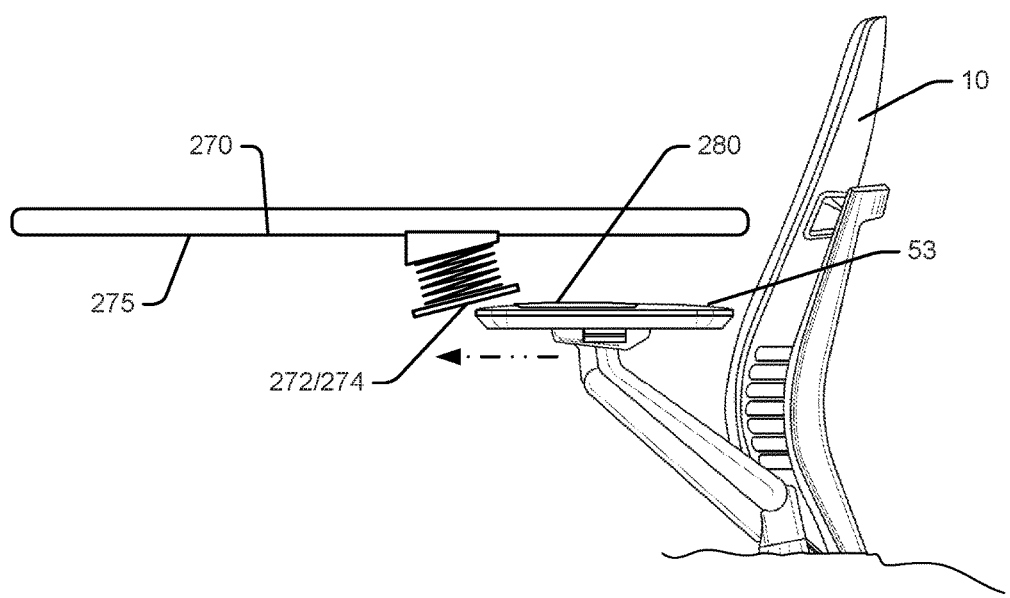
FIG. 12 is a chair assembly with a charging mechanism that interfaces with an underside of a work surface, in accordance with an aspect of the present disclosure.
Figure 13:
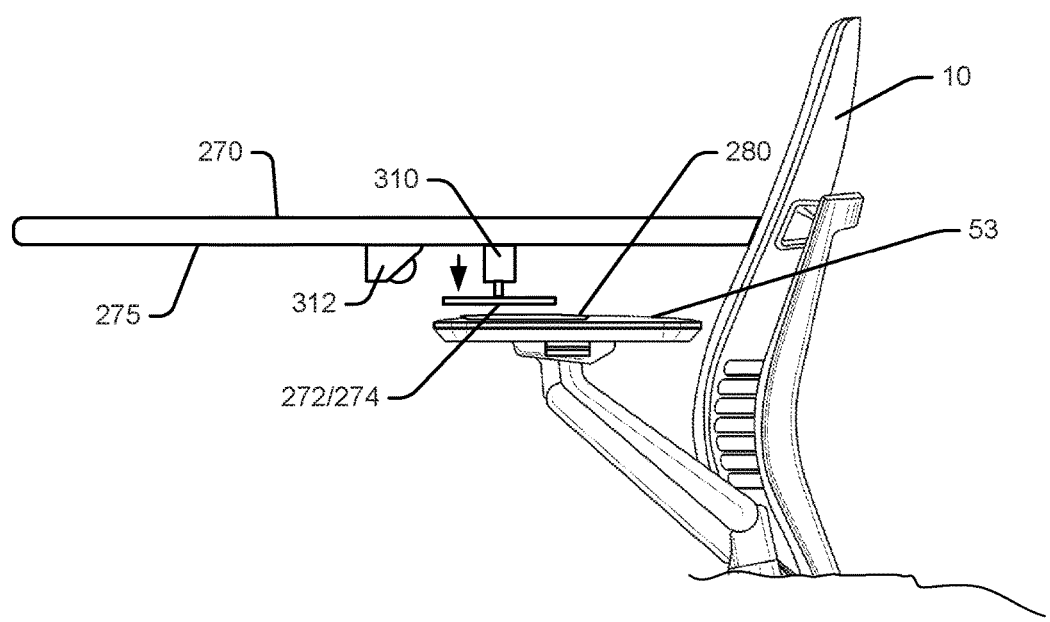
FIG. 13 is a chair assembly with a charging mechanism that interfaces with an underside of a work surface, in accordance with an aspect of the present disclosure.
Figure 37:
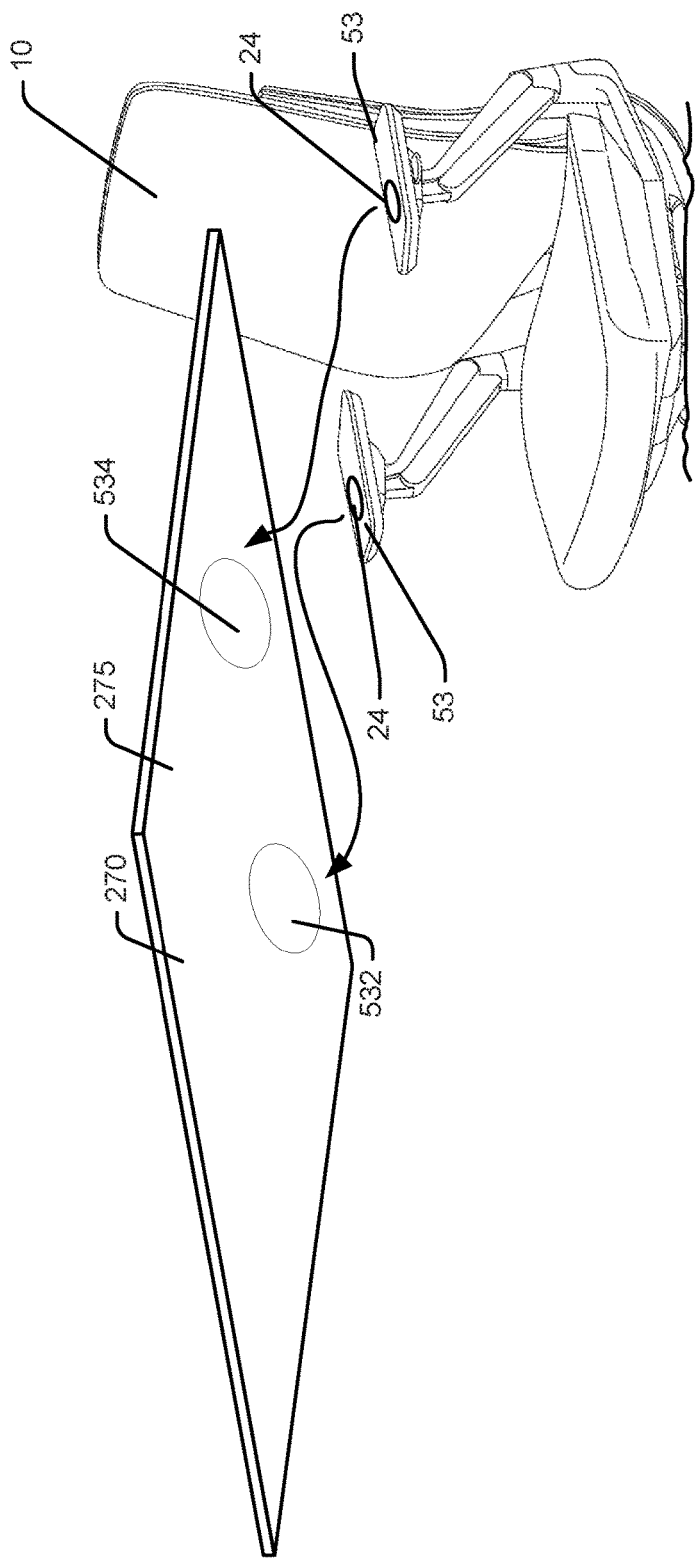
FIG. 37 is chair assembly with a charging mechanism that interfaces with an underside of a work surface, in accordance with an aspect of the present disclosure.

Referring to FIG. 37, a variation on the embodiment shown in FIG. 11 is illustrated, where wireless recharging is deployed. Here, wireless charging transmitters 532 and 534 are located on an undersurface 275 of the table top member 270 at spaced apart locations generally proximate a front edge of member 270. Referring also to FIG. 19, wireless charging receivers 24 can be located within or affixed to arm rest members of the arm assemblies 20. In this case, to charge a chair battery, a user would first adjust chair arm members to a position that enables sufficient coupling between the wireless charging receiver 24 and the wireless charging transmitters 532 and 534. The alignment can be provided as described elsewhere herein. Again, some table structure (e.g., legs or other guide members) may be provided to help the user align the arm members and associated wireless charging receivers 24 with the wireless charging transmitters 532 and 534.

Figure 38:
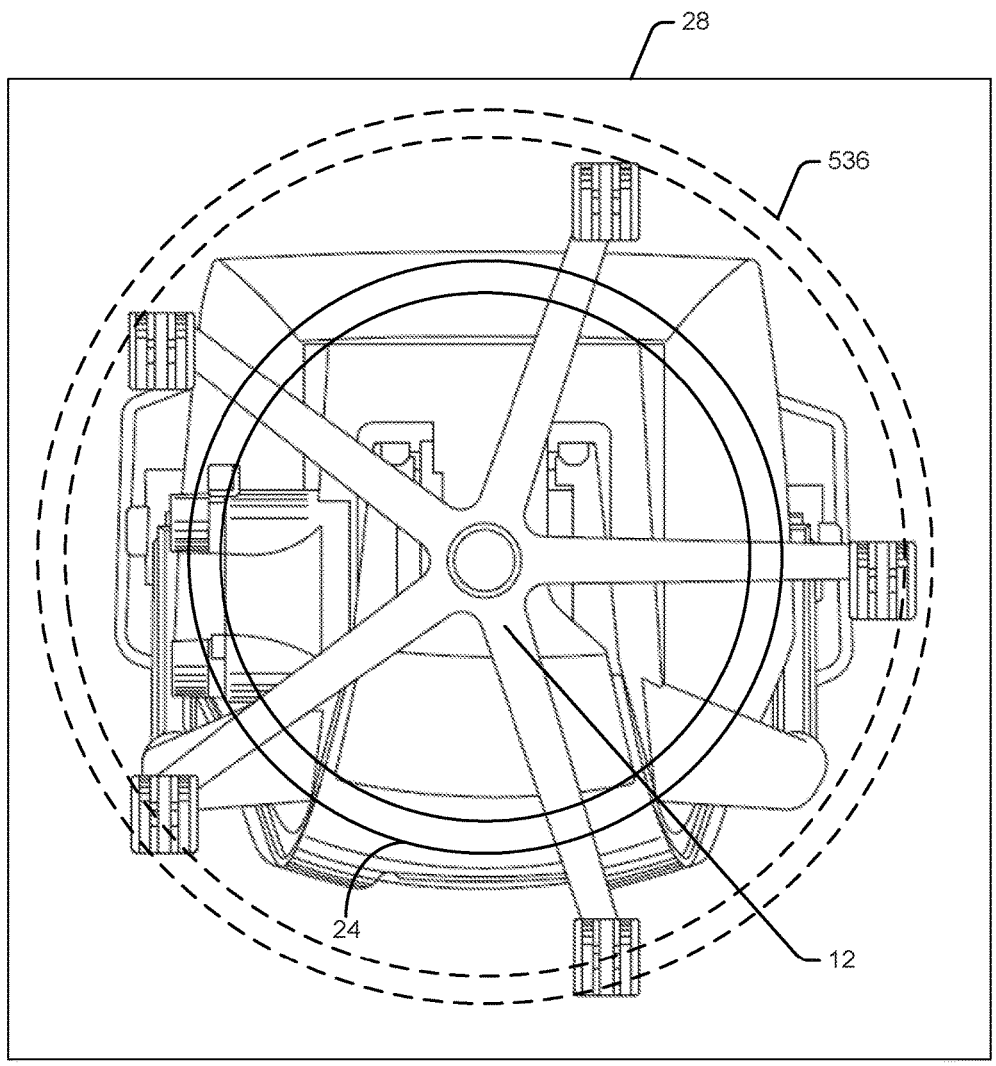
FIG. 38 is a view from beneath a chair assembly on a chair mat with a wireless charging assembly affixed to the base assembly and a wireless charging transmitter in the mat, in accordance with an aspect of the present disclosure.

Referring to FIG. 38, a chair assembly 10 on a chair mat 28 is shown from the underside of the chair mat 28. Referring also to FIG. 4, the chair assembly 10 can have a wireless charging receiver 24 affixed to the base assembly 12. Referring to FIG. 38, the mat 28 can include one or more wireless charging transmitters 536 (shown in phantom in FIG. 38) for wirelessly transmitting power to the chair assembly 10. This arrangement can be utilized for any wireless charging receiver 24 mounted to the underside of the chair assembly, including the arrangement shown in FIG. 35. The alignment between the wireless charging receiver 24 and the wireless charging transmitter 536 can be any alignment described herein that is suitable for providing sufficient coupling to transmit power.

In at least some embodiments the system processors may control chair operations as a function of sensed conditions of the chair user. For instance, based on different temperatures sensed at different locations within the seat 16, backrest assembly 18 and the arm rest members 20 either instantaneously or over time as the temperatures change, one of the processors may be programmed to discern either that a chair user is in pain or will likely experience pain in some part of her body (e.g., lower back, left arm, leg, etc.). Here, based on the discerned physiological parameter, the processor may control motors, heat elements, etc., in the chair assembly in some fashion calculated to eliminate perceived pain or to avoid likely pain. For instance, chair motors may be automatically controlled to change relative juxtapositions of chair components to change the physical positioning of the chair user in some calculated fashion. As another instance, chair sensors or images from a camera in the ambient may generate data that can be used to determine that a chair user is fidgeting and likely uncomfortable. In this case, a heating element in the lumbar region of the chair may be activated to apply heat in an effort to the user's lower back to increase comfort.

In cases where different people use the same chair at different times as in conference rooms, in hotelling spaces, etc., in some cases chair activities and functions may be automatically adjusted based on user identity. Thus, for instance, if one user prefers a set of five functions and a specific set of adjustments on her chair and a second user prefers a set of four other functions and a second specific set of adjustments, in at least some cases user identity and location may be determined (e.g., via triangulation of a user's personal computing device, an identification badge that includes an RF tag or some type of ID transmitter, biometrics, etc.) and, just prior to or after a user sits in a chair, the chair features may be adjusted and functions used to control chair components and features.

In some cases a chair may be programmed to operate differently at different times of day. For instance, in the morning a chair may apply heat, in the afternoon, after a lunch break, the chair may apply cooling and in the late afternoon, the chair may perform some vibration or massage activity. Similarly, a chair may be programmed to perform different functions based on different activities a user is performing or participating in or to perform different functions based on what a user is scheduled to be doing at different times. For instance, when a user is scheduled to be in a private focused session, the chair may perform heating, vibration, massage, support in a lounging position as opposed to an upright position, etc. When the same user is scheduled to be in a conference room with several other people during a collaboration session, the chair may force or strongly encourage an upright posture and may not perform massage or vibrating activities. Other schedule based control of the chair assembly 10 is contemplated and to support such functions, one or more system processor 52, 54, 58, etc., may have access to scheduling information maintained by a facility or enterprise server.

Worker wellbeing is an important focal point for many organizations because of the cultural, environmental, and economic implications wellbeing may have. Wellbeing-often characterized as an individual's health, happiness, satisfaction, physical state, and/or mental state-may be measured and assessed in a variety of ways. In certain circumstances, a worker's physical environment may impact various aspects of wellbeing. For example, aspects of wellbeing that may be impacted by a worker's physical environment include optimism, which may be essential for fostering creativity and innovation; mindfulness, which may allow a worker to engage more fully with the task at hand; a realization that a worker can be authentically himself or herself; a sense of belonging or connecting to others; a feeling that professional contributions have a meaning or a sense of purpose; and an ability to experience a workplace full of vitality that encourages workers actively to experience multiple aspects of the physical environment.

Wellbeing may be improved by communicating with a worker in a manner that seeks to increase his or her movement during the day, to engage more fully with his or her work, and to create a supportive and positive environment, among other things. In particular, communicating with a worker, may allow him or her to identity ways to optimize his or her interaction with the physical environment in a way that improves optimism, mindfulness, authenticity, belonging, meaning, or vitality. Various embodiments of the disclosed system collect and analyze data relevant to a worker's wellbeing and communicate information back to the worker in an effort to improve his or her wellbeing.

Figure 39:
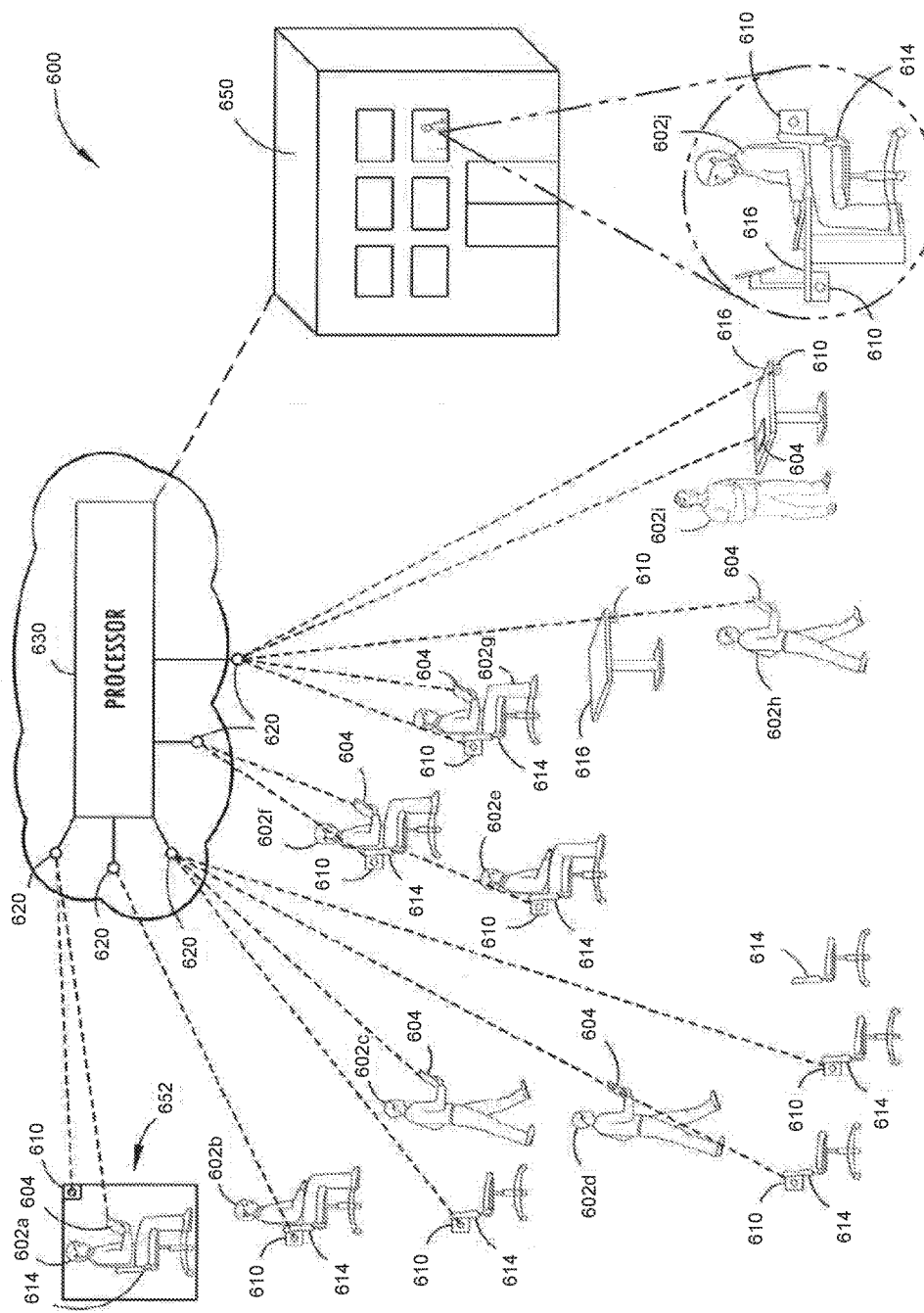
FIG. 39 illustrates a system for providing information to a user of an article of furniture in accordance with a particular embodiment.

FIG. 39 illustrates a system 600 for providing information to a user of an article of furniture. System 600 may be used in a variety of ways including collecting and analyzing data from users, encouraging or rewarding users, assisting users in maintaining mental engagement with their work, facilitating improved communication between users, and helping users identify or create ideal work environments. System 600 includes a plurality of users 602, displays 604, sensors 610, chairs 614, and tables 616. System 600 also includes gateways 620 and processor 630. System 600 includes a variety of places including an office building 650 and a personalized work space 652. In particular embodiments, system 600 may include any number of suitable users 602, displays 604, sensors 610, and articles of furniture, including but not limited to chairs 614 and tables 616. Similarly, system 600 may include any suitable number of gateways 620 and processors 630 or other system components.

Users 602 include a collection of workers affiliated with an organization, who have a variety of roles. At least one user 602j may have responsibility for the organization. This organizational user 602j may be a facility manager, a facilities planner, an operations manager, a purchasing professional, or any professional with responsibility for space utilization, worker wellbeing, worker retention, or other pursuits valuable to the organization. Users 602 may be associated with one or more displays 604. For example, user 602a, 602c, 602d, 602f, 602g, and 602h are each associated with a display 604 that is included in a personal computer such as a tablet, laptop, or mobile phone. User 602f is associated with a display 604 in a wearable computer such as a watch or glasses. User 602i is associated with a display 604 that is embedded in table 616. User 602j is associated with a display 604 configured at his personal workstation. Users 602b and 602e aren't illustrated with associated displays. These users may have a personal computer such as a tablet or laptop, a wearable computer such as a watch or eyewear, or may additionally or alternatively rely on displays embedded in their surrounding environments.

Several of chairs 614 and tables 616 include a coupled sensor 610. These sensors may be embedded in the chairs 614 and tables 616 and may or may not be perceivable to users 602. In some embodiments, some or all furniture within system 600 may have one or more sensors 610.

Personalized work space 652 includes sensor 610 configured to sense information about users 602 in or near work space 652. Including sensor 610 within work space 652 allows system 600 to sense information about a particular user 602 even when he is not in physical contact with chair 614 or other furniture within work space 652.

Gateways 620 allow sensors 610 and other devices such as the tablets, laptops, phones, and wearables mentioned above to relay information to processor 630. Processor 630 analyzes information from sensors 610 and these devices and may provide information to users 602. Information from processor 630 may include collective information regarding a group of users 602 or may include information about a particular user 602. Processor 630 may send information to an individual user, a group of users, or to the organizational user 602j. Information from processor 630 may be displayed on displays 604.

Figure 40:
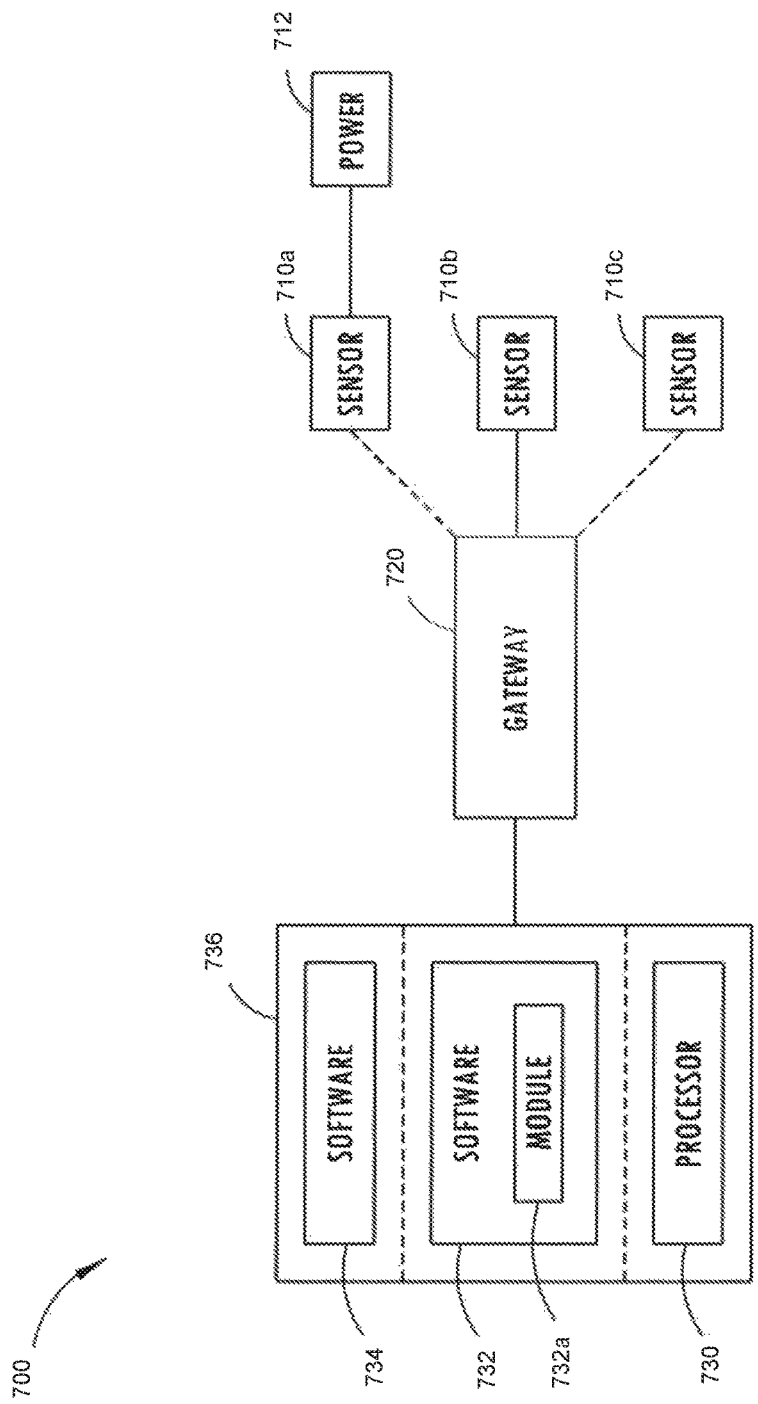
FIG. 40 illustrates a diagram of various details of a system for providing information to a user in accordance with another embodiment.

System 600 may include a variety of additional or alternate components that facilitate communication with users 602. For example, system 600 may include additional sensors, gateways, displays, and furniture. System 600 may include greater or fewer users 602. These users 602 may all be located within building 650 or may be positioned at a variety of locations within an organization's campus. Alternatively, one or more users 602 may be working in a location geographically remote from one or more of the other users 602. For example, organizational user 602j may be located in building 650 on a central campus, while user 602a is located at a second location and user 602i is located at a third location. The number of locations within system 600 may be equal to, greater than, or less than the number of users 602. The number of chairs 614 and tables 616 within system 600 may be correlated to the number of users 602, including a historical number of users 602, a current number of users 602, or an anticipated future number of users 602. Chairs 614 may include office-style task chairs, guest chairs, lounge style chairs, stools, and any other known furniture designed to accommodate a seated user. In various embodiments, a variety of furniture equipped with one or more sensors 610 may be included in system 600, including chairs, stools, panels, lounge style furniture such as sofas, tables, desks, shelving, or storage units. Although FIG. 39 illustrates via dashed lines possible paths of data transmission between particular system components, the sensors, displays, and personal devices described in conjunction with FIGS. 39 through 49 may be able to transmit data to any number of system components, including processors, gateways, other sensors, other displays, and other personal devices, regardless of the presence of an illustrated dashed line. FIG. 40 illustrates a block diagram 700 that portrays additional details of a communication system, similar to system 600. Block diagram 700 includes sensors 710a-c, a power source 712, a gateway 720, a server 736, a processor 730, software 732, and storage 734.

Sensors 710 sense data about the environment and/or users, similar to users 602 described in conjunction with FIG. 39, and provide data to server 736 via gateway 720. Sensors 710 may communicate with gateway 720 over a local area network (LAN) through a wired or wireless connection. For example, as illustrated, sensors 710*a* and 710*c* send data to gateway 720 absent any hard wired connection, instead sending data wirelessly. Sensor 710*b* is wired to gateway 720 and transmits data through this wired connection. Sensor 710*b* may also receive power through its wired connection with gateway 720. Sensor 710*a* receives power from power source 712. Power source 712 may provide power in a variety of ways, for example, through a low voltage transformer or a battery, from harvested energy, wirelessly through inductive coupling or resonant inductive coupling, or in any other known way. Sensor 710*c* does not have a separate power source and may instead rely on piezoelectric technology or other technology to provide sufficient energy for transmitting information to gateway 720. Depending on the embodiment, sensors 710 may employ a range of technologies. For example, sensors 710 may detect heat or pressure changes, may detect touch, or may detect changes in a variety of health indicators. Certain sensors 710 may rely on Bluetooth, iBeacon, or near field communication technology. In some embodiments, sensors 710 may include an accelerometer.

Sensors 710 may be present in a variety of locations within an organization's environment. Sensors 710 may be embedded in an article of furniture, such as a chair or table, similar to chairs 614 and table 616 in FIG. 39. In some embodiments, sensors 710 may be embedded in or coupled to a wall, partition, ceiling, of floor. Sensors 710 may also be associated with a user, present, for example, in a user's identification badge or mobile communication device (e.g., a smartphone, in a writs worn device, etc).

Gateway 720 relays information to server 736 and may be coupled to server 736 via a LAN or wide area network (WAN). Gateway 720 may be any device suitable to receive, aggregate, and/or relay information from sensors 710*a-c*, including, for example, a wireless router or a Room Wizard™. Gateway 720 may include existing technology affiliated with other services of an organization or may be provided to an organization specifically for use with sensors 710. In some embodiments, more than one gateway 720 may be used to optimize performance. For example, the number and/or positioning of gateways may depend on the number and/or positioning of sensors 710.

As information from one or more sensors 710 reaches server 736, software 732 may determine how the information is processed. In this embodiment, a software module 732*a* commands processor 730 to perform a variety of tasks, including those functions described in conjunction with FIG. 41. For example, processor 730 may analyze incoming data related to a user's posture, occupancy, mental engagement, or other factors. Processor 730 may make determinations or conclusions about a user or group of users based on incoming data. Processor 730 may also relay information or send conclusions to a user or group of users. Incoming data from sensors 710, other incoming data or inputs, conclusions, and other data may be stored in storage 734.

In various embodiments, server 736 may be a virtual server or may represent a cluster of servers. Some or all portions of the block diagram may be located physically on site at an organization's location and some or all may be stored remotely in the cloud. For example, in one embodiment, server 736 may physically include processor 730 while software 732, software module 732*a*, and storage 734 are located in a remote or cloud server. In another embodiment, only software 732 or storage 734 may be located in a remote or cloud server. Software module 732*a* may additionally communicate with a variety of other servers, processors, hardware, and software located in server 736 or in other servers or other locations. For example, software module 732*a* may communicate with a second server to ensure that a user's calendar or reservation information is up-to-date.

Figure 41:
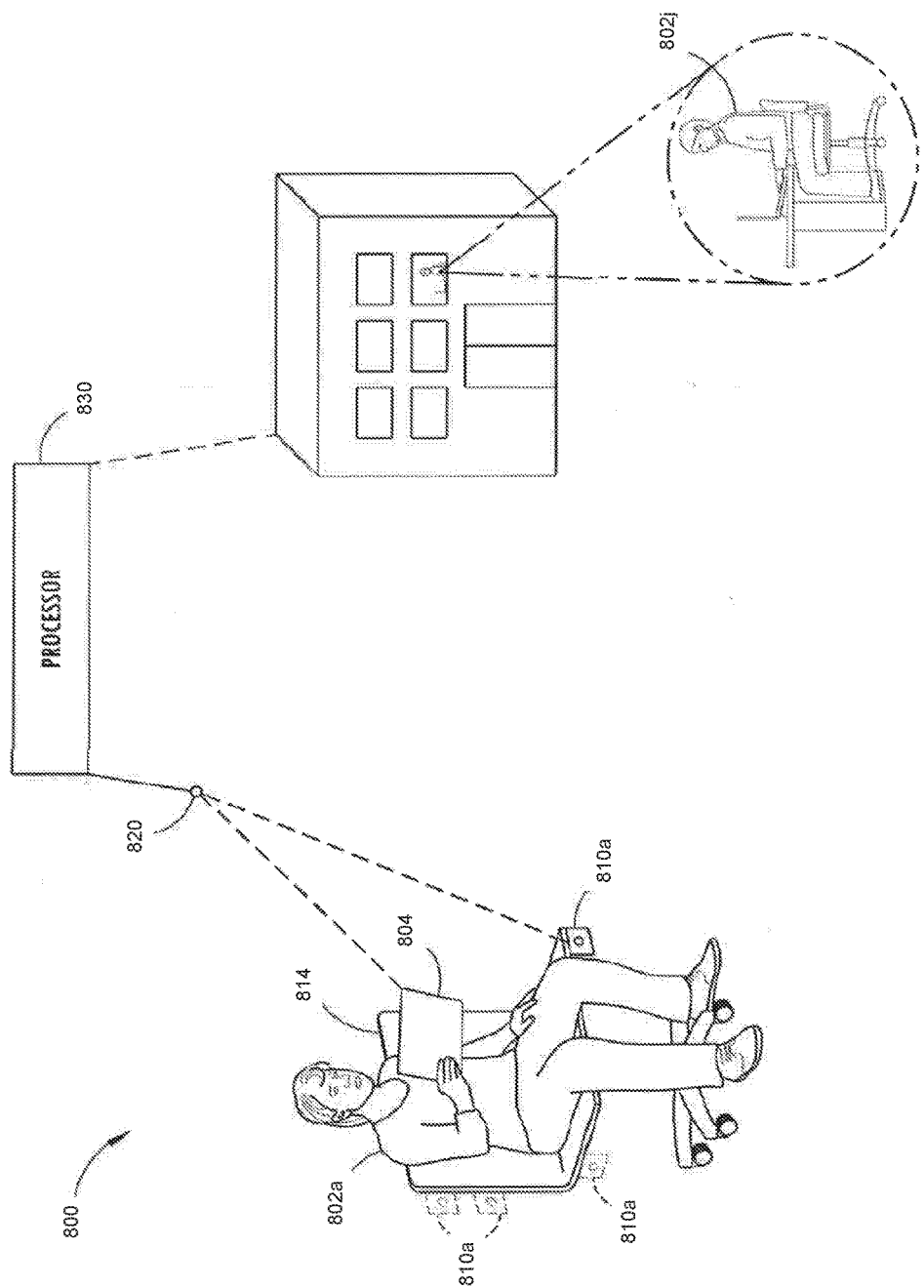
FIG. 41 illustrates a system for providing information to a user in accordance with another embodiment.

FIG. 41 illustrates a system 800 for providing information to a user of an article of furniture, similar to systems 600 and 700 described above. In particular embodiments, system 800 senses information about a user and solicits feedback from the user to confirm conclusions related to the sensed information. System 800 includes users 802*a* and 802*j*, a display 804, sensor 810, and a chair 814. System 800 also includes a gateway 820 and a processor 830.

User 802*a* is a worker affiliated with an organization. User 802*a* may have a variety of responsibilities. User 802*j* is also affiliated with the organization and has responsibility for the organization in some capacity. For example, user 802*j* may be a facility manager or human resources professional.

User 802*a* is associated with display 804. In this embodiment, display 804 is included in user 802*a*'s assigned tablet. In other embodiments, display 804 may be included in a variety of devices or environmental locations.

User 802*a* typically has display 804 with him throughout the workday including when he is seated in chair 814. Chair 814 may be user 802*a*'s assigned chair, or may be unassigned, and is equipped with sensor 810. In one embodiment, sensor 810 may include the ability to sense changes in pressure. In another embodiment, sensor 810 may additionally include an accelerometer and the ability to sense movement of the chair. Sensor 810 may be powered via a battery, a harvested energy source, or in any variety of known ways.

In some embodiments, chair 814 may include multiple sensors 810 that each has different capabilities. Possible additional sensors 810*a* are illustrated in dashed lines. In one embodiment, sensors 810*a* coupled to the back of chair 814 may include accelerometers and sensors 810*a* coupled to the seat of chair 814 may include the ability to sense pressure and/or heat changes. The number of sensors 810 coupled to chair 814 may depend on cost, manufacturing considerations, organizational requirements, or other factors.

Sensor 810 senses information about user 802*a* including when he sits down in chair 814 and the duration of his stay. Sensor 810 senses information about how user 802*a* is sitting in the chair including whether he is relatively still or whether he has begun to move or shift in chair 814. Sensor 810 also senses posture information, including whether user 802*a* is sitting upright, reclining, perching near a front edge chair 814, or other information. Sensor 810 sends some or all of this data to processor 830 via gateway 820.

Processor 830 processes this data and draws one of more conclusions based on the data. For example, processor 830 may conclude that chair 814 is occupied. Occupancy determinations may also include more specific conclusions. For example, processor 830 may conclude based on the rate of occupancy that chair 814 is in a preferred location within the business enterprise, that chair 814 is a preferred seat for workers of the business enterprise, and/or that chair 814 is a preferred seat for user 802*a*. Processor 830 may conclude that user 802*a* has been sitting for an extended period of time and would benefit from a change in posture, for example, by standing up. When the data from sensor 810 indicates that user 802*a* had previously been sitting relatively still and has now begun to shift or fidget in his chair 814, processor 830 may conclude that user 802a has become distracted or is beginning to lose focus on his current task. Conversely, user 802a may be a consistent "mover" in his chair during the workday and any reduction or slowing of movement may indicate that user 802a is no longer engaged with his work. Similarly, processor 830 may conclude that user 802a is struggling to remain mentally engaged because he is reclining in his chair despite engaging in a task that usually keeps him sitting upright. In some embodiments, processor 830 may conclude from an increase in body or ambient temperature that user 802a would benefit from a change in location. Processor 830 may reach a variety of conclusions based on the data for a user or users depending on the data and any software present in system 800, similar to software 732 described in conjunction with FIG. 40.

Conclusions made by processor 830 are based on objective data from sensor 810. Processor 830 may rely on software or other applications stored on the same server or in a remote location to draw conclusions about the objective data from sensor 810. In some embodiments of system 800, processor 830 will send one or more instructions to an application affiliated with user 802a for display on display 804. This instruction may cause display 804 to display information based on the objective data. The instruction may additionally or alternately solicit information from user 802a related to the conclusion of processor 830. In some embodiments, user 802a can provide any solicited input via a yes/no answer, through a multiple choice style answer, or by entering free standing text. For example, display 814 may pose one or more questions to user 802a about occupancy, posture, or focus, including:

- Is this your preferred location?
- Is this your preferred seat?
- What is your preferred seat?
- Do you prefer to sit upright or recline in a lounge position for your current type of work?
- Have you been sitting most of the morning?
- Have you been predominantly sitting today?
- Have you been predominantly sitting this week?
- Are you feeling engaged with your work?
- Are you feeling less engaged with your work than you were 15 minutes ago?
- Is your environment allowing you to focus?
- What is the ideal environment for your current type of work?
- Has an environmental distraction made it more difficult for you to focus?
- Has an environmental distraction made it more difficult for you to focus now that it was 15 minutes ago?
- What is the ideal environment for the work you expect to do later today?
- What is the ideal environment for the majority of your work?
- When do you most need to deviate from your ideal environment?

User 802a can use display 804 as an interface to provide input and answer questions. Information solicited from user 802a and related to user 802a's subjective understandings and perceptions may then be relayed by user 802a's tablet or other device associated with display 804 back to processor 830.

Upon receipt of user 802a's subjective data, processor 830 can develop an output about user 802a based on his objective and subjective feedback. For example, processor 830 may determine that user 802a has been shifting in his seat and he confirmed his change in engagement through his subjective feedback; processor 830 may then send an output to user 802a encouraging him to take a break, go for a walk, or change locations. As another example, processor 830 may determine that user 802a has been sitting relatively still for a longer than recommended time and has confirmed his focus has begun to wane; processor 830 may then send an output to user 802a encouraging him to stand up and continue working.

In an additional example, processor 830 may determine that the body temperature or ambient temperature near user 802a is rising and he has confirmed that he prefers cooler environments; processor 830 may send an output to user 802a encouraging him to change location and may even include a suggestion about a possible preferred location. These and other outputs may be displayed for user 802a via display 804. Other outputs may encourage other changes or actions to improve user 802a's physical or mental health or engagement.

In some embodiments, system 800 may include, and processor 830 may have access to, additional information about user 802a including identity, type of responsibilities, current tasks, and preferred work settings generally or for specific tasks. User 802a may provide this information initially or on an on-going basis. Processor 830 may also have access to information about a variety of work environments within the organization. As a result, in embodiments where processor 830 has access to information about user 802a's current task and preferred environments for specific tasks, processor 830 may be able to provide a recommendation to user 802a that he should consider moving from chair 814 to a particular alternative location more suitable for the task. In certain embodiments, this recommendation may occur as soon as system 800 detects that user 802a has begun a new task or may occur upon concluding that he is losing focus in his present location.

In certain embodiments, processor 830 may send an output about user 802a based on the objective and/or the subjective data to user 802j. In embodiments of system 800 that include a group of workers like user 802a, processor 830 may send an output to user 802j about the group of workers based on the objective and/or subject data of each member of the group or about the aggregated members. User 802j may use information received from system 800 to evaluate occupancy within the organization, to assess productivity associated with specific locations or tasks, group mental engagement, group wellbeing as it relates to health and satisfaction, or other factors. This information may be especially valuable to user 802j when one or more users are working from remote locations.

System 800 may learn about user 802a over time. For example, system 800 may come to determine based on user 802a's objective and subjective data that when user 802a starts to shift in chair 814 in a particular window of time, for example, before lunch, he is likely to be losing focus, while when user 802a starts to shift in chair 814 in a different window of time, for example, after lunch, he is not losing focus. Or system 800 may sense user 802a shifting posture to a position perched on the front edge of chair 814 and user 802a may confirm that he is losing focus when he shifts to "perch" while completing one task but not another. System 800 may receive the same objective data from sensor 810 in either scenario, but may receive different subjective feedback from user 802a regarding his degree of focus or engagement with his work depending on the circumstances. This may allow system 800 to forego or limit the instances where it solicits feedback from user 802a. In this embodiment, when system 800 receives objective data from sensor 810, it may not solicit additional feedback from user 802a, instead relying on subjective feedback received on a previous day or days, and sends an output for display encouraging user 802*a* to take action. For example, when the sensor data indicates a change and system 800 predicts user 802*a* may be losing focus, it may encourage him to stand up and continue working, seek an alternative work location, or take a break.

Figure 42:
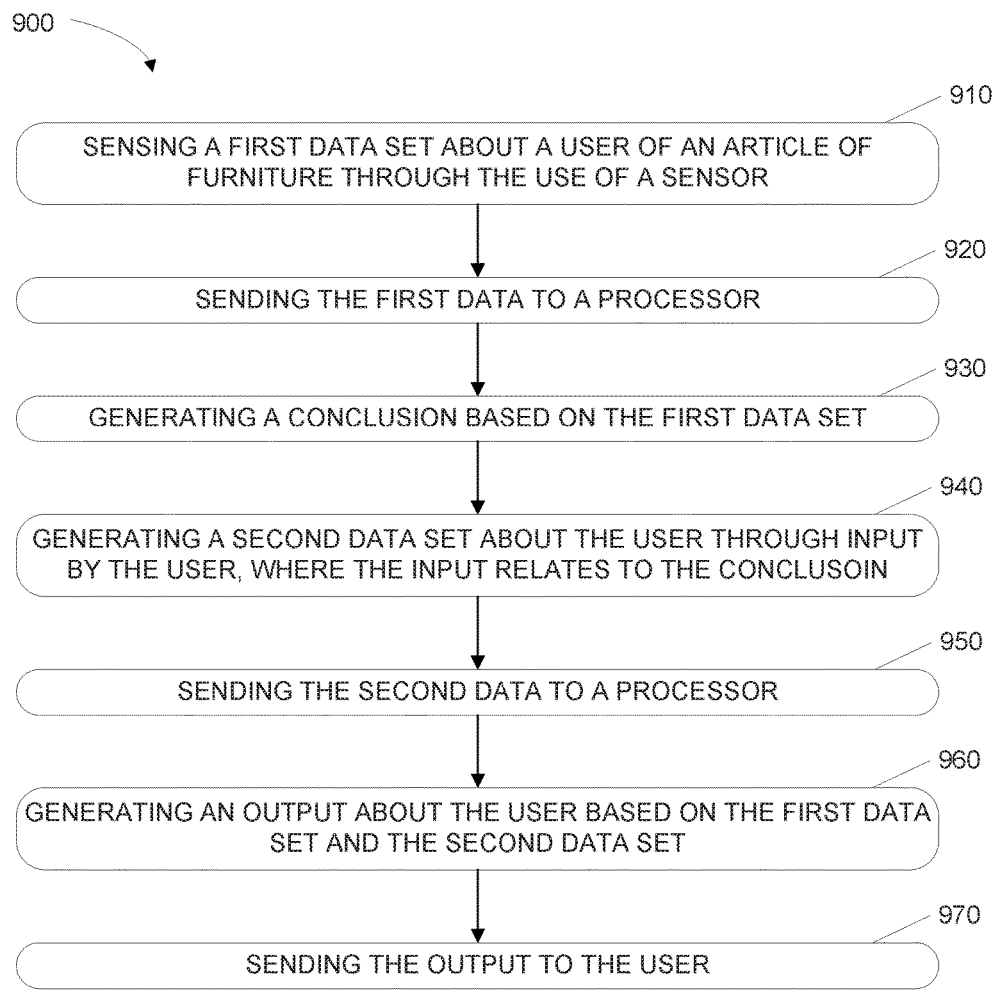
FIG. 42 illustrates a method for providing information to a user in accordance with another embodiment.

FIG. 42 illustrates a method 900 of providing information to a user of an article of furniture, similar to systems 600, 700, and 800 discussed above. In particular embodiments, method 900 is directed toward sensing information about a user and soliciting feedback from the user to confirm the sensed information. Method 900 begins at step 910 by sensing a first data set about a user of an article of furniture through the use of a sensor. In certain embodiments, the sensor is coupled to an article of furniture such as a chair or table. In other embodiments, the sensor may instead be coupled to a wall, partition, ceiling, or floor such that it can collect information about a user of furniture within the environment. The first data set in certain environments is data collected by the sensor without knowledge and/or input from the user, similar to the objective data discussed above in conjunction with FIG. 41.

Method 900 continues with steps 920 and 930 that include sending the first data set to a processor and generating a conclusion based on the first data set, respectively. The processor may receive data from the sensor disclosed in step 910. In certain embodiments, the processor may receive the data via a gateway. Upon receipt of the data from the sensor, the processor is able to generate one or more conclusions. Depending on the type of information collected by the sensor, the processor's conclusions may include determinations about the furniture's usage or occupancy, about the duration of occupancy, about the user's posture, and/or about the user's mental focus or engagement with his work. For example, the first data set may indicate that the user has begun to shift or move within the chair and the processor may conclude that the user is beginning to lose focus on his current task. In various embodiments, the first data set may include any type of information that can be sensed about a user using the sensor.

Step 940 includes generating a second data set about the user through input by the user, where the input relates to the conclusion. In various embodiments, information is solicited from the user that relates to the conclusion described in step 930. The user may be able to receive questions and provide feedback via a display associated with a personal device, such as a computer, laptop, tablet, mobile phone, watch, glasses, clothing, or other device. The display may also be positioned somewhere within the user's environment, for example in a table or wall. The solicited information may include questions designed to provide subjective feedback and/or confirmation on the conclusion. For example, if the processor's conclusion includes a determination that the user is beginning to lose focus on his current task, the input solicited by the user may be focused on the user's level of focus or engagement with his work. This input comprises a second data set about the user. In certain embodiments, the second data set may include a range of information about the user, including the user's preferences regarding his preferred work environment, his preferred work environments for specific tasks, his preferred ways of improving his perceived wellbeing, his preferred methods to increase his physical activity, his preferred ways to increase his mental focus and engagement, and other preferences regarding his work and work environment.

Method 900 continues with steps 950 and 960 that include, respectively, sending the second data set to the processor and generating an output about the user based on the first data set and second data set. In certain embodiments, the output about the user based on the first data set and second data set includes a recommendation for the user, for example, a recommendation the user change posture or location to increase his engagement with his work. The output may additionally or alternatively be based on the conclusion discussed above in conjunction with step 930. In particular embodiments, the output may include a metric about the conclusion. For example, the system may sense a user routinely selecting a certain seat or a particular setting for a chair or table, a selection which the user validates through user input and the generation of the second data set; the output in this circumstance may be tailored to recommend the desired or a related seat or setting to the user in the future.

Step 970 concludes method 900 by sending this output to the user. In various embodiments, this output is displayed to the user via the display described in conjunction with step 940.

Method 900 may additionally or alternately include other steps. For example, in certain embodiments, the method may proceed fully or partially with respect to a group of users and some or all of the data about the group may be sent to a facilities manager. In some embodiments, outputs about a user or a group of users may be sent to an organizational user, such as a facilities manager. Outputs sent to an organizational user (an organizational output) may include the user outputs previously sent to one or more users. In some embodiments, the information included in an organizational output may include aggregated information about the number of users within the system, partial or overall occupancy rates of furniture and/or particular environments within the system, usage rates of the communication system, types or numbers of outputs sent to users within the system, or any other information that may be stored within the system.

A related method may include identifying a selected position for a sensor within a work environment that is appropriate to sense a first data set about a user of an article of furniture within the work environment; placing the sensor in the selected position; creating a network between at least the sensor, a processor, and a device configured to solicit a second data set from a user; ensuring the sensor is configured to send the first data set to the processor; and ensuring the processor is configured to receive the first data set from the sensor and the second data set from the device, to generate an output about the user based on the first data set and the second data set, and to send the output to the user.

An additional, related method may include creating a system for collecting information about a group of users by providing a plurality of or group of furniture in a work environment, providing a group of sensors that are positioned within the work environment and are configured to sense individual data sets about each of the users of the furniture; and providing a processor configured to receive the individual data sets from the sensors, to generate a plurality or number of conclusions, where each conclusion is based on one of the individual data sets, to receive input data sets, where each input data set results from input from one user and relates to one conclusion, to generate outputs, where each output is based on at least one of the individual data sets and one of the input data sets, and to send one or more outputs to one or more of the users.

Figure 43:
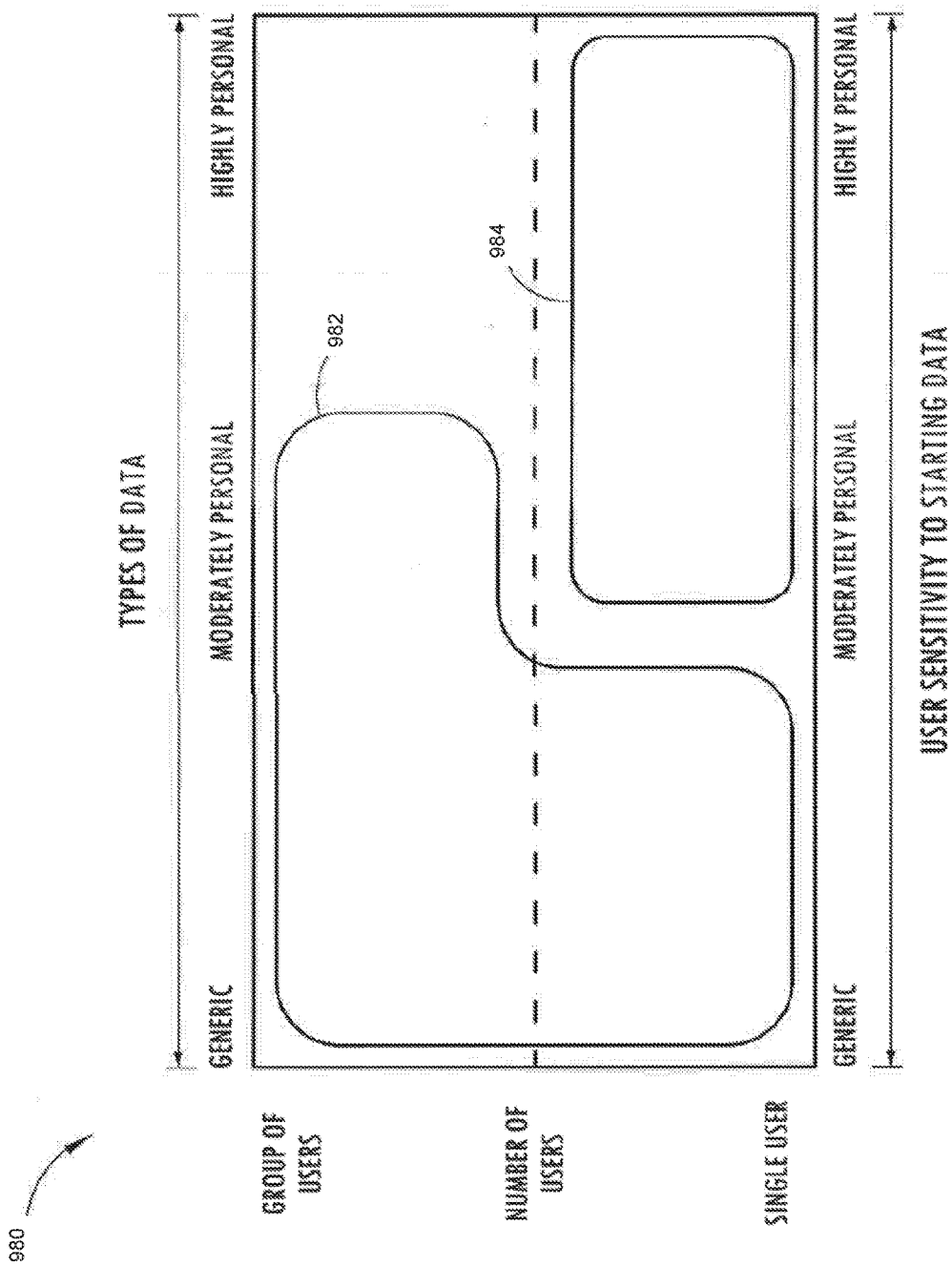
FIG. 43 illustrates a diagram of various details about information collected within a system for providing information to a user in accordance with another embodiment.

The type of information included in a user output and/or organizational output may also be determined based on the nature of sensed information and/or information input by the user. FIG. 43 includes a schematic diagram 980 illustrating how information collected by a sensor or sensors or provided by a user or group of users may be shared with an organizational user. On the left side of schematic 980, information is more generic and potentially less sensitive. Generic data might include information regarding whether a chair is occupied by any user during working hours and may exclude any identifying information about the user. Moving from left to right data becomes less generic; it starts to become more personal in nature and more sensitive. Moderately personal information may include information about where a user prefers to work during the day or his or her preferred conference room and the corresponding amenities or settings. A user may identify this data as moderately sensitive and may allow it to be shared, in some cases without his identifying information (e.g., in the aggregate). On the right side of schematic 980, data is highly personal and potentially highly sensitive. Highly personal data might include a health characteristic of a user as measured by a sensor in a chair. A user may identify this or other data as highly sensitive and may not allow it to be shared with anyone under any circumstances.

The scope of data shared with an organizational user in some embodiments is illustrated with bubble 982. Bubble 982 includes generic information for single users and groups of users and moderately personal information for groups of users; it does not include any highly personal data associated individual users or groups of users in the system. Bubble 984 illustrates the type of data shared with an individual user in some embodiments. Bubble 984 includes highly and moderately personal information about the user, but does not include generic information about users or groups of users. In certain cases, bubbles 982 and 984 may overlap or take on other shapes within schematic 980.

Figure 44:
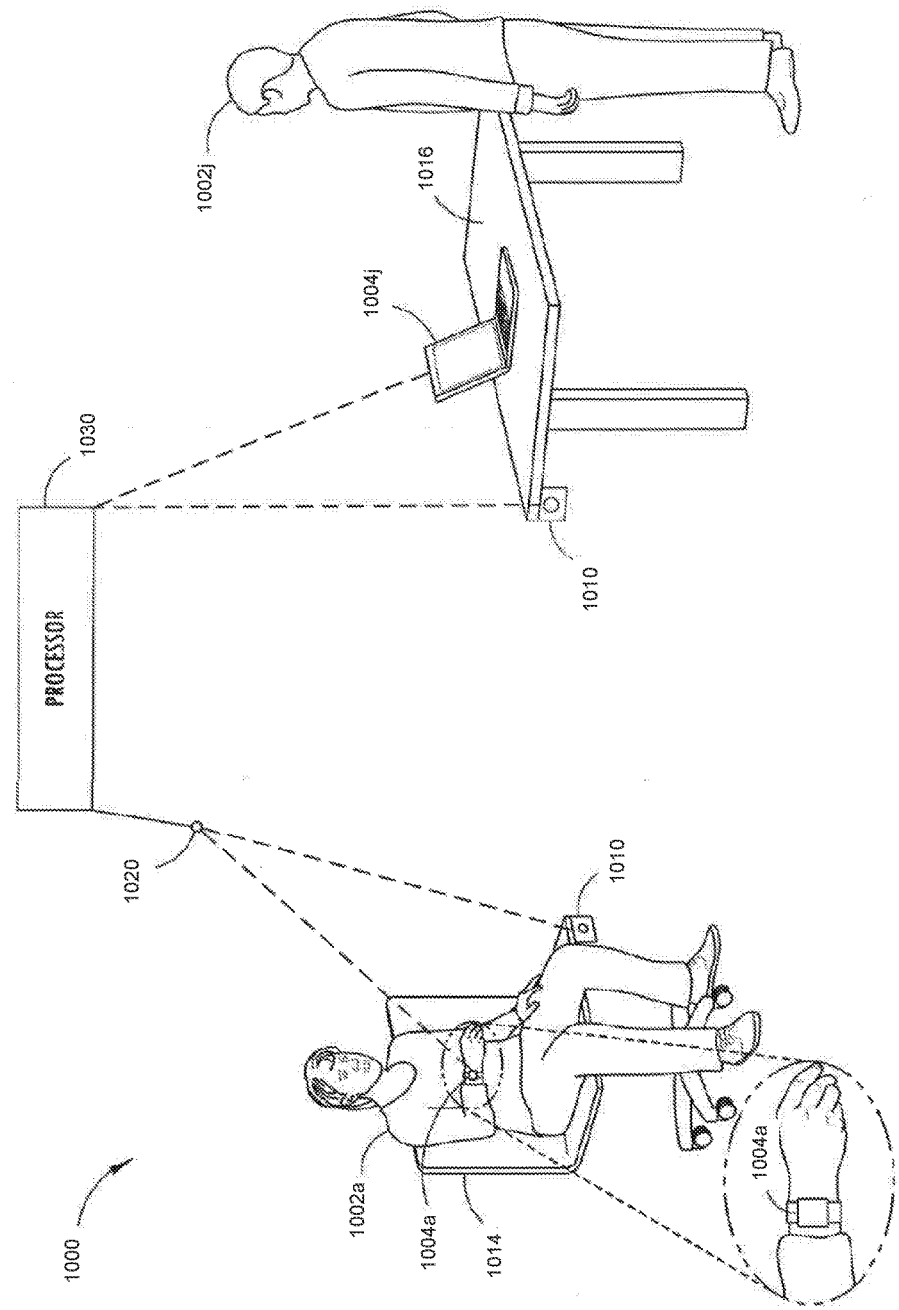
FIG. 44 illustrates a system for providing information to a user in accordance with another embodiment.

FIG. 44 illustrates a system 1000 for providing information to a user of an article of furniture, similar to systems described in conjunction with FIGS. 39-43. In particular embodiments, system 1000 provides information to a user, similar to users 602 and 802 described in conjunction with FIGS. 39 and 41, for the purpose of encouraging, motivating, coaching, changing, or rewarding behavior. System 1000 includes users 1002a and 1002j, displays 1004a and 1004j, sensors 1010, chair 1014, table 1016, gateway 1020, and processor 1030. Any number of users, displays, sensors, furniture, gateways, processors, and other components may be included in various embodiments.

User 1002a is a worker affiliated with an organization and may have a variety of responsibilities. User 1002j is also affiliated with the organization and has responsibility for the organization in some capacity, for example, as a facility manager, real estate planner, human resources professional, wellbeing coach, or health professional. In some embodiments, users 1002a and 1002j may be located in the same building or on the same campus. In other embodiments, users 1002a and 1002j may be geographically remote from one another.

User 1002a is associated with display 1004a. In this embodiment, display 1004a is included in user 1002a's watch. In other embodiments, display 1004a may be included in a variety of environmental locations or devices, such as a laptop computer, tablet computer, personal phone, or other wearable device.

Chair 1014 is equipped with sensor 1010. Similar to the sensors described previously in conjunction with FIGS. 39, 40, 41, and 42, sensor 1010 may sense changes in pressure, temperature, movement, other environmental changes, and/or a variety of health factors. Because sensor 1010 may sense changes in pressure, temperature, or movement of chair 1014, it is able to collect information that may be useful to user 1002a regarding his posture, the duration he has been sitting, or the likelihood that he might benefit from a change in location, activity, or posture. As stated with respect to sensor 810 and chair 814, in some embodiments chair 1014 may include more than one sensor and these sensors may be positioned anywhere on chair 1014, for example sensors may be embedded in or coupled to a seat, back, headrest, arms, pedestal, base, or casters.

As sensor 1010 collects data about user 1002a it transmits some or all of the data to processor 1030 via gateway 1020. Sensor 1010 may transmit data continuously as it is collected or at regular or irregular intervals. The timing of sensor 1010's transmissions may be established based on the purpose of system 1000, the needs of system 1000's users including users 1002a and 1002j, and/or determined by a user including organizational user 1002j. In some embodiments, sensor 1010 may transmit information to a processor in an alternative way. For example, gateway 1020 may be omitted or sensor 1010 may share information with an intermediate collection device that relays the information to processor 1030.

Processor 1030 processes the data it receives from sensor 1010. Processor 1030 also receives and processes one or more inputs from organizational user 1002j. Relying on data received from sensor 1010 and input received from organizational user 1002j, processor 1030 generates one or more conclusions, which may include an output suitable to send to user 1002a. In certain embodiments, input from organizational user 1002j may direct the types of outputs user 1002a should receive. For example, an input may direct processor 1030 to provide encouragement or motivation to change behavior.

One or more inputs from organizational user 1002j may be received by processor 1030 as it receives data from sensor 1010. Inputs may alternatively or additionally be received prior to or after any data from sensor 1010. In various embodiments, organizational user 1002j may provide one or more inputs to processor 1030 on a regular basis, for example, a new input or inputs may be received by system 1000 every quarter, month, week, or weekday. The interval of the inputs may be tailored to current business indicators of the organization or other factors.

The content of the inputs may also be tailored. For example, in circumstances where financial indicators of the organization are positive, the output might include a reward that has a cost to the organization, such as offering the user a cup of coffee or a meal "on the house" or paid for by the organization. In particular embodiments, the content of the input from organizational user 1002j may include information about particular users or groups of users. Further, the input from organizational user 1002j may also include information on the threshold or requirement that must be achieved by a user to receive the reward. Once processor 1020 determines that data from sensor 1010, associated with 1002a, has surpassed the threshold or satisfied the requirement, processor 1020 generates an output to send to user 1002a. For example, one input from organizational user 1002j may include a condition that if a user has been sitting for longer than a set period of time, such as 2 hours, he or she should be encouraged to change posture and stand up. In this example, processor 1030 receives this input from organizational user 1002j; once processor 1030 receives data from sensor 1010 that user 1002a in chair 1014 has been sitting for more than the prescribed period of time, processor 1030 generates a conclusion that user 1002*a* had been sitting for the prescribed period of time and should now change posture. Processor 1030 then sends the output to user 1002*a*.

In an additional example, another input from organizational user 1002*j* may include information designed to encourage or reward user 1002*a* under certain circumstances. For example, organizational user 1002*j* may provide an input that user 1002*a* may be rewarded for continuous focus on a given task. The input may outline that user 1002*a* may be rewarded by an offer for a snack or beverage, a message of encouragement from user 1002*a*'s superior or team, a change in work location or duration, or any variety of other positive feedback or accolades.

Inputs may depend on multiple aspects of a data set or data sets attributed to user 1002*a* in certain embodiments. For example, the input from organizational user 1002*j* may direct the processor to recommend that the user take a break and stretch after he has been sitting for longer than a prescribed time and has begun to fidget in chair 1014. Once sensor 1010 data indicates that user 1002*a* has been sitting for longer than the prescribed time and has begun to shift in chair 1014, processor 1030 generates an output that can be sent to user 1002*a* encouraging him to get up and take a break and stretch.

In some embodiments, processor 1030 may rely on additional data sources in generating an output, including, for example, a personal or corporate calendar, local weather information, information from other places within the organization, data input by user 1002*a* similar to the input described in conjunction with FIG. 41, or any useful data source relevant to the organizational user input or the system user. For example, when processor 1030 receives data from sensor 1010 that user 1002*a* has been sitting in chair 1014 for a set number of hours each day, for a certain number of consecutive days or days within a prescribed time period, and processor 1030 receives information from a corporate calendar that the present working day is the last day before a corporate holiday or from a meteorological database that the weather has unexpectedly changed for the better (or worse), the output to user 1002*a* may encourage him to leave the office earlier than his typical departure time.

When processor 1030 receives information about local weather, it might also provide user 1002*a* with an output including a recommendation to take a walk outside the organization's building if data from sensor 1010 indicates he has been sitting for the majority of the afternoon. In some embodiments, organizational user 1002*j* may provide a group of inputs that include a variety of different rewards or encouragements. Processor 1030 may determine which input to base its output on randomly or according to some other factor, such as user location, user preference, user responsibilities, or user interests.

Additionally, a particular output may be directed to all members of a group or team. For example, both user 1002*a* and organizational user 1002*j* may be included within the same group or team and may receive the same output (as illustrated in FIG. 44, organizational user 1002*j*'s workstation also includes sensor 1010 coupled to table 1016 in his workstation and he may be an active, individual participant in system 1000).

After processor 1030 generates an output for user 1002*a*, it transmits the output to user 1002*a*'s watch including display 1004*a* via system 1000 in a manner similar to those discussed in conjunction with FIG. 40. In addition, system 1000 may detect user 1002*a*'s personal device or devices based on proximity or user 1002*a* may register his device with system 1000 in accordance with certain embodiments.

User 1002*a*'s personal device may display a message based on the output on display 1004*a* and also may provide an audio message based on the output or convey the output to user 1002*a* in another known way. Other personal devices with displays may also receive outputs from processor 1030, including laptop computers, tablets, mobile phones, glasses, and clothing.

Once user 1002*a* receives an output from processor 1030 via his personal device, he may acknowledge receipt of the message related to the output, which may in turn be conveyed to organizational user 1002*j* via processor 1030.

In various embodiments, processor 1030 may also generate an output specifically for organizational user 1002*j* (an organizational output) and may include various information. For example an organizational output or outputs may include information regarding a user's or users' acknowledgement receipts, the number of outputs sent to users, which users, teams, or groups received outputs, the types of rewards suggested in the outputs, how users reacted to encouragement or motivation, user preferences or interests, user behavior, other information, or any combination of the above. Based on additional data from sensor 1010 collected after a user receives his reward, the organizational output may also include information on whether the user accepted any offered rewards or engaged in any encourage behaviors. For example, the organizational output may include information on whether user 1002*a* exited chair 1014 when system 1000 suggested he stand up after a prolonged period of sitting. As discussed in conjunction with FIG. 43, in certain embodiments, the type of data provided in an organizational output may be limited by the nature and potential sensitivity of the information.

Figure 45:
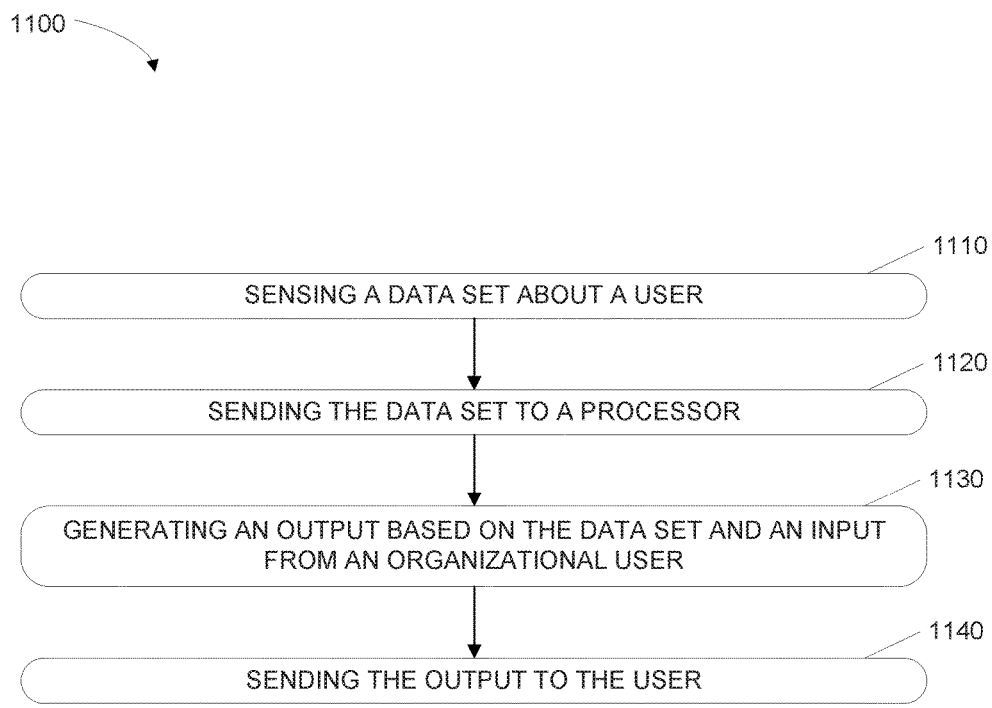
FIG. 45 illustrates a method for providing information to a user in accordance with another embodiment.

FIG. 45 illustrates a method 1100 of providing information to a user of an article of furniture, similar to systems 600, 700, 800, 900, and 1000 discussed above. In particular embodiments, method 1100 is directed toward providing encouragement, motivation, coaching, or a reward to a user. Method 1100 begins at step 1110 by sensing a data set about a user. In various embodiments, this sensing occurs through a sensor coupled to an article of furniture, such as a chair or table. Sensors capable of sensing a data set about the user could alternatively or additionally be positioned on a partition, wall, cabinet, shelving, ceiling, windows, doors, flooring, or on or from another surface within the work environment. In some embodiments, multiple sensors within the environment will sense data about a user; some sensors may have different sensing capabilities than others or sensors may be selectively utilized to sense certain characteristics. Sensors may sense changes in temperature, pressure, light, sound, movement, or other characteristics associated with a user's interaction with the work environment. Data sensed by the sensor constitute the data set. In some circumstances, the data set may be limited to a single sensed data point. In other embodiments, the data set includes a number of data points and may include all or some of the measurements taken by the sensor.

Sending the data set to a processor continues method 1100 in step 1120. In some embodiments, the processor may be similar to processors described previously in conjunction with FIGS. 1 through 5. The processor may receive data directly from the sensor or indirectly through an intermediate device such as a gateway. In certain embodiments, the processor may only receive a single data set as described in conjunction with step 1110. In some embodiments, the processor may receive multiple data sets from a particular sensor, single data sets from a group of sensors, and/or multiple data sets from a group of sensors. The processor may aggregate, store, sort, analyze, and otherwise process the data upon receipt.

Step 1130 includes generating an output based on the data set and an input from an organizational user. In particular embodiments, the processor may solicit an input from the organizational user upon receiving a data set or data sets, at a pre-determined time, or based on some event, such as input from a user. The processor may have received the input from the organizational user at approximately the same time as it received the data set from the sensor or at an earlier or later time. In some embodiments, the organizational user may provide input upon initializing a system like system 1000, at regular intervals, at irregular intervals, or at any beneficial time. For example, an organizational user may manually or automatically provide input to the processor once a day. In various embodiments, the input provided by the organizational user may depend on additional factors or data sets, including one or more calendars, meteorological information, financial metrics, or group or individual user preferences. Input from the organizational user may provide direction on the type of output appropriate for a group of users, type of user, or individual user. Generated outputs may include a variety of different information, including information designed to motivate, encourage, reward, or otherwise influence the user. For example, the output may be designed to motivate the worker in some way. As described above, worker wellbeing may increase when a worker is able to mindfully engage in his or her work; a related output might encourage the worker to stay focused or to take a break in order to improve focus later. The output may be designed to encourage the worker. Worker wellbeing may increase when a worker knows his or her work is meaningful to the organization; a related output might encourage the worker by providing recognition of his or her effort on a current task. Worker wellbeing may also increase when a worker vitality is encouraged; a related output may reward a worker for prolonged attention (as measured by occupancy in a chair, by stillness in a chair, or by other sensor measurements) over an morning, afternoon, week, month, or other time period by suggesting the user take a break to change postures, to take some time away from the project, or to change his or her routine.

In some embodiments, the output may be provided for a group or groups of users, but not for a particular user. In these embodiments, the system will generate the output based on at least the data set it receives from the sensor and the input from the organizational user. For example, the sensor may indicate that a user has been sitting in his chair for over two hours and the input may instruct the system to provide an output to users sitting for over two hours where the output encourages the user to change posture and stand up. In other embodiments, the output may be provided for a particular user and in these embodiments the system may generate an output that may also be based on a specific user's preferences, for example a personal enjoyment of a particular beverage like coffee or even a particular coffee drink such as cappuccino. In this example, the sensor may indicate that a user has been sitting in her chair for over two hours. The input associated with the user may instruct the system to provide to users who have been sitting for over two hours and who have input a personal preference regarding a beverage an output regarding a break. As a result, the user may receive an output encouraging the user to take a break and enjoy a cappuccino. The user may perceive this as encouragement that helps the user stay focused if the user pays for the cappuccino and may perceive it as a reward for the user's efforts if the user receives the beverage complimentarily.

Method 1100 concludes with step 1140 by sending the output to the user. Method 1100 may include a variety of additional or alternative steps. For example, in certain embodiments, the output may be displayed as a message based on the output via an application on a personal device of the user. Personal devices may include laptop computers, tablet computers, wearables, such as glasses, watches, and clothing, or other devices suitable for a work environment. A user's personal device may also convey the output to the user in a way or ways perceptible to the user's other senses, for example, by providing an audio or haptic signal. The method may also include acknowledging receipt of the message or signal and sending the acknowledgment to the processor and/or to the organizational user.

In particular embodiments, the method may include generating an output for the organizational user (an organizational output) and sending it to the organizational user. The organizational output may or may not be related to the output sent to the user. For example, in some embodiments, the organizational output may include aggregated information about the number of users receiving outputs from the system and/or information about the types of outputs received by the users. In certain embodiments, the organizational output may include information regarding the output sent to a particular user and whether the user took any action in response to the output. The method may also in some embodiments include generating an additional data set about the user through input from the user, where the input relates to the original data set generated by the sensor as described in conjunction with step 1110. Using information input by the user may allow the system to take into account user preferences.

A related method may include setting up a system to collect information and provide feedback as described in method 1100, for example, by identifying a selected position for a sensor within a work environment that is appropriate to sense a data set about a user of an article of furniture within the work environment; placing the sensor in the selected position; ensuring the sensor is configured to send the data set to a processor; ensuring the processor is configured to receive the data set from the sensor and an input from an organizational user; to generate an output based on the first data set and the input from the organizational user; and to send the output to the user. An additional related method may include creating a system to collect information about and/or provide information to a group of users by providing a plurality or group of furniture in a work environment; providing a plurality or group of sensors that are positioned within the work environment and are configured to sense individual data sets about the group of users of the furniture; and providing a processor configured to receive the individual data sets from the plurality of sensors; to receive an input from an organizational user; to generate a plurality of outputs based on the individual data sets and the input from the organizational user; and to send one or more outputs to one or more users.

Figure 46:
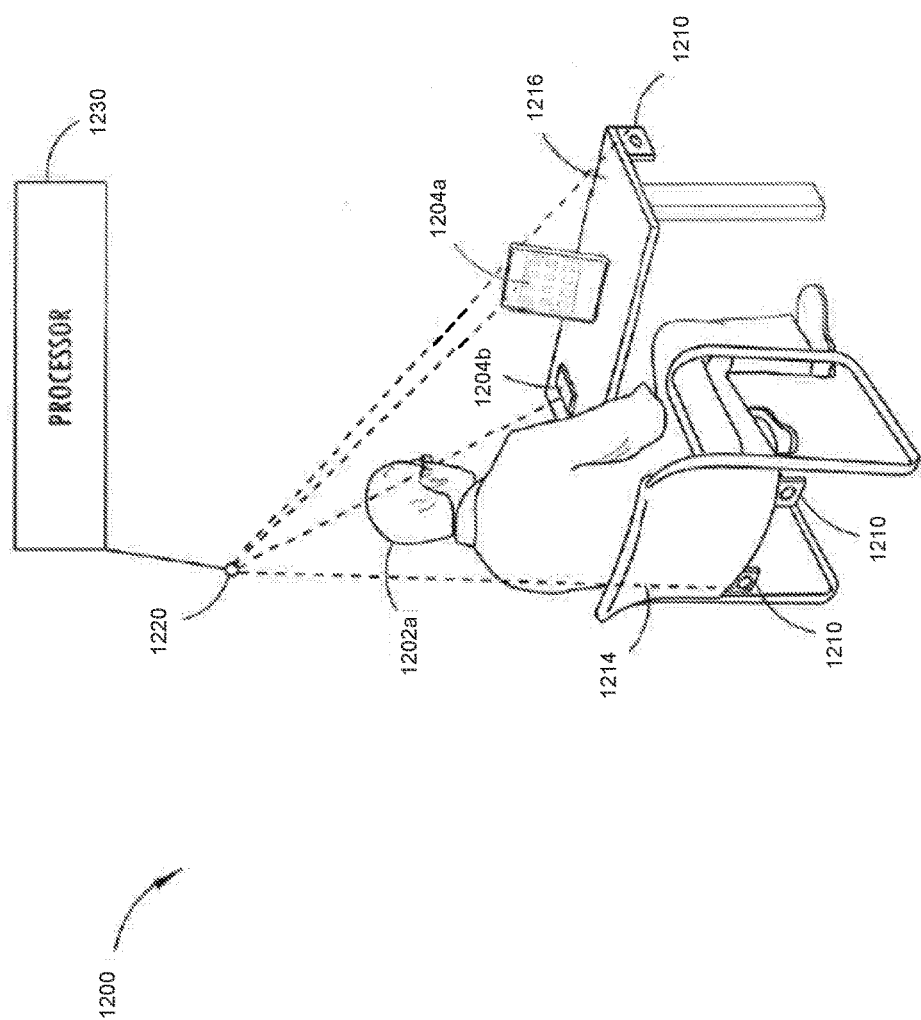
FIG. 46 illustrates a system for providing information to a user in accordance with another embodiment.

FIG. 46 illustrates a system 1200 for providing information to a user of an article of furniture, similar to systems 600 through 1000 described above. System 1200 provides information to a user or users at a time or within a time range that may improve the user's overall productivity. For example, system 1200 may generate an output for a user that the system holds until a time more appropriate for interruption.

System 1200 includes user 1202a, displays 1204a and 1204b, sensors 1210, chair 1214, table 1216, gateways 1220, and processor 1230. Any number of users, displays, sensors, furniture, gateways, processors, and other components may be included in various embodiments.

User 1202a is affiliated with an organization and is associated with chair 1214, table 1216, and displays 1204a and 1204b. In the illustrated embodiment, display 1204a is included in a tablet and display 1204b is included in a mobile telephone. In some embodiments, display 1204a or 1204b may be included in a variety of devices, such as desktop or laptop computers, tablet computers, personal phones, or other wearable devices. Displays 1204a or 1204b may be included in a variety of environmental locations, including walls, partitions, ceilings, windows, floors, desks, chairs, storage furniture, and other furniture. In some embodiments, user 1202a may be associated with one display or may be associated with many displays.

Chair 1214 and table 1216 are equipped with sensors 1210. Similar to the sensors described previously in conjunction with FIGS. 39 through 45 and other figures above. Sensors 1210 may sense changes in pressure, temperature, movement, and other environmental changes. Sensors 1210 may also be configured to sense changes in a variety of health indicators, including blood pressure, breathing rates, heart rates, blood glucose levels, brain function, and other indicators. In some embodiments, sensors 1210 may sense information correlated to a user's identity, such as a name or an employee number, by sensing the presence of the user's badge or a personal device associated with the user. In embodiments where multiple sensors 1210 sense information correlated to a user's identity, it may be possible to estimate the location of the user through, for example, triangulation.

Information collected by sensor 1210 may be useful to user 1202a and may include information regarding user 1202a's posture, the length of time user 1202a has been sitting or standing, the likelihood that user 1202a might benefit from a change in location or activity, and/or the current status of various health indicators. As described with respect to sensor 810 and chair 814, in some embodiments chair 1214 may include a greater or fewer number of sensors and these sensors may be positioned anywhere on chair 1214. For example, sensors may be embedded in or coupled to a seat, back, headrest, arms, pedestal, base, or casters.

As sensors 1210 collect data about user 1202a, sensors 1210 transmit some or all of the data to processor 1230 via gateway 1220. Processor 1230 processes the data it receives from sensors 1210. Processor 1230 may also receive and process additional data from user 1202a or from other sources. Processor 1230 may include several processors depending on the embodiments and these and/or other determinations may be made by the system at various processors.

In the illustrated embodiment, processor 1230 generates one or more outputs about a user or for the user based on available data. As discussed in conjunction with similar systems 600 through 1000, the generated outputs may include a variety of information and communications. For example, processor 1230 may determine, based on the data received about user 1202a, that user 1202a should change posture, location, or task. In certain embodiments, data associated with user 1202a may reflect a change in a health indicator, such as a change in breathing rate, and processor 1230 may determine that user 1202a should shift to a different activity. Processor 1230 may configure these determinations about user 1202a as one or more outputs for communication to user 1202a that encourage user 1202a to act in accordance with the suggested change.

In the illustrated embodiment, processor 1230 additionally determines when to communicate the output to user 1202a. Processor 1230 may rely on a number of factors and data sources in determining a preferred time for communication. As described herein, a preferred time for communication may be a particular time or may be a window or range of time, for example, a several minute range of time before, after, or encompassing a particular time.

Processor 1230 may determine a preferred time according to affirmative feedback from user 1202a, such as information solicited or received from user 1202a regarding user 1202a's desire to only be interrupted with outputs from system 1200 at certain time intervals or in conjunction with the ending or beginning of various calendar entries. Processor 1230 may determine a preferred time according to historical, sensed feedback from user 1202a, such as data collected over a period of time showing that user 1202a tends to begin shifting more in a chair, possibly indicating a reduction in focus, after a certain length of time; processor 1230 may determine the preferred time for communication in conjunction with the anticipated time that user 1202a's focus and attention to his current task is changing. Processor 1230 may also determine the preferred time according to real-time, sensed feedback from user 1202a, such as data showing that user 1202a was sitting still and has begun to shift and move within a chair, possibly indicating a change in focus; processor 1230 may determine that the preferred time for communication is the time when user 1202a's movement data changes.

A preferred time for communication in some embodiments may be determined by processor 1230 directly in conjunction with various calendar entries. For example, processor 1230 may receive information that user 1202a is scheduled to attend a meeting at some time in the future; processor 1230 may determine a preferred time for communication is a certain amount of time before the meeting starts, is near the meeting start time, or is near the meeting end time. In addition, processor 1230 may tailor the output in light of various calendar entries. For example, processor 1230 may determine that user 1202a has been sitting for most of the morning and should spend at least some time standing to complete assigned tasks. The output may take calendar entries into account, and may suggest or encourage user 1202a to stand during the meeting or to stand after the meeting.

In various embodiments, processor 1230 determines a preferred time for communication in accordance with user 1202a's usage of electronic applications. In the illustrated example, user 1202a uses tablet with display 1204a. As user 1202a works on a selected task, user 1202a utilizes a particular application on the tablet. Processor 1230 may determine that a preferred time for communication is when user 1202a switches from the particular application to a second application, which may be correlated with a task change or may reflect that user 1202a is ready for a break. For example, processor 1230 may determine that user 1202a is working on a particular task based on his selected application, processor 1230 may then determine that user 1202a has completed the task or a portion of the task, because user 1202a is switching from the selected application to a different application, and processor 1230 may then determine that the preferred time for communication is approximately when user 1202a switches from the first to second application. Similarly, processor 1230 may determine that a preferred time for communication is when user 1202a switches between personal devices, for example, switching between an application viewable on tablet display 1204*a* to an application viewable on mobile display 1204*b*.

Processor 1230 sends the output to user 1202*a* at or near the preferred time for communication. Any number of factors, data sets, and inputs from user 1202*a*, from user 1202*a*'s environment, or from user 1202*a*'s employer may be used in determining the preferred time for communication. The benefits of waiting to communicate with user 1202*a* until at or near a preferred communication time include allowing user 1202*a* to maintain engagement with and/or concentration on a present task.

In some embodiments, processor 1230 may send some outputs directly to user 1202*a* without delay. Direct outputs to user 1202*a* may occur when the output is of a particular nature, for example, a change in a critical health indicator such as blood glucose, or a change exceeding a certain magnitude, such as a change in heart rate exceeding a pre-set limit. In some embodiments, the timing of the output to user 1202*a* may depend on the magnitude of the associated information. For example, it' a change in heart rate is below a certain threshold, processor 1230 may send a related output to user 1202*a* only at a preferred time, however if the change in heart rate is above a certain threshold, processor 1230 may send the related output to user 1202*a* without delay. Outputs based on significant changes, such as changes in critical health indicators, may additionally be sent to other users, including users in close physical proximity and/or certain organizational users, such as a user in human resources, security, or in a management role.

Similar to systems 600, 800, and 1000, described above, outputs received by user 1202*a* may be displayed on a personal device, including for example on display 1204*a* on user 1202*a*'s tablet and/or display 1204*b* on user 1202*a*'s phone. Further similar to system 800, system 1200 may send an output to an organizational user based on the data set associated with user 1202*a*. In some embodiments, data sets of a group of users including user 1202*a* may be aggregated or otherwise analyzed by processor 1202*a* and an output regarding the group may be sent to an organizational user. Information that may be sent to an organizational user may include information about the current location of user 1202*a* and/or other users of system 1200. Information regarding the length of time user 1202*a* and/or other users have remained in one location may also or alternately be included. In certain embodiments, additional information may also flow from an organizational user to user 1202*a*. For example, an organizational user may provide additional outputs for user 1202*a* that are sent to user 1202*a* at a preferred time determined by system 1200. This may allow an organization to push information to users without disrupting users at inopportune times.

Users typically desire to engage fully in their tasks and employers similarly want users to be able to engage mindfully in selected tasks without interruption. System 1200 allows users to receive beneficial information generated for the users that is delivered at an appropriate time or within an appropriate time range, which may improve the distribution of information without reducing productivity.

Figure 47:
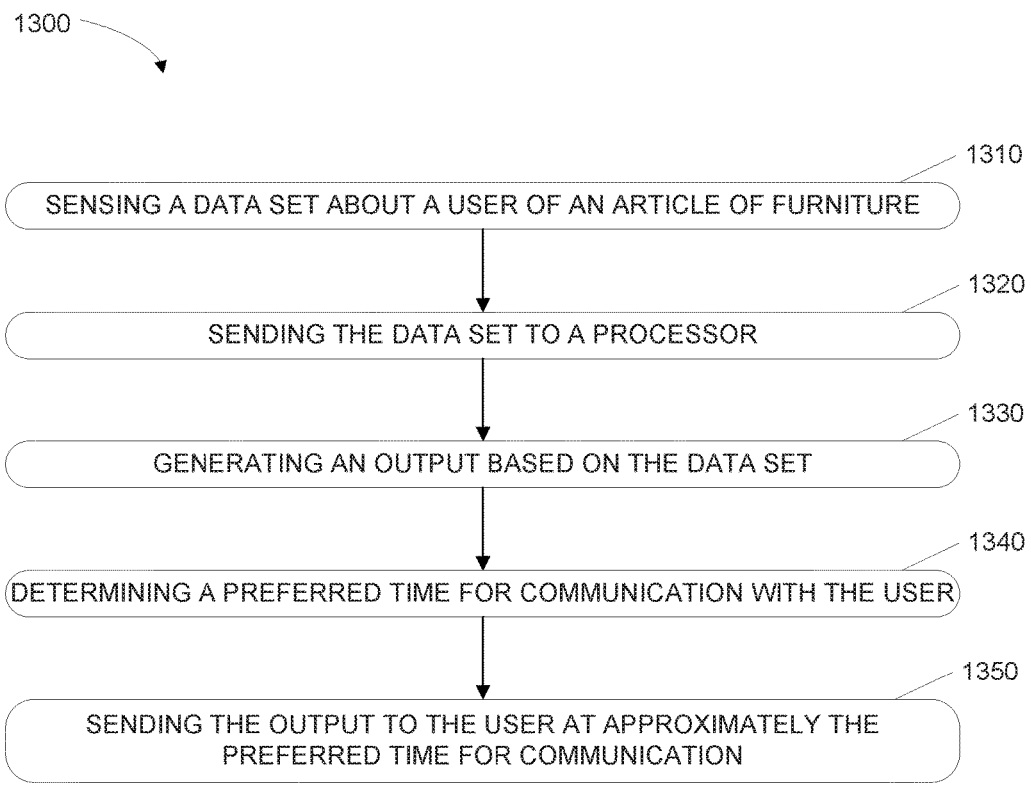
FIG. 47 illustrates a method for providing information to a user in accordance with another embodiment.

FIG. 47 illustrates a method 1300 of providing information to a user of an article of furniture through a system, similar to systems 600 through 1200 discussed above. Method 1300 is directed toward creating a system that can provide information to a user at an appropriate or preferred time. In certain embodiments, the steps disclosed in method 1300 allow the system to prepare information for a user, hold or retain it, and then send it at a preferred time that may not cause an unwanted interruption in the user's work. For example, a user may want information about the location of his team or a reminder to stretch his legs, and he may prefer to receive that information as he switches between tasks, between meetings, or after he's enjoyed a period of time in which he can concentrate on his work. Method 1300 enables a user or users to receive the benefits from participating with the system without sacrificing benefits associated with concentration or from being in the "flow," i.e., in a state where productivity and focus are high.

Step 1310 begins method 1300 by sensing a data set about a user of an article of furniture. Sensors capable of sensing data about a user may be coupled to a variety of articles in the user's environment, including, for example, chairs, tables, floors, storage cabinets, partitions, walls, displays, ceilings, and floors. Sensors may sense changes in temperature, pressure, light, or sound and may include information on the user's presence, activity level, and/or movement. Sensed data may also include one or more indicators of a user's health or wellbeing, such as temperature, heart rate, blood glucose levels, breathing rate, blood pressure, body mass index, and/or brain activity. Within a user's environment, only one sensor, for example, a sensor coupled to the user's chair, may be sensing information about the user. In other embodiments, multiple sensors may be sensing information about the user; these sensors may each be sensing the same type or types of data or particular sensors may be sensing specific information about the user. Sensors for sensing data about the user may be placed within the user's environment depending on the type of information that a user or organization hopes to sense. For example, a sensor coupled to a user's chair may sense information about the user's movement within the chair, from which information on a status of or a change in the user's concentration may be derived. In some embodiments, a sensor positioned in the environment, for example, coupled to a partition or wall, may be able to sense information about a user's presence within the environment, even if he isn't in physical contact with any of the furniture or articles in the environment, while. Various sensors may sense information on a user's identity. Data sensed by the sensor constitute a data set and may include one or more data points.

Method 1300 continues with step 1320 by sending the data set to a processor. The processor may be similar to processors described previously in conjunction with FIGS. 1 through 7. Although referenced in the singular herein, a processor may comprise several processors that may be located together or remotely from one or more other processors and/or components of the system. Data sent to and received by the processor may be received directly from a sensor or may be received through one or more intermediaries, including for example a gateway, similar to gateway 1220. The processor may receive data from a single sensor, multiple sensors associated with a particular user, or multiple sensors associated with multiple users. The processor may also receive other data about users of the system. The processor may aggregate, store, sort, analyze, and otherwise process some or all of the data upon receipt.

Step 1330 includes generating an output based on the data set. Similar to steps 930 and 1130 described in conjunction with methods 900 and 1100, respectively, the processor generates an output based on some or all of the data received. As noted in conjunction with step 1320, in certain embodiments, the processor may access additional sources of information contained within the system and the output may be based on the data set and additional data sources. For example, the processor may receive information from a sensor associated with a user and a sensor tracking ambient noise levels in a space associated with the user. The processor may analyze the data and determine that the user moves in his chair around the same time that an audible interruption occurs, which may indicate that the audio interruption is reducing the user's ability to focus on his current task. The processor may have access to additional information including current task information from the user and scheduling information for nearby environmental resources, such as shared workstations or conference rooms. The processor may generate an output for the user, suggesting that he move to a workstation that is not subject to audible interruptions. Other exemplary outputs may include encouragement for a user to change posture after receiving sensed data indicating the user has been in a similar position for a period of time; a suggestion for an available work environment; communication including motivation, encouragement, or rewards; communication regarding the status of one or more health indicators; information regarding a user's schedule or upcoming calendar commitments; task-specific information; communication about the proximity of another worker or workers; and/or environmental information, such as ambient noise, light, and temperature information.

Step 1340 continues method 1300 by determining a preferred time for communication with the user. The preferred time for communication may be determined in various ways and may be a particular preferred time or a preferred range of time. For example, the preferred time for communication may be determined in conjunction with feedback from the user regarding the user's preferred time and manner of communication. In certain embodiments, the system may solicit feedback directly from the user via an application on a personal device. For example, the system may inquire what type of feedback the user prefers, how often the user takes breaks to optimize output, what types of working environments are most conducive to productive work generally or for specific tasks, and/or other inquiries related to the user's preferred environment to improve productivity. In some embodiments, the system may exclusively rely on affirmative responses to determine a preferred time. It may also rely partially or fully on sensed data about the user. For example, the system may determine a preferred time for communication by sensing and correlating information about when a user choose to act or not act on suggestions contained in the system's outputs with the times at which the user received these outputs.

In various embodiments, a preferred time may be set and not variable; for example, it may be related to a particular time interval or particular time of day. A preferred time for communication may also be dynamic and depend on one or more factors. As noted previously, the system processor may receive or have access to other sources of information about a user and/or environment and this information may impact the determination of a preferred time. For example, processor may access information about a user's current task and may determine that a preferred time for communication is immediate (e.g., if the task is not time sensitive) or is in the future (e.g., at the completion of the task or if the task is time sensitive and/or is incomplete). In particular embodiments, the processor may access information about a user's device usage or devices associated with the user. For example, the processor may access information about devices associated with a user and may determine that the preferred time for communication is approximately the time when the user switches from one device to another (e.g., when a user stops working on a computer or tablet and checks a message on a phone). The processor may alternately or additionally access information about application usage on a user's device and may determine that a preferred time for communication is approximately the time when a user switches from one application to another (e.g., when the user switches from a document creation application to an email application) or between views in an application (e.g., when the user switches from one browser tab to another). The processor may also access, in certain embodiments, information associated with a user's calendaring or scheduling application and may determine that a preferred time for communication is at a time that corresponds approximately to an entry in the calendaring application (e.g., just before a user would stop or interrupt a task to attend a video conference or in-person discussion).

In some embodiments, the processor may determine that a preferred time for communication is when the user begins to lose focus on a current task. The processor will then continuously or regularly analyze the sensed data it receives regarding the user. When the processor determines from the sensed data that the user may be losing focus, the preferred time for communication will have arrived. This may occur, for example, when the sensed data shows that the user is working on a task and sitting relatively still in a chair, and then, while continuing to complete the task, the user increasingly begins to shift in the chair. A preferred time for communication or way the processor determines a preferred time for communication may also be established by someone other than the impacted user, including for example, by an organizational user. For example, in some embodiments, windows of time for communication may be set by an organizational user and the system may rely on sensed data of a user to determine a preferred time for communication with the user within the window set by the organizational user.

Method 1300 concludes with step 1350 by sending the output to the user at approximately the preferred time for communication. By sending the output to the user at the preferred time for communication, a user may benefit from the information conveyed by the system without incurring an additional interruption. By controlling the timing of any communications, workers may be more interested and/or willing to become users of the system. Unmanaged interruptions may reduce work productivity. Consequently, managing the timing of interruptions, by determining a preferred time for communication, may allow one or more users to engage more productively in work and may avoid or reduce the decrease in productivity often attributed to workplace interruptions.

Method 1300 may include several additional or alternative steps. For example, outputs may be displayed to a user via an application on a device associated with the user. The application may be an application specific to the system or an application used for other functions, such as a web browser. In some embodiments, an output may be sent to one or more users, for example, multiple users may be notified that their teammates are located in a given area. An output may also be sent to an organizational user; this output, similar to the organizational outputs described previously, may include information about a user or group of users.

Additional variations on method 1300 or related methods may include a method for setting up a system to collect information about one or more furniture users by identifying or selecting a position within a work environment that is appropriate to sense a data set about a user of an article of furniture within the work environment, placing a sensor in the selected position, and ensuring the sensor can send the data set to a processor, where the processor is configured to generate an output based on the data set, determine a preferred time range for communication with the user, and send the output to the user during the preferred time range for communication. In some embodiments of this related method, the sensor may be coupled to the article of furniture, such as a chair. Another related method may include creating a system for collecting information about a plurality of users in a particular environment, such as a work or office environment, and may include providing a plurality of articles of furniture in a work environment, providing a plurality of sensors positioned within the work environment that are configured to sense individual data sets about a plurality of users of the articles of furniture, and providing a processor configured to receive the individual data sets from the plurality of sensors, determine a preferred time range for communication with one or more users of the plurality of users, and send the one or more outputs to the one or more users during the preferred time range for communication. Similarly, in this related method, each of the sensors may be coupled to one of the plurality of articles of furniture, which may be a grouping of chairs.

Figure 48:
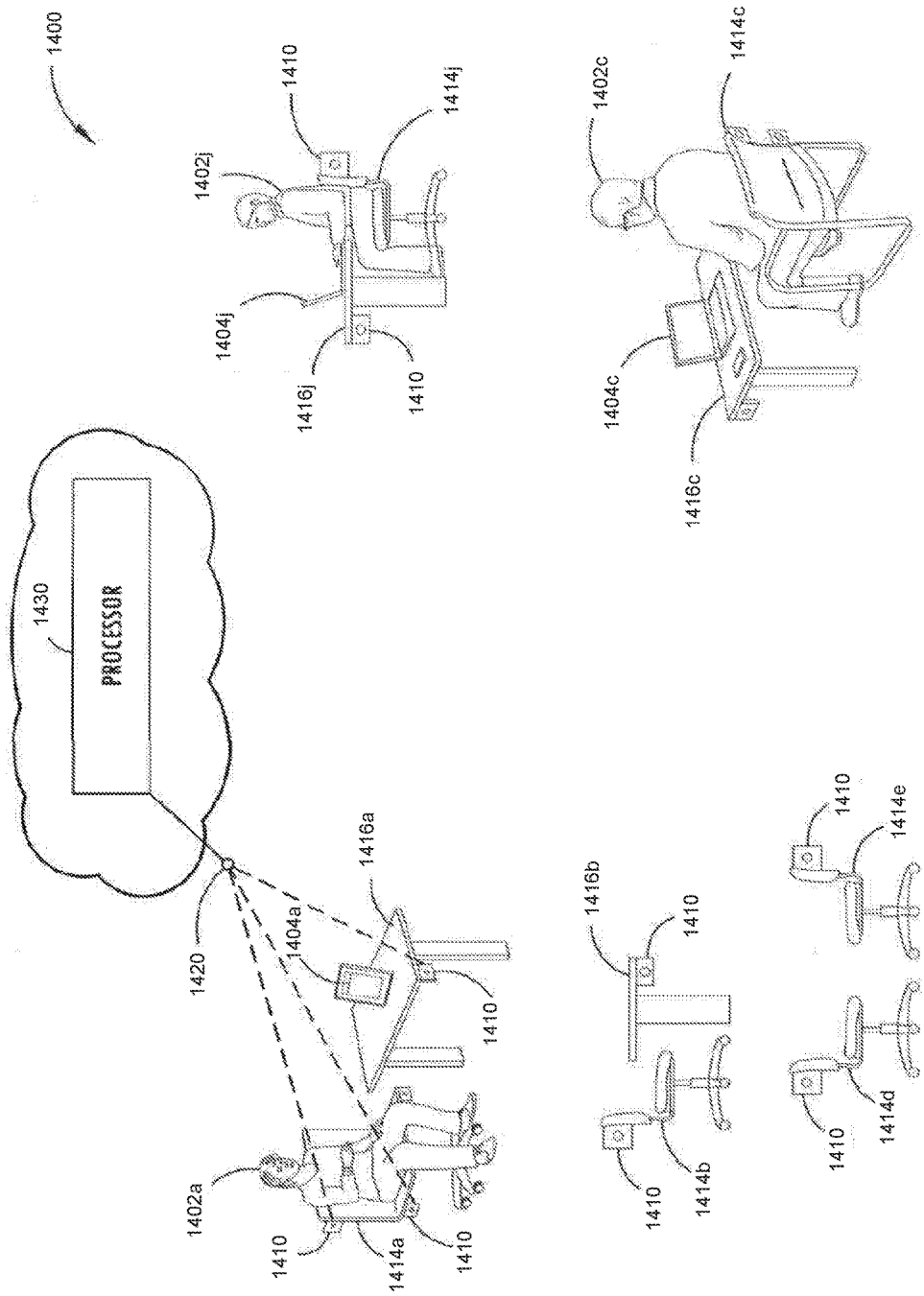
FIG. 48 illustrates a system for providing information to a user in accordance with another embodiment.

FIG. 48 illustrates system 1400 for providing information to a user of an article of furniture, similar to systems described above in conjunction with FIGS. 39 through 47. System 1400 provides information that may help users better collaborate with the users' colleagues. For example, in certain embodiments, system 1400 may sense that two users are working on similar tasks and may send information to one or both users about a space they could use to work together.

System 1400 includes users 1402a, 1402c, and 1402j, displays 1404a, 1404c, and 1404j, sensors 1410, chairs 1414a, 1414b, 1414c, 1414d, 1414e, and 1414j, tables 1416a, 1416b, 1416c and 1416j, gateway 1420, and processor 1430. Any number of users, displays, sensors, furniture, gateways, processors, and other components may be included in various embodiments.

Users 1402a and 1402c are affiliated with an organization and may have a variety of responsibilities. They may be assigned to work on the same team for all or some tasks, or may have no overlapping or coordinating activities. Users 1402a and 1402c may or may not know each other. User 1402j is also affiliated with the organization and has organizational responsibilities. Although user 1402j is illustrated here as one person, in various embodiments, organizational user 1402j may include any suitable number of people or computers with organizational responsibilities.

In the illustrated embodiment, user 1402a is working at a work station that includes chair 1414a and 1416a. A nearby workstation includes chair 1414b and table 1416b. User 1402c is working at a work station that includes chair 1414c and table 1416c. User 1402j is working at a work station that includes chair 1414j and table 1416j. Chairs 1414d and 1414e are located near each other and remote from the work stations described above.

Each of the chairs 1414 and tables 1416 are equipped with sensors 1410. In the illustrated embodiment, sensors 1410 are configured to collect data or sense information about users 1404. Sensors 1410 coupled to chair 1414a and table 1416a collect data about user 1404a; sensors 1410 coupled to chair 1414c and table 1416c collect data about user 1404c; and sensors 1410 coupled to chair 1414j and table 1416j collect data about user 1404j. Sensors coupled to chairs 1414b, 1414d, 1414e and tables 1416b, 1416d, 1416e may collect information as well, which may primary consist of information about the lack of any user activity. Similar to the sensors described previously in conjunction with FIGS. 1 through 8, sensors 1410 may sense changes in pressure, temperature, movement, and health indicators. Information collected by sensors 1410 may be correlated to a user's presence near one or more sensors 1410. a user's posture, a user's focus or mental engagement, and/or a user's health and wellbeing. Additional sensors may be present in the described work environments in a variety of locations.

Sensors 1410 are configured to transmit some or all of the sensed data to processor 1430 via gateway 1420. Processor 1430 processes the data it receives from sensors 1410. Processor 1430 also has access to information regarding the organization, which it receives in sum or in part from organizational user 1402j. Information regarding the organization may include information about users, such as users 1402a's and 1402c's assigned tasks, colleague identities, team member identities, or supervisor identities, as well as information about environmental resources, such as meeting rooms, project rooms, project resources, prototyping resources, videoconferencing resources, and nourishment locations. Processor 1430 may also receive or have access to additional information related to users 1402, including for example, current application usage on any personal devices, calendars, email patterns and traffic, and personal preferences.

In the illustrated embodiment, processor 1430 generates an output or outputs based on the data it receives, including data about users 1402a and 1402c from sensors 1410 and data regarding the organization from organization user 1402j. Outputs include information about another user's location or activity, information about environmental locations conducive to collaboration, independent work, or down-time, and/or information about productive changes in upcoming calendar events or additional calendar events. A variety of outputs are available based on the sensed data received by processor 1430.

In certain embodiments, after receiving sensed data about users 1402a and 1402c regarding their respective and separate locations and receiving information from organizational user 1402j that users 1402a and 1402c are working together on a project, processor 1430 may generate an output with location information about one or both users. For example, the output may direct user 1402a that a colleague, such as user 1402c, is working in a nearby location, identify the location, and/or provide directions or travel time to the location. In particular embodiments, processor 1430 may generate an output with varied location information about multiple colleagues or multiple teams.

Processor 1430 may additionally or alternatively receive information about the present tasks of users 1402a and 1402c. Processor 1430 may generate an output for user 1402a regarding the activity of user 1402c. For example, an output generated for user 1402a may include information that user 1402c is working on a similar task, is working on a task that is on user 1402a's agenda but has not yet been started, or is completing a task for which both users 1402a and 1402c share responsibility. Processor 1430 may also generate an output for user 1402a with information about the location of a group of users who have been assigned the same or similar task and the current status of the group members' work.

In some embodiments, generated outputs may include task and location information. For example, the output may include information for user 1402a that a colleague, such as 1402c, is working on a similar task at a nearby location and may identify the location. These outputs may allow users of system 1400 to better collaborate with teammates, especially when teammates are mobile workers or are working in distributed locations. Similar outputs regarding task and location may allow users more accurately to find assistance for a given task. For example, organizational user 1402*j* may provide information to processor 1430 regarding the experiences or expertise of a given group of users. Processor 1430 may then generate an output for user 1402*a* with information about the location of a system user who has had previous experience in a type of task, should user 1402*a* need assistance.

In certain embodiments, processor 1430 may generate an output with location information for a user or group of users regarding a location for collaboration. For example, processor 1430 may receive sensed data indicating that user 1402*a* and user 1402*c* are present but in separate locations. Processor 1430 may also receive sensed data indicating that chairs 1414*b*, 1414*d* and 1414*e* are vacant and available. Based on this sensed data and an input from organizational user 1402*j*, processor may generate an output that suggests that user 1402*c* move closer to user 1402*a* by occupying chair 1414*b*, or that users 1402*a* and 1402*c* may be able to collaborate or work together at chairs 1414*d* and 1414*e*. Processor may rely on other information, including for example, ambient noise, task, distance from each user, user preferences, and/or other factors, to determine which option to suggest. The outputs may include the locations of chair 1414*b* or chairs 1414*d* and 1414*e*, respectively. In various embodiments, a suggested location for collaboration may include certain chairs, tables, lounge spaces, nourishment spaces, meeting spaces, spaces with videoconferencing capabilities, confidential spaces, or development spaces, and may depend on a variety of factors, including the number of participating users, the tasks of the users, the identity of the users, and the present location of the users.

Processor 1430 sends one or more of the generated outputs to one or more users of system 1400. In several of the examples described above, processor 1430 sends the output to at least user 1402*a*. Outputs may also be sent to user 1402*c*, organizational user 1402*j*, and other users or groups of users. Outputs sent to a user or users may be displayed on a personal device of the user, including for example, a mobile phone, a tablet, a laptop computer, or other display affiliated with the user. The output or a communication based on the output may be displayed on the personal device of a user via an application related to or developed Cor system 1400 or via an application that may be used for many purposes, such as a web browser.

Benefits of system 1400 may include the ability of individual users to identity and/or locate team members more efficiently, which may allow a mobile workforce to collaborate more easily. In some embodiments, additional benefits of system 1400 may include increased productivity for users, for example, in situations where a user needs help completing a task and receives information on the location of a user who can provide assistance.

Figure 49:
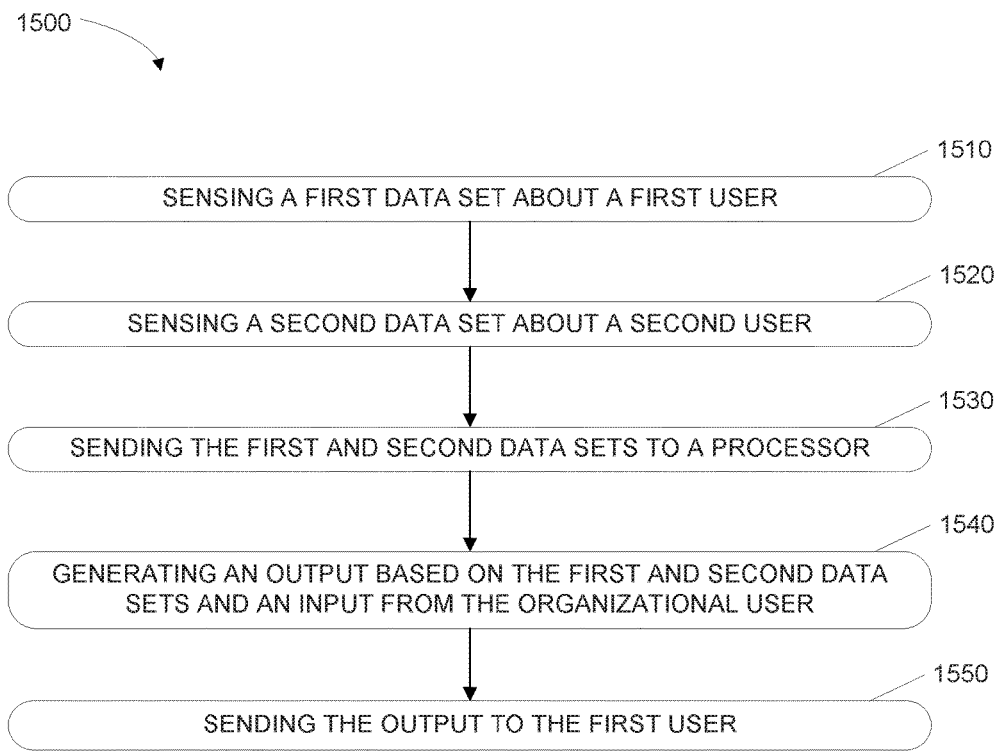
FIG. 49 illustrates a method for providing information to a user in accordance with another embodiment.

FIG. 49 illustrates a method 1500 of providing information to a user of an article of furniture through a system, similar to systems 600 through 1400 discussed above. Method 1500 is directed toward generating and sharing providing information on the locations and activities of system users in order to foster collaboration. Method 1500 allows a user to receive information regarding the location and activities of his colleagues. Method 1500 may be particularly helpful in work environments where some or all workers are mobile or are not assigned a particular workstation for day-to-day tasks. Information on the location and/or activities of other users, may allow a user to find or contact others on his team for collaboration. Method 1500 may also be helpful in work environments where multiple users, who would benefit from working together to complete a task, select or are assigned to remote workstations. By receiving information about the location and/or activity of other users, a user can make an informed decision as to whether moving to another location might help accomplish a given task.

Method 1500 starts with step 1510 by sensing a first data set about a first user and proceeds to step 1520 by sensing a second data set about a second user. Steps 1510 and 1520 occur via one or more sensors present in the work environments of the first and second users. A sensor configured to sense a first data set or a second data set may be coupled to or embedded in an article of furniture, such as a chair, desk, lounge furniture, or storage furniture, or to or in structural elements within the environment, such as partitions, walls, ceilings, or flooring elements. Each data set may include one or more pieces of data. In some embodiments, a data set will include all data points sensed or collected by one or more sensors or may include only some of the data points sensed by one or more sensors.

Method 1500 continues by sending the first and second data sets to a processor. The sensors described in conjunction with steps 1510 and 1520 will transmit data to a processor. Sensors may send data continuously, sporadically, at regularly timed intervals, or whenever data is generated. One sensor with the system may send data at different times than some or all other sensors within the system. In particular embodiments, sensors will receive a notification prompting the transfer of some or all sensed data. The processor may be a single processor or a collection of processors, which may be physically located near or remotely from one or more work environments including sensors. Some or all sensors may, in certain embodiments, transmit data to the processor through an intermediary device, such as a gateway. In addition to the first and second data sets, the processor may have access to or may receive additional data. For example, the processor may receive information about some or all users of the system, including information on user roles within the organizational structure; user positions, tasks, and activities; calendaring information; and information about the personal devices of users. This additional information may, in some embodiments, be received directly or indirectly from a user within the system who has responsibilities for managing the organization, often described herein as an organization user.

In embodiments where one or more sensors are positioned within a space assigned to an individual user, any data collected by the sensor or sensors may be attributed by the processor to the individual user based on the sensor identity. For embodiments where sensors are positioned within a space that accommodates mobile users or a group of users, the processor may not be able to assign data automatically to a certain user or users. In these embodiments, the processor may utilize an alternative correlation between sensed data with a particular user in order to provide feedback to that user. For example, one or more sensors within the system may be able to sense and collect data about an aspect of the user's activity (e.g., the user's movement) and collect data about the user's identity. Sensors may be able to collect information about the user's identity by sensing and identifying a user's badge or personal electronic device such as a phone, wearable, tablet, or laptop. Approximate user location may be determined by identifying the location of one or more sensors that are collecting data about a user. Multiple sensors may be able to triangulate a user's location. Sensors may transmit user identification data separately or with other data and identification data may be a part of the first and/or second data sets disclosed in steps 1510 and 1520.

Step 1540 continues method 1500 by generating an output based on the first and second data sets and an input from the organizational user. As described above in conjunction with step 1530, processor may access additional information about a user or an environment. This additional information may be accessible in whole or in part via one or more inputs from an organizational user. For example, a user with some responsibilities for running an organization may provide information to the system regarding tasks and teams of various users. The processor is then able to use the sensed data collected in steps 1510 and 1520 and the organizational input to generate an output. The output may include information about a user's tasks, teammates, or current or suggested work environment.

For example, the processor may receive sensor information indicating that two users of the system are present within a given proximity of each other. The processor may also receive or have received information from an organizational user that the two users are both tasked with working on a project. Upon receiving information about the users, the processor may generate an output for one user that includes information on the location of the other user. This may allow one user to seek out the other user for assistance or to collaborate in person. Alternately, in embodiments where the users may or may not be present within a given proximity of each other, the processor may generate an output for one or both users that includes information on their respective locations and information on a possible physical meeting location or on a method to meet and discuss electronically, for example, information on a video conferencing site for one or both users.

After receiving the information described above, the processor may generate additional or alternate outputs. Examples include an output with information on the location of a manager or supervisor, information on the progress of a colleague or teammate on a task, or information on available work environments.

Method 1500 concludes at step 1550 by sending the output to the first user. In various embodiments, method 1500 will include different or additional steps. For example, in some embodiments, sending the output to the first user will include displaying the output via an application on a personal device of the user. An output that is the same, similar, or different may be sent to one or more other users, including an organizational user, groups of users, or all users. A variation on method 1500 may creating a system to provide similar information to users by identifying a plurality of positions within a work environment appropriate for sensing, placing a first sensor in a first position of the plurality of positions, where the first position is appropriate to sense a first data set about a first user of a first article of furniture; placing a second sensor in a second position of the plurality of positions. where the second position is appropriate to sense a second data set about a second user of a second article of furniture; and ensuring the first and second sensors are configured to send the first and second data sets to a processor, where the processor is configured to generate an output based on the first and second data sets and an input from an organizational user and to send the output to the first user. Another variation on method 1500 may include creating a system for collecting information about a group of users by providing a plurality of articles of furniture in a work environment, providing a plurality of sensors in the work environment that are configured to sense individual data sets about a plurality of users of an article of furniture; and providing a processor configured to receive the individual data sets from the plurality of sensors, to generate one or more outputs based on the data sets and one or more inputs from an organizational user, and to send the one or more outputs to the one or more users. In some embodiments, one or more of the sensors may be coupled to the articles of furniture, which may often be office chairs.

The technical benefits of these method steps may include allowing a group of users to connect more efficiently with colleagues, teammates, and mentors. Several of these steps may allow a distributed team or mobile work force to collaborate more easily, which may increase productivity and user satisfaction.

Figure 50:
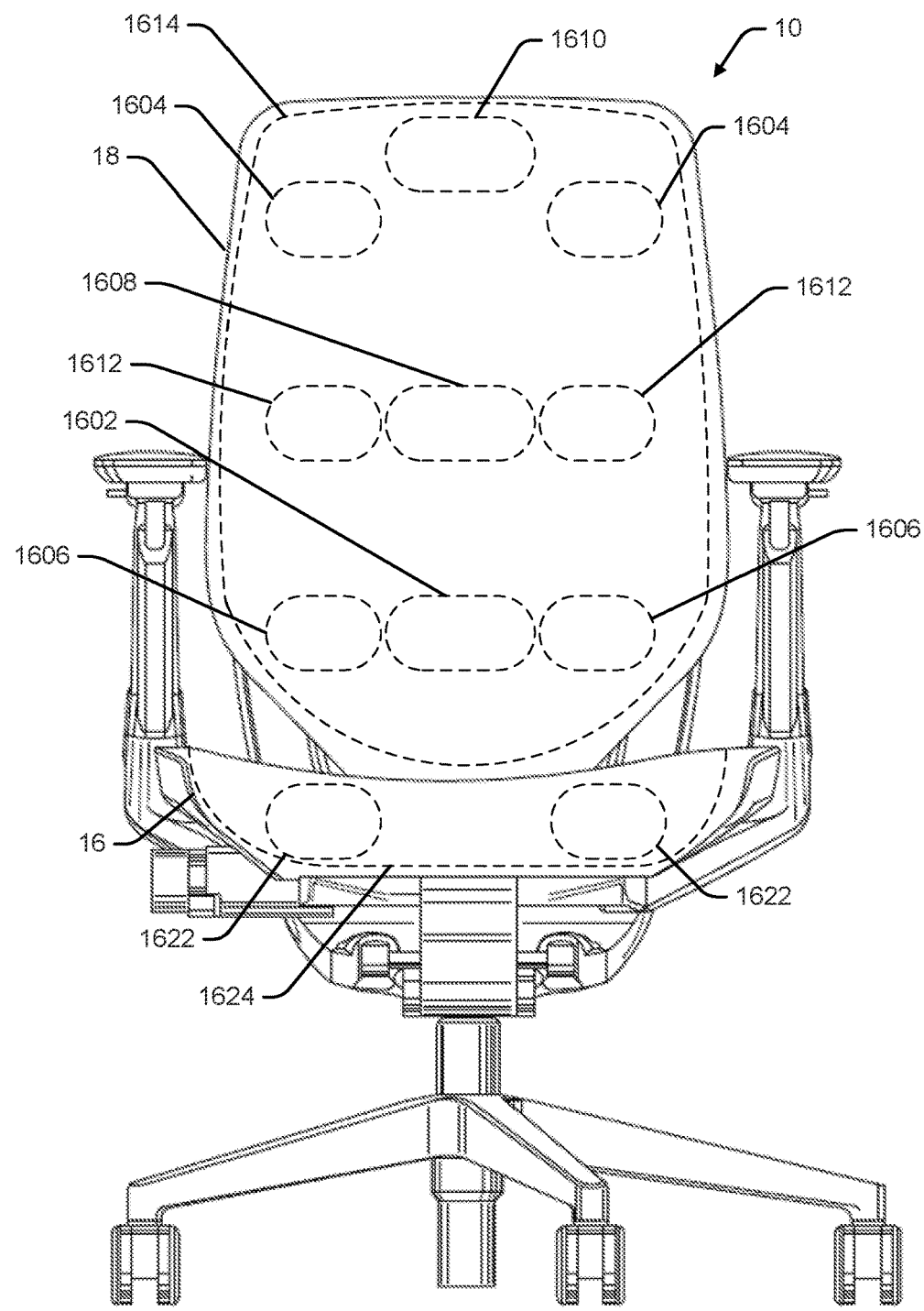
FIG. 50 is a chair assembly, in accordance with an aspect of the present disclosure.

Referring again to FIG. 1 and also now to FIG. 50, an exemplary chair assembly 10 can provide heat to a seated user in locations that are selected based on user comfort or the best available medical knowledge for treatment of various muscle and joint conditions. For example, the chair assembly 10 can provide heat to a seated user in the lumbar region of the back, by a continuous heating element located in the lower part of the back assembly 18, by a series of heating elements located in the lower part of the back assembly 18, or by one or more heating elements located where the best available medical advice indicates that lower back heat treatment is most effective.

The chair assembly 10 can also provide heat to a seated user in an effort to promote better posture based on the best available scientific evidence for the manipulation of seating habits by the application of heat. Different combinations of heating elements are contemplated and, for each combination, different ways of controlling heat in each of the elements are contemplated. For example, heat can be applied at the very bottom of the backrest in an effort to coax a user into shifting her buttocks backward to engage the backrest. Heat could also be applied at the front of the seat cushion, in an effort to coax a user into avoiding a "perched" seating position where the thighs are not supported.

Referring still to FIG. 50, the chair assembly 10 can include heating elements in the back assembly 18. The chair assembly 10 can include a two-point heating element arrangement in the back assembly 18, with a central lower element 1602 located at the bottom of the back assembly 18 for applying heat to the lumbar region of the back, and a central middle element 1608 located in the middle of the back assembly 18 for applying heat to a central portion of a user's thoracic region of the back.

The chair assembly 10 can include a three-point heating element arrangement in the back assembly 18, with the central lower element 1602 deployed and utilized in the same fashion as the two-point heating element arrangement, and two upper flanking elements 1604 located at the top right and top left of the back assembly 18 for applying heat to a user's shoulders.

Alternatively, the chair assembly 10 can include a four-point heating element arrangement in the back assembly 18, with two lower flanking elements 1606 located at the bottom left and bottom right of the back assembly 18 for heating a user's lumbar region of the back, and two upper flanking elements 1604 deployed and utilized in the same fashion as the three-point heating element arrangement.

Alternatively, the chair assembly 10 can include a five-point heating element arrangement in the back assembly 18, with two lower flanking elements 1606 and two upper flanking elements 1604 deployed and utilized in the same fashion as the four-point heating element arrangement, and the central middle element 1608 deployed and utilized in the same fashion as the two-point heating element arrangement. A different five-point heating element arrangement in the back assembly 18 can include a central lower element 1602 and two upper flanking elements 1604 deployed and utilized in the same fashion as the three-point heating element arrangement, a central middle element 1608 deployed and utilized in the same fashion as the five point heating element arrangement, and a central upper element 1610 located at the top middle of the back assembly 18 for applying heat to a central portion of the user's upper middle back or cervical region of the back.

Alternatively, the chair assembly 10 can utilize a six-point heating element arrangement in the back assembly 18, with two lower flanking elements 1606 and two upper flanking elements 1604 deployed and utilized in the same fashion as the four-point heating element arrangement, and two middle flanking elements 1612 located in the middle left and middle right of the back assembly 18 for heating a user's thoracic region of the back on the left and right side.

Alternatively, the chair assembly 10 can utilize a seven-point heating element arrangement in the back assembly 18, with two lower flanking elements 1606, two middle flanking elements 1612, two upper flanking elements 1604, and the central upper element 1610.

The chair assembly can include any of the heating elements described herein as a one-point heating element arrangement in the back assembly 18. Other two-point heating element arrangements include any two flanking elements or any two central elements. Other three-point heating element arrangements in the back assembly 18 include the following: a central lower element 1602, a central middle element 1608, and a central upper element 1610; two flanking lower elements 1607 and a central middle element 1608 or a central upper element 1610; two flanking middle elements 1612 and a central lower element 1602 or a central upper element 1610; and two flanking upper elements 1604 and a central middle element 1608. Other four-point heating element arrangements in the back assembly 18 include the following: any combination of two flanking elements with two different flanking elements; or any combination of two flanking elements with two central elements. Other five-point heating element arrangements in the back assembly 18 include the following: any combination of two flaking elements with two different flanking elements, and one central element; or any combination of two flanking elements with three central elements. Other six-point heating element arrangements in the back assembly 18 include the following: any combination of two flanking elements with two different flanking elements, and two central elements.

Figure 51:
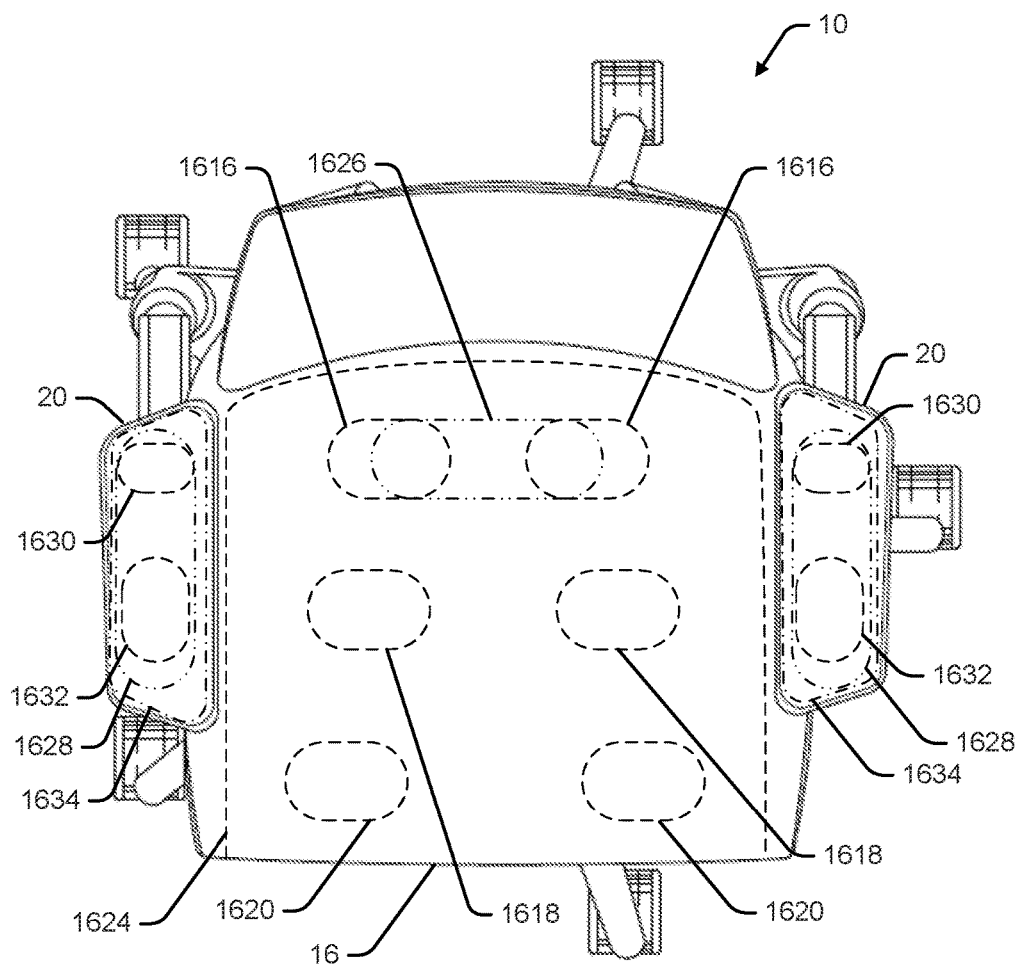
FIG. 51 is a chair assembly, in accordance with an aspect of the present disclosure.

Referring to FIGS. 50 and 51, the chair assembly 10 can include heating elements in the seat assembly 16. The chair assembly 10 can include a two-point heating element arrangement in the seat assembly 16, with two rear elements 1616 located at the back of the seat assembly 16 for applying heat to a user's buttocks, two middle elements 1618 located in the middle of the seat assembly 16 for applying heat to a user's upper thighs, two front elements 1620 located at the front of the seat assembly, for applying heat to a user's lower thighs, or two forward-facing elements 1622 located on a front-facing portion of the seat assembly 16 for applying heat to the back of a user's knees or to a user's upper calves.

The chair assembly 10 can include a three-point heating element arrangement in the seat assembly 16, with a single rear element 1626 for applying heat to a user's buttocks and the two middle elements 1618, the two front elements 1620, or the two forward-facing elements 1622.

The chair assembly 10 can include a four-point, six point, or eight-point heating element arrangement in the seat assembly 16, with any combination of the two rear elements 1616, the two middle elements 1618, the two front elements 1620, and the two forward-facing elements 1622.

The chair assembly 10 can include a five-point or seven-point heating element arrangement in the seat assembly 16, with the single rear element 1626 and any combination of the two middle elements 1618, the two front elements 1620, and the two forward-facing elements 1622. The chair assembly 10 can include a one-point heating element arrangement in the seat assembly 16 with any heating element described herein.

Referring to FIG. 51, the chair assembly 10 can include heating elements in the arm assemblies 20. The chair assembly 10 can include a one-point heating element arrangement in each arm assembly 20, with a full length heating element 1628 for heating a user's elbows, forearms, and wrists, a rear heating element 1630 for heating a user's elbows, or a front heating element 1632 for heating a user's forearms and/or wrists. The chair assembly 10 can include a two-point heating element arrangement in each arm assembly 20, with the rear heating element 1630 and the front heating element 1632.

Referring to FIG. 50, the chair assembly 10 can utilize a heat application mapping module 1614 in the back assembly 18, such as a smart fabric that can selectively apply heat to any of the locations described herein with respect to the back assembly 18. Referring to FIGS. 50 and 51, the chair assembly 10 can utilize a heat application mapping module 1624 in the seat assembly 16, such as a smart fabric that can selectively apply heat to any of the locations described herein with respect to the seat assembly 16. Referring to FIG. 51, the chair assembly 10 can utilize a heat application mapping module 1634 in the arm assemblies 20, such as a smart fabric that can selectively apply heat to any of the locations desired herein with respect to the arm assemblies 20.

The chair assembly 10 can include any combination of the heating element arrangements for the back assembly 18, the seat assembly 16, and the arm assemblies 20. In some aspects, the chair assembly can include all or some of the heating elements described herein and a user must activate the heating elements in a commissioning process.

The heating elements shown in FIGS. 50 and 51 are of an exemplary size and shape and can be bigger, smaller, or shaped differently than pictured. The heating elements shown in FIGS. 50 and 51 are positioned in exemplary locations and in certain aspects, the positions are customizable to a particular user. For example, the upper elements 1604 can be positioned higher for a person with a longer torso or lower for a person with a shorter torso.

The heating elements can be manually repositioned by a user in at least some embodiments. For example, the back assembly 18 could contain a plurality of foam inserts in various locations where a user might desire a heating element, and the user could replace the foam insert with a heating element in a location that is customized to the user's physical dimensions. Alternatively, the heating elements may be repositioned by a motor mechanism, which can move in response to a specific user command or in automatic response to a user's physical dimensions, which can be programmed or sensed by the chair assembly. In the event the best available medical knowledge changes, the heating elements described herein may be deployed in a variety of additional locations, so as to be suitable for applying heat to a user according to the best available medical knowledge.

Control of the heating elements may be dynamic in at least some embodiments. To this end, for instance, one or more heating elements may be cycled through different temperatures where the changing temperature is intended to help maintain a chair user's alertness. The cycling may only be controlled for one or a subset of chair heating elements while others are maintained at a constant or steady state temperature. In some cases the heating element temperature or cycling pattern may be adjusted as a function of sensed parameters within the chair seat and/or backrest structure. For instance, where pressure is substantial at one seat location, heat may be applied at a different seat location or at several other seat locations to encourage the employee to shift her weight to what is perceived to be a more healthy position. As another instance, the heat may be cycled on and off at different locations to encourage user movement in cases where that type of activity is perceived to be advantageous. Here, for instance, some employees may shift to avoid applied heat while others shift to encounter applied heat.

The chair assembly 10 can include pressure sensors, which can be utilized for an on-board measurement of the occupancy state of a chair or a user's posture. The pressure sensors can be located at positions determined by the best available scientific knowledge relating to seated posture and health.

Figure 52:
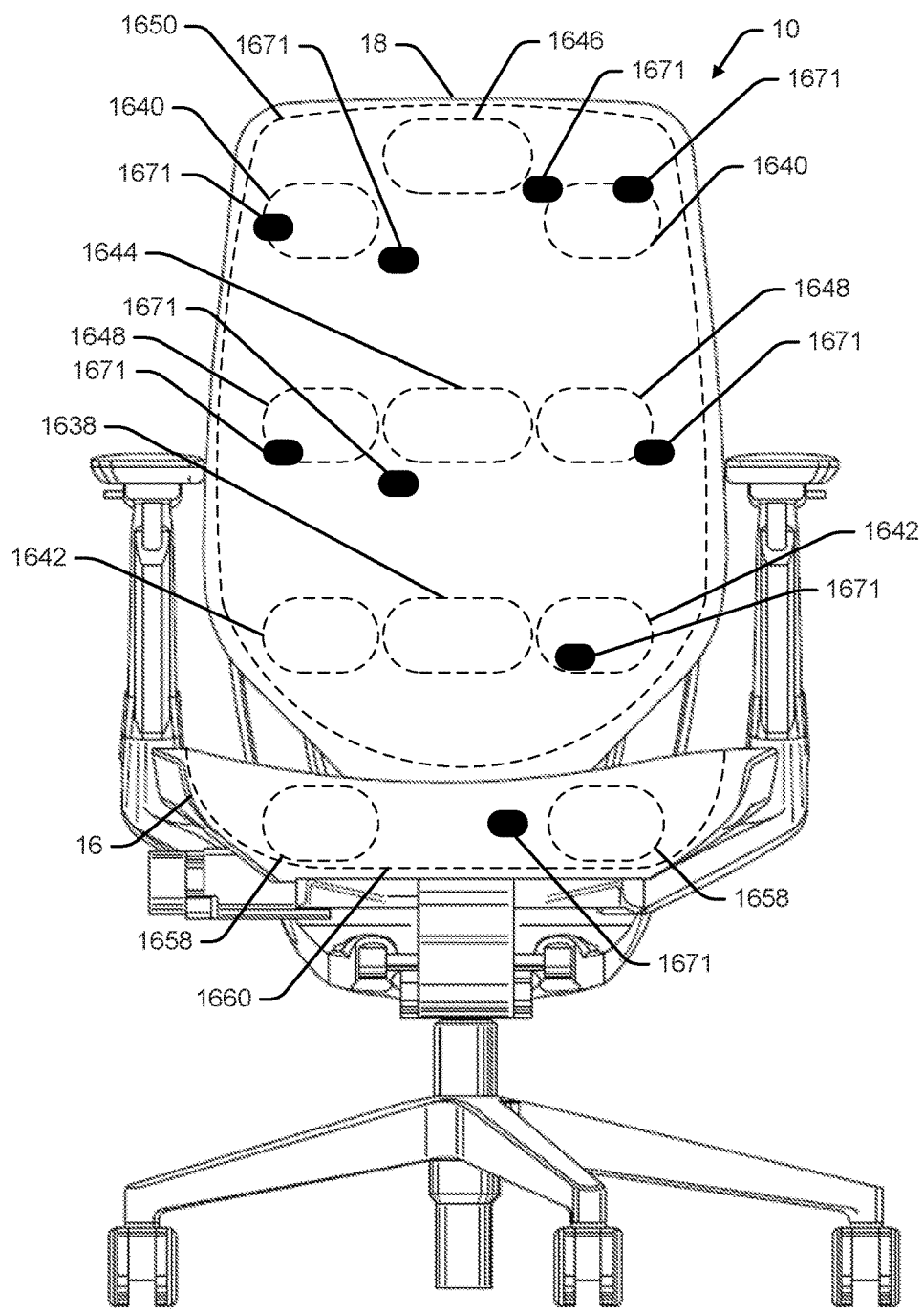
FIG. 52 is a chair assembly, in accordance with an aspect of the present disclosure.

Referring to FIG. 52, the chair assembly 10 can include a three-point pressure sensor arrangement in the back assembly 18, with a central lower sensor 1638 located at the bottom of the back assembly 18 for sensing if a user's buttocks and/or lumbar region of the back are appropriately contacting the back assembly 18, and two upper flanking sensors 1640 located at the top right and top left of the back assembly 18 for sensing if a user's shoulders are appropriately contacting the back assembly 18 and maintaining balance between the pressure on the shoulders.

Alternatively, the chair assembly 10 can include a four-point pressure sensor arrangement in the back assembly 18, with two lower flanking sensors 1642 located at the bottom left and bottom right of the back assembly 18 for sensing if a user's buttocks and/or lumbar region of the back are appropriately contacting the back assembly 18 such that there is balance between the user's hips, and two upper sensors 1640 deployed and utilized in the same fashion as the three-point pressure sensor.

Alternatively, the chair assembly 10 can include a five-point pressure sensor arrangement in the back assembly 18, with two lower flanking sensors 1642 and two upper flanking sensors 1640 deployed and utilized in the same fashion as the four-point pressure sensor, and one central middle sensor 1644 located in the middle of the back assembly 18 for sensing if a user's thoracic region of the back is appropriately contacting the back assembly 18 or one central upper sensor 1646 located at the top of the back assembly 18 for sensing if a user's cervical region of the back is appropriately contacting the back assembly 18.

Alternatively, the chair assembly 10 can utilize a six-point pressure sensor arrangement in the back assembly 18, with two lower flanking sensors 1642 and two upper flanking sensors 1640 deployed and utilized in the same fashion as the four-point pressure sensor, and two middle flanking sensors 1648 located in the middle left and middle right of the back assembly 18 for sensing if a user's thoracic region of the back is appropriately contacting the back assembly 18 such that there is balance between the left and right side.

The chair assembly can include any of the pressure sensors described herein as a one-point pressure sensor arrangement in the back assembly 18 or any two of the pressure sensors described herein as a two-point pressure sensor arrangement in the back assembly 18. Other three-point pressure sensor arrangements in the back assembly 18 include the three central sensors or any combination of two flanking sensors and one central sensor. Other four-point pressure sensor arrangements in the back assembly 18 include any pair of two flanking sensors or any two central sensors and any two flanking sensors. Other five-point pressure sensor arrangements include the three central sensors and any two flanking sensors, or one central sensor and any two pairs of flanking sensors. Other six-point pressure sensor arrangements include two central sensors and any two pairs of flanking sensors. A seven-point pressure sensor arrangement can include any of the five-point pressure sensor arrangements plus an additional pair of flanking sensors. An eight-point pressure sensor arrangement can include all of the pressure sensors described herein sans one central sensor. A nine-point pressure sensor arrangement can include all of the pressure sensors described herein.

Figure 53:
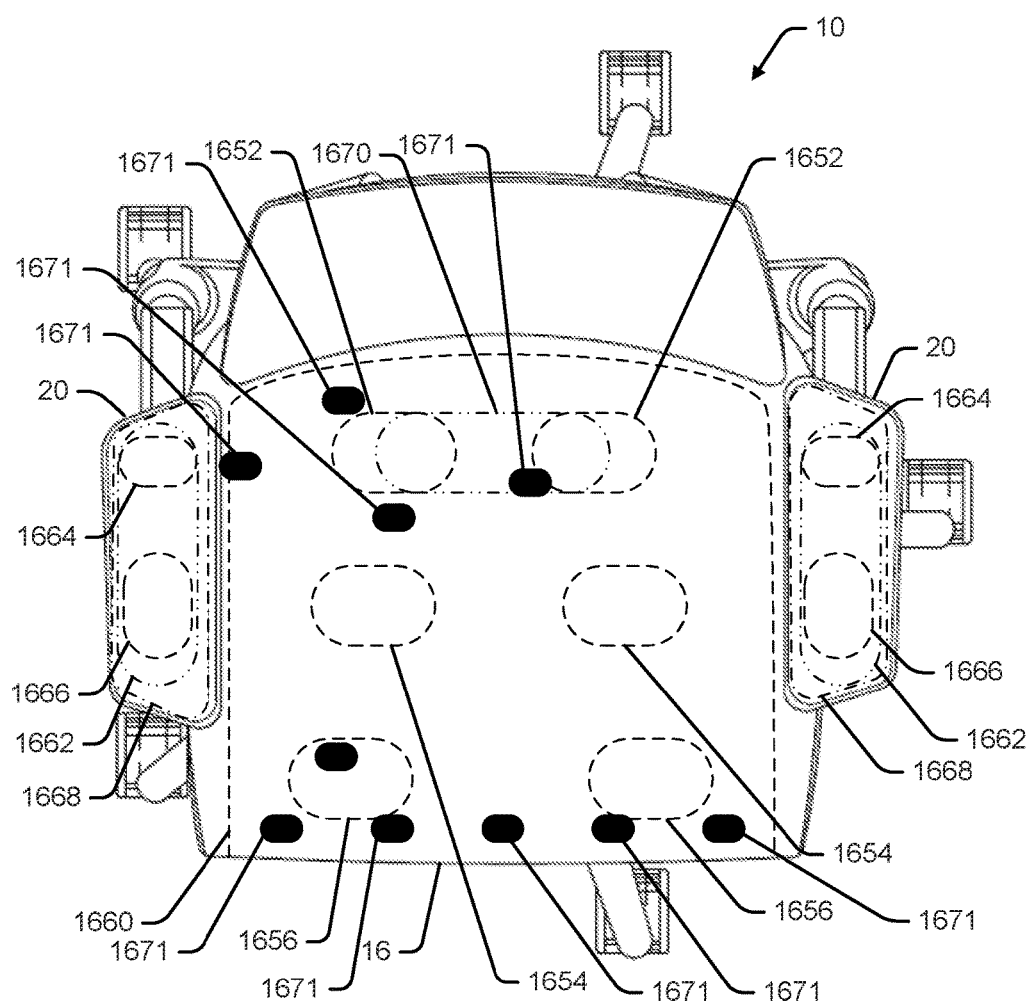
FIG. 53 is a chair assembly, in accordance with an aspect of the present disclosure.

Referring to FIGS. 52 and 53, the chair assembly 10 can include pressure sensors in the seat assembly 16. The chair assembly 10 can include a two-point pressure sensor arrangement in the seat assembly 16, with two rear sensors 1652 located at the back of the seat assembly 16 for sensing pressure applied by a user's buttocks as well as the balance of pressure between a user's hips, two middle sensors 1654 located in the middle of the seat assembly 16 for sensing pressure applied by a user's upper thighs as well as the balance of pressure between the user's upper thighs, two front sensors 1656 located at the front of the seat assembly, for sensing pressure applied by a user's lower thighs as well as the balance of pressure between the use's lower thighs, or two forward-facing sensors 1658 located on a front-facing portion of the seat assembly 16 for sensing pressure applied by a user's knees or a user's upper calves as well as the balance of pressure between the user's knees or upper calves.

The chair assembly 10 can include a three-point pressure sensor arrangement in the seat assembly 16, with a single rear sensor 1670 for sensing pressure applied by a user's buttocks and the two middle sensors 1654, the two front sensors 1656, or the two forward-facing sensors 1658.

The chair assembly 10 can include a four-point, six point, or eight-point pressure sensor arrangement in the seat assembly 16, with any combination of the two rear sensors 1652, the two middle sensors 1654, the two front sensors 1656, and the two forward-facing sensors 1658.

The chair assembly 10 can include a five-point or seven-point pressure sensor arrangement in the seat assembly 16, with the single rear sensor 1670 and any combination of the two middle sensors 1654, the two front sensors 1656, and the two forward-facing sensors 1658. The chair assembly 10 can include a one-point pressure sensor arrangement in the seat assembly 16 with any pressure sensor described herein.

Referring to FIG. 53, the chair assembly 10 can include pressure sensors in the arm assemblies 20. The chair assembly 10 can include a one-point pressure sensor arrangement in each arm assembly 20, with a full length element 1662 for sensing pressure applied by a user's elbows, forearms, and wrists, a rear pressure sensor 1664 for sensing pressure applied by a user's elbows, or a front pressure sensor 1666 for sensing pressure applied by a user's forearms and/or wrists. The chair assembly 10 can include a two-point pressure sensor arrangement in each arm assembly 20, with the rear pressure sensor 1664 and the front pressure sensor 1666.

Referring to FIG. 52, the chair assembly 10 can utilize a pressure mapping module 1650 in the back assembly 18, such as a smart pressure-sensitive fabric, to generate a pressure map of the user's contact with the back assembly 18 and/or sense any of the relevant pressures described herein with respect to the back assembly 18. Referring to FIGS. 52 and 53, the chair assembly 10 can utilize a pressure mapping module 1660 in the seat assembly 16, such as a smart pressure-sensitive fabric, to generate a pressure map of the user's contact with the seat assembly 16 and/or sense any of the relevant pressures described herein with respect to the seat assembly 16. Referring to FIG. 53, the chair assembly 10 can utilize a pressure mapping module 1668 in the arm assemblies 20, such as a smart pressure-sensitive fabric, to generate a pressure map of the user's contact with the arm assemblies 20 and/or sense any of the relevant pressures described herein with respect to the arm assemblies 20.

The chair assembly 10 can include any combination of the pressure sensor arrangements for the back assembly 18, the seat assembly 16, and the arm assemblies 20. In some aspects, the chair assembly can include all or some of the pressure sensors described herein and a user must activate the pressure sensors in a commissioning process.

The pressure sensors shown in FIGS. 52 and 53 are of an exemplary size and shape and can be bigger, smaller, or shaped differently than pictured. The pressure sensors shown in FIGS. 52 and 53 are positioned in exemplary locations and in certain aspects, the positions are customizable to a particular user. The pressure sensors can be manually repositioned by a user in at least some embodiments. For example, foam inserts can be located in a position where a user might desire a pressure sensor, and the user could replace the foam insert with the pressure sensor in a location customized to the user.

The heating elements can be repositioned by a motor mechanism, which can move in response to a specific user command or in automatic response to a user's physical dimensions, which can be programmed or sensed by the chair assembly 10 in at least some embodiments. In the event the best available scientific knowledge relating to seated posture and health changes, the pressure sensors described herein can be deployed in a variety of additional locations, so as to be suitable for sensing pressure for posture determinations according to the best available scientific knowledge.

In some aspects, the pressure sensors can be used to ensure that there is no or at least minimal pressure in certain locations. For example, referring again to FIG. 52, the seat assembly can include the two front pressure sensors 1658 for sensing if a user's calves are engaged with the front of the seat assembly. According to the currently best available scientific knowledge, the best posture requires space between a user's calves and the front of the seat assembly.

In some aspects, referring to FIGS. 52 and 53, the pressure sensors may be point pressure sensors 1671 that measure essentially a single point of pressure. The point pressure sensors 1671 can be located at positions scientifically determined to be ideal for identifying postures with the minimal number of sensors possible, as shown in FIGS. 52 and 53.

Although there is a general concept of ideal posture according to the best available scientific knowledge, it is generally not ideal for a user to occupy any single posture position for too long, even if it is an ideal posture position. Accordingly, the chair assembly might utilize the pressure sensors to monitor a user's posture to account for the cycling of postures. For example, if it is generally known that there is one ideal posture, and four nearly-ideal postures that are close to ideal but not quite ideal, the chair assembly can monitor pressure sensors or points on a pressure map associated with the one ideal posture and the four nearly-ideal postures when the user initially sits. Then, after sensing that the user is occupying one of these postures and has not moved for a certain length of time, the chair assembly can monitor the pressure sensors or points on a pressure map associated with the other postures that the user is not occupying, in order to prompt the user to occupy one of the other postures, in order to actuate a portion of the chair in order to physically alter the user's posture to conform with one of the other postures, or simply to determine if and when the user moves to one of the other postures.

If the chair assembly senses that a user has occupied a particular posture for a certain period of time, for example, 30 minutes or a length of time considered by the best available medical knowledge to be the longest time a person should occupy one position, then the chair assembly can prompt a user to change postures. The prompt can take the form of a visual or audio cue, a vibration, or an actuation of a part of the chair assembly 10 in an attempt to force the user to occupy a different posture.

In some aspects, the chair assembly 10 can assess posture immediately by taking a "snap shot" of a user's posture. For example, the processor can assess the posture of a user using the snap shot described above, and if the user is sitting with bad posture in the snap shot, then the processor can make a recommendation for an adjustment of posture to the user or can actuate a part of the chair assembly 10 to prompt an adjustment of the user's posture. In some aspects, the chair assembly 10 can assess posture hysteretically by averaging the posture of a user over time. For example, the processor can assess a user's average posture over the course of five minutes, or any other pre-programmed length of time, and if the user's average posture is bad, then the processor can make a recommendation for an adjustment of posture to the user or can actuate a part of the chair assembly 10 to prompt an adjustment of the user's posture.

As the chair assembly attempts to improve a user's posture either by prompting the user to adopt a better posture or by mechanically moving the chair to guide the user's body into a better posture, the improvement can be made slowly over time. For example, the chair assembly 10 may only prompt the user when the user is in a posture that is perceived to be below a certain posture quality level. As another example, the chair assembly 10 may only prompt the user a small number of times per day at first, and then slowly increase the number of times the chair assembly 10 will prompt the user, and eventually, the chair assembly 10 can prompt the user any time the user is not using good posture. As a further example, the chair assembly 10 can slowly adjust the physical position of the chair, the application of heat or vibrations to certain locations of the chair, or a combination thereof in order to adjust the user's posture. This adjustment can be slow enough that it is not easily perceived by the user.

In some aspects, a single component can serve as both a heating element and a pressure sensor, thus allowing application of heat and sensing pressure simultaneously at a single location.

Figure 55:
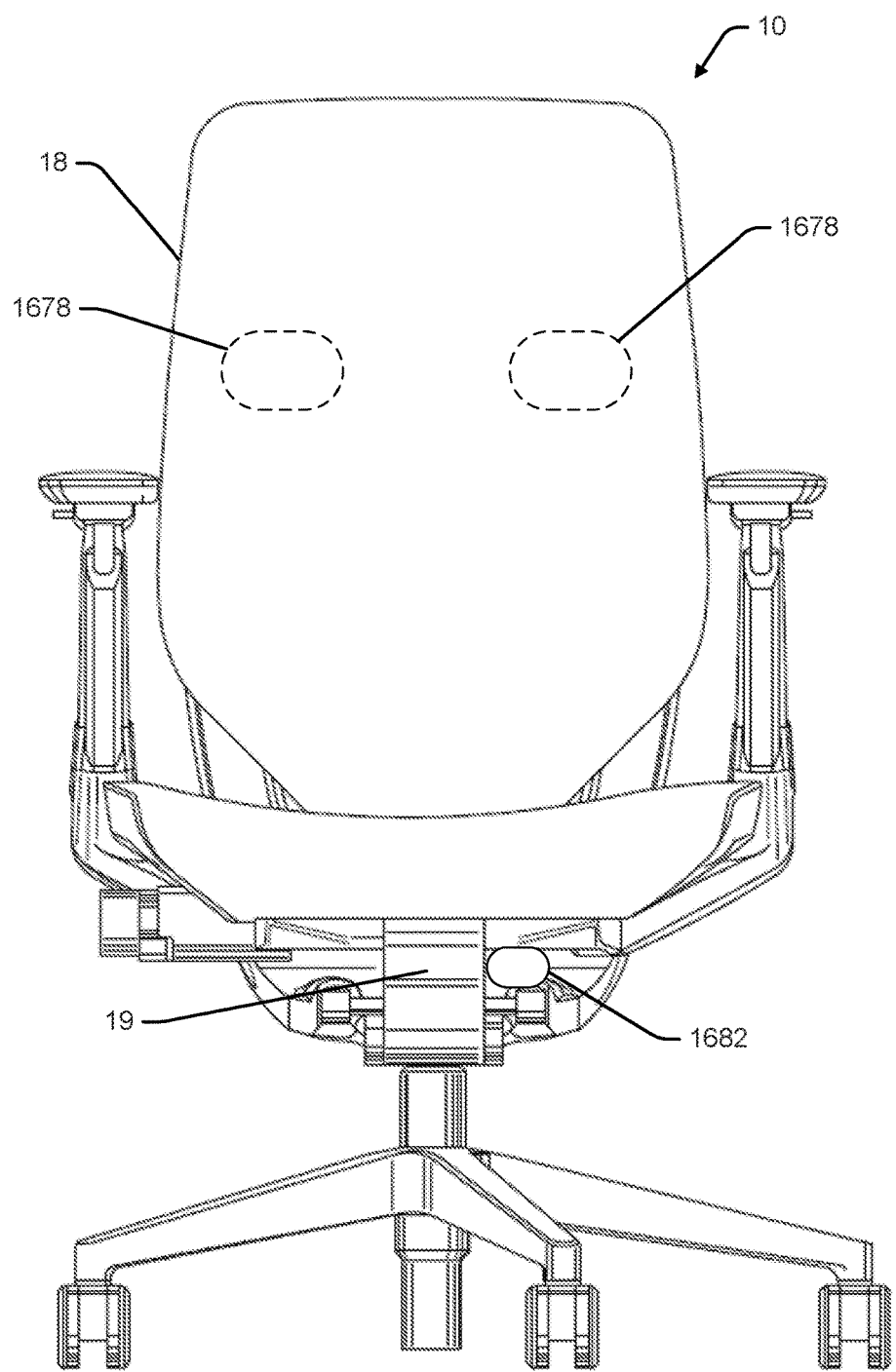
FIG. 55 is a chair assembly, in accordance with an aspect of the present disclosure.

Temperature sensors can measure the temperature of the user, the temperature of a portion of the chair assembly 10 contacted by the user, or an ambient temperature of the environment surrounding the chair assembly 10 and the user. In embodiments where temperature sensors are configured to measure the temperature of the user, they can be located at the same positions as set forth above with respect to the pressure sensors, as shown in FIGS. 52 and 53. In embodiments where a temperature sensor is configured to measure the ambient temperature, the temperature sensor 1682 can be located in a location that the user does not come into contact with, such as on an underside of support assembly 19, as shown in FIG. 55.

Figure 54:
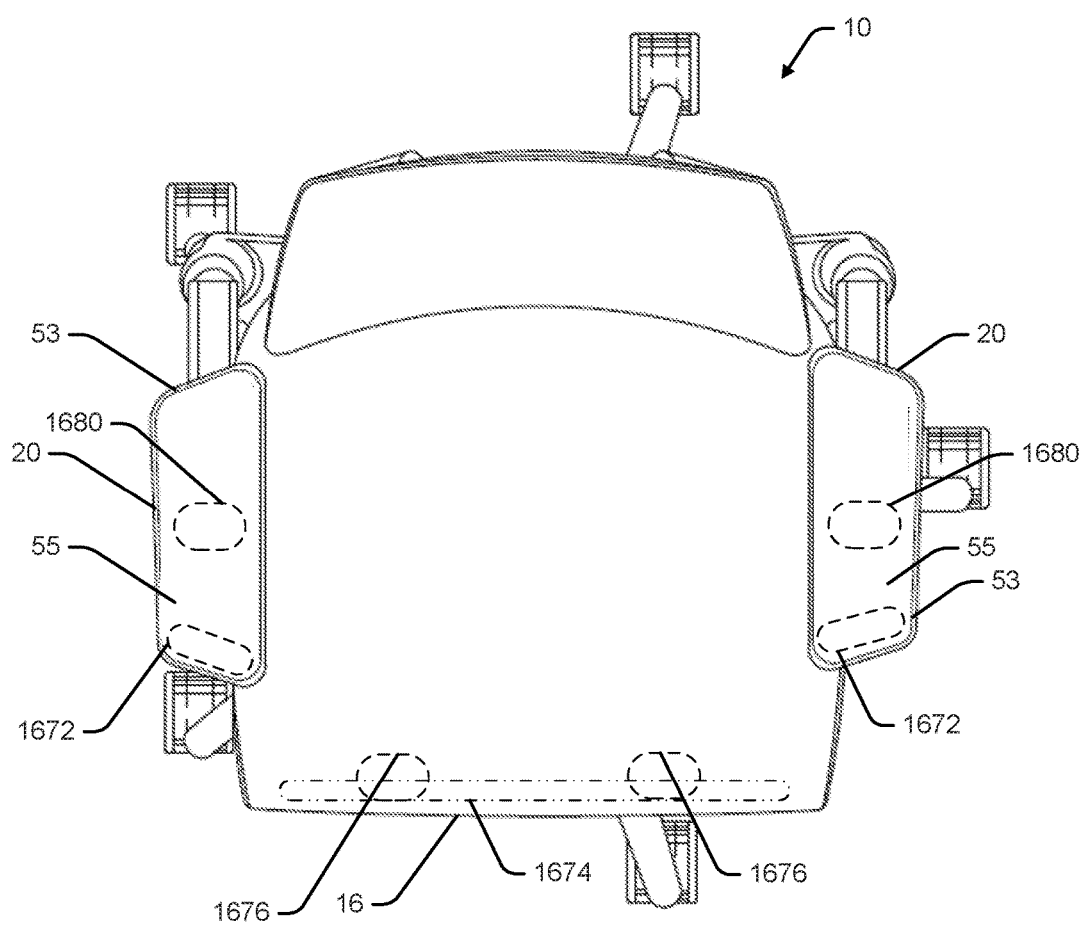
FIG. 54 is a chair assembly, in accordance with an aspect of the present disclosure.

As described herein, the chair assembly 10 can include a heart rate sensor. Many of the locations where a pulse can be sensed on a user are inaccessible by a chair supporting a seated user, but some can be accessed by heart rate sensors located in the chair assembly 10. Two different pulses can be sensed in the wrist area, namely, the radial pulse and the ulnar pulse. Referring to FIG. 54, a wrist heart rate sensor 1672 positioned at the front edge of the top surface 55 of one or both of the armrests 53 could measure a heart rate when a user is utilizing the armrests. Another pulse can be sensed in the legs, namely, the popliteal pulse, which can be sensed behind the knee. Referring to FIG. 54, a single knee heart rate sensor 1674 positioned at the front edge of the seat assembly 16 or two separate knee heart rate sensors 1676 positioned at the front edge of a seat assembly 16 where a user's legs are expected to fall could measure a heart rate when a user is sitting appropriately far back in the chair.

As described herein, the chair assembly 10 can include a breath rate sensor. Referring to FIG. 55, the chair assembly 10 can include breath rate sensors 1678 at positions within the back assembly 18 that are proximate the lung cavity of a seated user.

As described herein, the chair assembly 10 can include a galvanic skin response sensor. Because most of the contact points between a user and the back assembly 18 or seat assembly 16 are clothed, the galvanic skin response sensor is preferably located on the top surface 55 of the armrest 53. For example, referring to FIG. 54, the galvanic skin response sensor 1680 can be located in the middle of the top surface 55 of the armrest 53, though other locations on the top surface of the arm assembly 20 are contemplated.

"Flow" is a concept that relates to a mental and physical state where a user is performing in an optimal fashion. Developments have enabled the sensing and detection of a user's flow state. The chair assembly can utilize one or more of the sensors described herein, an on-board processor, and the best scientifically-available techniques for sensing flow, to determine if a user occupying a chair is in a flow state, out of a flow state, entering a flow state, or exiting a flow state. The chair assembly can utilize a visual indicator on the chair assembly, such as one or more LEDs that illuminate in colors representative of an instantaneous or steady state flow state, an optical indicator that projects a certain ambient light about the chair representative of the flow state, a smart material on the chair that changes colors to indicate flow state, etc.

The chair assembly can communicate with other chair assemblies, via a wireless transmitter, and can share data relating to a user's flow state. The visual indicator can then be representative of a user's current flow state relative to other user's, a user's average flow state relative to other user's, the total amount of time a user is in a flow state compared with other users, and the like.

If a processor makes a determination that a user is in a flow state, is being productive, is actively collaborating, or any other determination of a generally positive user state, and at the same time the processor determines that one or more prompts need to be delivered to the user, such as a prompt regarding recharging the chair assembly or a prompt to recommission the chair assembly, or the processor determines that the posture of the user should be adjusted by actuating one or more portions of the chair assembly, then the processor can delay the prompt or the posture adjustment until the user is no longer in the generally positive state. For example, if a user is in a flow state and the chair requires recharging, the processor might wait until the user is no longer in the flow state to notify the user or the processor might wait until the chair is at a critically low charge state to notify the user. Similarly, if a processor determines that a user is being very productive, but that their posture is not ideal to the point that the processor would like to actuate the chair assembly to adjust the user's posture, then the processor can wait until the user is no longer being very productive to adjust the user's posture. These settings can be adjusted based on user. For instance, a user can configure the processor to never interrupt a flow state, regardless of the charge state of the chair or posture of the user. A user can also program which sensed or deduces states can or cannot be interrupted. For example, a user could configure the processor to not prompt the user or adjust posture if the user's heart rate is below a certain level, if the user's stress is below a certain level, if the user's focus is high, any combination thereof, or the like.

Figure 56:
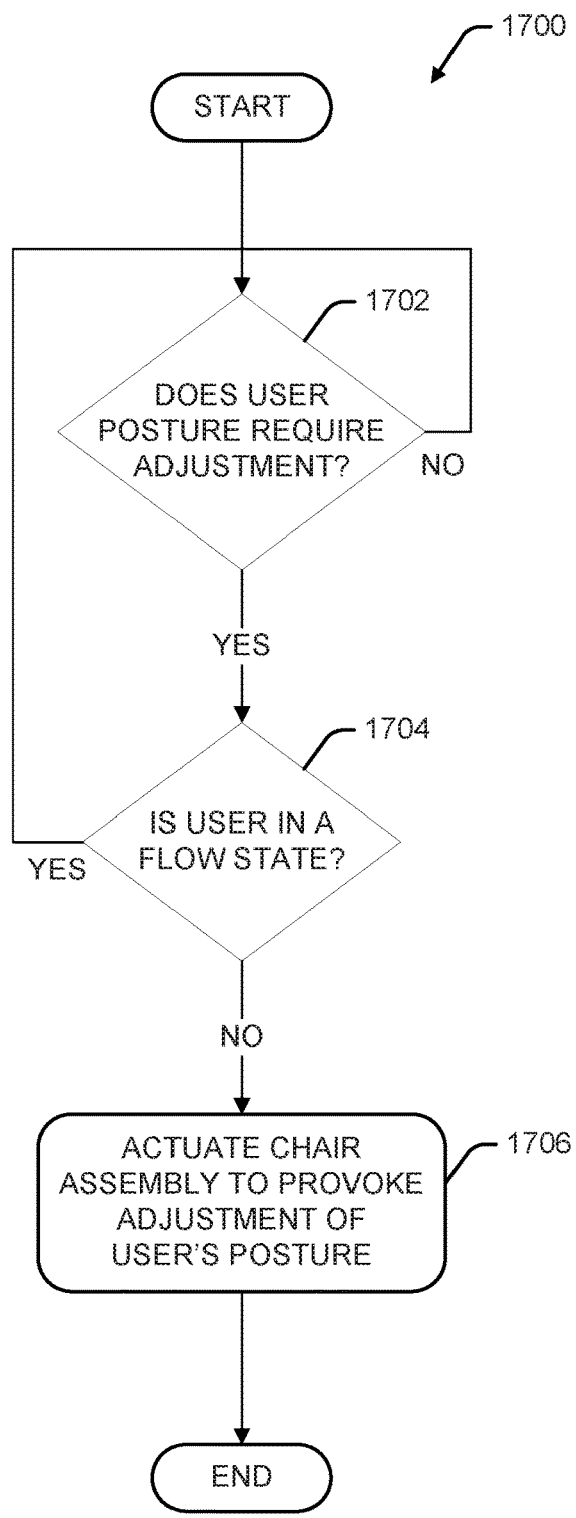
FIG. 56 is a flowchart showing a method of determining whether or not to adjust a user's posture based on the user's flow state.

Referring to FIG. 56, an example of a method 1700 of a processor determining whether or not to disturb a user's generally positive state is shown. The flowchart describes the method 1700 in terms of sensing a posture, determining if a user's posture requires adjustment, and then determining whether or not to disturb the user based on whether the user is in a flow state or not, but is equally applicable to any determination that a user needs to be disturbed or any generally positive state as described herein. At decision block 1702, the method 1700 includes determining if a user's posture requires adjustment. If the answer to decision block 1702 is NO, then the method 1700 repeats decision block 1702. If the answer to decision block 1702 is YES, then the method proceeds to decision block 1704. At decision block 1704, the method 1700 includes the processor determining if the user is in a flow state. If the answer to decision block 1704 is YES, then the method 1700 can return to decision block 1702. If the answer to decision block 1704 is NO, then the method 1700 can proceed to process block 1706. At process block 1706, the method 1700 can include actuating one or more aspects of the chair assembly that are expected to provoke an adjustment of the user's posture to a more ideal posture. Instead of actuating the chair assembly, the method 1700 can notify the user that the user's posture is not ideal and should be adjusted.

The chair assembly can include an on-board commissioning feature, where a user can identify preferred operational parameters for the chair by using a button, touch screen or other interface device mounted on the chair assembly itself. For example, a user can prompt the chair assembly to enter into the commissioning feature by pressing or holding a user interface, such as a button or a touch screen. An optical or audio indicator could then indicate to the user that the commissioning feature is active. The user could then set a preferred positioning of one or more aspects of the chair assembly, such as height of the seat, height of the arm rests, tension in the recline of the backrest, or the like. In another aspect, the user could set a preferred temperature for the heating function by pressing one button or location on a touch screen that raises the temperature or another button or location on a touch screen that lowers the temperature.

In another aspect, the user could set preferred heating locations. In one variation, the user could cycle through a set of pre-set heating locations by pressing a button or a location on a touch screen. In another variation, the user could activate individual heat application modules by selecting them on a touch screen. In yet another variation, if the chair assembly has a continuous heat application module, such as a smart fabric that applies heat at selective locations or a heating pad with very small heating elements, the user could activate chosen heating application locations by selecting and deselecting them on a touch screen.

In certain aspects, the chair assembly 10 can sense a changed property in the user or in the environment and can notify the user of the changed property. The notification can be a prompt for the user to utilize the commissioning feature (i.e., re-commissioning the chair assembly 10) in order to make sure the user's preferred operational parameters are set for varying user or environmental stated. For instance, if the chair assembly 10 senses that the environmental temperature is higher or lower than when the user commissioned the chair, the chair assembly could notify the user that the temperature is different and prompt the user to commission the chair at the new temperature or at least query if the user would like to re-commission the chair. For example, if the user commissions the chair during a Winter month, the chair could prompt a user to re-commission the chair on the first warm day of Spring, the first hot day of Summer, or the day that the facility changes from heating to air conditioning.

In an aspect, if the user commissions the chair when the user weighs a first weight and the user then gains or loses weight to weigh a second weight, the chair assembly 10 could notify the user that the chair was commissioned at the first weight and prompt the user to re-commission the chair for the second weight. For example, if a user commissions the chair at a weight of 200 lbs. and then loses 30 lbs. to weigh 170 pounds, the chair could prompt the user through a visual, audio, or haptic cue to re-commission the chair at the new weight. The user could then recommission the chair, indicate through a user interface that the user does not wish to recommission the chair at this time, which may cause the chair to remind the user again after some period of time, or that the user does not wish to re-commission the chair.

In some aspects, the extent of the commissioning process for a chair assembly 10 can be tailored to a particular user or category of user. The commissioning process can be more extensive for a user that is designated as a repeat user or that is anticipated to be a repeat user by selection algorithm. The commissioning process can be less extensive for a user that is designated a less frequent user or that is anticipated to be a less frequent user by a selection algorithm. For instance, in a conference facility environment, a conference room chair could have a thorough commissioning process for an employee of the conference facility, but could have a less extensive commissioning process for an attendee at a conference that is being hosted at the conference facility.

The selection algorithm could identify one or more properties of the user, such as distance a user resides from the facility, the number of times a user has accessed the facility over a certain time period, the user's job credentials, and the like, then weight those properties based on a programmed or learned set of priorities, and determine the probability that a user will be a repeat user or a less frequent user.

In another aspect, the extent of the commissioning process for a chair assembly 10 can be tailored to the intended use of the chair. For example, a chair assembly 10 that is intended for use in a single-occupant office could have a thorough commissioning process, because a single user is likely to be a repeated user of the chair assembly 10, while a chair assembly that is intended for use in a conference room could have a very brief commissioning process, because multiple users are likely to occupy the chair assembly.

As described elsewhere herein, a user's attentiveness, need for a break, productivity, flow, or combination of these can be continuously monitored. Based on this monitoring, a commissioning or re-commissioning prompt may be delivered at a time when it is determined that prompting the user is not likely to disrupt productivity. For example, if a user's flow is being monitored, and it is determined that commissioning or re-commissioning of the chair assembly 10 would be beneficial at a time when a user is in a flow state, the chair assembly 10 could wait until the user emerges from the flow state before prompting the user to commission or re-commission the chair assembly 10.

Because the chair assembly 10 in many instances is utilized to improve productivity, and because constantly interrupting a user with prompts to re-commission the chair assembly 10 would likely decrease productivity, the chair assembly 10 can have a minimum time interval between prompts to re-commission the chair assembly 10. In some aspects, this minimum time interval could be one day, two days, one week, fifteen days, three weeks, one month, or more.

The chair assembly 10 can include a feature that enables a user to prevent the acquisition of data using the sensors described herein. For example, the chair assembly 10 can include a switch labeled "PREVENT DATA ACQUISITION" in a first position and "ALLOW DATA ACQUISITION" in a second position. When the switch is in the first position, the chair assembly 10 is prevented from acquiring data from the sensors. When the switch is in the second position, the chair assembly 10 can acquire data from the sensors.

The chair assembly 10 can include a feature that enables a user to prevent transmission of data from the chair assembly 10. For example, the chair assembly 10 can include a switch labeled "PRIVACY" or "PREVENT DATA TRANSMISSION" in a first position and "SHARING" or "ALLOW DATA TRANSMISSION" in a second position. When the switch is in the first position, the chair assembly 10 is prevented from sharing data with a facility-based processor or other outside users. When data is prevented from being shared, it can still be used for on-board processing. For example, if data is not being shared, the chair assembly 10 can still measure the ambient temperature and apply heat to a user. When the switch is in the second position, the chair assembly 10 can transmit data to outside users. In some aspects, when the switch is in the first position, the chair assembly 10 is still able to share data with an individual user's devices or computers.

These switches can be in the form of a virtual switch that is activated/deactivated by a touch screen located on the chair assembly 10. These switches can be a voice-responsive switch. For example, a user can say "Chair, stop acquiring/transmitting data" to prevent data acquisition/transmission and "Chair, start acquiring/transmitting data" to resume data acquisition/transmission. In embodiments having more than a simple switch, the user can be selective about which data is acquired or transmitted. For example, using a touch screen or voice-responsive switch, a user can select to acquire or transmit data relating to occupancy, but can select to not acquire or not transmit data relating to the user's weight.

The chair assembly 10 can record a user's preferences and "learn" which settings a user prefers. For instance, if a user manually adjusts the application of heat in response to a particular ambient temperature, the processor 58 can "learn"

this behavior and begin automatically adjusting the application of heat in response to the particular ambient temperature. As another example, if the chair assembly 10 and system as a whole senses that a user is repeatedly less alert after lunch, the chair assembly 10 might "learn" this and start providing additional stimuli to the user in the early afternoon.

The chair assembly 10 can include software that predicts certain settings for the user based on historical data regarding the preferences of other individuals. In some aspects, a chair assembly processor 58 can be programmed with a predictive software. The predictive software can result from an analysis of historical data. For example, the data may show that all users that are taller than six feet prefer one setting and all users that are shorter than six feet prefer a different setting. The characteristics of the user are set as variables in the historical data analysis and those variables are fit to the historically preferred settings for users. The predictive software can be updated as more data becomes available, either by user initiation or automatic updating. The predictive software can also be run remote from the chair assembly 10. In at least some cases, predictions may be used as defaults or automatic parameter settings to be used when a particular user has not already specified preferences.

Figure 57:
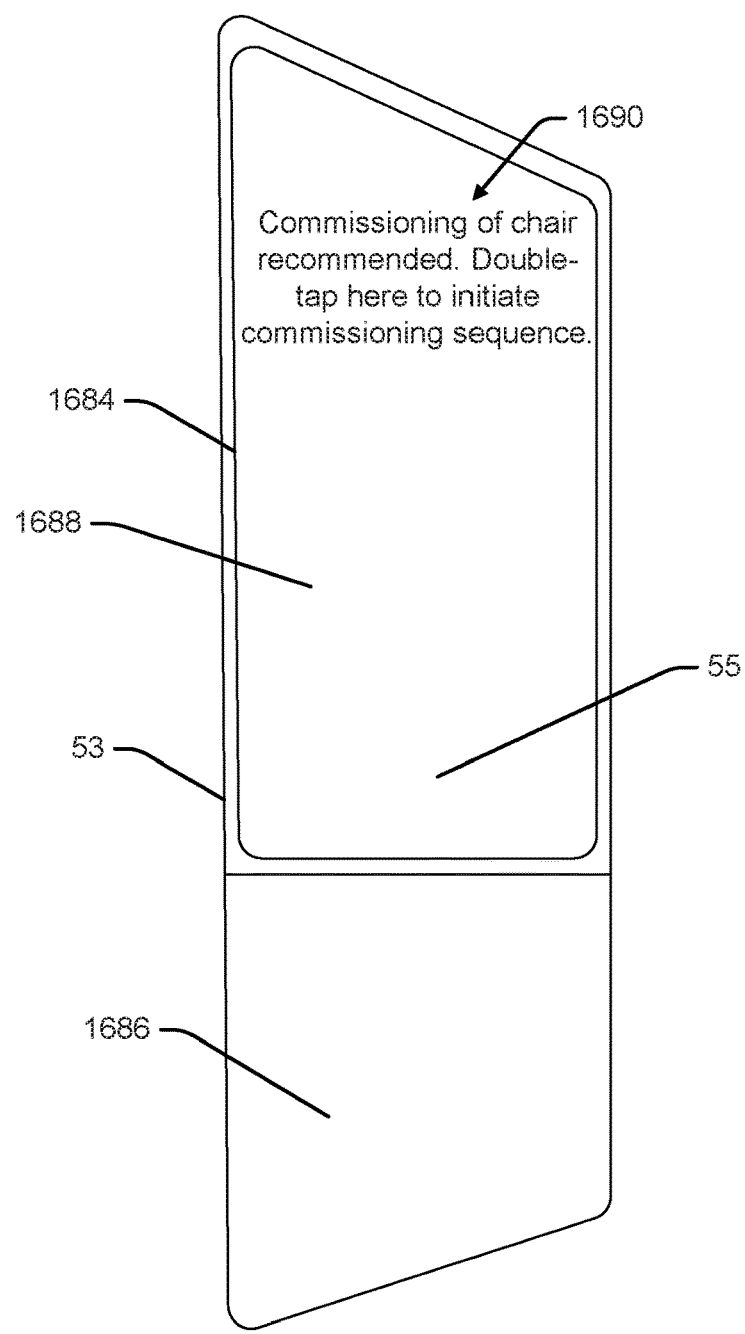
FIG. 57 is an armrest with a touch screen located on a front portion, in accordance with an aspect of the present disclosure.

In some aspects, a touch screen 1684 can be located in an armrest of an arm assembly. Referring to FIG. 57, the top surface 55 of the armrest 53 can be divided into two areas: a back portion 1686 where the elbow rests; and a front portion 1688 where the forearm rests. The back portion 1686 can be padded for a user's comfort. The front portion 1688 can be a touch screen 1684 for enhanced functionality. In some aspects, the touch screen 1684 can initially be inactive, so that the user does not accidentally perform an action on the touch screen while resting her forearms. The touch screen 1684 can then be activated by a specific user signal input to the touch screen 1684, such as a double- or triple-tap, by a voice command, such as "touch screen on", or by other activation means. The touch screen 1684 can be configured to recognize the difference between a touch from a user's forearm and a touch from a user's hand. The touch screen 1684 can then revert to an inactive state after being unused for a certain period of time. The touch screen 1684 can display a message 1690, such as "Commissioning of chair recommended. Double-tap here to initiate commissioning sequence." The touch screen 1684 can provide the functionality described herein with respect to a user interface. It should be appreciated that the armrest 53 and touch screen 1684 are not limited to the shapes that are illustrated.

In certain aspects, the touch screen 1684 can provide a user interface for standalone functionality of the chair assembly 10. In certain aspects, the touch screen 1684 can serve as a remote terminal for a user device. For example, if a user links their smartphone to the touch screen 1684, the user could answer calls, send text messages, and the like from the touch screen 1684 serving as a remote terminal for the smartphone. In some aspects, one or both armrests 53 can include a touch screen 1684. In some aspects, only one armrest 53 has a touch screen and both armrests 53 have the same physical dimensions and orientations, and can be swapped, so that a right-handed user can have a touch screen 1684 in the right armrest and a left-handed user can have a touch screen 1684 in the left armrest, or vice versa if so preferred.

Figure 58:
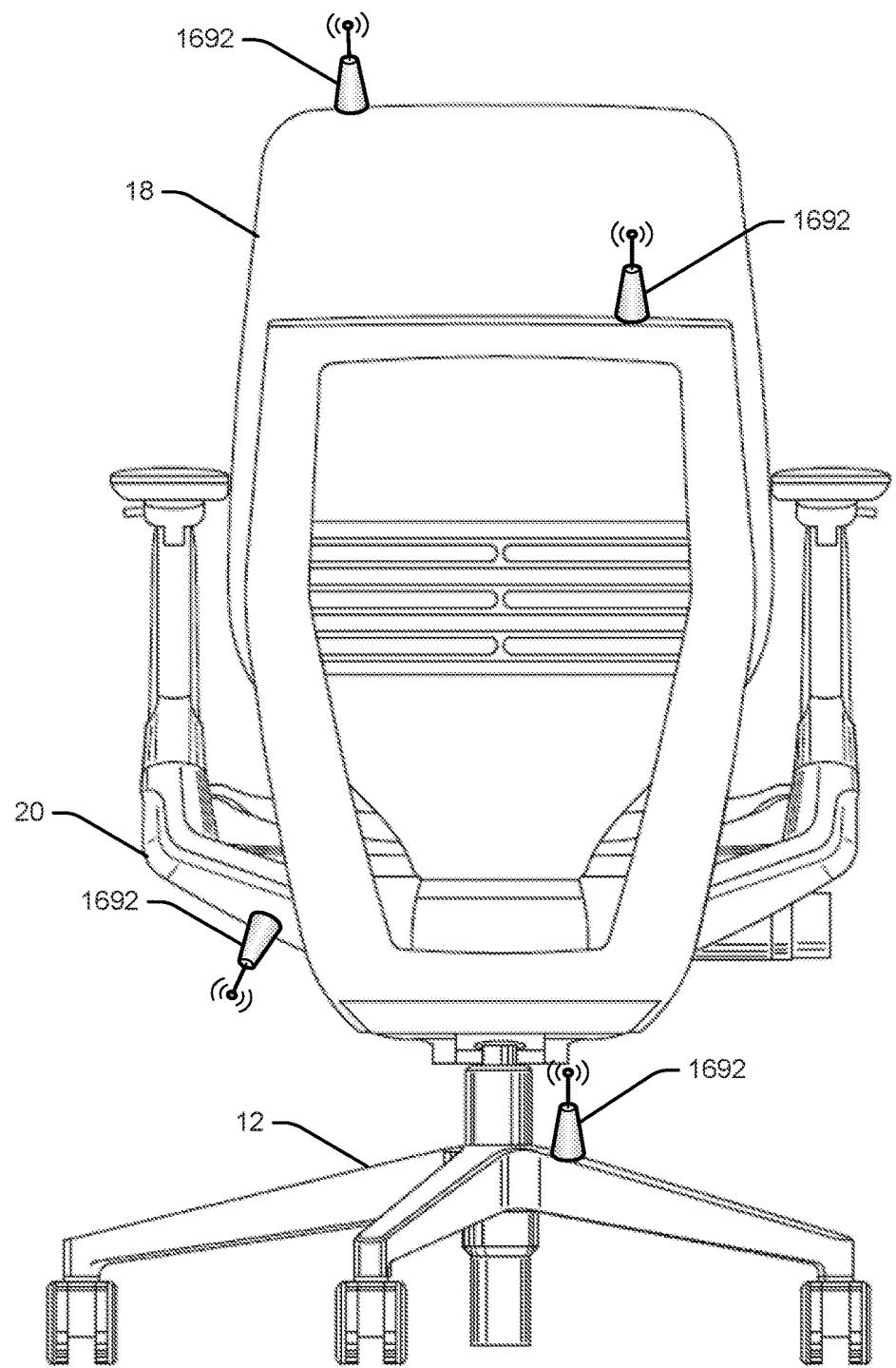
FIG. 58 is a chair assembly, in accordance with an aspect of the present disclosure.

Referring to FIG. 58, the chair assembly 10 can include wireless communicators 1692, such as a wireless transmitter, a wireless receiver, or a wireless transceiver. For applications where it is preferred that the wireless communicator 1692 be as elevated as possible, the wireless communicator 1692 can be located near the top of the back assembly 18. For applications where it is preferred that the wireless communicator 1692 not be located in proximity to a user's head when a user is in a seated position, the wireless communicator 1692 can be located within or attached to an arm assembly 20. For applications where it is preferred that the wireless communicator 1692 be located as far from a seated user as possible, the wireless communicator 1692 can be located on or in the base assembly 12, such as at a proximate end of a leg of a 5-point base (as shown), a distal end of a leg of a 5-point base (not pictured) or integrated into one of the casters (not pictured).

In certain aspects, the back assembly 18, the seat assembly 16, the armrest 53, or a combination thereof can have contact surfaces that interface with the user and that includes personalized contours that are configured to provide a continuous support surface for the user. For example, the contact surfaces can be moved by a plurality of individual actuators that move the contact surface toward or away from the user in order to provide a continuous support surface. As another example, a material that changes volume and/or shape in response to a certain electric field, magnetic field, chemical stimulus, or the like, and changes back to the initial volume and/or shape upon removal of the electric field, magnetic field, chemical stimulus, or the like, can be used to provide a user-specific contour to the contact surfaces. A processor can identify the user, then send a signal to the appropriate electric field, magnetic field, or chemical stimulus applicator directing them to apply the appropriate settings. These settings can be configured via a commissioning process. These settings can also be configured via a learning algorithm that varies the settings and monitors feedback by way of a user's flow, productivity, comfort, etc.

In some aspects, the sensing of one or more attributes of a user as described herein can be performed by a wearable device, such as a smart watch, a badge, a pin, a bracelet, a necklace, etc.

A wearable device can be utilized to sense temperature, proximity to objects including the chair assembly, heart rate, breathing rate, blood oxygen levels, stress, perspiration, movement, identity, muscle activity, alertness, emotional state, galvanic skin response, and the like. For example, a smart watch can sense a user's heart rate, blood oxygen levels, and galvanic skin response.

In some aspects, the processing functions described herein can be performed on a user's portable device or wearable device. For example, a user's portable smartphone device can receive data from one or more sensors as described herein, deduce a user's stress, flow, fatigue, need for a break, alertness, or the like, and can notify a user. Also, the user's portable device can deduce these things and can automatically cause a change in the status of one or more aspects of a chair assembly. For example, if the device deduces that the user is fatigued, the device could cause a haptic actuator in the chair to vibrate the chair in a fashion that stimulates an awakening action. As another example, if the device deduces that the user is stressed, the device may cause an olfactory actuator to release a calming aroma or could cause a heating element to apply heat to a portion of the user's body that is medically known to reduce stress. If the device deduces that the user needs a break, the device could alert the user and recommend that the user take a break.

Figure 59:
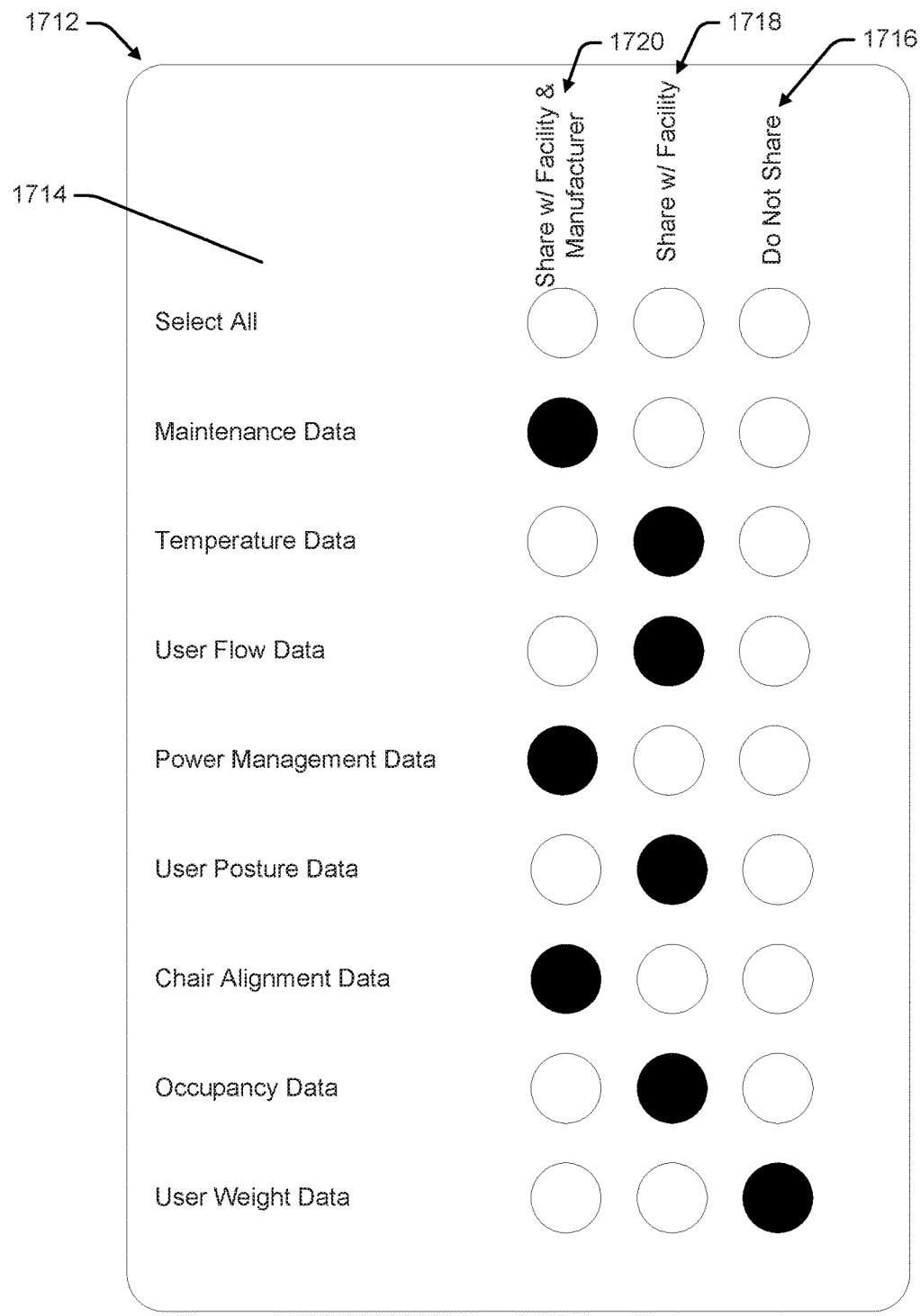
FIG. 59 is an illustration of an portable device app for controlling the sharing of data with certain entities, in accordance with an aspect of the present disclosure.

In some aspects, the control of data related to the chair assembly 10 might be user controllable through a software application on a personal device. In this way, a user can either opt out or opt in to sharing certain kinds of data. A user's data privacy settings can follow the user from one chair assembly 10 to another chair assembly 10, without requiring additional opt in or out selections. For example, referring to FIG. 59, an app 1712 shown on a user's device screen 1714 could have multiple privacy settings for certain kinds of data. As an example, referring to FIG. 54, the app 1712 has three privacy settings, a "Do Not Share" setting 1716 for the right column which indicates data that will not be shared, a "Share w/ Facility" setting 1718 for the middle column which indicates data that will be shared with the facility, but not with the manufacturer, and a "Share w/ Facility & Manufacturer" setting 1720 for the left column which indicates data that will be shared with the facility and the manufacturer. In the example shown in FIG. 59, the user has selected to share maintenance data, power management data, and chair alignment data with the facility and manufacturer, has selected to share temperature data, user flow data, user posture data, and occupancy data with the facility, and has selected not to share user weight data. In certain applications, a facility administrator can override the user's preferences for one or more kinds of data. In certain applications, when a facility administrator can override a user's preferences, the user can still have the ability to opt out of data sharing entirely. In some aspects, data shared with the manufacturer or the facility can be anonymous. In some aspects, anonymity is a user preference set within the app 1712. Other options for entities to share data will include, but are not limited to, a health care provider, a health insurance provider, a health rewards service, an individual of the user's choosing, such as a spouse, an educational institution, a governmental agency, a non-governmental organization, scientific research organizations, a social media site, and the like.

The chair assembly 10 can provide data for a user that can be compared with other users in a facility, a workgroup, a company, or any other group of users. Researchers have discovered that reporting energy usage of a person's neighbors can have positive impacts on a person's energy efficiency performance. A similar concept can be applied with the data acquired from the chair assembly 10 described herein. For example, if a user's flow is sensed by the chair assembly, the chair assembly 10 can provide a report at daily, weekly, or monthly intervals, or any other time interval comparing the amount of time a user spends achieving flow to others within a group. After receiving a report, a user might be more motivated to take active steps toward increasing the amount of time during the workday that is spent achieving flow. Similarly, if a user that typically sits with poor posture receives a report indicating that the average person in their work environment spends a large percentage of time sitting with excellent posture, it might motivate the user to strive to sit with better posture. By generating and delivering these reports to users, a facility or company might be able to prompt an improvement in work performance.

In still other cases, a system may present posture, flow or other progress reports to a user to show how that user's characteristics change over time. For instance, where a user initially pas poor posture but continually makes changes that lead to better posture over time, the progression from poor toward excellent posture may be reported to the user periodically. Similarly, a regression in sensed posture may be indicated to a user. Increases and decreases in flow efficiency over time may also be reported to a chair user. Other health trends that may be periodically reported include hear rate, temperature, weight, alertness, fidgetiness, degree of movement, etc.

As described above, chair assembly 10 can go through a re-commissioning procedure when the chair assembly 10 senses that one or more ambient properties is change relative to the ambient property during the initial commissioning procedure. The re-commissioning prompt can be delivered via a wearable device, such as a smart watch or a earpiece. The re-commissioning prompt can be delivered via a portable device, such as a smartphone, a tablet, or the like. In addition, the determination regarding the need for re-commissioning can also be made on the device. For example, the device can receive data relating to the environmental or user conditions, can process the data through a decision-making algorithm, and can make recommendations for re-commissioning when certain conditions are met.

A device can utilize the chair assembly 10 in concert with other affordances in a space to alter a user's condition or integrated experience. For example, if the system determines that a user is not currently in a flow state, the system can prompt the alteration of the lighting, sound, temperature, and other aspects of the environment using other affordances, while actuating the positioning of the chair assembly 10, actuating the temperature of the chair assembly 10, or any other actuating of the chair assembly 10 that is known to promote a flow state. Similarly, the system can alter the environment using other affordances and can alter the chair assembly 10 to promote reduced stress, increased productivity, increased focus, increased social behavior, improved collaboration, more or less user movement, and the like.

As described elsewhere herein, the chair assembly 10 can perform functions based on data received from remote sensors. Remote sensors can include, but are not limited to, a camera, a wearable device, a swallowed sensor, an injected sensor, an implanted sensor, or the like.

Referring to FIG. 8, a camera 100, 102 can monitor certain aspects of a user seated in a chair assembly 10. A camera can be used to monitor a user's posture by acquiring images and processing the images via a posture-assessment algorithm known to those having ordinary skill in the art. A camera can also be used to monitor a user's breathing rate by monitoring the motion within a user's chest cavity or abdomen. A camera can further be used to monitor a user's movement by monitoring the motion of all parts of a user's body. A camera can be used to monitor a user's heart rate by monitoring the slight movement of the skin near the jugular vein, by monitoring slight variations in retinal reflections, or the like. A camera can be used to monitor a user's facial expressions using facial expression recognition software known to those having ordinary skill in the art. A camera can be used to monitor a user's eye movement by using eye movement tracking algorithms known to those having ordinary skill in the art. A thermal camera can be used to monitor a user's surface temperature. A camera can identify a user using facial recognition technology. A camera can identify a user that is wearing a non-visible emitter, such as an infrared emitter, by acquiring an image that is sensitive to the non-visible emission from the non-visible emitter.

As described above, for certain types of sensors, the sensing capability is particularly good where a sensor surface makes direct contact with some part of an employee's body. For this reason, certain parts of a table top or work surface are particularly advantageous for supporting sensor devices. Referring again to FIG. 31, table top sensor devices 512 should be located immediately adjacent or even within an edge portion of a table top so that an employee's wrists can rest thereon and make direct contact therewith during keyboard operation. As shown, in at least some particularly useful embodiments, two direct touch sensors are provided in the top surface of table assembly 32 where a small gap exists between the two sensors. Each of the separate table top mounted sensors should be capable of independently sensing a user's physiological parameters (e.g., heat rate, temperature, etc.). Referring still to FIG. 31, in some cases the table associated sensors have a length dimension between three inches and ten inches each to accommodate different users that may position their hands/wrists differently during keyboard operation. Each sensor 512 in the table top should be within one quarter to two inches of an adjacent table edge and should have a width dimension between one inch and four inches to accommodate different positions of user wrists on the table top surface.

In at least some cases top surfaces of the sensors 512 in the table top may be substantially flush with the top surface of the table assembly 32. In other cases the sensors may stand proud of the table top so that they offer elevated wrist support to a station user. In still other cases the table associated sensors 512 in FIG. 31 may comprise wrist support structure independent of the table top.

Keyboard 510 in FIG. 31 also includes a pair of direct touch sensor devices 512 that may have characteristics similar to the characteristics of the table top associated sensors described above. Thus, each keyboard sensor has a length dimension to accommodate different wrist locations and may either be substantially flush with adjacent board surfaces or may stand proud to offer additional wrist support.

Figure 60:
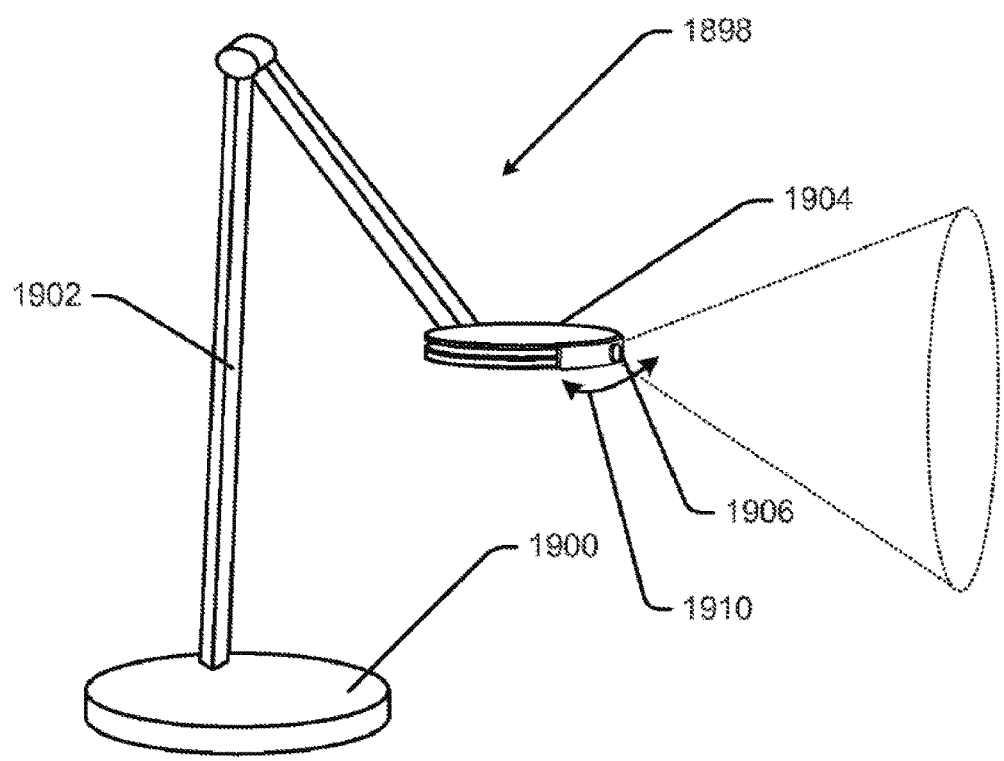
FIG. 60 is a perspective view of an exemplary desk lamp that includes a built in camera or other type of sensor device.

A system camera may also be integrated into other space affordances. For instance, in some cases a system camera or other type of sensor device may be integrated into a desk lamp or other lamp structure. To this end, see the exemplary lamp structure 1898 shown in FIG. 60 that includes a base 1900, a support arm 1902 and a light head member 1904 where a camera is mounted within the head structure at 1906. Here, the camera 1910 may be mounted to swivel about the head structure so that the camera can be optimally placed at a location in front of a user with the user's head or torso generally located in the field of view of the camera.

In still other cases, a system camera may be mounted to a monitor support arm structure, to a credenza, a shelf member or a partition wall or architectural wall structure immediately in front of a location at which a user typically works. In at least some cases a camera device including a wireless transceiver may be retrofittable to a system including a chair and other components so that a user can position the camera at any optimal location relative to the user.

In still other cases a user may be able to sync her smartphone which includes a camera to her system so that a smartphone camera can obtain images useable by a system processor to perform many of the parameter analyzing steps. In this case, a smartphone camera could obtain useful images of the user and a display screen on the same smartphone device could present feedback to the user. For instance, the phone camera images may be used to determine a user's heart rate and that rate may be reported back to the user via the phone screen as well as being used for some other purpose (e.g., an overall wellness assessment of the user and to provide posture or other suggestions, to control chair actuators to change posture automatically, etc.).

A swallowed sensor can be used to monitor a user's core temperature. The core temperature data can then be used by the chair assembly 10 to actuate heating or cooling elements, as described herein. The swallowed sensor can communicate wirelessly with a processor that utilizes the data acquired by the swallowed sensor in one or more of the ways described herein.

An implanted sensor can be used to monitor a user's core temperature, surface temperature, heart rate, breathing rate, brain activity, muscle activity, blood oxygenation, blood sugar levels, and the like. In some aspects, the implanted sensor can be powered by a user's blood stream. In some aspect, the implanted sensor can be powered by a battery that is recharged using wireless recharging. In some aspects, the implanted sensor can be powered by a communication signal.

Data gathered from sensors in the chair assembly, from a wearable device, from a user's portable device, or from the remote sensors described herein, can be collectively used by a processor to derive a property or state of a user that cannot be directly measured or is more efficient to derive than to directly measure. For instance, given a sufficient number of inputs, a user's flow state can be derived.

If multiple users are using multiple chair assemblies 10 as described herein, a processor can receive data from the multiple chair assemblies 10 and make a determination as to the state of collaboration of the users. For example, the processor can receive proximity and orientation data from sensors within a set of chair assemblies 10 or a remote sensor that is sensing the set of chair assemblies, and if the chair assemblies 10 are within a certain distance of one another and generally facing one another, then the processor could begin assessing the state of collaboration. For example, if the processor receives data indicating that a single person is dominating the conversation in a collaborative environment, then the processor might score the interaction at a low level of collaboration. If the processor receives data indicating that the conversation is moving freely about the group in the collaborative environment, then the processor might score the interaction at a high level of collaboration. As another example, the processor could receive data relating to how the users in the collaborative environment are seated relative to one another and determine the state of collaboration as a result. This collaborative assessment can be based on the best available scientific knowledge relating to the study of collaborative working environments.

The chair assembly 10 can be an integrated part of a network of smart devices. In such a network, the chair assembly 10 can serve as a storage point for a user's individual preferences for the chair assembly 10, as well as the user's individual preferences for the other smart devices. In the alternative, a user's preferences may be stored in a remote system database so that the preferences can be accessed and used to customize automatic control of any chair used by a specific user that has controllable features. Thus, for instance, where an employee works in many different enterprise facilities and therefore uses many different chairs, each controllable chair can be controlled in a fashion that best meets the user's preferences.

In at least some cases it is contemplated that a smartphone or other portable computing device that includes a processor and wireless communication capabilities may provide most if not all of the processing power required to operate a smart chair assembly including sensors, actuators and other components. While many different types of portable devices may be used to drive a smart chair assembly, an exemplary smartphone device will be described in the following example. Here, a smart chair assembly may include several sensors and actuators as described above for sensing a user's physiological parameters and for adjusting chair assembly components to meet user preferences, encourage healthy use of the chair assembly, or to encourage any other type of activity. The chair assembly would also include a transceiver (se 1692 in FIG. 58) for wirelessly communicating with a smartphone device. In the present example it will be assumed that a chair assembly application can be downloaded to a smartphone where the application is designed to work with the chair assembly to perform various tasks and functions.

In order to interact with a chair assembly, a smartphone and the smartphone application have to be associated with the chair in some way. One particularly useful way to associate a smartphone with a specific chair assembly is to use the phone to identify the specific chair assembly and associate with the identified chair assembly automatically. For instance, most smartphones include a camera that can be used to take an image of a bar code, dot matrix code, QR code, or some other type of code (hereinafter a "chair code"). In these cases, a chair code that uniquely identifies a specific chair assembly may be attached to a chair and the camera may be used to take an image of the chair code which can then be used to identify the specific chair. In at least some cases it is contemplated that a remote database may store chair codes associated with specific virtual addresses so that each specific chair code corresponds to a specific virtual address that can be used to communicate with the chair assembly.

In at least some cases it is contemplated that obtaining an image of a chair code on a chair may cause a smartphone to automatically download and access a chair control application so that the chair user does not have to download the application in a separate step. In other cases, the chair user may have to first download the chair control application and then obtain an image of the chair code from within the application to associate the phone with the specific smart chair assembly.

In other cases where a smartphone includes a near field RF or other ID reader, an RF or other type of identification tag may be attached to the smart chair and that tag may be read periodically to associate the chair and the smartphone. For instance, here, the association may be made automatically when the smartphone is initially proximate the chair and may be reconfirmed every few seconds. Here, when any system sensor (e.g., a pressure sensor, a camera, etc.) senses that the user has left the chair (e.g., a user stands up), the association may be discontinued or the action may cause the smartphone to attempt to re-associate with the chair.

Once a smartphone is associated with a specific smart chair assembly, in at least some embodiments the chair assembly can simply be used by the user and various processes may commence automatically. For instance, as a user adjusts the chair actuators, the adjustments may be transmitted to the smartphone to be memorialized. As sensors in the chair sense different postures and other physiological parameters, the sensed parameter values may be transmitted to the phone for archiving or other processing. When an unhealthy posture or some other condition that is not optimal is sensed, the smartphone can provide messages to the chair user via a display on the smartphone device to encourage better posture or some other action to optimize parameters. Where actuators in the chair can be automatically controlled, the smartphone may present control signals thereto to automatically adjust parameters in an attempt to achieve some positive goal (e.g., better posture, relieve perceived or indicated pain, cause healthy repositioning of the chair user periodically, etc.).

In cases where chairs are assigned to single users or are routinely used by single users over at least some period, the smartphone application can be used to at least semi-automatically re-associate with the assigned chair each time the user uses the chair. For instance, after a smartphone is associated with a specific chair, if the user leaves the chair at the end of a day and then comes back to that chair the next day, when the user sits in the chair and a pressure sensor in the chair recognizes that someone is occupying the chair, a chair processor may broadcast a signal including a chair identifier which is received by the smartphone application. Here, the smartphone application may recognize that some user is occupying the chair and may request that the user obtain another image of the chair code to re-associate the phone with the chair.

In other cases when the user sits in a chair, sensed user parameters may be used to at least partially identify the user and then to associate the chair and the specific user's smartphone. For instance, in a simple case, once a user uses a chair and the chair is associated with the user's smartphone a first time, the user's weight as sensed by the chair may be stored for re-association. The next time the user sits in the chair, the chair may sense user weight and use that as a simple identifier to identify the user and attempt to associate the chair with the user's smartphone application to enable smartphone control of the chair.

In still other cases where a location tracking system is capable of locating user smartphones and other portable devices as well as smart chairs and other affordances in an enterprise space, the locations of user smartphones and chair assemblies may be used to associate and then re-associate smartphones and chairs. For instance, in at least some cases when a user's smartphone is not already associated with a specific chair assembly, the smartphone application may be programmed to routinely query for smart chair assemblies in a small area (e.g., an 8 foot radius). When a smart chair assembly is identified and the chair assembly generates a signal indicating that a user occupies the chair (e.g., a pressure sensor identifies that a user sat down), specific locations of the chair assembly and the user's smartphone device may be determined and, if the chair and smartphone locations are within some predefined threshold distance of each other, the application may automatically associate the phone with the chair. Here, re-association would be performed in substantially the same manner.

In some cases the smartphone may either provide a commissioning option to the user or may automatically initiate a commissioning option the first time the phone is associated with the smart chair or any smart chair. In some cases the commissioning process may be extremely simple such as, for instance, having the user set preferred chair settings (e.g., temperature, height, seat depth, lumbar support, force required for backrest to recline, etc.) to preferred settings and then storing the settings so that the settings can be subsequently used to automatically set parameters for the user in the future. In other cases more complex commissioning processes are contemplated.

In some cases a commissioning procedure may cause a smart chair assembly to cycle through different parameter settings and may request feedback from a user for at least a subset of the parameter settings. For instance, regarding heat settings, where a chair assembly includes several heat elements that can be independently controlled to apply heat to different locations on a seat and/or a backrest assembly, the heat elements may first be controlled to cycle through different heat patterns, holding each pattern for 20 minutes unless a user affirmatively indicates a desire to move on to a next pattern. At the end of each 20 minute period, a system processor (e.g. in a smartphone, a remote server, etc.) may query the user to determine if the user liked or disliked the heat pattern. After all heat patterns have been tested, the system processor may store the preferred pattern or the top N preferred patterns for subsequent use with the user. Continuing, the system may cycle through different heat levels using the preferred heat pattern(s) continuing to gather user preference information. Other chair parameter options may be automatically cycled through to obtain user preferences for subsequent use.

It has been recognized that different people have very different body types and body characteristics. For instance, some people are very thin while others are very heavy, some people are tall while others are short, some people have relatively wide shoulders while others have a slimmer build, etc. Because people's bodies have different characteristics, their bodies are typically perceived very differently by chair sensors. For instance, a tall, heavy and wide person with good posture in a chair may be perceived very differently by a processor considering chair pressure sensor signals than would a thin, light and narrow person that is also sitting with good posture. In fact, if the signals associated with the tall, heavy and wide person's good posture were to be considered optimal, the sensed signals for the other person in this example likely would result in a determination that the other person's good posture is actually poor.

As another instance, a first person with good posture may naturally lean back against a backrest support structure with a first force while a second person with good posture may naturally lean back against a backrest support structure with a second force that is substantially different than the first force. Here, if good posture is associated only with the first force level, then the second force level applied by the second user would be erroneously associated with bad posture.

For this reason, in at least some cases it is contemplated that various user parameters may be determined during a commissioning process which would then be used subsequently for the specific user associated therewith to recognize good posture and poor posture as well as other physiological positions the user may assume and then to coach that user on good posture and other parameters.

It has also been recognized that in most cases, even if a person generally has poor posture, that person can often assume a good posture position for at least a short period by sitting upright with two feet on the ground, moving her buttocks rearward on a seat, rolling shoulders back, and holding head high. During a commissioning procedure, a chair user may be instructed via a smartphone (or other device) to assume a good posture in a smart chair assembly. Here, the application may coach the user on what a good posture position is (e.g., feet on ground, head up, shoulders back, etc.). Once the user assumes a healthy or good posture, the user may select an on screen icon or otherwise indicate that the user is in a good posture position. Next, the application may cause the chair pressure sensors or other sensors to detect sensor signal values associated with good posture for the specific user and that information may be stored in a database for subsequent use. Here, where a chair includes 10 pressure sensors or sensor devices that can sense pressure in 10 different locations, the combination of sensor signals for the specific person may be stored as a "good posture sensor signature" for the specific user. Thereafter the sensor signature may be used as a target or goal for comparing user postures to assess when good posture occurs and when other postures occur.

In at least some cases a smart chair may be able to help a user achieve certain health goals over time. For instance, where a user would like to improve her posture, the smart chair may be controlled to help the user improve posture over time. Here, in as least some cases, it is contemplated that during a commissioning procedure, a good posture sensor signature for an employee may be obtained as described above and used as a good posture target or goal. Subsequently, during chair use, the smartphone application or an application run by another system processor may be programmed to monitor user posture for some time such as, for instance, two days of use, a first week of use, etc., to develop a baseline or a current state of user posture.

After a current posture baseline is established, the smartphone application may start to encourage posture changes in a series of steps designed to, ultimately, lead to a better posture and, in some cases, the target or goal posture identified during the commissioning procedure. For instance, a first step may be to encourage the user to maintain her feet flat on the ground so that the bottom of her thighs are typically sensed at the front edge of the chair assembly seat. A second step may be to encourage the user to move her buttocks rearward on the assembly seat. A third step may be to encourage the user to roll her shoulders back so that her shoulder blades are sensed by sensors in the upper lateral portions of a backrest and so on. Here, one step may need to be routinely met prior to starting to encourage the next until good or at least better posture results. Here, as in the case of other embodiments described above, encouragement may be via simple messages to the chair user via the smartphone application. In other cases the chair actuators may be controlled in some fashion to encourage posture correcting steps such as applying heat, vibrations, etc., at different locations that the user will want to experience thereby causing the user to assume a better position where the heat, vibration, etc., is directly experienced. In still other cases, actuators may be automatically controlled to cause good behavior in some fashion (e.g., move seat backward or forward to change posture, move lumbar support in or out, etc.).

In at least some cases, in addition to establishing a good posture signature for an employee during a commissioning procedure, other posture signatures may be established for various purposes. For instance, during a commissioning procedure, a user may be instructed to assume a "normal" posture that the user would typically assume when sitting in a smart chair. Here, the chair sensors would sense signals indicative of the normal posture and store that set of signals as a normal posture or initial signature. The initial signature could then be used as a baseline for comparison to the good posture signature to automatically develop a plan to correct the user's posture over time. This process of establishing initial posture issues and a target posture (e.g., the good posture signature) is akin to an orthodontist working with a person to correct alignment of teeth over time, starting with a patient's teeth as they initially are and moving toward an ultimate goal of good or at least better alignment for a specific patient. In the case of the smart chair, the commissioning process enables an understanding of posture issues and a target and would help formulate a plan for how to correct posture issues.

Other posture signatures developed during commissioning may include a "perched signature" where the user is instructed to sit on the front edge of a chair seat while a sensor signal set is generated and stored, a "left leg crossed" signature where the user is instructed to cross her left leg over right while a sensor signal set is generated and stored, a "right leg crossed" signature where the user is instructed to cross her right leg over left while a sensor signal set is generated and stored, etc. Once multiple position signatures are obtained and stored, the application or system should be able to very clearly distinguish one posture from others.

As indicated above, in general a person should not sit in the exact same position for long periods of time. For this reason, in at least some cases, the smartphone application may encourage different relatively healthy positions every few minutes. For instance, an application may encourage a user to cycle through the good posture, left over right leg posture, right over left leg posture and perched posture every 30 minutes so that the user moves periodically. Here, where the user is already moving periodically or even more than an application prescribes, sensing of those movements may cause the application to skip presenting messages to encourage additional movement.

In at least some cases it is contemplated that an application may take into account information in addition to an initial posture and a good posture signature to develop a corrective posture plan. For instance, during a commissioning procedure a user may be queried about back, wrist, leg or other pain that occurs persistently or sporadically while using a smart chair. Answers about experienced pain may be used to form a pain signature for the specific user. In at least some cases an application may use each of an initial posture signature, a good posture signature and a pain signature to develop a plan for achieving better posture.

In at least some cases a user will be queried about pain subsequent to an initial commissioning procedure so that the application can track the effects of corrective messaging or actuator control and, in at least some cases, to adjust a better posture plan accordingly. For instance, at the end of each day of use, a simple query may be presented to a chair user requesting information about experienced pain. Where pain persists or is exacerbated, a better posture plan may be modified. Where pain is alleviated or eliminated, the initial plan may be continued.

In at least some cases it is contemplated that the application may also at least periodically analyze better posture plan results and present that information to a chair user automatically. For instance, if a user's posture improves and moves from the initial posture signature toward the good posture signature for the specific user, that information will be reflected in a different posture signature sensed by the chair sensors which can be used to indicate better posture textually or even graphically to the chair user via a smartphone display screen or other display screen used by the chair user. Similarly, as pain subsides and is reported by the user to the application over time, that development can be reported back to the user along with an updated posture signature to show posture corrective progress as well as to encourage further efforts on the part of the user to achieve the ultimate good posture signature.

Where a smartphone application controls a smart chair assembly, the smartphone application may also be useable to control other devices or affordances proximate a smart chair in conjunction with the smart chair in some cases. For instance, a light device, speakers, a camera, a heating device, that are independent of the chair assembly may be controlled along with the chair assembly to control a chair user's environment in different ways. Here, in at least some cases it is contemplated that each other device or affordance that may be controlled by a phone application may include its own processor and transceiver for receiving control commands from the phone application. Here, in at least some cases, when a user initially associates a chair with a smartphone, separate steps may also be performed to associate the phone with other affordances in space including a light, speakers, a camera, etc.

In at least some cases it is contemplated that a phone application may be associated with other affordances in the same way that a smart chair is associated with the application. For instance, after obtaining an image of a chair code from a smart chair, images of similar codes on other affordances or resources may be obtained while in the smartphone control application. Each resource code may then be used to identify a virtual wireless address for an associated light, camera, etc., and a small network of devices may be formed, a sort of local internet of things (hereinafter a "local IOT"), to be controlled by the smartphone application. Here, for instance, if the smartphone application receives signals from the chair assembly or a networked camera that indicate that a chair user is losing focus, the application may cause a vibrator in the chair it vibrate and stimulate the chair user and at the same time increase intensity of light generated by a networked light device.

In at least some cases it is contemplated that resources may be added to or removed from a local IOT and the application will automatically change its operation as a function thereof. For instance, a user may only have a chair initially and a stimuli would, in that case, only be provided via the chair assembly. Thereafter, the user may take steps to associate a coded light device with the application and thereafter the application may provide stimuli via both the chair and the light device.

Figure 61:
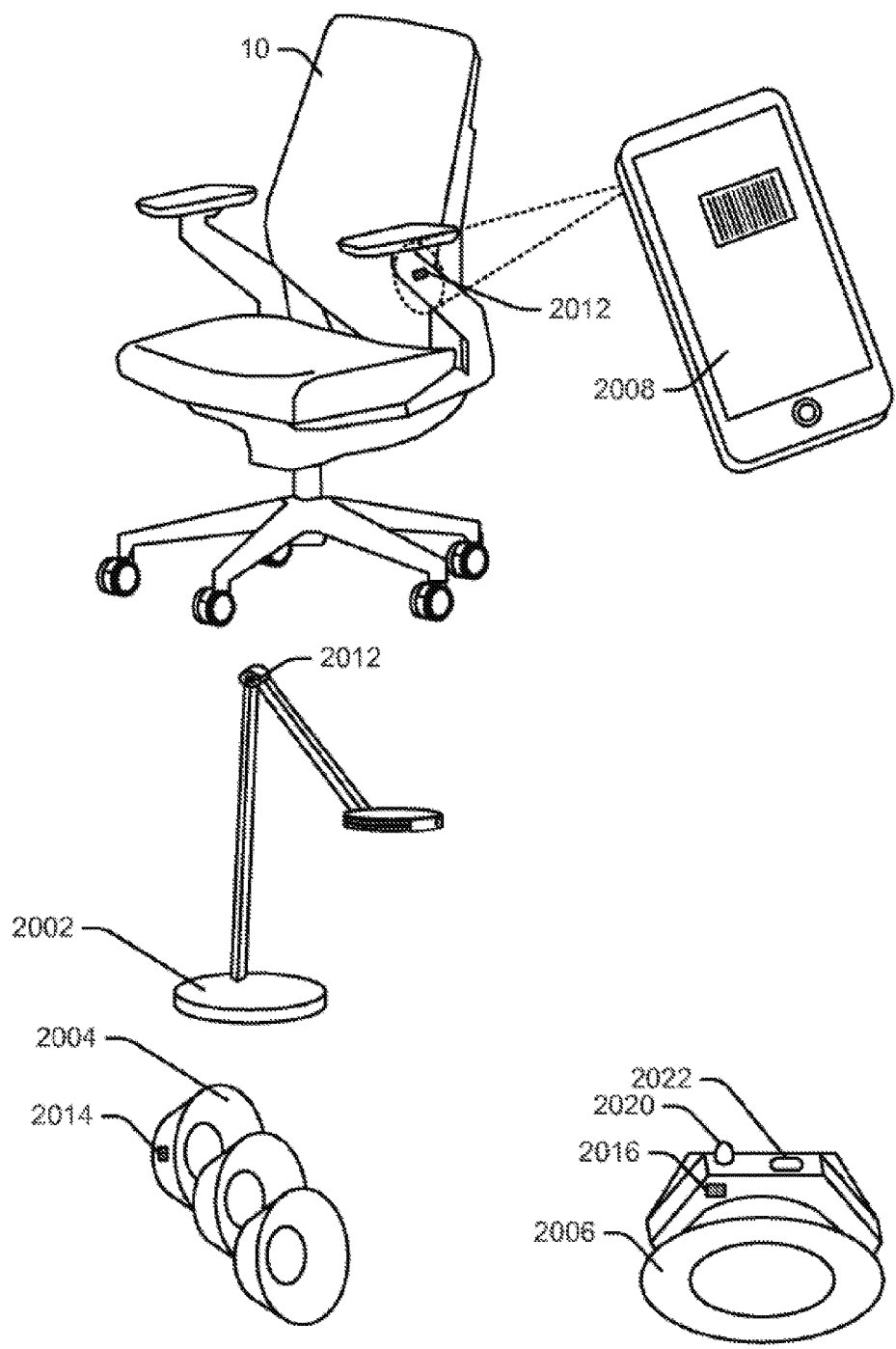
FIG. 61 is a schematic view illustrating various office resources that include identification tags readable via a smartphone device to form a local network of things controllable together to provide an integrated experience'

Consistent with the above aspects, see FIG. 61 that includes a chair assembly 10, a light device 2002, speakers 2004 and a high definition camera 2006 as well as a smartphone assembly 2008 to be used with the other components. Each of the chair assembly 10, light device 2002, speakers 2004 and camera 2006 includes a resource tag or code 2010, 2012, 2014 and 2016 that can be read or imaged via the smartphone camera to associate the phone and the affordances. Again, during a commissioning procedure, a user can obtain an image of code 2012 via the phone assembly 2008 causing the phone assembly to download and open up an affordance control application. The application may instruct the user to obtain images of other resource codes 2012, 2014 and 2016 to associate those resources with the application and the specific chair 10 to be used by the user. Thereafter, either a commissioning procedure may commence or the application may automatically start controlling affordances in the local IOT according to any of the processes and methods described above. Subsequently, if the user wants to add another resource or device to the network for control purposes, the user can simply reaccess the application and obtain another image of a resource code causing the application to automatically change the control program to accommodate the added resource and take advantage of resource characteristics.

In still other cases a local IOT may be formed that is controlled by a local or system related computer or server without requiring a personal portable device after initial commissioning. For instance, referring again to FIG. 61 and also once again to FIG. 7, after a local IOT is created using smartphone 2008, the local IOT may be associated with a facility based processor 54 for control purposes. Here, processor 54 would receive signals via access points 69 or other receiver devices from chair sensors or other system sensors and would control the chair assembly and other resources associated with the local IOT as a function thereof. In still other cases, after resources are added to a local IOT, control thereof may be passes on to the chair assembly processor 58 shown in FIG. 7 so that the smartphone or other device is either out of the loop or only operates as a sensor or an output device.

Where a chair is routinely used by more than one user, preferences, posture profiles, local IOTs, and other user specific parameters for each user would be established during a commissioning procedure in at least some cases and would be used to facilitate user specific control. Thus, where a first user specifies a first local IOT and a second user specifies a second local IOT for a specific chair and proximate resources, a system processor (e.g., smartphone or facility based) would change the IOT as a function of the user specific local IOT.

In cases where a first user uses different chairs and proximate resources at different times (e.g., in the case of a user that "hotels" in different facility spaces at different times), user specific preferences, posture and pain signatures, local IOTs and other parameters may be automatically applied to different chair assemblies and proximate affordances in at least some embodiments. For instance, if a first user initially uses a first chair and proximate light device and camera for a three hour period and then moves to a different location and a second chair and proximate second light and second camera, the same parameters used to control the first chair, light device and camera may be used to control the second chair, light device and camera.

Association with the first chair and proximate affordances and then with the second chair and proximate affordances may be made in any of several different ways. For example, if a first user is the only person in an enterprise space (e.g., in an office or a conference room), when chair sensors for a specific chair generate signals indicating that someone sat in that chair, a system server or processor may be programmed to assume that the first user (e.g., the only person in the space) is the person that sat down and preferences and other parameters for that specific user may be applied. As another example, if first, second and third employees are located in a specific enterprise space and the first and second employees are already associated with first and second smart chair assemblies and associated proximate resource sets, if a third smart chair assembly generates sensor signals indicating that someone sat down in the chair, a system processor or server may be programmed to associate the third employee and her preferences and other parameters with the third smart chair and proximate resources and to therefore apply those parameters to controlling the chair and associated resources. As still one other example, cameras and other tracking system devices (e.g., triangulating access points, proximity sensors, etc.) may be used to track specific user locations and automatically associate specific users and their associated preferences and other parameters with specific chair assemblies.

In at least some embodiments a system server or processor may first attempt to associate a smart chair and other proximate resources with a specific user and user's parameter set (e.g., preferences, posture and pain signatures, an IOT signature, etc.). In some of these cases, the server may resort to querying a user for confirmation of association only when association cannot be automatically established beyond some threshold level of confidence (e.g., 90 to 100% confidence level that association is correct). For instance if the system server can only establish association with a 50% confidence level that the association is intended, the server may query a user via a smartphone display screen or other display screen in the vicinity of the user to confirm which chair and other resources the user is using.

In at least some cases it is contemplated that upon association of a user's parameter set with a smart chair and/or other resources, some aspect of the chair or other resource may be controlled according to some convention that can be learned and known by all users as a confirmation of association. For instance, when a first user approaches a smart chair assembly and sits down in the chair, if a server or processor automatically associates the user's preference set with the chair, a vibrator device in the chair assembly may be automatically controlled to vibrate three times in rapid succession to confirm automatic association. In another case where a chair assembly includes a light device (e.g., an LED built into a lower surface of a support arm rest member), the light device may be pulsed on and off in rapid succession three times to generate an automatic association confirmation signal for the user to perceive. In still other cases a small speaker or other sound generating device on a chair may generate a sequence of three beeps or other sounds to indicate automatic association.

Other devices that are automatically included in a user's local IOT may generate perceivable automatic association signals as well including a light device (see again 2002 in FIG. 61) which may flicker on and off or flicker to increase and decrease light intensity three times to indicate automatic association, speakers (see again 2004 in FIG. 61) that may generate a sequence of three beeping sounds or a camera (see 2006 in FIG. 61) that may include a built ing LED 2020 or sound generating device 2022 to generate a three part visual or audio signal to indicate automatic association.

In particularly advantageous embodiments the signals used to indicate automatic association of different resources will be similar in all cases. For example, in some cases each associated device will generate a sequence of three beeps to indicate automatic association. In some cases the association signals generated by a set of devices in a local IOT will be controlled to automatically stagger the association signals so that a chair user can clearly distinguish one from the others. For instance, in the case of FIG. 61, chair assembly 10 may generate a first sequence of three beeps followed by light device 2002, followed by speakers 2004 and finally followed by camera 2006.

Above we describe how different people have different body characteristics and therefore that it is important in at least some embodiments to customize how a system server or processor perceives sensor signatures to specific smart chair assembly users. Thus, good posture for a first user may have a sensor signature that is substantially different than a good posture signature for a second user. Similarly, other conclusions that should be drawn from sensed parameter sets may be highly user specific. For instance, "flow" may be sensed differently for different chair and other resource users.

It has also been recognized that flow and perhaps other conclusions about user conditions may not be easy to simulate during a temporally defined commissioning procedure. Thus, where a commissioning procedure takes 15 minutes to complete, in most cases it will be difficult for a user to enter a flow state in that 15 minute period and hence allow a system to determine a flow signature of sensor values for that user.

To enable capture of a flow signature for a specific user, in at least some embodiments it is contemplated that the system will enable a user to indicate a flow state at any time. Here, for instance, if, while using a smart chair and other proximate resources, a user recognizes that she has been in a flow state for the last 30 minutes, the user may be able to indicate her perceived recent state in some fashion. When the perceived state is indicated, a system server may be programmed to look historically at sensed parameters over some previous period (e.g., the most recent 20 minutes) to establish a flow signature for the specific employee. The flow signature may then be stored for subsequent use in determining when the specific user is in a flow state.

Other state signatures may also be established for a system user including, for instance, an agitated state, a relaxed state, etc. Here, the system may enable a user to indicate any of several different states that the user perceives which would then be associated with sensor value sets obtained during a previous period (e.g., again a previous 20 minute period).

The disclosure describes particular embodiments, but one of skill in the art will appreciate that various modifications can be made without departing from the spirit of the disclosure. Thus, the invention is to cover all modifications, equivalents, and alternatives falling within the spirit and scope of the invention as defined by the following appended claims. For example, although the system is described above for use as furniture in an office environment, in some applications, the furniture can be used in medical applications, such as, for example, a table carrying surgical tools, a bed sensing and altering patient characteristics, and the like, or in a home environment, such as a sofa, a bed, a table, and the like. The furniture can also be used in waiting rooms, cafeterias, show rooms, classrooms, and various other locations.

Additional Specification

In at least some embodiments described above various ways of associating a chair or workstation with a user are contemplated. User-affordance (e.g., chair, workstation table, lighting, audio devices, cameras, thermostats, air management systems, etc.) association is important for several reasons including, for instance, the ability to use personal preferences to control affordance settings, tracking and maintaining affordance use and user health data and ability to develop healthy user services and provide service guidance that is customized to specific affordance users. For instance, to guide a first user when to optimally sit and stand at a workstation as part of a health regimen, user data related to recent prior sit and stand activities (e.g., in the last 2 hours, over the last 12 hours, etc.) as well as physical limitations associated with the first user should be known. As another instance, a first user may like or even need high intensity light on a worksurface while a second user may prefer a dimmer lit environment.

While user-affordance association is important, in many cases accessing user preferences or various types of user data may raise privacy concerns. For example, a first user may not feel comfortable with a system that ties the user's identity to information related to how often the user stands at her workstation, how often the user is in a flow state, how often the user ignores health related guidance or suggestions, etc. To the extent that data collected by chair or workstation sensors has HIPAA implications, government regulations may prohibit at least some ways of storing that type of user data along with user identity.

For these reasons, in at least some embodiments it is contemplated that users data and service preferences may be anonymously associated with affordances or workstation in various ways. For instance, instead of storing data and other customized affordance control parameters with a user's identity (e.g., name, social security number, address, or any other data that could be used to identify a specific user), that information may be correlated with a generic PIN number such as, for instance, a six digit number. Then, when a user enters the 6 digit number, that number can be used in some cases to access user data and preferences in a database that are then used to customize affordance settings and operation. Here, while the data is stored, the data is only associated with the user's generic PIN number and not the user's specific identity.

As another instance, in some cases a workstation or the like may include a biometric sensor device capable of collecting user distinguishing biometric information from station users. For instance, the biometric sensor may include a retinal sensor, a fingerprint sensor, a facial recognition sensor, a voice sensor, a palm print sensor, a posture sensor, etc. Here, bio-signatures for each system user may be stored in a database along with user data and preferences but without being associated with specific user identies. In this case, after a sensor collects biometric data from a user, the collected data may be compared with the bio-signatures to identify a match. Once a match is identified, the system may use the data and preferences associated with the matched bio-signature to control the workstation or other controllable affordances. Here, while the biometric data collected is used to access user data and preferences, that data and those preferences are never directly associated with the user's identity.

As yet one more instance, in some cases user data/preferences may be stored on a user's personal device and may only be provided to a workstation or other affordance processor or used to drive the affordance or workstation when the user is present and while the user remains present at the affordance or station. For instance, a user may have an identification badge that includes a processor, a memory, a battery and a wireless transmitter where the badge processor only transmits user data and preferences to a workstation processor once the user is located at the station. Here, user identity from the badge may never be transmitted to the station. In particularly advantageous cases the badge processor may run affordance control algorithms and may only transmit control signals to space affordances so that user data/preferences are never transmitted to a processor outside the user's personal control. In some cases the badge may include a biometric sensor like a fingerprint reader or other sensor device so that the user data/preferences are not provided to the workstation processor unless the user affirmatively authorizes provision.

Figure 62:
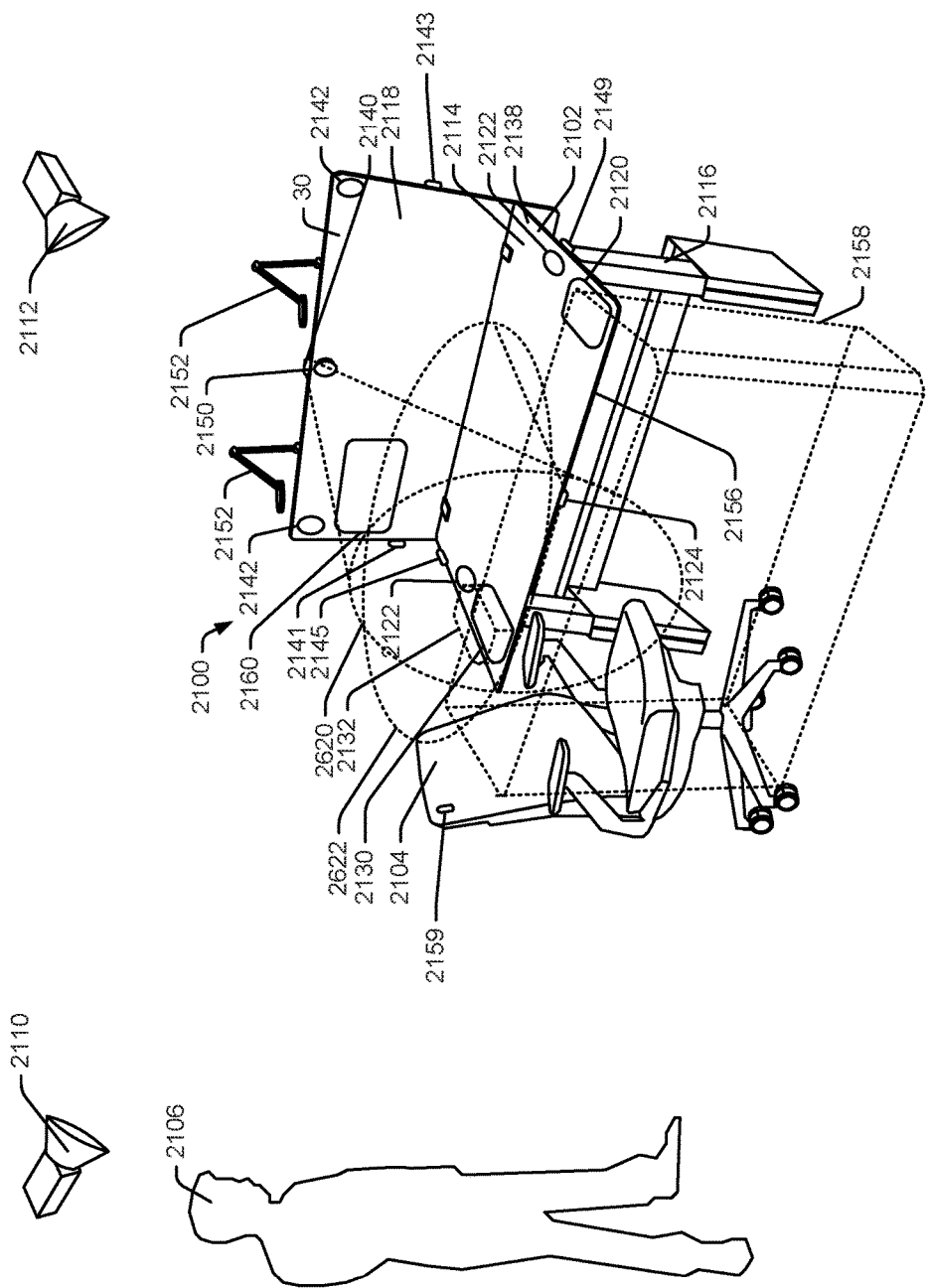
FIG. 62 is a perspective view of an exemplary workstation assembly that is consistent with various aspects of the present disclosure.

Referring now to FIG. 62, an exemplary workstation 2100 that may be provided within an enterprise facility is illustrated. Workstation 2100 includes a workstation table at 2102 and a task chair 2104. The task chair 2104 may take many different forms and, in some embodiments, may include a plurality of sensor devices and actuator modules and a processor and other components as described in embodiments above. Table 2102 is a height adjustable table assembly. U.S. provisional patent application Ser. No. 15/170,550 which has been incorporated herein by reference in its entirety as indicated above describes a height adjustable table assembly. Assembly 2100 may be constructed in and controlled in a fashion similar to that described in the ('xxx) application and, to that end, as seen in FIG. 62, may include first and second telescoping support leg structures or assemblies at 2116 and a substantially rectangular tabletop assembly at 2114 that includes a substantially flat tabletop surface 2138. A privacy panel or screen 2118 is mounted along a rear edge of the tabletop member 2102 opposite a front edge 2156. Although not shown in FIG. 62, the ('xxx) application describes motors in the supporting leg structure 2116 that can be controlled to change the height of top member 2102 within a range of heights that should be comfortable for both standing and sitting users. Also described in the ('xxx) application is a table control processor that can control the motors to change the height of the top member according to different processes.

While not shown in FIG. 62, is some embodiments it is also contemplated that top member 2102 may be pivotally mounted at the upper ends of the supporting leg assembly so that the top member 2102 can be angled with respect to a user adjacent front edge 2156. In this case other motors or motive devices may be included in the assembly 2100 for forcing controlled tilt adjustments.

In still other cases, the top member 2102 may include a bendable emissive surface where at least sections of the top member can be bent into different shapes. Here, the phrase emissive surface is used to refer to an electronic display structure on which digital information can be presented. For instance, in at least some cases, the left rear and right rear corners of top member assembly 2102 may be controllable to bend upward so that those sections of the tabletop at least somewhat face rear edge 2156 so that a station user can better see content presented at an angle on those surface section. U.S. patent application Ser. No. 14/500,091 which was filed on Sep. 29, 2014 and which is titled "Curved Display and Curved Display Support" describes, among other things, a bendable emissive surface and that specification is incorporated herein by reference in its entirety.

Referring still to FIG. 62, the exemplary assembly 2100 also includes several built in subassemblies or affordance enhancements. For instance, assembly 2100 includes an input/output interface device or touch sensitive emissive surface at 2120, built in speakers at 2122 and 2142, a biometric reader or sensor device at 2130, integrated light devices at 2152, an integrated camera at 2150, exemplary integrated microphone devices at 2124 and 2140, and an emissive surface display screen or other visual output device at 2160. Other affordance enhancements are contemplated. In the FIG. 62 embodiment the table processor may be hardwired to each of the enhancement affordances for controlling those devices per default settings or per user preferences when preferences are known.

Referring again to FIG. 7, a facility based processor 54 may be located at various locations within a system. For instance, processor 54 may be located in a system server either at the same facility as a workstation configuration 2100 or may be located at some other facility and simply be networked to station 2100. In other cases the processing function may be performed by two or more processors that cooperate to perform different functions at different times. Unless indicated otherwise, hereafter it will be assumed that processor 54 is located within table assembly 2100 and will be referred to as a table, system or station processor 54.

In at least some embodiments processor 54 is linked to a system database that stores user workstation preferences that can be used to drive the controllable affordances at station 2100 and at other similar stations having different affordance configurations. In some cases the database includes a memory device that is integrated in the workstation 2100. In other cases the database may be remote from the station and linked to via a wireless or wired communication or computer network. In still other cases the database may be distributed where at least some of the data is maintained in a memory device that is integrated into the station and other data is stored in a remote data storage device.

Figure 63:
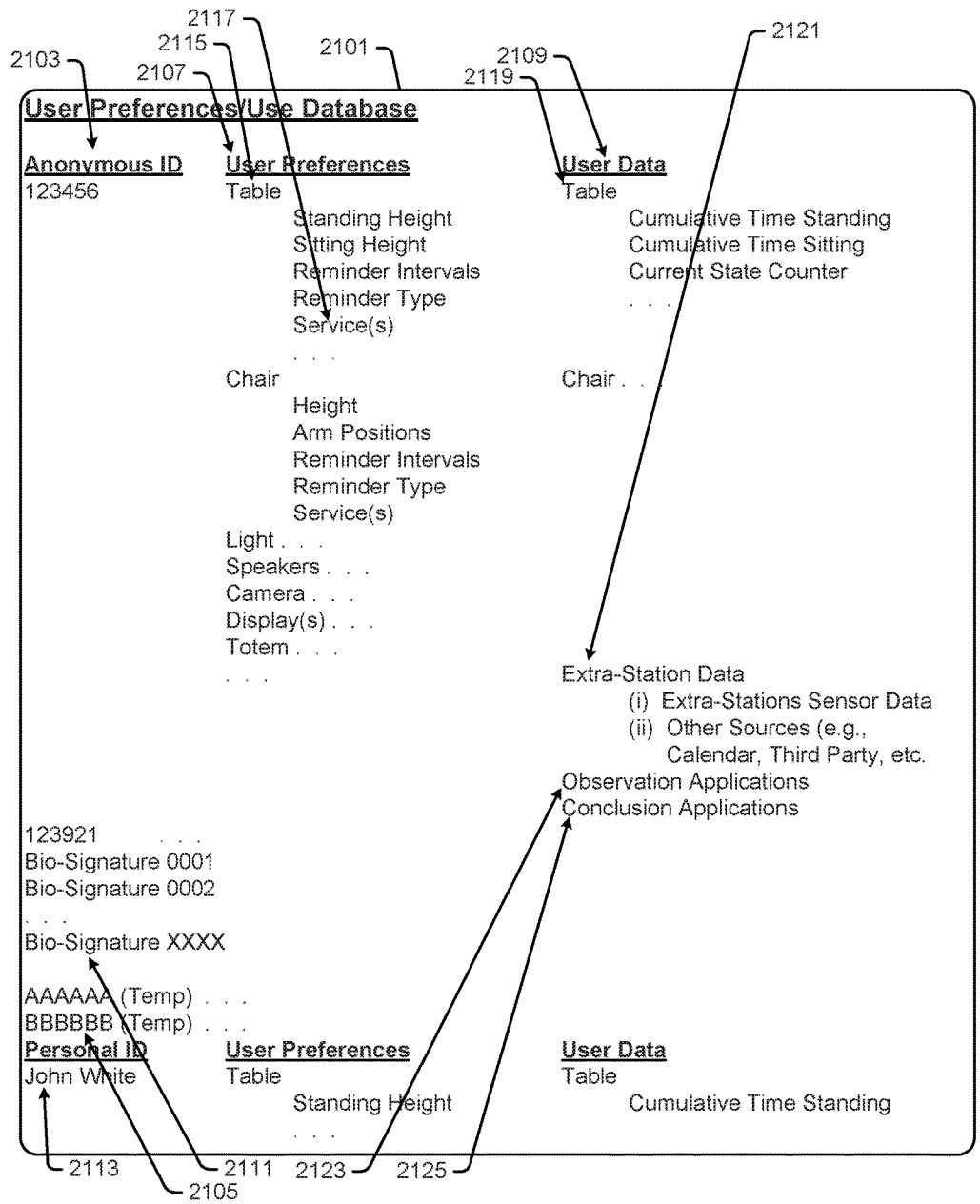
FIG. 63 is a schematic representation of an exemplary user preferences/use data base that is consistent with at least some aspects of the present disclosure.

An exemplary user preferences/use database 2101 is shown in FIG. 63. Database 2101 includes affordance preferences for a plurality of workstation users along with use data and other related information that can be used to drive user services at workstations and, in some cases, throughout enterprise facility space. The exemplary database 2101 includes an ID column at 2103, a user preferences column at 2107 and a user data column at 2109. While shown in simplified form in the interest of simplifying this explanation, the database 2101 would typically include a much more complex arrangement.

ID column 2103 includes two different types of IDs including anonymous IDs and personal IDs. Anonymous IDs include identification numbers or labels that are anonymous in the sense that they are only used to access a user's preferences and data and not to determine the exact identity of a user. Thus, for instance, an anonymous ID may include a simple six digit number or number/letter password that is unique to a specific facility user. As another instance, a user may define a user name and associated password where both have to be provided to identify the user's preferences and data. Here, while the name and password may be unique to a specific user, they would not be useable to identify the specific user (e.g., would not be associated with the user's name, address, social security number, phone number, etc.) in at least some embodiments.

Another type of anonymous ID may include a bio-signature (see 2111) that comprises a biometric data set that can be compared to biometrics sensed from a system user to uniquely distinguish one user from others. For instance, a fingerprint may be a bio-signature, the pattern of a person's face may comprise another bio-signature, a person's voice pattern/tone may comprise another bio-signature, etc. In cases where bio-signatures are anonymous, while useable to distinguish one user from others for the purpose of accessing user preferences and data, the bio-signatures would not be associated with specific user names or other information that could be used to identify specific users. In other cases bio-signatures may be associated with user identifying information so that they can be used to identify as opposed to simply distinguish facility users.

Referring still to FIG. 63, in at least some cases temporary anonymous user IDs are also provided as shown at 2105. Temporary IDs are identification numbers or labels that can be used to discern a system user from other users on a temporary basis. For instance, in cases where a user only wants to have the benefits associated with one or more system services during a current workstation use and not persistently, a temporary ID may be assigned to the user for the current use where any preferences set or user data obtained is only used during the current workstation use and is discarded thereafter. Temporary IDs will be explained in more detail hereafter.

In at least some embodiments personal IDs are useable to determine the identities of specific system users (as opposed to simply distinguishing users) and may, for instance, include a user's name (e.g., see "John White" at 2113), a user's telephone number, or some other identifying alpha-numeric sequence. While user names and passwords and bio-signatures may only be used for anonymously distinguishing users, in some cases that information may be associated in the database with specific user identities.

Referring still to FIG. 63, while database 2101 shows both anonymous and personal IDs in column 2103, embodiments are contemplated that include only one or the other of anonymous and personal IDs so that, in some cases users may only be distinguished one from the other while in other cases user specific identification occurs all the time.

Referring again to FIG. 63, the user preferences column 2107 includes, for each ID in column 2103, a set of user preferences for each type of affordance that may be configured for a user at a station and, in many cases, throughout an enterprise (e.g., throughout all of the facilities and for all of the affordances that a user may encounter throughout facilities). Here, to simplify this explanation, the preferences are described in the context of the affordances shown at station 2100 in FIG. 62. The exemplary preferences are ordered by station affordance type where an affordance list includes table (see 2115), chair, light, speakers, camera, display, totem, etc. The affordance list would typically include many other affordances. For each affordance in the preferences list, a separate list of user preferences are provided in text form. Here, while preferences are presented in text form, each preference would include a preference or attribute label along with one or more attribute values. For instance, a table standing height preference would include a value like "41 inches" along with the attribute label.

The exemplary preferences for a table include a standing height, a sitting height, a reminder interval (e.g., related to how often reminders should be provided to the user to change position), a reminder type (e.g., audio, visual, haptic (e.g., vibration of the station tabletop), etc.

While preferences may be specified for many different workstation and facility affordances in database 2101, in many cases specific users will only specify preferences for a subset of possible or available affordances. In this case, preference defaults may be specified in the database so that whenever a user has not specified some preferred or custom value, the default values are used to drive affordances that do not have specified preferred settings. For instance, a default table standing height may be 40 inches and that value may be used to control a standing tabletop height when there is no preferred setting.

In many cases it is contemplated that while a user may specify preferences for workstation affordances, some stations used by a user may not include all of the affordances that are associated with preferences that the user specified. For instance, while a user may specify lighting preferences, a particular station may not include integrated task lighting. In cases where a station does not include an affordance for which a user has specified a preference, the system would simply ignore the preference when the user associates her preferences with a specific station.

In some cases a user's preferences may be different based on the mix of affordances that are located at a specific station. For instance, a user may prefer that sit/stand reminders be provided to the user by pulsing the intensity of station light devices. Here, a specified (e.g., stored in the database) alternative to pulsing light intensity may be a haptic vibration of the tabletop. In this case, where a station includes lights, the pulsing light signaling may be provided and in a case where a station does not include lights, the sit/stand reminders may be provided by haptic signaling if possible.

In addition to including user preferences related to station affordance control, the preferences column includes a set of services 2117 (see again FIG. 63) for each affordance in column 2107. While shown as a separate service set for each affordance, the services may be per user ID instead of per affordance. \

It is contemplated that there may be many different services that can be supported by a workstation configuration or, indeed, other affordance configurations within an enterprise. For example, one exemplary service type already described above includes user guidance activities such as, sit-stand programs or other programs that offer recommendations to station users based on timing and sensed user positions or on other sensed parameters like heart rate, temperature, fidgetiness, etc.

Other service types may include simple data and space use tracking services, scheduling services, notification services, automatic messaging services, weather, traffic and other reporting services, etc. Here, data and use tracking services may collect and memorialize data related to how a user uses space affordances and may present that data to a user either upon request or automatically at set intervals for the user to consider. In some cases a tracking service may apply sense making algorithms to collected data and generate observations or conclusions based on the collected data. For instance, a tracking service may simply report the percent of a working day during which the user achieves focus while at a workstation or while using several different workstations within a facility if the user moves from one station to a next during a workday. Here, focus would be a conclusion based on a sense making algorithm driven by data sensed at each station.

Scheduling services may include things like reminders to a user regarding upcoming meetings (e.g., "Your next meeting starts in 5 minutes"), messaging regarding locations/schedules of other employees (e.g., a specific team member), reminders to call other persons that left messages that require a return call, etc. Notification services may include services related to controlling social media and communication applications like e-mail, text and other alerts and may specify filters for these types of alerts as well as preferences related to when alerts or notifications should be presented to a space user (e.g., only when user is not in flow, only during last 10 minutes of every hour, etc.).

Automatic messaging services may include a system that suggests automatic messages to be sent by a user to other persons. For instance, one automatic message may be suggested for delivery to a user's home where the message indicates "Leaving work now, should be home in 15 minutes." Another automatic message may indicate "Running late, will be at the meeting in about 10 minutes," for delivery to one or a subset of employees that are located at or scheduled to attend a meeting with a user associated with the messaging service. Many other automatic messages are contemplated and could be generated by a system processor 54 based on user preferences. Another messaging preference may relate to whether or not messages are automatically sent or require some user affirmation step. For example, one preference may be that each automatically generated message be presented to a user via an interface screen 2120 (see again FIG. 62) along with a "Send" icon which is selectable to transmit the message to one or more recipients. Another preference may be that a message suggested via screen 2120 be accompanied by a "Cancel" icon and a send countdown clock (e.g., 10 seconds) and, where a user does not cancel the message within the countdown period, the message may be sent automatically. Other messaging service preferences may include who to send messages to (e.g., when a user is running late for a meeting, should a message be sent to each meeting attendee that is present at the meeting or just to a meeting organizer, should a message about leaving work be sent only to a spouse or also to children, etc.).

Weather and traffic services may automatically present weather and traffic information to a station user at optimal times during a user's day. For instance, where a user's schedule indicates that she has a meeting in 30 minutes at a different facility, the system may obtain traffic information from a third party information provider regarding traffic conditions between the user's current location and the location at which the meeting is to occur and may automatically present that information to the station user. Weather information may be automatically served up to a user 30 minutes prior to an end of the user's scheduled day and only when the user is not in a focused flow state. Many other services are contemplated and, for each user listed in column 2103, a separate service set 2117 would be listed in column 2107.

Figure 64:
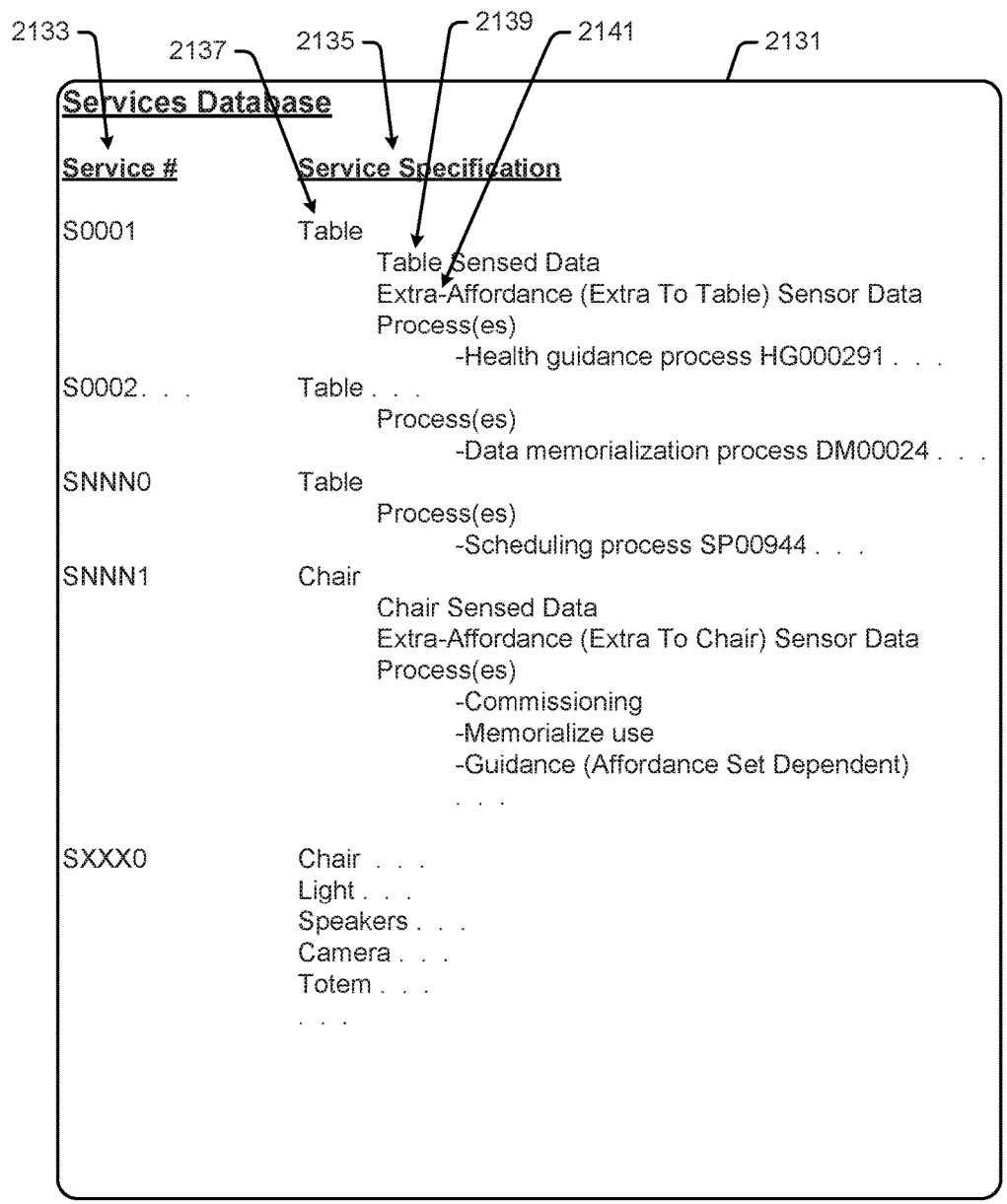
FIG. 64 is a schematic showing a services database that is consistent with at least some aspects of the present disclosure.

Referring also to FIG. 64, an exemplary and simplified services database 2131 is shown that includes a service column at 2133 and a service specification column at 2135. The service column lists all services that may be associated with facility or enterprise affordances. For each service in column 2133, a service specification is presented in column 2135. As shown, there may be several services associated with each affordance at a workstation. Thus, there are several "Table" services (see exemplary service 2137), several "Chair" services, etc. Here, it is contemplated that a user may select one, two or more services to be implemented simultaneously for each affordance. Thus, a user may specify each of a guidance service, a scheduling service and an automatic messaging service for any workstation table used by the user. As another example, a user may specify any of or a combination of 20 different services that are associated with a chair at a workstation.

For each affordance and service combination, column 2135 includes a listing of affordance sensed data 2139, a listing of extra-affordance sensor data 2141 and a listing of processes 2143. Here, affordance sensed data indicates types of data that may be sensed by sensors that are integrated into an associated affordance and that can be used to drive services or processes. For instance, sensor data from workstation sensors that may drive service S0001 in FIG. 64 are listed at 2139. Extra-affordance sensor data lists sensed data from sensors other than sensors that are integrated into an associated affordance. For example, in FIG. 64, the extra-affordance sensor data at 2141 that is associated with a workstation table may include sensor data from secondary sensors in a workstation chair, a camera located within a space in which a workstation is located, a processor that manages user and affordance scheduling, a third party information service like a weather service or a traffic service, etc. In addition, extra-affordance sensor data may include data from a user's portable or wearable computing device like a badge, a wrist mounted computing device (e.g., a smart watch), etc.

A process, method, algorithm or application associated with each service in column 2133 is provided in column 2135. To this end, see the exemplary processes in column 2135 associated services S0001, S0002 and SNNN0 that includes a health guidance process HG000291, a data memorialization process DM00024, and a scheduling process SP00944, respectively. Each process in column 2135 may use the data types specified there above to facilitate the process.

In at least some cases it is contemplated that each process in column 2135 will include a set of calculations or methods that can be performed by a system processor to generate process results based on different data input sets. The idea here is that different workstation configurations and different extra-affordance configurations may include different sensor combinations and therefore generate different datasets. Thus, in the case of a sit-stand health guidance process, if a station chair is sensored and includes a weight sensor, output from that sensor can be used as a clear indication of whether or not a workstation user is sitting in the chair. In this case the chair weight sensor may be used to generate data useful to drive the guidance process. In other cases, where a station chair is not sensored or at least where the chair does not include a weight sensor, the health guidance process may use a different dataset based on signals from a different set of sensors at the station or from extra-affordance sensors to determine if a user is sitting or standing. Thus, the health guidance process HG000291 may be able to effectively generate health guidance results using different datasets.

In embodiments where there is a set of triage type calculations useable to generate similar observations and conclusions, while different calculations may yield similar observations or conclusions, different calculations will have different confidence factors associated therewith that indicate how likely it is that the conclusions are accurate. For instance, a weight sensor may have a high user sitting confidence factor while a user presence sensor may have a lower sitting confidence factor. In these cases, the service specification will typically include an ordered list of calculations to be considered consecutively for implementation at a station associated with user's preferences. Thus, the system processor may always automatically use the highest confidence factor calculation to facilitate a process that can be supported by the data available at a station to generate observations and conclusions.

Referring still to FIGS. 63 and 64, where a user's preferences specify two or more services for a station affordance (e.g., a table, a chair, a camera, etc.), more than one service may require at least some of the same sensed and/or extra-affordance data. Here, it is contemplated that there will be a complete set of sensed and extra-affordance sensor data for each station that corresponds to all of the data required to support preferred services at a station. Referring specifically to FIG. 63, user data column 2109 memorializes all of the data generated for a specific user per affordance such as, the table data at 2119. In addition, column 2109 also includes "extra-station data" at 2121 that corresponds to the extra-affordance sensor data specified at 2141, as well as service observations and conclusions at 2123 and 2125, respectively.

In at least some embodiments user presence at a station will be used to initiate workstation services and therefore some type of user presence or occupancy detection system will be required. In at least some cases users or at least a subset of users will not employ or carry portable computing devices that can be tracked as a proxy for user location/presence and therefore other user presence detection systems will be required. In some cases where user privacy is particularly important, a system may not use portable user devices at all to detect user presence. Similarly, where user presence is required for safety reasons (e.g., do not want to raise or lower a workstation tabletop without a user being present), device detection may not be supported.

Referring again to FIG. 62, in at least some cases area facility cameras 2110, 2112 may be used to track user locations proximate facility stations or other affordances. Here, the camera data may only be used to identify human forms and locations/relative juxtapositions to workstations, and not to generate images for identifying specific users via face recognition or some other image analysis process. Thus, in FIG. 62, analysis of camera images may be used to determine that a user is located in a workstation present zone 2158 adjacent a front workstation tabletop edge 2156. Here, because the camera images are not used to identify specific users and instead only to identify user forms, the cameras may be limited to relatively low pixel counts or to designs where the images generated are unsuitable for user identification. Thus, for instance, human form can be discerned through data that represents general movements that are typically associated with human activities where the data is highly granular. The presence sensing camera may also be integrated into the workstation as at 2150.

U.S. patent application Ser. No. 15/170,550 which has been incorporated in its entirety by reference as described above describes a capacitive sensor assembly for sensing presence of a user along a front edge of a workstation tabletop. The capacitive sensor described in the '339 patent may be used to detect user presence in zone 2158. Other presence detection sensors and systems are contemplated here.

In at least some cases, where a user has not specified personal preferences for station use, instead of using standard defaults for system settings and operations, for at least some settings, the system may be able to automatically identify settings that are better for a specific user than the default settings. For instance, in a simple case, camera images or other sensed data may be useable by processor 54 to determine a user's height and then typical body dimensions for the sensed height may be used to select standing and sitting heights and other control parameters that should be better than standard default settings for any user height. In more complex cases, camera images may be used to detect arm and leg lengths, user posture, neck length, etc., all of which may be used to automatically set optimized station settings. Hereinafter, physiological parameters that are automatically sensed for controlling station settings will be referred to as "auto-sense physiological parameters" and the setting that result from the sensed user parameters will be referred to as "prescriptive settings".

Figure 65:
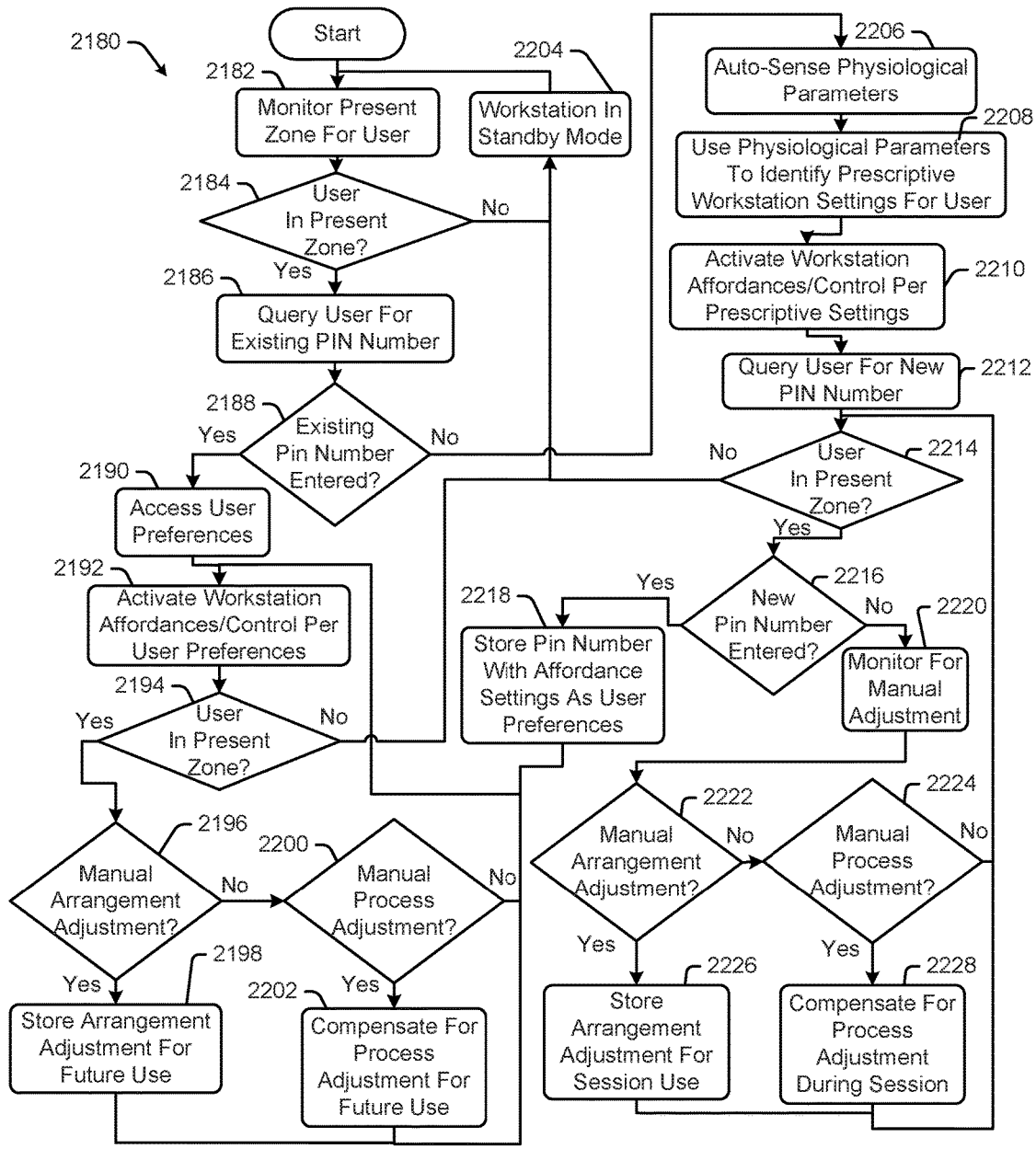
FIG. 65 includes a flowchart that illustrates an exemplary process for associating user preferences with a workstation in an anonymous fashion.

Referring to FIG. 65, a process 2180 for anonymously associating user preferences with a workstation where portable user computing devices are not used as a proxy for user location and where the system generates prescriptive settings if a user has not already specified preferences is illustrated. Again, here, it will be assumed that the system processor 54 in FIG. 7 is present in the table assembly of FIG. 62. At block 2182, processor 54 receives signals from presence sensing devices and uses those signal to determine if a user is currently located in the station present zone 2158 (see again FIG. 62). At decision block 2184, if a user is not present in zone 2158, control passes to block 2204 where the workstation is controlled to assume a standby mode. Here, the standby mode may be one where many of the station affordances are off and where moveable affordances are parked in default standing or sitting of other default positions. In other cases the standby mode may cause at least a subset of station affordances to perform other functions including guidance, scheduling and messaging functions within a facility environment. To this end see the Space Guidance Management System and Method application that is incorporated by reference above that describes various guidance and messaging functions for output devices at workstations.

Figure 66:
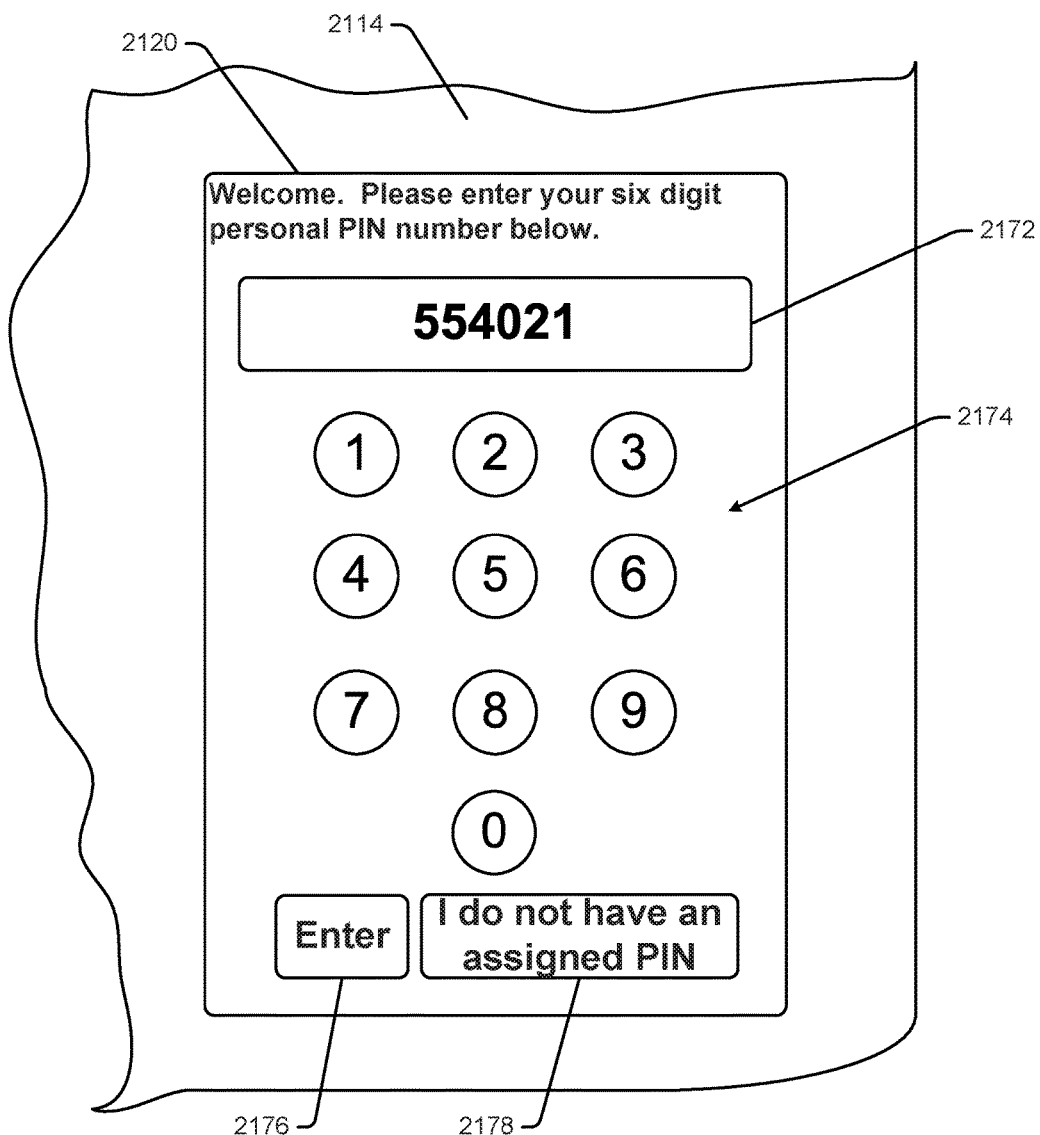
FIG. 66 is a top plan view of a portion of the top surface of a tabletop from FIG. 62 showing an emissive surface interface.

Referring still to FIG. 65, if a user is present in the present zone 2158 at block 2184, control passes to block 2186 where processor 54 presents a query to a user requesting entry of a user's anonymous PIN number if the user already has an assigned PIN number. At block 2188, processor 54 monitors for entry of a PIN. Referring also to FIG. 66, an exemplary screen shot of interface 2120 (see also FIG. 62) is shown that includes instructions to enter a user's six digit PIN number in field 2172, a virtual number pad at 2174, an enter icon and an "I do not have an assigned PIN" icon at 2176 and 2178, respectively. Here, the user enters a PIN number and selects the enter icon 2176 or indicates that she does not have a PIN number. One other alternative may be an icon indicating that the user does not want to enter a PIN number which would indicate to the processor 54 that the user wants to use the workstation completely anonymously in the sense that there would be no persistent storage of any preferences or data related to the user's station use or of any process changes made during current station use.

Referring again to FIG. 65, if a user enters a PIN number at block 2188 that is recognized by processor 54, control passes to block 2190 where processor 54 accesses the user preferences in the preferences/data database (see again FIG. 63). At block 2192, processor 54 uses the user preferences to activate workstation affordances and control (e.g., various processes) in a manner consistent with the user preferences. Processor 54 continues to monitor for user presence within the present zone 2158 while performing the user's preferred processes or services at block 2194. If the user leaves the present zone, control passes back up to block 2204 where the workstation reverts to the standby mode prior to returning to block 2182 to again monitor for presence of a user in present zone 2158.

At block 2194, while processor 54 is monitoring for user presence, processor 54 may allow a user to leave the present zone for a very short time without reverting back to the standby mode in at least some cases. For instance, when a user initially leaves the present zone, the processor may start a time out a 5 second time out period and control may remain at block 2184 until that five second period expires. When the time out period expires, control may pass to block 2204.

In other cases, when a user initially leaves present zone 2158, processor 54 or some other system processor may use images from area cameras (see again 2110 and 2112 in FIG. 62) or a station camera (see 2150) or from some other presence sensing device(s) to track user location proximate (e.g., within a 30 foot area around the station) the station. Here, if the user associated with the user preferences that are associated with the station remains in the general area about the station and then returns to that station's present zone 2158, the user's preferences may remain associated with the station. In some cases, while tracking the user's location within the proximate area, the processor may start a timeout timer and the process may require that the user return to the present zone within the timeout period (e.g., 2 minutes) to maintain the preferences-station association.

Where the processor 54 maintains the preferences/station association after the user leaves the present zone 2158 and while the user remains in the larger proximate area, processor 54 may disable any station control that requires movement of station components. For instance where a tabletop periodically moves or is moved up and down per a sit-stand health management process, processor 54 may halt the process whenever the user leaves the present zone 2158. Then, once the user returns to the present zone, processor may recommence the sit-stand process.

In addition, in cases where processor 54 the preferences/ station maintains association after the user leaves the present zone 2158 and while the user remains in the larger proximate area, processor 54 may automatically present signage per a station emissive surface (e.g., see 2160 in FIG. 62) indicating that the station is generally occupied to discourage other users from attempting to use the station.

In other cases, after a user's preferences are associated with a station and the user leaves the station present zone for some reason, processor 54 may place the station in a standby mode and start a present zone sensing process whereby the processor attempts to re-recognize the user within present zone 2158. For instance, re-recognition may include processor 54 using sensor signals while the user is located in the present zone to generate a simple bio-signature for the user such as, for instance, a user height, user leg and arm lengths and a user posture. Then, after the user leaves the present zone, processor 54 may start monitoring sensor signals to re-identify the bio-signature and may automatically restart station control per the user's preferences and specified services if the user is re-recognized within the present zone.

In at least some cases, when a first user leaves a present zone and while processor 54 continues to track and attempt to re-recognize the first user or tracks the first user's location, if a second user enters the present zone and attempts to use the station, processor 54 may disassociate the first user's preferences from the station and allow the second user's preferences to be associated with the station.

In some cases, if a first user's preferences are associated with a first workstation and the first user leaves the present zone associated with the first workstation and while processor 54 tracks the first user's location within a facility space, if the first user moves into a present zone associated with a second station, processor 54 or another processor associated with the second station may automatically use the first user's preferences and services to activate the second workstation affordances and the first station may revert back to the standby mode. Here, activation of the second station may be automatic or may include a sub-process where the second station presents some greeting to the first user upon entry into the second station present zone and some type of opt in activity such as, "Welcome, please select the 'Associate' button below to customize this station to your preferences" along with an "Associate" icon. Here, once the associate icon is selected, the user's preferences would be associated with the second station and the prior association with the first station would cease.

Tracking user locations via cameras and offering an opt in swipe tool for associating with user preferences and information is described in U.S. patent application Ser. No. 14/995,367 (hereinafter "the '367 application") which was filed on Feb. 1, 2016 and which is titled "Emissive Shapes And Control Systems" which is incorporated herein in its entirety by reference.

Referring still to FIG. 65, if a user remains present in present zone 2158 at block 2194, control passes to block 2196 where processor 54 monitors for manual adjustment of station component arrangement. Here, manual arrangement adjustment means a change in a preferred juxtaposition of station components. For instance, a user may prefer a standing tabletop height of 41 inches instead of a set 39 inches. In this case, it is presumed that if the user changes the standing height of a tabletop to 41 inches while using a station, that the user will persistently want the 41 inch standing height to be used every time processor 54 moves the tabletop to a standing position. Similarly, if a user adjusts other station components in a way that changes relative juxtapositions (e.g., chair adjustments, screen adjustments, emissive surface positioning in some cases, etc.), it may be assumed that the user wants those arrangement adjustments to be used in the future. At block 2196, if a user makes an arrangement adjustment, processor 54 stores the adjustment in the user's database preferences at block 2198 for future use after which control passes back up to block 2192 where the user's preferences, including the new arrangement adjustment, are used to drive the station affordances.

Referring to block 2200, in addition to monitoring for a manual arrangement adjustment at 2196, processor 54 monitors for a manual process adjustment by the user. Here, a process adjustment is a manual adjustment made by a user to one of the service processes (see again FIG. 64) that is associated with user preferences. For instance, where a sit-stand process encourages a user to change between sit and stand postures every 30 minutes, if a user opts out of a suggested stand period (e.g., ignores a reminder to stand or affirmatively indicates that the stand cycle should be skipped), a process adjustment or deviation would be identified at block 2200. Where a process deviation occurs, in at least some cases, processor 54 may be programmed to encourage compensation for the deviation by changing the process moving forward. For instance, where a user skips a 30 minute stand cycle, processor 54 may attempt to lengthen each of six next stand cycles by 5 minutes each to compensate for the skipped 30 minute cycle. In this case, compensation would simply require adjustment of sit and stand reminder times to increase the lengths of the stand periods and decrease the lengths of the sit periods. Deviation compensation occurs at block 2202 in FIG. 65.

In many cases deviation compensation may only affect processes during a current station use or during station use during a current day or other period. In other cases, deviation compensation may be used automatically or with affirmation from a user (e.g., per a user request or selection of a presented "Change future process" icon), to change user preferred service processes for persistent future use. For instance, where a user generally persistently skips a morning stand cycle over some period, processor 54 may recognize the pattern and automatically modify the user's sit-stand process so that the morning stand cycle is not suggested. Here, the user's process may also be automatically adjusted to increase each afternoon stand cycle by 5 minutes to compensate for the skipped morning stand cycle. After block 2202, control passes back up to block 2192 where the process described above continues to cycle.

Referring again to block 2188 in FIG. 65, if a user indicates that she does not have a PIN number, control passes to block 2206. In some cases, processor 54 may simply activate station affordances with default station settings and services and control may pass to block 2212 where processor 54 queries the user to enter a new six digit PIN number. In the alternative, in some cases, as illustrated in FIG. 65, at block 2206, processor 54 may access data from station and facility sensors that is useable to identify physiological parameters of a user that can be used to identify prescriptive station settings. For instance, again, given a user's height and limb lengths, a generally comfortable standing tabletop height and other configuration parameters may be identified and used as prescriptive settings. At block 2208, the parameters from 2206 are used to identify the prescriptive settings for the user and at block 2210 those settings are used to activate workstation affordances and control. At block 2212, the user is queried for a new PIN number.

Referring yet again to FIG. 65, at block 2214, processor 54 continues to monitor for user presence in the station present zone. Again, presence monitoring may take several forms where, after user-preference station association, short user absence within the present zone may not disassociate a user's preferences from with the station or where a user's location is tracked outside the present zone and if the user re-enters the zone, the user-station association continues.

Figure 67:
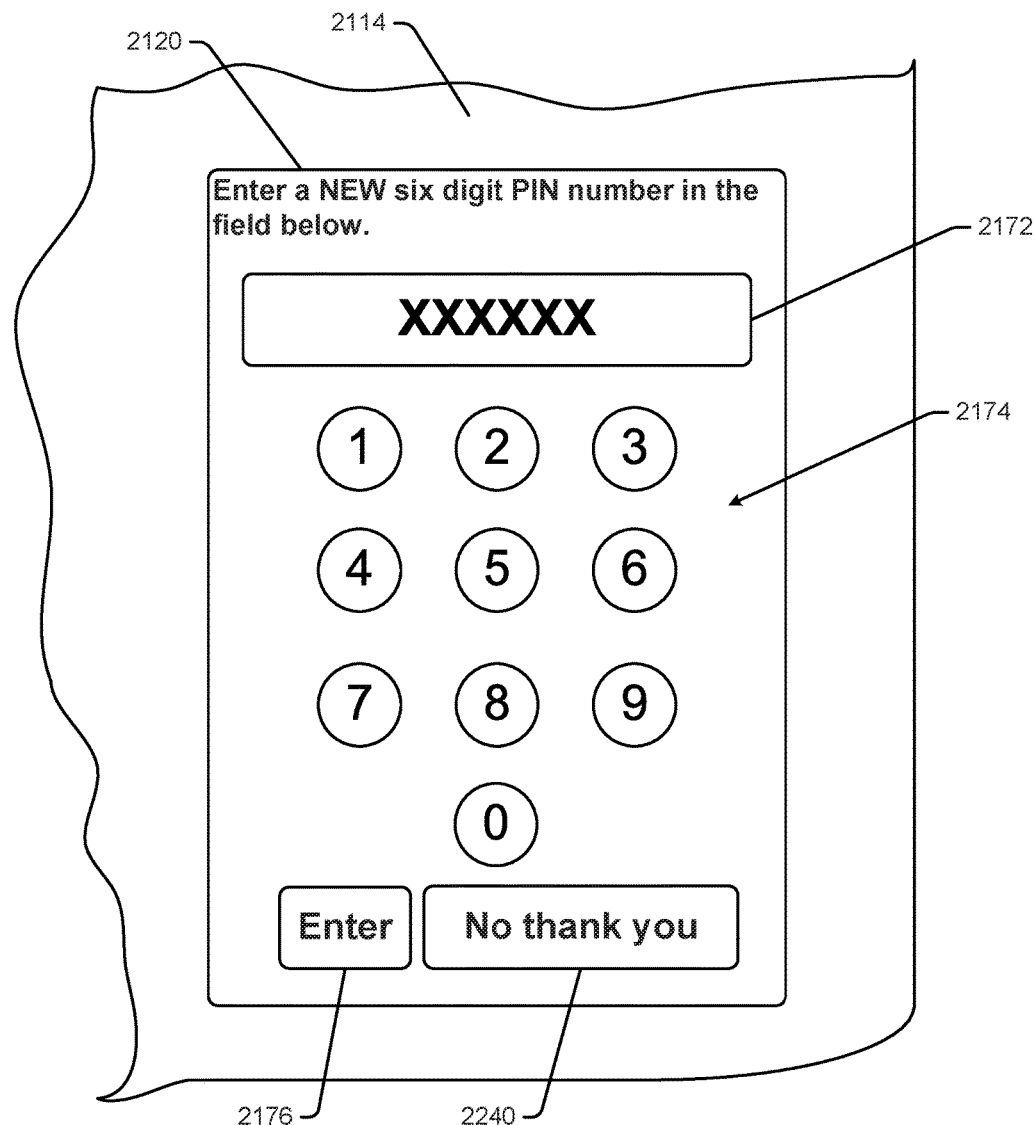
FIG. 67 is similar to FIG. 66, albeit showing the emissive surface interface at a different time during operation.

Referring now to FIG. 67, an interface screen shot that may be presented for requesting a new PIN number is shown at 2120 which includes a field 2172 for a new PIN number and a virtual number pad 2174 for entering the new number. The interface also includes an enter icon and a "No thank you" icon 2176 and 2178, respectively. Here, in at least some cases a user may have the option to not enter a PIN number. Where a user chooses to not create a new PIN number, control passes to block 2220 where processor 54 monitors for manual adjustments of the station affordances. Manual arrangement adjustments and process adjustments are detected at blocks 2222 and 2224, respectively and where an arrangement adjustment occurs control passes to block 2226 while a process adjustment causes control to pass to block 2228. At block 2226, arrangement adjustments are stored with temporary anonymous identification numbers (see again 2105 in FIG. 63) for use during the current use of the station and at block 2228 process adjustments are used to compensate the services or processes during current station. Here, because the user did not enter a new password, the user's arrangement and process adjustments are not stored as preferences for subsequent station control. After blocks 2226 and 2228, control passes back up to block 2214 where user presence in the present zone 2158 is continually monitored.

In at least some cases it is contemplated that while a user may not initially enter a new PIN number, a user may decide, after adjusting user preferences (e.g., arrangements and processes at 2222 and 2224), to store those preferences to be used during subsequent station use. Thus, the user may be able to enter a PIN number at 2216 after cycling through blocks 2220 through 2224 so that the user's preferences can be associated with a PIN number at any time during station use. Referring again to decision block 2216, if a user enters a new PIN number, control passes to block 2218 where processor 54 stores the new PIN number along with the current workstation settings (e.g., ether the prescribed settings, default settings or settings as adjusted by the user at blocks 2222 and 2224). After block 2218, control passes to block 2192 where workstation affordances are activated per the user preferences and then the process cycles through blocks 2192 through 2202 as described above.

In at least some cases, processor 54 may be programmed with some general rules of thumb so that the processor 54 itself can automatically ascertain station states. For instance, in the case of a sit-stand health management process, where a user manually adjusts tabletop height at any time, the adjustment may be either an arrangement adjustment or a process adjustment, depending on the degree of adjustment and the final juxtaposition of station components. For instance, where a station is initially at a standing height of 42 inches and a user manually changes the height to 26 inches, in almost all cases, the 16 inch height change would signal a state change from the standing height to a sitting height. This 16 inch adjustment should be contrasted with a two inch adjustment from 42 inches to 40 inches which, in most cases, would amount to a simple standing height arrangement adjustment (e.g., the user prefers a 40 inch standing tabletop height to a 42 inch height).

Thus, referring again to FIG. 65, a height adjustment may be recognized as either an arrangement adjustment at block 2196 or as a process adjustment at block 2200, depending on the amount of adjustment that occurred as well as the final adjustment height. In the above example, the 2 inch adjustment to 40 inches may be recognized as an arrangement adjustment at 2196 while the 16 inch adjustment to 26 inches would be recognized as a process adjustment at 2200. In this case, the rule of thumb may be that any tabletop height adjustment that drops the height by greater than 10 inches where the final tabletop height is less than 32 inches is recognized as a process adjustment that results in a sitting height state and a complimentary rule of thumb may be that any tabletop height adjustment that raises the height by greater than 10 inches where the final tabletop height is above 34 inches is recognized as a process adjustment that results in a standing height state.

In at least some cases adjustments may be cumulatively tracked for applying the rules of thumb. For instance, where a user moves a tabletop down two inches and then halts for 2 seconds and then moves the tabletop down another 9 inches for a total of 11 inches, the cumulative drop of 11 inches may be used to determine if a process change occurred. Similarly, if a user moves a tabletop down four inches, then up one inch and then down 8 inches the cumulative effect would be to drop the top 11 inches and that accumulation would be used to assess if a rule of thumb was met.

While the rules of thumb may cover all possible adjustments so that processor 54 can always automatically categorize adjustments as arrangement adjustments or process adjustments and can always automatically identify arrangement states, in other cases, there may be some adjustments where the degree of adjustment and end state cannot be definitively identified after the adjustment has occurred. For instance, if a user moves a tabletop down four inches to a 36 inch height, the rules may not definitively categorize the end state as sitting or standing. In that case, in at least some embodiments, processor 54 may be programmed to query a user to indicate the current state by presenting a question and selectable "Sit" and "Stand" icons per the station interface 2120 (se again FIG. 62). Here, a user's response would be stored as part of the user's preference data for subsequent use.

Referring again to FIG. 65, while blocks 2196 and 2200 are described as relating to arrangement and process adjustments, other station settings and adjustments are contemplated that are related to other station affordances. For instance, a user may adjust station light intensity to meet the user's preference and the adjustment may be stored at 2198 or, if lighting is specified by a specific process, may be used to change a process and then stored at 2202. For example, a focus or flow inducing process may include changing lighting effects and a user modification to those effects or timing may be used to modify other portions of the overall flow inducing process. Many other station adjustments are contemplated and would be stored for setting user preferences in the future.

As indicated above, in at least some cases, biometric data may be used in an anonymous user-station association process. To this end, see the sub-process 2300 in FIG. 68 that may be substituted for a portion of the FIG. 65 process so that biometrics as opposed to a user entered PIN number are used to associate a user's preferences with a specific station. At block 2182, processor 54 monitors for user presence within a station present zone 2158 (see again FIG. 62). At block 2184, if a user is not present in the zone, control passes to block 2204 where the station is placed in the standby mode as described above. If a user is present in the present zone, control passes to block 2302 where user biometrics are sensed via one or a subset of the station or facility sensor devices. For instance, see FIG. 62 where a palm sensing device is shown at 2230 that is configured to sense a palm print of a user when the user's hand is placed within field 2132 with the open hand facing downward. Other biometric sensing devices may include cameras, fingerprint readers, a microphone along with voice recognition software, etc.

Figure 68:
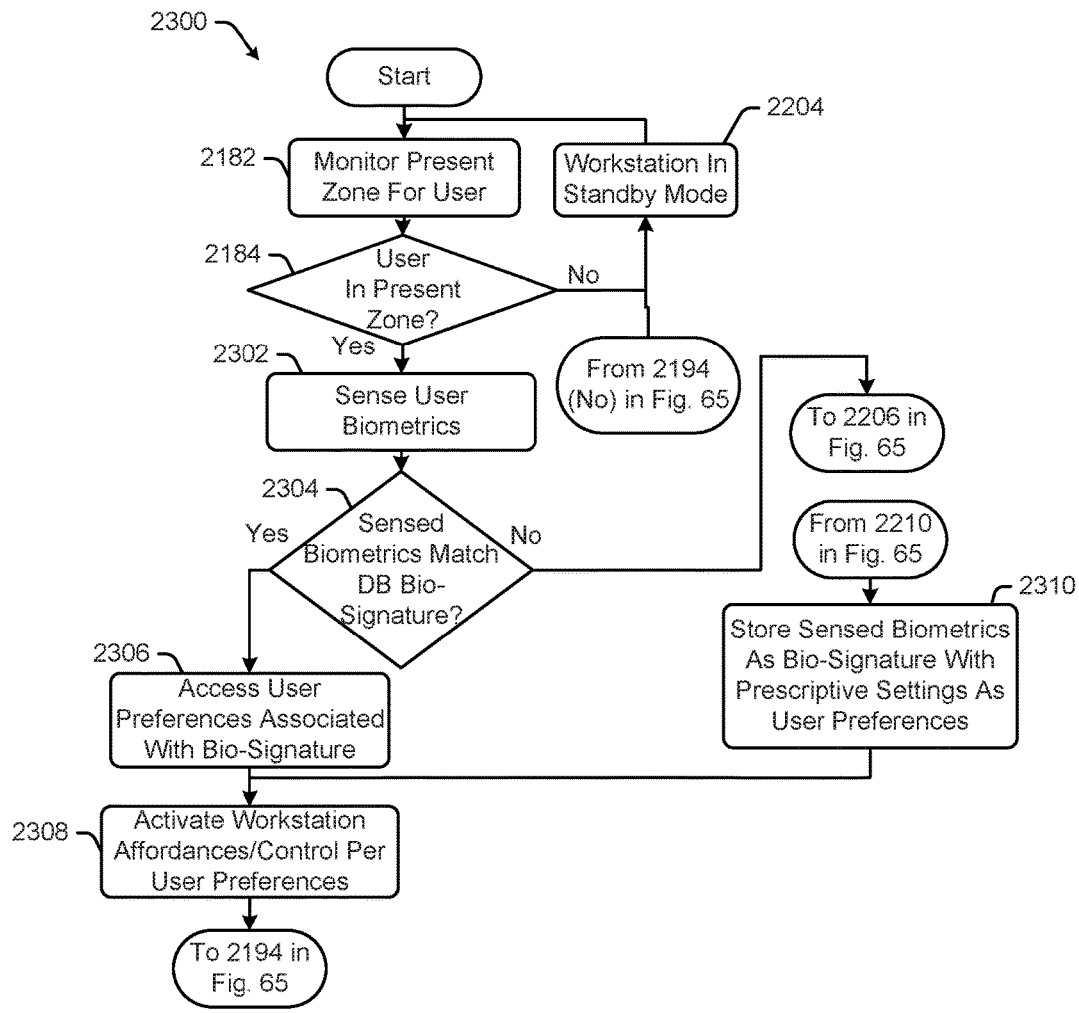
FIG. 68 is a flowchart illustrating a subprocess that may be substituted for a portion of the process shown in FIG. 65 whereby user biometrics are used to anonymously associate a user's preferences with a workstation.

At bloc, 2304 the sensed biometrics are compared to bio-signatures stored in the database (see 2111 in FIG. 63) and if there is no match, control passes to block 2206 in FIG. 65 where physiological parameters of the user are identified and used to generate prescriptive workstation settings which are then used to activate workstation affordances after which control is passed back to block 2310 in FIG. 68. At block 2310, processor 54 stores the sensed biometrics as a bio-signature with the prescriptive settings as user preferences and then control passes to block 2308 where user settings are used to activate the station affordances.

Referring again to decision block 2304, where the sensed biometrics match one of the database bio-signatures, control passes to block 2306 where user preferences associated with the bio-signature are accessed and then control passes to block 2308. At block 2308, processor 54 uses the user preferences to activate station affordances. After block 2308, control passes back to block 2194 in FIG. 65 where processor 54 continues to monitor user presence in the present zone 2158 as described above.

Th association processes describe above with respect to FIGS. 65 and 68 are particularly advantageous as each anonymously distinguishes users and accesses user preferences so that user privacy can be maintained. In addition, each of the FIG. 65 and FIG. 68 processes is facilitated without requiring users to carry personal portable devices. Thus, in cases where some employees have personal computing devices and others do not, all employees could still use workstations as described above and take advantage of personal settings and preferences in an anonymous fashion.

After a first user's preferences are associated with a station and while the user maintains that association by remaining in the station present zone, if a second user enters the present zone, it is contemplated that processor 54 may attempt to continue to distinguish the first user from the second and, while the first user remains in the zone, to maintain the association between the first user's preferences and the station for preference setting purposes. Here, if the first user leaves the present zone while the second user remains in the zone, processor 54 may be programmed to either cause the station to revert to the standby mode and wait for entry of a PIN number or may attempt to identify the second user automatically via biometric sensing or may continue to monitor the first user's presence in a larger proximate area so that association with the first user's preferences may be maintained until the first user re-enters the present zone.

In at least some cases, after a user's preferences are associated with a station and when processor 54 initially identifies that the zone is unoccupied thereafter, processor 54 may be programmed to issue some type of warning that the preferences-station association will cease unless the user performs some activity. For instance, in some cases, if a user exits the present zone, the station may generate an audible chirp or beeping sound that can be recognized as a warning that disassociation is about to take place. In this case, a text warning to re-enter the present zone may be provided simultaneously with the beep or chirp via screen 2120 (see again FIG. 62) so that the user is encouraged to re-enter the zone to maintain association.

In cases where a user carries some type of personal portable device, other association processes and other functionality is contemplated. One particularly useful portable user device is a user identification badge. While personal portable smartphones, tablets, laptops and other wearable devices could also be employed to perform various processes and functions, badges are of particular interest because a badge, in most cases, serves as a user identifier for human-to-human identification. For instance, many identification badges include a user name, title or general job description and an image of the user so that other persons in a space can identify the user by quick visual examination of the badge worn on a lapel or the like. Thus, while personal computing devices like phones, tablets and laptops may soon be replaced by interfaces and other affordances in facility spaces, it is contemplated that badges may persist for human-to-human identification purposes and therefore the badges may be used by a processor to distinguish one user from others if suitably configured.

In at least some cases it is contemplated that a badge may include a simple memory device, a power source and a transmitter, where a user PIN number is stored in the memory device that can be retrieved by a station processor 54 automatically upon detection of the user in a station present zone. For instance, see exemplary badge 2260 in FIG. 69 where a power source and transmitter include an RF coil 2261 that can receive power from a coil integrated into a station table when the badge is brought into close proximity with the integrated coil (e.g., within the present zone or a portion of the present zone) and that can transmit the PIN number to the station coil so that the station can retrieve the PIN number from the badge. In other cases the power may be provided via a battery. To maintain anonymity, in at least some cases, the PIN number will not be associated with a specific user's identity and instead would only be associated with user preferences and specified services and related supporting data.

In operation, referring again to FIG. 69, in at least some embodiments, when a user 2106 enters present zone 2158, system processor 54 (see again FIG. 7) may generate an RF excitation field generally within the zone 2158 causing badge 2260 to transmit the badge PIN number to the processor 54 which the processor uses to access user preferences for activating the station affordances. In at least some cases the badge memory may be writable and, in that case, if a badge does not include a PIN number in the memory upon initially entering a present zone, processor 54 may automatically assign a PIN number to the badge and transmit the number to the badge for storage thereon so that default, prescriptive or user defined preferences can be assigned to the PIN number for future use.

In other cases, processor 54 may query a user once for a PIN number to be entered via a virtual number pad (see again FIG. 66) that can then be transmitted to the badge for storage. Thereafter, the next time the user enters a present zone, processor 54 can retrieve the PIN number from the badge and use that number to access user preferences stored in the system database.

In still other cases, user preferences may be stored in a badge memory and those preferences may be transmitted to or obtained by the system processor automatically or upon some user's affirming action when a user is present in the present zone 2158. Here, for instance, after a user is sensed within zone 2158, processor 54 may excite badge 2260 to transmit all of the user preference data to processor 54 which would temporarily store the preference data in a table or other system memory. The step of obtaining the data may be automatic or it may include inviting the user via interface 2120 to opt in to associating with the station via selection of an "Associate" button or the like. Any arrangement changes or process changes made by a user while in the zone may be transmitted back to the badge for storage and subsequent use.

In still other cases, a badge type identification device may also include a fingerprint or other biometric sensor device that can be used to confirm that the person using a badge is the actual badge user as well as to initiate an anonymous user-station association process. To this end, see that badge 2260 in FIG. 69 includes a fingerprint reader or sensor device 2263 on the front surface of the badge. In other cases the fingerprint sensor may be on the rear surface of the badge so that the reader does not have to affect the appearance of the badge. In some cases a user's fingerprint data may be stored in the badge memory so that a badge processor can compare a user's sensed fingerprint to the stored print and, when a match occurs, transmit the user preferences to system processor 54. A second fingerprint reading may cause any user adjustments to be transmitted to the badge and stored in the badge memory.

Figure 70:
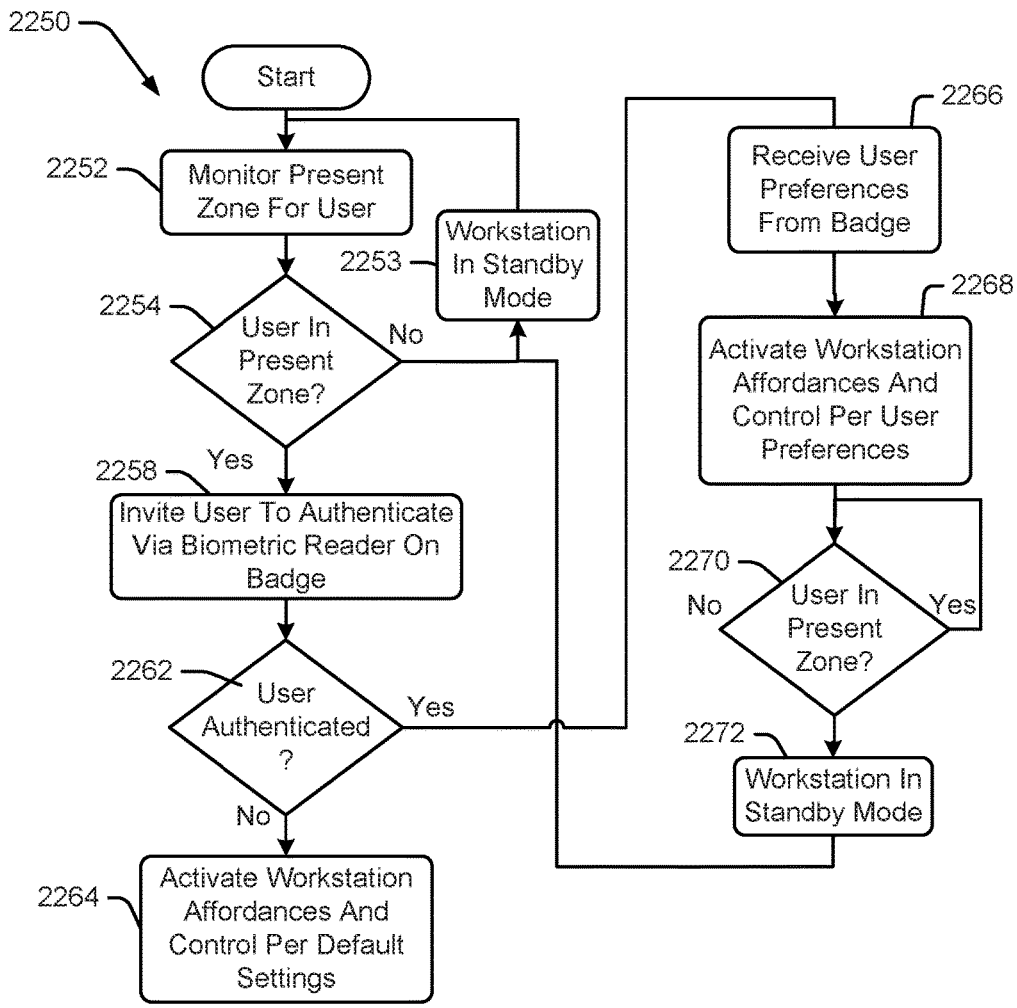
FIG. 70 is a flowchart illustrating a process whereby a station user uses a biometric reader on a badge to authenticate the user's identify causing a user's station preferences to be accessed anonymously by a system processor.

A method 2250 whereby a badge including a fingerprint reader is used to anonymously associate a user with a station is illustrated in FIG. 70. At block 2252, processor 54 monitors sensor data to determine if a user is in the present zone 2158. If there is no user in the present zone at block 2254, control passes to block 2253 and the station is place in the standby mode. If a user is present in the zone, at block 2258, processor 54 invites the user to authenticate via the fingerprint reader or some other biometric reader device on the badge. Here the invitation to authenticate may include an instructional message on workstation interface 2120 encouraging the user to place her thumb print of the fingerprint sensor device 2263. At block 2262, if the user fails to authenticate either by not placing her thumb on the sensor device or for some other reason, control passes to bock 2264 and the station is activated per default settings. In the alternative, if the user fails to authenticate, control may switch to control akin to the process described above with respect to FIG. 65 where a user is queried to enter an existing six digit PIN or a new PIN if the user is not already distinguishable via a prior entered or assigned PIN.

Figure 69:
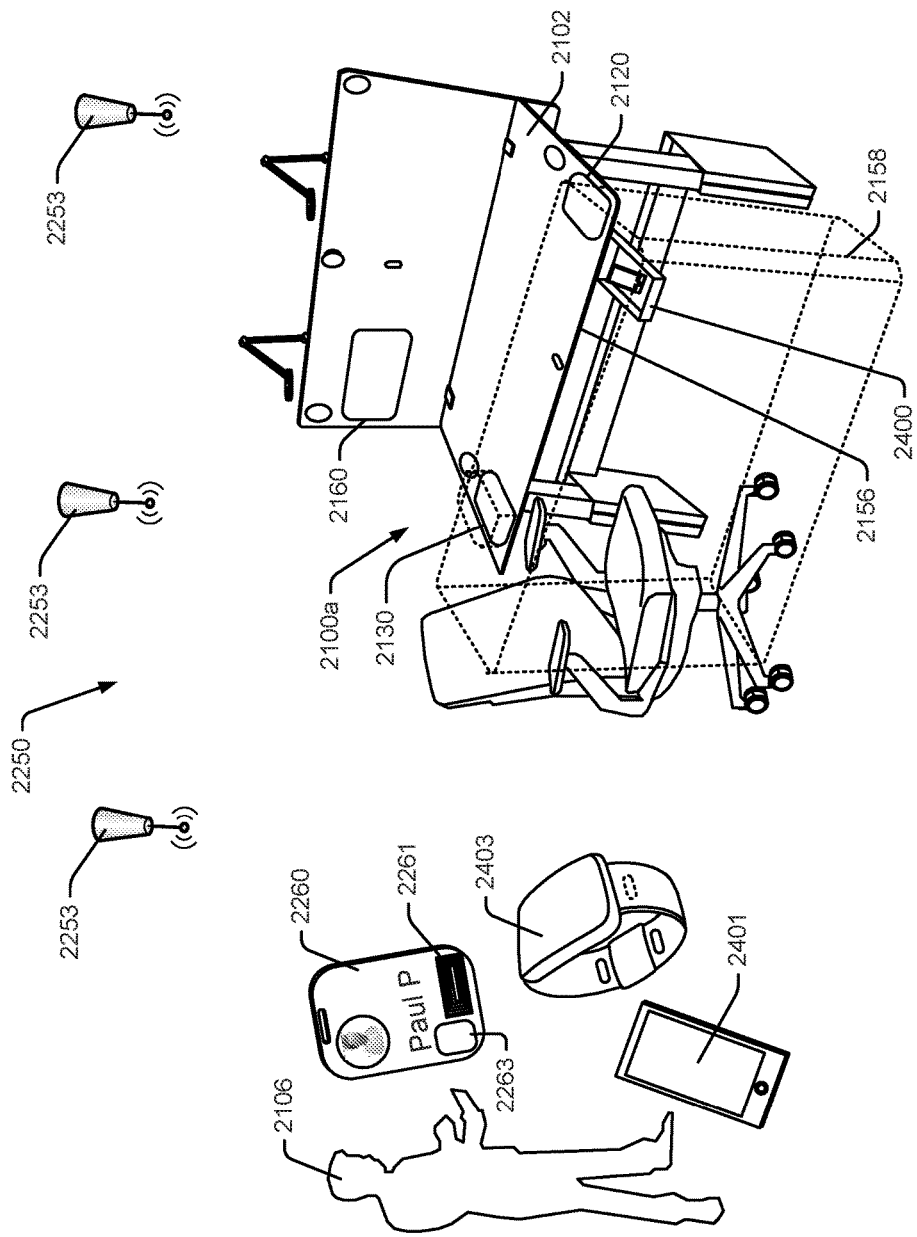
FIG. 69 is similar to FIG. 62, albeit showing a different overall facility configuration and workstation configuration that is consistent with at least some aspects of the present disclosure.

Referring still to FIG. 69, if a user authenticates at block 2262, control passes up to block 2266 where user preferences are retrieved from the badge memory and at block 2268 the user preferences are used to activate workstation affordances. At block 2270, processor 54 continually monitors user presence in the present zone and once the zone becomes unoccupied, processor 54 places the station in the standby mode again at block 2253. While not shown in FIG. 70, in at least some cases, arrangement and process adjustments like those described above with respect to FIG. 65 (see blocks 2196 and 2200) may be monitored and used to change current station operation as well as future arrangements and process modifications.

In some cases, a preferred way to associate a user with a station may include a badge or ID card and a backup plan may include manual entry of a user PIN or other name and password information. In this way, users with badges may be easily associated with stations in space while users that either do not have a badge or that have misplaced or forgotten their badges elsewhere still have the ability to customize station affordances and services at any time. To this end, referring again to FIG. 70, in a case where a user cannot be authenticated via a user badge at block 2262, instead of using default user settings, control may switch to the process 2180 or at least a portion of the process shown in FIG. 65 to obtain an existing user PIN or to guide the user to enter a new user PIN to be associated with user preference. In an alternative system, if user authentication via a badge did not work at 2262, control may switch to the biometric identification process shown in FIG. 68.

While badge type personal devices are particularly advantageous because they serve the dual purpose of enabling human-to-human identification and enabling other functions described herein and because they are likely to persist as technology evolves, other portable electronic user devices such as smartphones (see 2401 in FIG. 69), pad or tablet type devices, laptops, wearable devices like a smart watch device (see 2403 in FIG. 69), etc., may serve similar functions to generate anonymous PIN identifier numbers or anonymous usernames and passwords that can be used to access and activate user preferences. Here, at least some of these other types of portable devices may include biometric sensors like fingerprint readers, face recognition software, voice recognition software, etc., that may be used to authenticate a device user prior to sending an anonymous PIN number to a system processor 54 for accessing user preferences. Where portable devices are used for identification or to distinguish user preferences, portable device location may be determined per any known wireless triangulation process using device signals received at access points 2253 in the general area of a station.

In any of the above cases, the user biometrics or PIN number are used to initially distinguish one user from others so that user station preferences and use data can be accessed. Thereafter, in at least some cases, preferences-station association may have nothing to do with the PIN number or sensed biometric characteristics and instead may be solely based on user occupancy within station present zone 2158. Thus, as indicated in many of the flowcharts described above, once a station is activated per user preferences, the station remains active until a user leaves the present zone at which time station control reverts back to the standby mode. Here, in at least some cases, once user preferences are used to activate station affordances, as long as a user remains located within the present zone, even if the user's portable device is removed from the present zone or the area around the station, station affordances will continue to be controlled by per the user's preferences and any user adjustments made during station use.

In other cases, processor 54 may be programmed to require both a user to remain present in the present zone and that the user's portable device remain in the zone or some other station zone associated with the station configuration to maintain the association of station and user preferences. For instance, see the separate station zone 2550 in FIG. 72 that may include an area anywhere within four feet of the station tabletop member. Here, if anyone moves a user's portable device outside station zone 2550 a warning of possible disassociation may be provided to the user either via the user's portable device or via some visual or audio output device associated with the station. In this case, the user may have a short timeout period (e.g., 10 seconds) during which to reposition the portable device in the station zone to maintain the station-preferences association. In the alternative or in addition, the user may be provided with an ability to indicate that the user intends to maintain control of the station which may place the station in an "occupied" mode for some timeout period (e.g., 20 minutes). Here, the station may indicate "Occupied" on digital signage during the timeout period and, if the user's device is returned to the device station zone within the timeout period and a user is sensed in the present zone, processor 54 may simply restart the prior station control process using the user's preferences and adjusted settings. If the user's device is not returned to the station zone within the timeout period, processor 54 may automatically enter a standby mode waiting to associate with another user's preferences.

In at least some cases it is contemplated that a user may have to place a user's portable device at some specific station location or in some specific space that is defined by a mechanical structure or on a surface defined by indicia that mark a specific surface section to start a user preference association process. Here, the user's physical placement of the device indicates to processor 54 that the user intends to associate her preferences/data with the station. For instance, see in FIG. 69 and also in FIG. 71 that station 2100*a* includes a pull out drawer 2400 under tabletop member 2102. Drawer 2402 may include a near field sensor (NFS) device 2404 or other type of wireless device that is capable of short distance wireless communication with a personal portable device 2310 that is placed in a drawer alcove or chamber 2402. In some cases, the NFS device may only be activated once the drawer 2400 is closed or, in the alternative, the NFS device may activate immediately upon placement of the portable device in chamber 2402 so that a confirmation of a wireless link can be provided to a user via the screen on the portable device 2310 prior to closing the drawer 2400. In still other cases a confirmation message of a link to the portable device may be presented on workstation screen 2120 either immediately upon placement of device 2310 in chamber 2402 or upon closing the drawer 2400.

Figure 71:
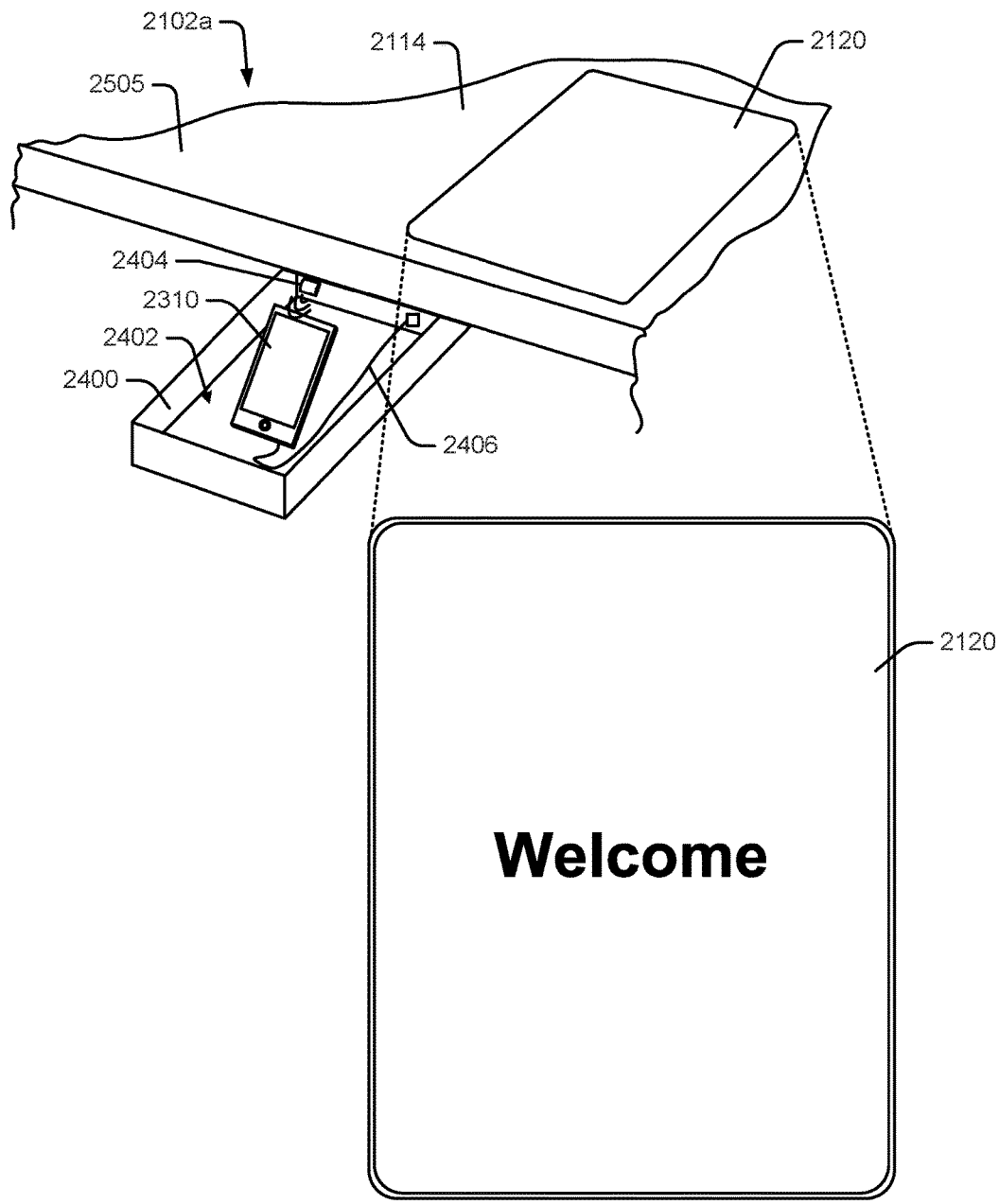
FIG. 71 is a partial perspective view of a subset of the components of the workstation assembly shown in FIG. 69.

In at least some cases the top surface of the bottom member in the drawer 2400 may include a plate shaped wireless charging device or structure to wirelessly charge device 2310 when that device is placed within the chamber 2402. Planar wireless charging systems are known in the art and therefore will not be described here in detail. In other cases an inductive coil may be located in or proximate the drawer where the coil creates a charging field within the chamber 2402 for charging a portable device placed therein. Referring still to FIG. 71, in other cases, a power and data cord may be provided within chamber 2402 as shown at 2406 for manually linking the device 2310 to the system processor 54. In some cases both wireless NFS and cabled connections may be supported.

In still other cases, an NFS device may be built into a portion of the top surface of the tabletop member 2102 as shown at 2130 in FIG. 62 so that when a user places her portable device on the space labelled 2130 or proximate thereto, the portable device is recognized.

In any case, after the portable wireless device is identified in a sensing space dedicated to associating the portable device with a station, the system processor 54 may retrieve either an anonymous PIN number or user preference information for the station from the portable device. Thereafter, the user preference information (e.g., either retrieved using the PIN number or retrieved directly from the portable device) may be used to activate station affordances and initiate the user's preferred services or processes.

In at least some embodiments it is contemplated that when a portable user device is placed in a drawer or other enclosed space, the portable device may automatically link to the system processor 54 which may present a portable device interface to a station user on one or more station emissive surfaces. For instance, in some cases, if a user places a smartphone in drawer 2402, processor 54 may link to the device 2310 and replicate the interface from device 2310 on display screen 2120 in FIG. 69. Here, the user would be able to use the portable device in the usual fashion to run any application programs that the device is capable of running, albeit using the interface screen 2120 instead of the portable device screen.

As another instance, either processor 54 or the processor in portable device 2310 may cause a dual or more screen interface to be generated instead of the single screen interface typically presented by the portable device. For example, in FIG. 69 where an emissive touch sensitive surface is provided at 2120 and a heads up emissive surface is provided at 2160, processor 54 (or the portable device processor) may generate an input interface at 2120 and an output interface at 2160 that takes advantage of the dual interface design at the station 2100*a*. Thus, while the portable device interface may be good for portable use, the dual or more surface interface may be much better for use at a station. In some cases, it is envisioned that portable device applications themselves may be coded to drive either the portable device surface or other optimal interface configurations that include two or more screens when available. Thus, the dual, three or more screen interfaces may compromise a more optimal "vessels" for interacting with an application run by a portable device and the application or the system processor 54 may drive whatever interface resources are available in the most optimal fashion. In at least some cases, how an application drives emissive surfaces at a station to provide input and output capabilities may be based on a user's preferences.

In some embodiments input and output tools for station services may be provided on different emissive surface devices when available. For instance, referring again to FIG. 69, sit-stand reminders may be provided to a user via a heads up station display 2160 when available and control input buttons or icons may be provided to the user via emissive input surface 2120 which is conveniently located at an area that a user should be able to easily reach near front tabletop edge 2156.

Similarly, while personal portable devices that have tough sensitive displays facilitate both input and output on a single touch sensitive screen, at a station that includes both a heads up display 2160 and an emissive interface that is more readily reachable adjacent a tabletop front edge, output and input tools may be separately presented via the heads up and reachable devices 2160 and 2120, respectively. Again, user preferences may define how and where portable device applications as well as station service input and output tools are presented.

While a special system processor 54 may be included in each workstation assembly or may be provided for controlling several workstation assemblies in any of the ways described above, in at least some embodiments, it is contemplated that a user's portable computing device may be programmed to operate as the system processor 54. Thus, after a portable device 2310 is associated with a station as by, for instance, placing the portable device 2310 in a station drawer 2400 (see again FIG. 69), the portable device may run a station controlling process whereby user preferences are controlled by the portable device. Here, because the user's device may control all station operations or services and the data used to drive those services, the user's data and information may remain private. In this case, interaction with the station affordances may be limited to receiving sensor data from station and area sensors, receiving data from other applications like scheduling applications, weather and traffic tracking applications, etc., receiving input commands from a station interface device (e.g., screen 2120), and providing control commands to the station for controlling affordances per user preferences and adjustments.

In some cases, the station may perform a triage process whereby, when a user has a portable device that is capable of driving station affordances per user preferences, the portable device is used to control station operations and, in cases where a user does not have a portable device that is capable of controlling or programmed to control the station, some other process like the deviceless processes described above may be used to drive a station per user preferences. As fallback operating states, where a user does not indicate personal preferences, the station processor may generate prescriptive station settings per sensed biometric characteristics of a user or may use default settings to drive station affordances.

It has been recognized that many people routinely purchase or otherwise obtain upgraded personal portable devices well before those devices become obsolete. It has also been recognized that many personal devices that are replaced with newer devices have substantial processing power and clearly have sufficient power to control affordance operations at a typical workstation. In addition to having more than enough processing power to control station affordances, in many cases, unused portable devices also include wireless transceivers and charging capabilities.

In at least some embodiments, it is contemplated that, instead of providing a dedicated table processor and wireless transmitter system, an old or unused portable computing device may be retrofitted to a system workstation and an application may be purchased from an on line store for controlling workstation affordances in any of the ways described above. To this end, see again FIG. 71 where a portable device 2310 is shown in a workstation drawer. The drawer compartment 2402 should be large enough to receive any type of portable computing device including, at a minimum, a standard or large sized laptop so that any type of portable device can be stored in the drawer. For instance, drawer dimensions may be two inches deep by 15 inches wide by 18 inches long so that many different types of portable devices can be accommodated.

Once a station management application is downloaded to a user's portable device 2310, the application may be run to receive sensor data and user input data from a station interface (e.g., 2120 in FIG. 71) and to provide output as described above. Importantly, while many different types of portable computing devices may be used with a station assembly, downloaded applications to the those devices can cause each of those devices to operate essentially identically in most cases so that user interfacing can be uniform at all workstations irrespective of which type of portable device is retrofitted to a particular station. For instance, see in FIG. 71 that a primary user interface 2120 provided at station 2100a is nicely integrated into the tabletop upper surface. Here, irrespective of the portable device in drawer 2400, mechanical aspects of the interface 2120 will be the same at every workstation and the dynamic visual aspects of the interface screen shots could be rendered substantially identically via application control. Once device 2310 is operational, the device 2310 can be left with the station 2102a and operate as described above to maintain and activate user preferences and other controls as required.

Portable user devices can now run several (e.g., at least two) applications simultaneously and can provide multiple application output at the same time. In at least some cases, it is contemplated that a single portable device 2310 may be use to run two or more applications simultaneously and to drive two or more different station emissive surfaces with output from the two or more running applications. In this case, one station control application may drive the station interface 2120 and a second separate application may drive the heads up emissive surface at 2160 (see again FIG. 69). In other cases, the portable device processor may present a station control application at interface 2120 and may drive a second touch sensitive interface screen at 2130 to provide all of the functionality usually provided by a smartphone or the like (e.g., the entire operating interface for a smartphone may be replicated on screen 2130 so that any portable device applications can be used to drive screen 2130).

The station described above with respect to FIG. 69 includes built in station affordances including light devices, microphones, speakers, interface devices, emissive surfaces, other digital signage type devices, etc. In other cases, it is contemplated that most and in some cases substantially all station affordances may be separate devices or components that can be added on to a station to build out a customized station in whatever configuration a user wants. To this end, see, for instance, exemplary workstation 2500 shown in FIG. 72 that includes a height adjustable table assembly at 2252, a task chair 2104 and other add on station affordances described hereafter. The table assembly 2252 is similar to the telescoping dual leg assembly described above with reference to FIG. 62, albeit including a tabletop structure or assembly 2505 with several special features. One special feature of exemplary tabletop assembly 2505 is that the assembly includes a plurality of power strips 2236a, 2236b, etc., arranged so that each strip is capable of providing wireless power to affordances positioned on the top of tabletop member 2505 over the strip.

Figure 72:
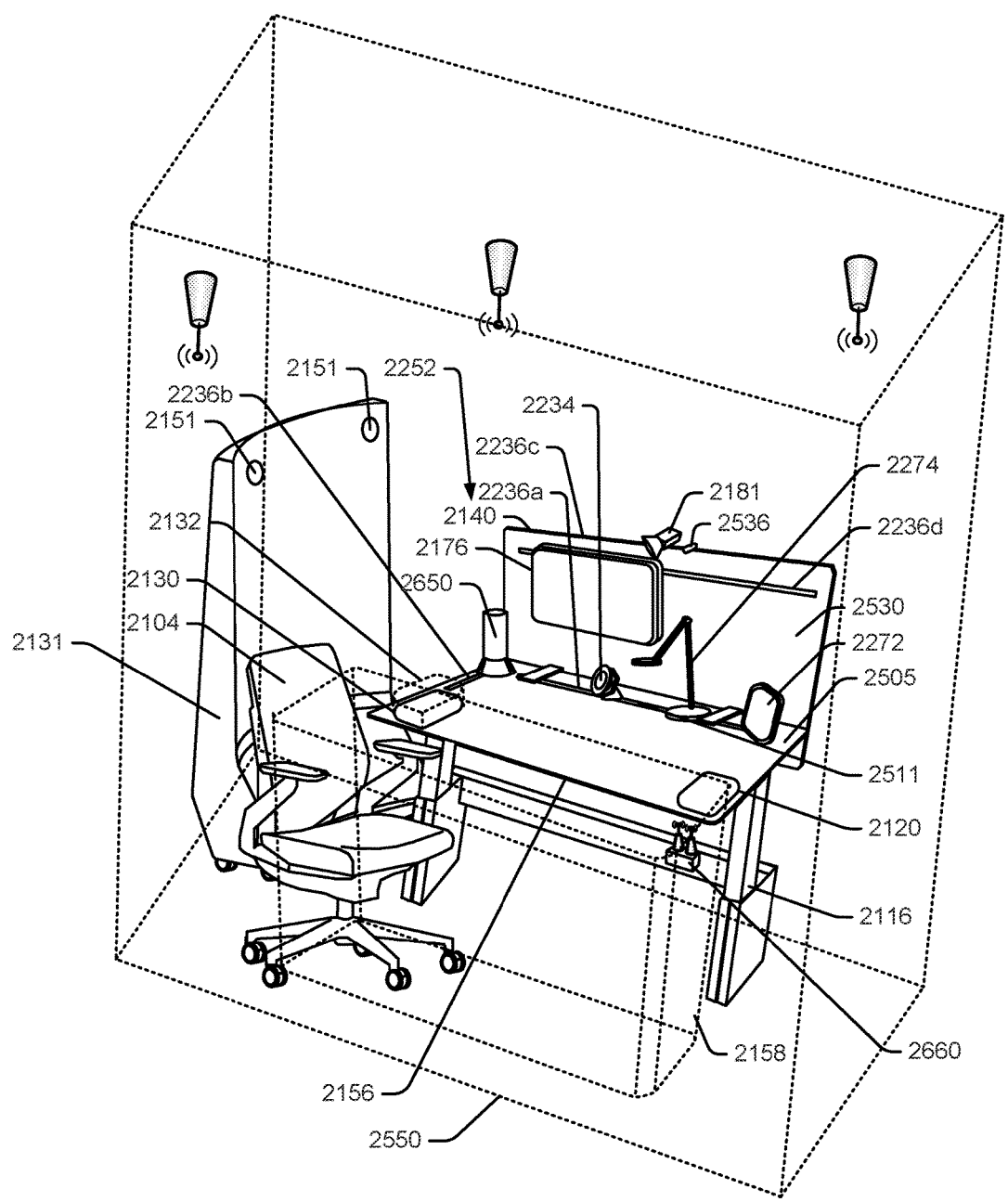
FIG. 72 is a perspective view of yet another workstation assembly that is consistent with at least some aspects of the present disclosure.

Thus for instance, when a suitably constructed light device 2274 is placed on strip 2236a, the light device is capable of drawing power from the strip 2236a and when a suitably constructed speaker device is placed on strip 2236b, the speaker device is capable of drawing power from the strip 2236b. As shown in FIG. 72, in at least some embodiments, one strip may be provided proximate (e.g., within a 3-4 inch range of) a rear edge of the tabletop member 2505 and may extend substantially along the entire length of member 2505 and at least a second strip 2236b may be placed along a least a portion of a lateral edge of the member 2505 substantially parallel to the lateral edge. In other cases, power strips may be formed along, substantially parallel to, and adjacent each of the front, rear, and two lateral edges of tabletop member 2505.

Each strip may either be inductive or be a direct contact type power assembly. Here, the general idea is that when a user places one of the add-on affordances on or proximate the power strip, power may be provided to the add on affordance via the strip.

In the case of an inductive strip, one or more inductive coils would be integrated into the tabletop along the length of the strip and each affordance would include a second inductive coil in a supporting base structure (e.g., the base of a task lamp (see 2274 in FIG. 72). The coil in the affordance would couple to the tabletop coil via an inductive field to receive power therefrom.

Figure 73:
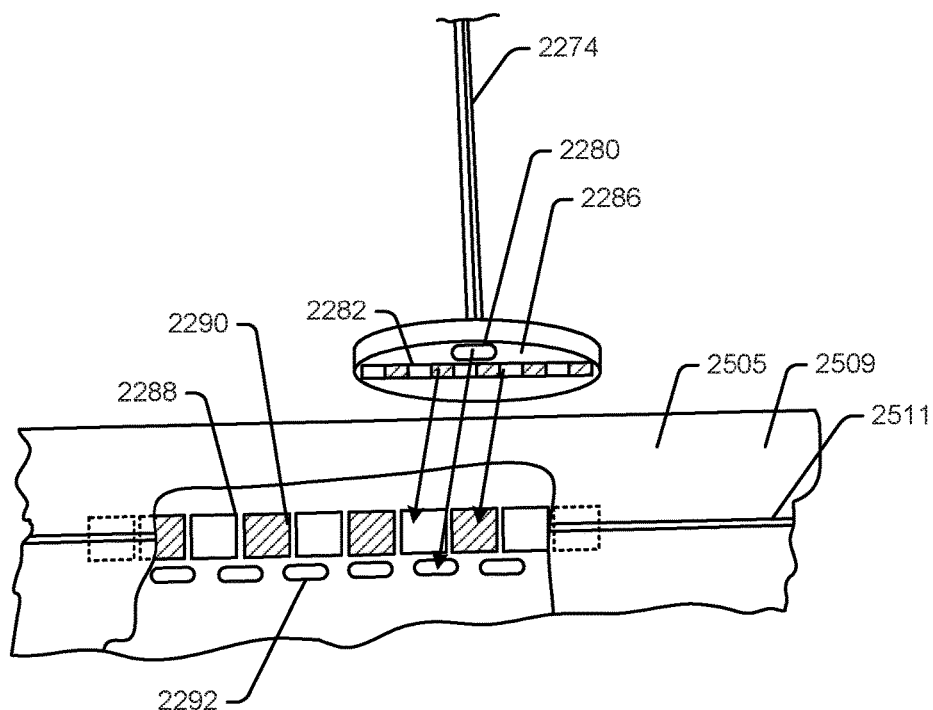
FIG. 73 is a schematic view illustrating a subset of the workstation components from FIG. 72.

In the case of a direct contact type power assembly, a strip would include positive and negative power pads or electrodes integrated into the tabletop assembly along the length of the strip. To this end, see the exemplary direct contact type assembly shown in FIG. 73. In FIG. 73, a plastic or other type of cover member 2509 that covers an upper surface of tabletop member 2505 is shown partially removed to reveal power strip components including a line of positive and negative contact or electrical pads 2288 and 2290, respectively. On the undersurface 2286 of every affordance base, a set of power electrodes or pads is provided in a pattern 2282 that is designed so that when the base is properly aligned with the strip of pads 2288 and 2290, at least one positive and one negative electrode in the pattern is aligned with one positive and one negative pad in the strip so that power can be delivered to the affordance.

In at least some cases the electrode pattern 2282 may form a line of electrodes as shown in FIG. 73 and some type of alignment guidance components may be included in the design. For instance, in some cases one or more magnetic rods may be provided in the undersurface 2286 of each affordance base and a line of metallic rods 2292 may be provided adjacent the line of pads where the juxtaposition of the magnet(s) with respect to the pattern electrodes 2282 and the juxtaposition of the metallic rods 2292 with respect to the pads 2288 and 2290 are such that when the magnet(s) and metallic rods are in contact or aligned through magnetic attraction, at least one positive and one negative connection are made. The magnets should have a strong enough magnetic field that they are capable of moving an associated affordance when attracted to a proximate metal rod over at least a short distance so that the magnetic force aids in proper electrical alignment and to maintain that alignment.

In at least some cases the plastic cover may be doped with electrically conductive particles adjacent each of the pads 288 and 2290 so that electricity can pass there through to affordance electrodes. In at least some cases an electrical control system may only provide power to electrode pads that are "in contact" with (e.g., through the doped sections of the plastic cover) affordance electrodes and therefore some type of sensor device may be provided within the tabletop assembly 2505 for determining which electrode pads are aligned with affordances. For instance, in FIG. 73, a sensor device may be linked to each of the metallic rods 2292 for detecting when a magnet 2280 is adjacent the rod and then electrode pads that will be aligned with affordance electrodes may be suitably powered. In some cases the pads and/or the electrodes on the bottom surface of the affordance base may be controllable to render each pad or electrode positive or negative and may be controlled as a function of alignment to make electrical contact for power delivery.

In other cases, instead of using magnetic attraction to align electrodes and electrical pads, indicia may be provided on a top surface of a tabletop to indicate subsections of the top at which affordances can receive power from the strips. For instance, see indicia 2511 in FIGS. 72 and 73 that indicate the location of the pad strip 2288 and 2290 to a user.

Figure 74:
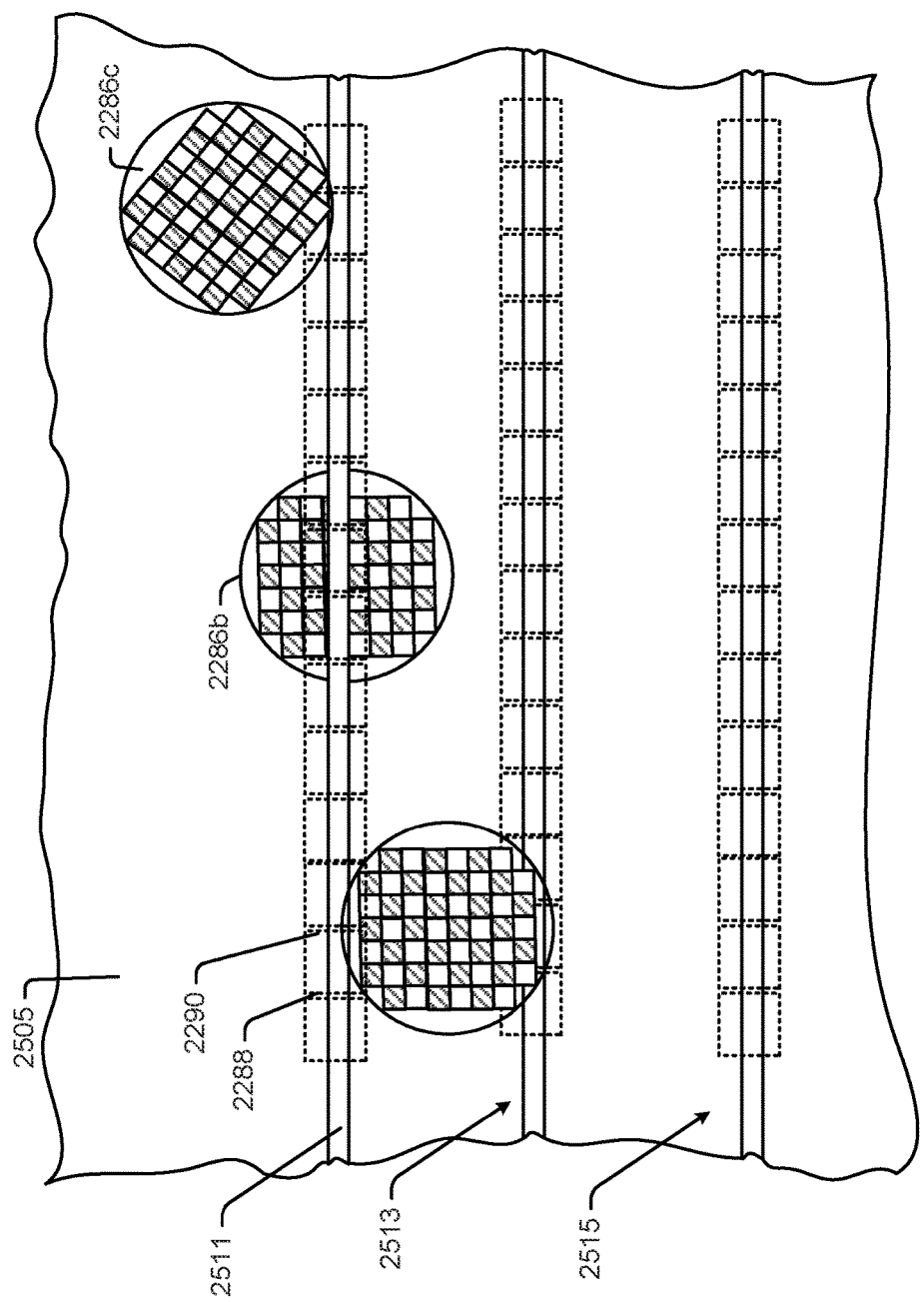
FIG. 74 is a schematic top plan view showing an exemplary layout of a workstation tabletop power delivery assembly that is consistent with at least some aspects of the present disclosure.

In some cases the electrode pattern on the undersurface of each affordance base may cover a substantial portion of the undersurface and may be designed so that any time the base member overlaps any part of the indicia 2511, the base electrodes and strip pads will form an electrical circuit. To this end, see FIG. 74 where undersurfaces of three affordance bases 2286a, 2286b and 2286c are shown at different locations with respect to an indicia strip 2511 and with respect to electrical pads 2288 and 2290 that are shown in phantom. As shown, while each of the bases 2286a through 2286c are aligned differently with the indicia 2511, each includes at least two electrodes that are aligned with two pads 2288 and 2290 that may be controlled to create a complete electrical circuit. Other electrode and pad patterns are contemplated that could perform a similar function. While the base shapes may be different for different affordances, the electrode patterns on the undersurfaces of the bases should each be designed to ensure that an electrical circuit is formed when alignment guidance features (e.g., indicia, magnets, etc.) are used properly.

In other cases, a series of parallel power strips (see additional strips 2513 and 2515 in FIG. 74) may be provided in a table top where adjacent strips are spaced such that electrodes in an affordance base will always make electrical contact with at least two power strip pads regardless of where the affordance is placed on the tabletop top surface. Again, other pad patterns are contemplated.

Referring again to FIG. 72, the table assembly 2252 also includes a display screen 2530 that is mounted to a rear edge of the tabletop assembly 2505 opposite the front edge 2156.

In at least some embodiments it is contemplated that the screen 2530 may comprise another type of powered add on affordance. For instance, in some cases a screen may include built in digital signage devices (e.g., an LED output matrix or emissive surface), microphones, sensors, speakers, cameras, etc., each of which needs power to operate. As another instance, in some cases, the screen assembly 2530 may also include power strips for providing power to other add on affordances. To this end see the power strips at 2236c and 2236d in the upper edge of screen 2530 and in a front face of the screen assembly, respectively. The power strips integrated into the screen may be constructed in a similar fashion to the strips described above with reference to FIGS. 73 and 74, albeit where some additional mechanical mounting structure (e.g., clamps, hook and loop couplers, screws and nuts, etc.) may be required to physically mount or attach add on affordances to the screen 2530.

Referring still to FIG. 72, the screen assembly includes first and second fastening or coupling assemblies at 2532 to secure the screen assembly to the rear edge of the table top. Here, each coupling assembly 2532 includes a base member that extends over the power strip 2236a and at least one of the base members may include a downwardly facing electrode pattern akin to those described above with respect to FIGS. 73 and 74 so that when the add on screen is attached to the tabletop assembly, the base electrodes form a complete electrical circuit with the electrical system in the tabletop to render power available to the screen power strips 2236c and 2236d or other integrated affordances.

While not shown, each fastening assembly 2532 may include a clamping jaw for securing the screen assembly to the rear edge. In at least some cases a power strip may also be or may instead be provided in an undersurface of the tabletop member 2505 and an upward facing surface of one or each of the clamping jaws may include an electrode pattern for creating a complete electrical circuit with the downward facing strip.

Exemplary add on affordances in FIG. 72 include light device 2274, screen assembly 2530, an additional small emissive surface 2272, a speaker device 2534, a voice activated interactive processor device 2650, a camera device 2181, a heads up emissive surface 2176 and a microphone device 2536. Because task chair 2104 may be removed from the station 2252, the chair device may also be considered an add-on affordance to the station. In addition, in FIG. 72, a portable totem assembly 2131 is shown adjacent the station table assembly. In at least some cases totems and other additional portable furniture assemblies may be considered station add on affordances. Other affordance types may include other types of sensor devices and environmental control and data presentation devices.

As described above with respect to FIG. 61, one way to associate affordances with a task chair used by a specific person is to provide bar codes or other readable tags on each of the affordances and create a personal internet of things (IOT) by reading those tags to identify specific affordances to be associated for sensing and control purposes. A similar tag reading process may be used to create a station IOT as add on affordances are added to a station configuration. Thus, each add on affordance in FIG. 72 may include a readable tag and those tags may be read during a station commissioning process to create the station IOT.

In other cases, it is contemplated that add on affordances may be identified whenever they are brought into a station zone 2550 (e.g., within 3 feet of the table assembly in FIG. 72) and may be automatically added to the station IOT when in the zone. For instance, here, when a user brings a new light device 2274 into zone 2250, the light device 2274 may be automatically identified by a device network address and may be added to a station IOT so that the light device can be controlled by the table or system processor 54 per user preferences or default preferences where user preferences are unknown. As another instance, if a totem 2131 is moved into the station zone 2550, a network address associated with the totem may be automatically identified and added to the station IOT. As yet one other instance, when chair 2104 is moved into zone 2550, the chair address may be identified and added to the station IOT.

Where a user's preferences are already associated with a station prior to moving an add-on affordance into the zone, the user's preferences may be automatically applied to the newly added affordance. Thus, for instance, in FIG. 72, when a user that is associated with station 2252 adds emissive surface device 2176 to station 2252, the user's preferences regarding data presentation at the station may cause content to be presented on the surface device 2176 automatically. When a user moves a totem 2131 into the station zone 2550 where the totem includes speakers 2151, the user's preferences with respect to audio output may be automatically applied to the speakers 2151 in the totem. When chair 2104 is moved into station zone 2550 chair preferences and preferred services may be automatically applied to the chair.

U.S. patent application Ser. No. 62/169,645 which was filed on Jun. 2, 2015 and which is titled "Affordance Template System And Method" and which is incorporated herein in its entirety by reference describes motor powered totems that can be automatically moved to different locations within a facility space per user preferences or system templates. In at least some cases, it is contemplated that user station preferences may specify relative juxtapositions of motorized affordances like totems, cart mounted display screens, etc., so that when a user associates with a particular station or when a user's preferences are associated with the station, mobile and powered add on affordances like totems can move to the stations and configure per the preferences.

Figure 75:
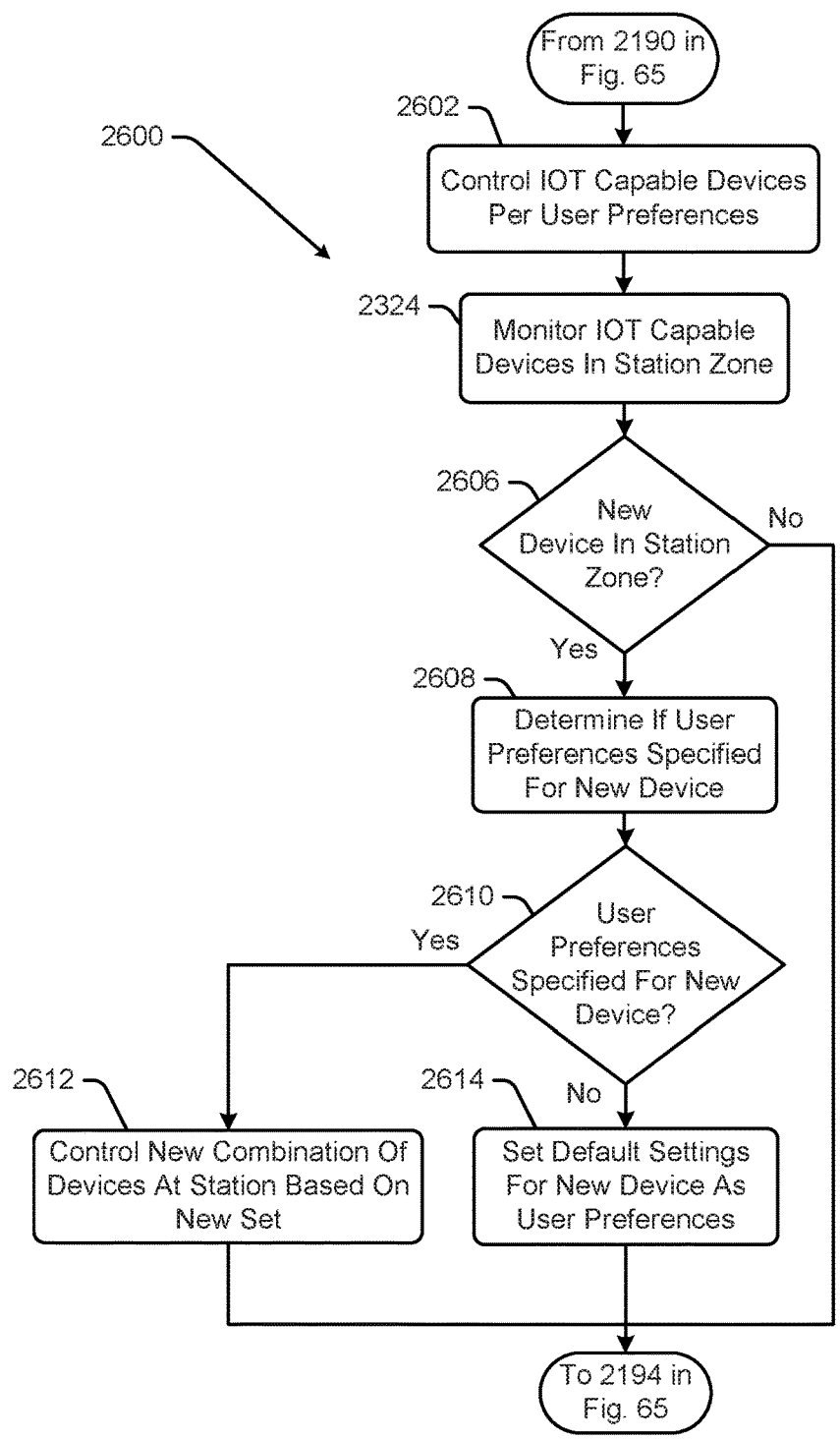
FIG. 75 includes a flow chart illustrating a process whereby devices or internet thing enabled affordances are added to a workstation configuration and are automatically controlled as a function of previously specified user preferences.

A simple sub-process 2600 that may be swapped for block 2192 in FIG. 65 for associating add on affordances with a station IOT is illustrated in FIG. 75. Referring also to FIG. 65, after block 2190, control may pass to block 2602. At block 2602, the table or system processor 54 controls IOT capable devices at a user's station per user preferences. At block 2324, processor 54 monitors station sensors to identify IOT capable devices at the station. Here, monitoring for new devices may take many different forms including using wireless triangulation signals from access points, using NFS sensors at the station, identifying devices linked to power strips, using images from system or station cameras, etc. At block 2606, if a new IOT capable device is identified with the station zone (see 2550 in FIG. 72), at block 2608, processor 54 determines if the user's preferences include preferences for the new device.

Referring still to FIG. 75, at block 2610, where user preferences exist for the new affordance, control passes to block 2612 where processor 54 controls the new combination of devices per the user's preferences. Addition of a new device may affect control of devices that were included in the station IOT prior to addition of the new device or may simply result in establishing preferred control of the new device. For instance, addition of a second display screen at a station that included a first display screen may cause content from the first screen at the station to be divided among the first and second screens or may simply cause additional content to be presented on the newly added second screen. Similarly, addition of a second task light to a station may change how a first light is controlled (e.g., first light intensity may be reduced). After block 2612, control returns to block 2194 in FIG. 65. Referring again to block 2610, if no user preferences exist for the newly added affordance, control passes to block 2614 where default settings are set for the new device.

There have been recent advances in voice recognition software which have made it possible for station users to provide voice commands to computing devices that processors in the device can recognize and act upon. Referring again to FIG. 62, in at least some embodiments, it is contemplated that one or a set of microphones 2124, 2140 may be provided at each workstation and used to capture voice commands from a station user for controlling the station services and affordances. For instance, in one case, a user may utter the phrase "Table, up eight inches" to instruct the height adjust system of the table to increase the height of the tabletop member 8 inches (e.g., from a sitting to a standing height in at least some cases). As another instance a user may utter the phrase "Table, audio off" to turn off a music track currently playing on station speakers 2142.

In some cases station microphones may be integrated into a station at locations where they are most likely to receive clear voice signals from a station user and may be designed to be directional so that they only pick up strong voice signals within microphone fields of sound (FOSs). For instance, see microphone 2140 that is integrated into a central portion of the upper edge of screen assembly 2118 that is directly in front of a location that a user would be expected to assume at station 2100 in FIG. 62. As shown, microphone 2140 may have a FOS 2620 that is generally limited to a central area adjacent front edge 2156 of tabletop member 2102 from which a station user's utterances are expected to emanate. See as another instance microphone 2124 that is integrated into front tabletop edge 2156 and that has a FOS 2622 that extends upward to include an area from which it is expected that a station user will utter commands. Other microphone placements may include lateral screen and table edges as indicated at 2143, 2145, 2147, 2149, in other station affordances as at 2159 in the backrest of chair 2104, etc.

In some cases a station will include 2 or more directional microphones at different locations and the system processor 54 may be programmed to identify voice signals received by one of the microphones that is the best voice signal or at least that is sufficient for distinguishing voice commands and use that signal instead of other voice signals from the other microphones. Here, if one or more of the microphones is blocked or attenuated for some reason (e.g., a book over the microphone, a screen in front of a microphone, etc.), the processor would still receive and be able to use a relatively high quality voice signal to recognize user commands and other utterances.

In at least some cases, where there are several workstations in close proximity in a facility area so that voice signals emanating from several stations may be received at a microphone associated with a first station, a system processor may be able to use the voice signals at several stations to identify which one of the stations from which the voice emanated so that the voice signal can be used to control only that station and not others. U.S. provisional patent application Ser. No. 62/171,401 which has been incorporated in its entirety by reference above teaches a process for identifying one of a plurality of proximate stations from which a voiced utterance emanates in the context of a noise detection system and that process may be used in the case of a station based voice recognition system to associate voice commands with a specific station in this application. In general, the process includes a processor comparing volumes of a voice utterance picked up by microphones at each of several proximate stations and identifying the station from which the utterance emanated by identifying the highest volume signal. Other sensed data may also be used to more clearly identify a station from which a voice emanated. For instance, if there is no user in a present zone associated with a station, that station can be eliminated as a source for an utterance. As another instance, camera images from a station camera (e.g., 2150 in FIG. 62) may be used to identify station users that are speaking and ones that likely are not speaking and may reduce the pool of stations from which a voice emanates down to a small number.

As still one other instance, voice recognition software can train to recognize specific voice signals (e.g., to distinguish a training voice from other voice signals). In some cases as a user uses a voice command system, the recognition software may automatically train to recognize a specific user's voice signal and may generate a voice recognition model for the specific user. The voice recognition model may be stored in the system database correlated with the user's six digit password or an anonymous bio-signature (e.g., face recognition data, the user's voice signal or model itself, etc.) and then, when the specific user's preferences and data are associated with a station, the station processor 54 may use the user's voice recognition model to identify only commands and other utterances from the specific user. It at least some cases, voice model training would be persistent so that the station processor could adapt over time or quickly to changes in a user's voice.

In some cases it is contemplated that the FOS of a voice receiving microphone or other operating characteristics may be modified automatically to compensate for sensed environmental characteristics. For instance, in a case where sensed background noise is appreciable, processor 54 may reduce the dimensions (e.g., cone diameter) of a microphone FOS so that a user has to speak within a smaller FOS area in order for the microphone to pick up a useable utterance. Other microphone operating parameters may also be similarly adjusted in an automated fashion based on sensed noise.

In at least some embodiments other voice recognition services may also be provided at a workstation. For instance, various voice enabled personal helper devices are now available on the market for consumer use where user devices are capable of accessing and presenting information to a user and are also, in at least some cases, capable of controlling other proximate affordances. For example, some voice enabled devices can receive a user's voice utterances, parse the utterances to make sense of what was said (e.g., assign a meaning to the user's utterances), use the meaning of the utterance to search for an answer, and then present the answer as a response voice signal to the user for consideration. In at least some cases, it is contemplated that the capabilities of one of these voice enabled devices may be built into a workstation where microphones and speakers integrated into or included as add on affordances may be used as input and output devices for personal helper capabilities. Again, in a crowded facility space where multiple voice enabled devices are in the same general area, the ability to discern where a voice emanates from or who uttered a voice signal will be particularly important.

In addition to voice enabled devices that respond with voice responses, other personal portable devices that are voice enabled often respond with visual representations of information or a combination of visual and audio information. For instance, many smartphones are now voice enabled so that a user can provide simple verbal search queries and the phones return verbal and/or visual results via a phone speaker and/or a phone display screen. In at least some cases it is contemplated that where a station is voice enabled to receive voice commands or queries via station microphones and provide audio output via station speakers, some response output may also be presented via one or more station display screens or emissive surfaces (e.g., see 2160 in FIGS. 62 and 2176 and 2272 in FIG. 72). Here, again, how information is presented to a user may be specified by a user's preferences and would be a function of the affordance set or combination that exists at a station used by the user.

While integrated station components will provide voice enabled capabilities in at least some embodiments, in some cases it is contemplated that a station may become voice enabled through association of a personal portable device like a smartphone, tablet type device, smart watch, etc. with the station. Again, referring to FIG. 71, smart phone device 2310 may be voice enabled and, when linked either via a cable or wirelessly within drawer 2400, may receive voice commands and queries via a station microphone and provide output via station speakers and emissive surfaces. In addition, device 2110 may be programmed to control other station affordances via voice command and the voice recognition software application.

In other cases a voice enabled microphone and speaker device may comprise an add on affordance to a station. To this end, see the voice enabled or activated processor device 2650 shown in FIG. 72 that is associated with station 2252 but is separate from that station. Exemplary device 2650 may include a speaker, a microphone, a processor and a transceiver for wireless communication.

In some cases, the microphone and speaker in device 2650 will not be optimal for use in a multiperson work environment. Again, optimally a microphone at a workstation will be directional or will be parsed to pick up voice signals only from the station and the device 2650 speakers likely will not be similarly optimized. In addition, in some cases visual output as opposed to audio output will be preferred. In this case, only device 2650 is added to the local statin IOT, that device may be programmed to receive optimal voice input and provide optimal audio and video output via optimized station microphones, speakers and emissive surfaces.

Device 2650 may be added on to the station at a user's will and may be removed and moved to a different station for use by the same user or by another user. If initially used at station 2252 by a first user and the first user moves device 2650 to a second station for use, device 2650 would operate in the same general fashion at the second station as at the first (e.g., differences being based on the set of affordances at the first and second stations). If device 2650 is initially used at station 2252 by a first user and moved to a second station used by a second user, device 2650 would be automatically driven at the second station using the second user's preferences instead of the first user's preferences.

In at least some cases it is contemplated that processor 54 may recognize conditions that make it difficult to apply user preferences to station affordances and may automatically seek guidance or some type of help from station user. For instance, user preferences for a task chair will typically only specify preferences for a single task chair. In this case, if there are two task chairs in a station zone when a user enters the zone, processor 54 may not be able to determine which of the two chairs to link to the station IOT so that user preferences can be associated with the chair for control purposes. In this case the system may instruct the user to move the chair that will not be used by the user out of the station zone. In other cases processor 54 may use sensor data during an initial short period immediately after a user enters a station zone to make sense of indefinite conditions. For instance, in the case of two chairs in the station zone when a user enters a present zone, processor 54 may sense weight data from chair sensors and, when the user sits in one of the chairs and the sensor generates a weight signal, may automatically add the chair that the user sat in to the station IOT and apply user preferences and run services accordingly.

Some embodiments may include gesture detecting sensor devices for sensing user commands at a station. For instance, referring again to FIG. 72, a gesture sensing device may be integrated into the top surface of tabletop 2505 at 2130. Here, the gesture sensing device may include a high definition camera for obtaining images of hand positions and motions. Processor 54 may be programmed to convert hand images and motions to control commands for station affordances. In other cases gesture sensing device 2130 may include a sonar sensor device, a radar sensor device or any other type of device capable of generating data that can be used to discern at least a set of distinct hand gestures.

In other cases gestures may be sensed via other sensor types like, for instance, a vibration type sensor. For instance, upon entering a present zone, a user may tap the edge of her smartphone or other portable computing device on a tabletop 2505 (see again FIG. 72) to physically indicate a desire to either associate the smartphone with the station for control or to simply associate user preferences with the station for control. Here, nearly or substantially simultaneous vibration sensed by the phone device and a vibration sensor in the tabletop 2505 may cause the phone device to transmit the user's six digit code to the table processor to establish controlling association or to be used to access user preference data.

In other cases, when a personal portable device enters a station zone, the station processor 54 may cause the personal device to automatically open a table controlling application that initially presents a portable device user an opt in icon to associate the device with the station or to enable the station to access user preferences and optimize affordance control and services based on those settings.

U.S. patent application Ser. No. 15/170,550 which has been incorporated in its entirety by reference as described above, described a sensor system where battery powered sensors located throughout an enterprise space generate sensor signals that are transmitted to a system server via gateway networking devices. In at least some embodiments it is contemplated that a gateway device may be included in each or at least a subset of workstations to increase networking capabilities. Providing gateways at workstations has several advantages. First, in at least some embodiments every station will provide a reliable power source useable to power the gateway. Second, it is highly likely that many sensor devices will be located at workstations and therefore if a gateway is provided at each station, strong wireless signals should be receivable from proximate sensor devices at each station. Referring again to FIG. 72, an exemplary gateway device is shown at 2660 attached to or integrated into the station 2252.

In at least some cases a user's portable computing device may be anonymously associated with a workstation as part of a user's IOT when the user enters a station zone or present zone. To this end, when a user enters a present zone and is sensed at a station, if the user accesses a station control application on her portable smartphone device, the portable smartphone device may be programmed to automatically transmit the user's anonymous six digit number to system processor 54 so that the processor can access the user's preferences. In other cases the user may be required to enter the six digit code into the user's smartphone to cause that code to be transmitted to processor 54 to initiate preference association.

As described above, some station services may be provided using data that is sensed by station sensor devices alone. For instance, some sit-stand processes may only use data sensed at a station to determine when to recommend sit and stand times. In other cases, station services may rely on other data in addition to data that is generated by system sensors. For instance, in the case of a sit-stand process, the process may be more advantageous if a user's recent sit and stand or walking activities are used to better inform the sit-stand process so that sit and stand times are better suited to a user's overall physical activities during the course of a day, a portion of a day, or some other time period. For instance, wearable fitness sensing devices are used by many people to track number of steps taken during a day, user posture (e.g., sitting or standing), number of flights of steps ascended by a user, etc., as well as physiological parameters like heart rate, blood pressure, perspiration rate, blood glucose level, blood oxygen level, etc. In these cases, wearable fitness device data may be retrieved by a system processor 54 and used in combination with data sensed at a station to adjust sit-stand schedules for station users in more optimal ways. For instance, where a user has been sitting in a vehicle driving to work for the last hour and it takes five minutes to walk from the user's vehicle to her workstation, a sit-stand process may consider the one hour sitting and five minutes walking and start the user's day by recommending a tabletop standing height for the first 30 minutes of the user's day. In contrast, for a second user that walks from home to work for an hour, the sit-stand process may use data indicating an hour long walk obtained from the user's wearable device to change the sit-stand process to recommend a one hour sitting period prior to recommending that the user stand. In yet another case, where a user drives one hour to work and walks five minutes to a workstation, if the user's heart rate is abnormally high as measured by the user's wearable device, processor 54 may again initiate a sit-stand process with a 30 minute sitting period until the user's measured heart rate drops to a more normal level for the particular user. Sit-stand processes and many other station services and processes will benefit from considering a global user dataset (e.g, station sensed and data from other sensor devices and other sources outside the station in general) associated with a user in many cases instead of simply relying on data sensed at a user station.

Figure 76:
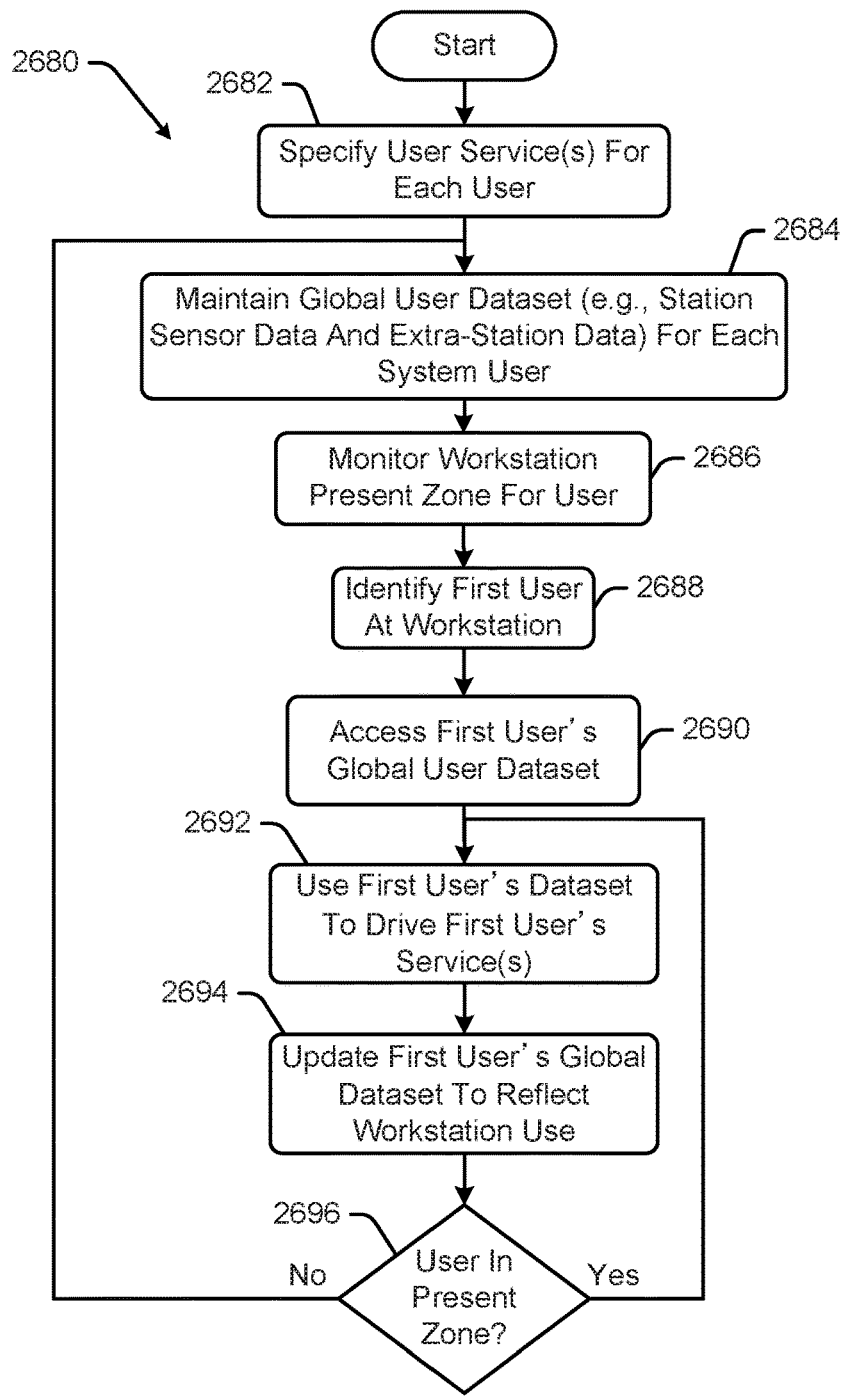
FIG. 76 is a flow chart illustrating a process whereby a user's global user dataset is used to drive workstation processes and services wherein the global dataset includes data from sources other than sensors at the workstation location.

Referring to FIG. 76, a process 2680 whereby a user's global data set is used to drive preferred services is illustrated. At block 2682, user services (see the databases shown in FIGS. 63 and 64) are specified for each of a plurality of system users. At block 2684, a global user dataset is maintained for each system user. Here, the global dataset includes data from station sensors as well as extra-station sensors such as, for instance, user wearable device sensors, sensors from other stations and other sensors within a facility or enterprise space that are not directly associated with station sensors, etc. Other data in the global set may include health records or physical test results, scheduling data, etc. At block 2686, station processor 54 monitors a station present zones for occupancy.

When a first user is identified in a station present zone at 2688, at block 2690, the first user's global dataset is accessed which is used to drive the first user's services at the station at 2692. At 2694, user activities and system data while the user is using the station is collected via station sensors, wearable sensor devices and other sensor devices in a facility and is used to update the first user's global dataset. At block 2696, processor 54 continually monitors user presence in the present zone associated with the station and if the user leaves the zone control loops back up to block 2684 where the process described above continues to loop. If the user remains in the present zone, control loops up to block 2692 and the first user's global dataset is used to drive the user's services at the station.

Regarding use of scheduling information to modify services, the time a user is scheduled to be at a station and what the user is scheduled to be doing before and after the user's time at the station may better inform how to modify user services at the station. For instance, in the case of a sit-stand process, instead of simply assuming that a user will be at the station for an 8 hour work day and basing a sit and stand interval schedule thereon, processor 54 may access a user's schedule and determine that the user only intends to be at the station for a shorter period of time (e.g., one hour). In this case, processor 54 may adjust a sit-stand regimen so that it makes sense given the shorter scheduled period of time at the station.

As another instance, where a user's schedule indicates that the user will be walking for an hour before and an hour after a two hour scheduled time at a station, the sit-stand schedule may again be modified based on the scheduled walking activity which, in at least some cases, may be considered standing activity or even a third type of activity (e.g., walking may be a third activity to standing and sitting). Where a user's station use follows a scheduled two hour run, the sit-stand process may be heavily skewed toward sitting based on the user's schedule information.

As yet one other instance, where a user is scheduled to be at a three hour meeting in a conference room with other employees after a one hour period of workstation use, the sit-stand process may be adjusted to suggest that the user stand at the station during the entire scheduled one hour station use based on the assumption that the user will be sitting throughout most of the three hour period.

As described above, in at least some embodiments some associating activity for associating a user or a user's preferences with a workstation or for associating a user's portable computing device (e.g., a smartphone) with a station will have to occur immediately proximate or very close to the station to avoid a case where an inadvertent or unintended association occurs and then, after association is established, the association may be maintained within a larger zone, area or field. For instance, once a user's portable computing device is associated with a station by being sensed within a small wireless field (e.g., a "near field" within 12 inches of a tabletop sensor 2120 (see again FIG. 72), the association may be maintained while the portable device remains in a larger station zone (see 2550 in FIG. 72). As another instance, referring again to FIG. 72, once a user or the user's preferences are associated with a station while the user is present in the present zone 2158 adjacent a front edge 2156 of the workstation assembly 2552, the association may be maintained while the user remains within the larger station zone 2550 either persistently or, in some cases, for at least some timeout period (e.g., 30 minutes).

Figure 77:
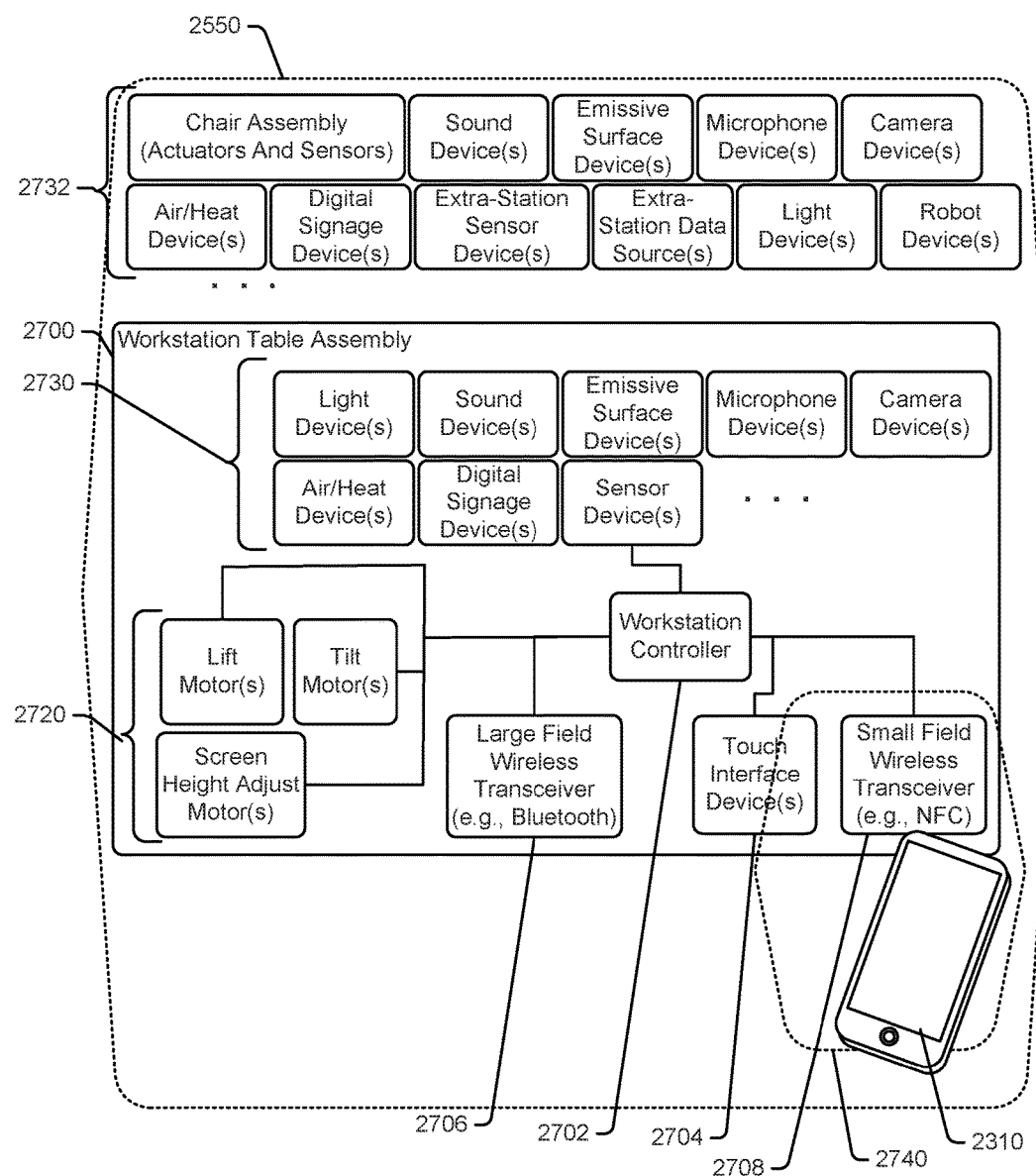
FIG. 77 is a schematic diagram illustrating a workstation table assembly that is consistent with at least some aspects of the p[resent disclosure.

Referring now to FIG. 77, a schematic of a workstation system is illustrated that includes a workstation table assembly 2700 and other extra-table devices or data sources 2732 that may be linked to via wireless transceiver 2706 included in the table assembly or via a hardwired connection. The devices and sources 2732 include a chair assembly with sensors and actuators, sound devices, emissive surface devices, microphone devices, camera devices, air/heat devices, digital signage device, extra-station sensor devices, extra-station data sources (e.g., scheduling, weather, locating services, traffic sources, etc.), light devices, robot devices (e.g., motored totems, cart mounted emissive surfaces, etc.), etc. as described above, any combination of the extra-table devices may be added to a local IOT associated with the table assembly 2700 and then controlled in accordance with user preferences, default settings or prescriptive settings as described above.

Referring still to FIG. 77, in addition to including transceiver 2706, table assembly 2700 also includes a controller 2702, motor or other motive devices 2720, sensors and actuators or affordance devices 2730 that are integrated into the table assembly 2700, a touch interface type device 2704 and a second transceiver 2708. Affordance devices 2730 may include any subset of the devices listed and described including but not limited to light, sound, emissive surface, microphone, camera, air/heat, digital signage and sensor devices. Controller 2702 is linked to each of the integrated affordance devices either via hardwire or wirelessly in some cases. Motors 2720 include lift motors from driving the tabletop of the table assembly to different standing, sitting and intermediate heights per preferences, defaults or user settings. Motors 2720 may also include other motor devices for tilting the tabletop surface, adjusting emissive surface height independent of the tabletop height, and for controlling other table component juxtapositions.

Referring again to FIG. 77, transceiver 2708 is a near field device which is only capable of communication with a user's portable device or other devices that are within a small wireless field that is adjacent the transceiver or sensor. Thus, for instance, referring again to FIG. 72, where the near field transceiver 2708 is proximate interface screen 2120, transceiver 2708 may only be able to interact with a portable device that is located within 6 inches of the top surface of device 2120. In contrast, transceiver 2706 is capable of communication in a much larger wireless field. For instance, transceiver 2706 may be a Bluetooth transceiver that can communicate with a portable wireless devices located anywhere within field 2550 shown in FIG. 72. In FIG. 77, the large wireless station zone or field is labelled 2550 and the smaller near field communication zone is labelled 2740.

The present disclosure contemplates a system wherein a user's portable device 2310 may be used via small field transceiver 2708 to associate with the workstation assembly 2700 and, thereafter, the device may be used to control table and workstation affordances while the device remains within a larger station zone that is associated with the large wireless field of the Bluetooth or other longer range wireless transceiver 2706. Here, a user will have to perform some process or activity that can be detected as an indication that the user wants to associate device 2310 with the station and device 2310 will have to be located within the near field 2740 in order for the table controller or processor 2702 to establish the initial association.

Figure 78:
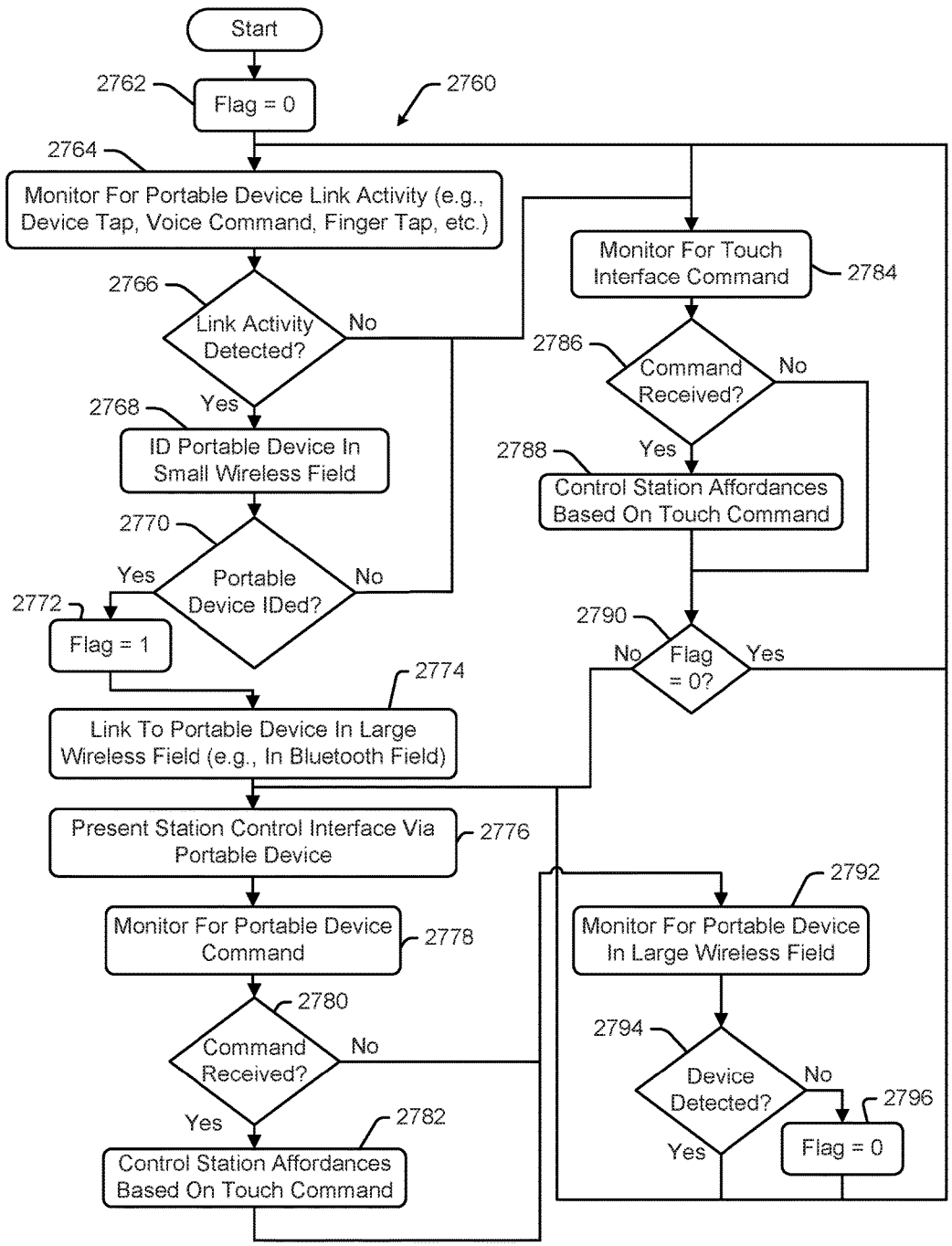
FIG. 78 is a flow chart illustrating a method for associating a portable wireless computing device with a workstation for control.

Referring to FIG. 78, a process 2760 that may be performed by table or station controller 2702 in FIG. 77 is illustrated. At block 2762 a flag that indicates whether or not a user's portable device is already associated with a station is set to zero to indicate that, at least initially, no portable device is associated with the station. At block 2764, controller 2702 monitors for a portable device link activity by a portable device user. For instance, one activity that may indicate a desire to associate a user's portable device to a station may include a user double tapping the top surface of interface 2120 (see again FIG. 72) where the double tap would be recognized as a link activity. In other cases, a link activity may include a user uttering a voice command like "Table, commence portable device association". In still other cases a link activity may require a user to bump the edge of her portable device into interface 2120 or at some other location on the tabletop or some other station component where simultaneous vibration sensed by the portable device and a sensor in the table assembly may be recognized by controller 2702 as a link request or command. Other link activities are contemplated.

Referring still to FIGS. 77 and 78, at block 2766, when no link activity is detected, control passes to block 2784 where controller 2702 monitors the touch type interface 2704 for any station control commands. Here, it is contemplated that interface 2704 may provide the user with a full slate of station control tools or devices. At block 2766, if a link activity is detected, control passes to block 2768 where controller 2702 attempts to identify any portable device located within the near field 2740 by polling the field for any devices located therein. If a portable device is not located in the near field or no device in that field is responsive to the polling, at block 2770 control passes to each of blocks 2764 and 2784 to continue monitoring for other link activities as well as touch interface input. If a portable device is identified at block 2768, the flag is set to "1" to indicate that a device is being associated with the station and then control passes to block 2774.

At block 2774, controller 2702 links to the identified portable device using the large field wireless transceiver 2706 and a station control interface is presented to the portable device user via the portable device at 2776. At 2778, controller 2702 monitors for any portable device station control commands and if no command is received form the portable device, control passes to block 2792. If a station control command is received from the portable device, control passes to block 2782 where the station is controlled per the portable device command and then control passes to block 2792.

At block 2792, controller 2702 monitors the large wireless zone 2550 for the associated portable device and where the device is not detected (e.g., the portable device has been removed from the station zone 2550) at block 2794, the flag is reset to zero to disassociate the portable device from the station after which control passes back up to blocks 2764 and 2784 where the process described above continues to loop. At block 2794, if the portable device is detected in the station zone, control passes directly back up to blocks 274 and 2784.

At block 2784, controller 2702 monitors for touch input via interface 2704. Where a touch interface command is received at 2786, controller 2702 controls the station affordacnes per the command at 2788 and then control passes to decision block 2790. At block 2786, if no touch command is received, control passes directly to block 2790. At block 2790, controller 2702 determines if the association flag is zero where, again, zero indicates that no portable device 2310 is currently associated with the station for control purposes. Where the flag is zero, control passes back up to blocks 2764 and 2784 where controller 2702 monitors for a link activity and for a station interface command, respectively. Where the flag is "1" (e.g., not "0") at block 2790, control passes to block 2776 where the portable device 2310 persistently presents the station control interface via a display screen.

In some cases, other more complex rule sets for maintaining portable device, user preference or even user association with a station are contemplated. For instance, in the example illustrated in FIGS. 77 and 78, one other requirement to maintain device association with a station may be that the user remain within the intermediately sized present zone 2158 in FIG. 72. In other cases, after a portable device is located within the near field zone and is associated with a station, the portable device interface may be presented only when the portable device is within the intermediate size present zone 2158 but the association may be maintained while the portable device is within the larger station zone 2550. Thus, for instance, after association is established based on near field detection, if the user moves the portable device outside present zone 2158 but not outside the station zone 2550, the station control interface may be removed from the portable device display but the association may persist so that if the portable device is again brought back into the present zone, the interface is again presented to the user for station control. In still other cases, as a user moves a portable device that is associated with a station from one proximity zone to another proximity zone (e.g., from the present to the station), controller 2702 may cause the portable device or some other output device at the station to issue a notice or warning to the user that the association may be terminated or that the user should move the portable device back into some closer proximity zone to maintain association or reaccess the station control interface on the portable device display screen.

Referring yet again to FIG. 77, in at least some cases the functionality associated with the two transceivers described above may be provided via a single transceiver that is tunable to change the size of the wireless sensing field. Thus, for instance, a single transceiver may initially be controlled to generate a near field wireless zone for initial station to device association and, after a portable device has been identified in the near field, may be controlled to generate an intermediate present wireless field or zone (e.g., 2158 in FIG. 72) and or a larger station zone or field 2550. Other zone defining capabilities are contemplated.

In all cases, any wireless communication protocol may be used to link system devices or processor together including but not limited to Bluetooth, near field communication, and other protocols now known in the art or yet to be developed.

To apprise the public of the scope of this invention, the following claims are made:

We claim:

1. A method for associating a user's portable computing device with a workstation, the method comprising the steps of:

sensing a link activity at the workstation indicating that a user wants to associate the user's portable computing device with the workstation;

determining that the user's portable computing device is located within a wireless near field zone;

establishing wireless communication between the workstation and the user's portable computing device;

receiving a user workstation settings input at the user's portable computing device, the user workstation settings input including at least a workstation standing height preference and a workstation sitting height preference;

monitoring the location of the user's portable computing device within a wireless present zone associated with the workstation wherein the wireless present zone is larger than the near field zone; and
if the user's portable computing device is detected within the wireless present zone, adjusting height of the workstation using the user workstation settings input; and
if the user's portable computing device is no longer detected within the wireless present zone, removing a workstation control interface from the display screen.

2. The method according to claim 1, wherein the wireless present zone is a wireless transceiver range.

3. The method according to claim 1, the method further comprising, while the workstation control interface is presented on the display screen, receiving a workstation control signal from the portable device and controlling workstation affordances per the workstation control signal.

4. The method according to claim 1, wherein the establishing wireless communication comprises establishing an association between the user's portable computing device and a workstation processor.

5. The method according to claim 4, the method further comprising:
monitoring the location of the user's portable computing device within a wireless station zone associated with the workstation, wherein the wireless station zone is larger than the present zone; and
if the user's portable computing device is no longer detected within the wireless present zone and is still within the wireless station zone, maintaining the association between the user's portable computing device and the workstation processor; and
if the user's portable computing device is outside the wireless station zone, disassociating the user's portable computing device from the workstation processor.

6. The method according to claim 1, wherein the workstation includes a height adjustable tabletop driven between different heights by a processor-controlled motor, wherein the workstation control interface is configured to control the processor-controlled motor.

7. The method according to claim 1, wherein the workstation includes one or more other affordances and the workstation control interface is configured to control the one or more other affordances.

8. The method according to claim 7, wherein the one or more other affordances includes an adjustable chair and the workstation control interface is configured to control the adjustable chair.

9. The method according to claim 7, wherein the one or more other affordances includes at least one light device controllable via the workstation control interface.

10. A method for anonymously acquiring and utilizing a workstation user's usage data, the method comprising the steps of:
correlating anonymous user IDs with user usage data sets in a database;
obtaining input from a user at a workstation;
comparing the user input to the anonymous user IDs to distinguish one distinguished user from other users without determining the identity of the user;
receiving workstation usage data for the user at the workstation, the workstation usage data acquired by a workstation sensor of the workstation; and
updating the user usage data set associated with the distinguished user to include the received workstation usage data.

11. A method for associating a user's portable computing device with a workstation, the method comprising the steps of:
sensing a link activity at the workstation indicating that a user wants to associate the user's portable computing device with the workstation;
determining that the user's portable computing device is located within a wireless near field zone;
establishing wireless communication between the workstation and the user's portable computing device;
receiving a user workstation settings input including at least one workstation height preference; and
adjusting height of the workstation using the user workstation settings input.

12. The method according to claim 11, wherein the sensing a link activity comprises sensing activity at a workstation sensor of the workstation.

13. The method according to claim 11, wherein the sensing a link activity comprises sensing activity at the user's portable computing device.

14. The method according to claim 11, wherein the determining step comprises detecting a near field wireless signal.

15. The method according to claim 11, wherein the establishing wireless communication comprises establishing Bluetooth communication.

16. The method according to claim 11, wherein the user workstation settings input is stored on a server that is remote from the workstation and/or the user's portable computing device.

17. The method according to claim 11, wherein the adjusting height requires a user confirmation prior to the adjusting.

18. The method according to claim 11, wherein the adjusting height is automatic or semi-automatic.

19. The method according to claim 11, wherein the adjusting height follows a height adjustment schedule.

20. The method according to claim 11, wherein receiving the user workstation settings input is at least partly derived from a calculation based on one or more physical properties of the user.

21. The method according to claim 11, wherein the workstation includes one or more other affordances and the user's portable computing device is configured to control the one or more other affordances.

22. The method according to claim 21, wherein the one or more other affordances include a light, a speaker, a heating device or a camera.

23. The method according to claim 22, further comprising the step of storing a user preference corresponding to the one or more affordances.

24. The method according to claim 11, further comprising the step of querying a user about pain while using a chair and forming a pain signature for the user and storing the pain signature.

25. The method according to claim 11, further comprising the step of providing a signal when the user's portable computing device is associated with the workstation.

26. The method according to claim 25, wherein the signal is provided by at least one of a vibrator, a speaker, and a light.

27. The method according to claim 25, wherein a device for providing the signal is associated with the workstation.

28. The method according to claim 25, further comprising the step of providing a signal when the user's portable computing device is associated with an affordance associated with the workstation.

29. The method according to claim 23, further comprising the step of anonymously associating the user preferences with the workstation.

30. The method according to claim 23, wherein the user preferences are accessed using biometric data.

31. The method according to claim 23, wherein the user preferences are accessed using a unique identification number.

32. The method according to claim 23, wherein the user preferences are stored on a user personal device.

33. The method according to claim 23, wherein the user preferences include at least one of a standing height, a sitting height, and a reminder interval.

34. The method according to claim 11, further comprising the step of storing a user guidance activity for retrieval by a user.

35. The method according to claim 34, wherein the user guidance activity comprises a program providing recommendations to a user based on timing and sensed user positions.

36. The method according to claim 35, wherein the program is a sit-stand program.

37. The method according to claim 34, wherein the recommendation is based on a sensed parameter.

38. The method according to claim 37, wherein the sensed parameter is at least one of a heart rate and a temperature.

39. The method according to claim 11, further comprising the step of applying a commissioning procedure to establish at least one of an initial posture signature and a good posture signal.

40. The method according to claim 11, further comprising the step of associating a virtual wireless address with corresponding affordances to form a network of corresponding affordances.

41. The method of claim 18, wherein each of the corresponding affordances includes a resource tag or resource code configured to be read by the user's personal computing device.

* * * * *